US010127563B2

(12) United States Patent
Heath

(10) Patent No.: US 10,127,563 B2
(45) Date of Patent: Nov. 13, 2018

(54) SYSTEM AND METHOD FOR PROVIDING SPORTS AND SPORTING EVENTS RELATED SOCIAL/GEO/PROMO LINK PROMOTIONAL DATA SETS FOR END USER DISPLAY OF INTERACTIVE AD LINKS, PROMOTIONS AND SALE OF PRODUCTS, GOODS, GAMBLING AND/OR SERVICES INTEGRATED WITH 3D SPATIAL GEOMAPPING, COMPANY AND LOCAL INFORMATION FOR SELECTED WORLDWIDE LOCATIONS AND SOCIAL NETWORKING

(76) Inventor: Stephan Heath, Littleton, CO (US)

( * ) Notice: Subject to any disclaimer, the term of this patent is extended or adjusted under 35 U.S.C. 154(b) by 1681 days.

(21) Appl. No.: 13/439,735

(22) Filed: Apr. 4, 2012

(65) Prior Publication Data

US 2013/0073389 A1 Mar. 21, 2013

Related U.S. Application Data

(63) Continuation-in-part of application No. 13/233,352, filed on Sep. 15, 2011, now abandoned, and a
(Continued)

(51) Int. Cl.
*G06Q 30/02* (2012.01)
*G06Q 50/00* (2012.01)

(52) U.S. Cl.
CPC ............. *G06Q 30/02* (2013.01); *G06Q 50/01* (2013.01)

(58) Field of Classification Search
CPC ..................................................... G06Q 30/02
(Continued)

(56) References Cited

U.S. PATENT DOCUMENTS 6,073,124 A 6/2000 Krishnan et al.
7,630,936 B2 12/2009 Kumar et al.
(Continued)

OTHER PUBLICATIONS

Q. Huang and Y. Liu, "On Geo-social network services," 2009 17th International Conference on Geoinformatics, Fairfax, VA, 2009, pp. 1-6; date of conference: Aug. 12-14, 2009; date added to IEEE Xplore Oct. 23, 2009 (Year: 2009).*
(Continued)

*Primary Examiner* — Eric R Netzloff
*Assistant Examiner* — Michael R Stibley
(74) *Attorney, Agent, or Firm* — Peter B. Scull; Hamilton DeSanctis & Cha LLP

(57) ABSTRACT

A technique, method, apparatus, and system to provide sports and sporting events related, integrated social networking, real time geospatial mapping, geo-target location based technologies including GPS and GIS and multiple points of interest, receiving current location of user's electronic or mobile device and multiple points of interest, cloud-type configuration storing and handling user data across multiple enterprises, generating user behavior data and ad links, promotions ("social/geo/promo") links on a website for sports and sporting events related products, goods, gambling, and/or services, including sports related social/geo/promo data sets for user customized visual displays showing 3D map presentations with correlated or related broad or alternative categories of social/geo/promo links to be displayed with web page content for view and interaction by an end user.

8 Claims, 28 Drawing Sheets

Related U.S. Application Data continuation-in-part of application No. 13/337,271, filed on Dec. 26, 2011, and a continuation-in-part of application No. 13/337,275, filed on Dec. 26, 2011, and a continuation-in-part of application No. 13/359,498, filed on Jan. 27, 2012, and a continuation-in-part of application No. 13/369,244, filed on Feb. 8, 2012, and a continuation-in-part of application No. 13/430,600, filed on Mar. 26, 2012.

(58) Field of Classification Search
USPC .......................................................... 705/14
See application file for complete search history.

(56) References Cited

U.S. PATENT DOCUMENTS

| | | | |
|---|---|---|---|
| 7,756,756 B1 | 7/2010 | Lifson | |
| 7,831,476 B2* | 11/2010 | Foster | G06Q 30/02 705/26.8 |
| 7,860,852 B2 | 12/2010 | Brunner et al. | |
| 7,908,263 B1 | 3/2011 | Palz et al. | |
| 7,933,897 B2 | 4/2011 | Jones et al. | |
| 7,970,665 B1 | 6/2011 | Lifson | |
| 7,980,466 B2 | 7/2011 | Lee et al. | |
| 8,209,220 B2 | 1/2012 | Yoshikawa et al. | |
| 2002/0055924 A1 | 5/2002 | Liming et al. | |
| 2002/0094868 A1 | 7/2002 | Tuck et al. | |
| 2003/0158796 A1 | 8/2003 | Balent | |
| 2004/0073634 A1* | 4/2004 | Haghpassand | G06F 21/50 709/220 |
| 2005/0027705 A1* | 2/2005 | Sadri | G06F 17/30994 |
| 2005/0288959 A1 | 12/2005 | Eraker et al. | |
| 2006/0170670 A1 | 8/2006 | Burke | |
| 2006/0238380 A1* | 10/2006 | Kimchi | G01C 21/26 340/995.1 |
| 2006/0265197 A1 | 11/2006 | Peterson et al. | |
| 2007/0043766 A1* | 2/2007 | Nicholas | H04L 67/02 |
| 2007/0143345 A1 | 6/2007 | Jones et al. | |
| 2007/0174259 A1* | 7/2007 | Amjadi | G06F 17/30864 |
| 2007/0219712 A1* | 9/2007 | Abhyanker | G06Q 10/087 701/532 |
| 2007/0265006 A1 | 11/2007 | Washok et al. | |
| 2008/0028341 A1* | 1/2008 | Szeliski | G06F 3/04815 715/854 |
| 2008/0307003 A1 | 2/2008 | O'Donnell et al. | |
| 2008/0086356 A1* | 4/2008 | Glassman | G06Q 30/0242 705/14.41 |
| 2008/0140650 A1* | 6/2008 | Stackpole | G06F 17/3087 |
| 2008/0172288 A1 | 7/2008 | Pilkalns et al. | |
| 2008/0201156 A1 | 8/2008 | Abhyanker et al. | |
| 2008/0214148 A1* | 9/2008 | Ramer | G06F 17/30749 455/414.1 |
| 2008/0222295 A1* | 9/2008 | Robinson | G06F 17/30867 709/227 |
| 2008/0300979 A1 | 12/2008 | Abhyanker et al. | |
| 2009/0070129 A1 | 3/2009 | Inbar et al. | |
| 2009/0070204 A1 | 3/2009 | Clancy et al. | |
| 2009/0144144 A1 | 6/2009 | Grouf et al. | |
| 2009/0163187 A1 | 6/2009 | Terrell et al. | |
| 2009/0187486 A1 | 7/2009 | Lefenfeld et al. | |
| 2009/0198607 A1* | 8/2009 | Badger | G06Q 30/02 705/37 |
| 2010/0042923 A1* | 2/2010 | Barcay | G06T 17/05 715/715 |
| 2010/0094752 A1 | 4/2010 | Heath | |
| 2010/0119053 A1 | 5/2010 | Goeldi | |
| 2010/0145800 A1 | 6/2010 | Eraker et al. | |
| 2010/0169161 A1* | 7/2010 | Sacco | G06Q 10/107 705/319 |
| 2010/0198684 A1 | 8/2010 | Eraker et al. | |
| 2010/0226535 A1 | 9/2010 | Kimchi et al. | |
| 2010/0325563 A1 | 12/2010 | Goldthwaite et al. | |
| 2011/0004515 A1 | 1/2011 | Mesaros | |
| 2011/0029360 A1 | 2/2011 | Gollapalli | |
| 2011/0035284 A1 | 2/2011 | Moshfeghi | |
| 2011/0041168 A1 | 2/2011 | Murray | |
| 2011/0066615 A1 | 3/2011 | Pradhan et al. | |
| 2011/0082736 A1 | 4/2011 | Goldman et al. | |
| 2011/0173066 A1 | 7/2011 | Simmons et al. | |
| 2011/0191417 A1 | 8/2011 | Rathord | |
| 2011/0191432 A1 | 8/2011 | Layson et al. | |
| 2011/0196776 A1 | 8/2011 | Rash et al. | |
| 2011/0208724 A1 | 8/2011 | Jones et al. | |
| 2011/0208822 A1* | 8/2011 | Rathod | G06Q 30/02 709/206 |
| 2011/0231363 A1 | 9/2011 | Rathod | |
| 2011/0238762 A1* | 9/2011 | Soni | G01C 21/3679 709/206 |
| 2011/0246305 A1 | 10/2011 | Brazeau et al. | |
| 2011/0258073 A1 | 10/2011 | Lifson et al. | |
| 2011/0276396 A1 | 11/2011 | Rathod | |
| 2011/0276628 A1 | 11/2011 | Pell | |
| 2011/0313781 A1 | 12/2011 | Ho | |
| 2012/0036015 A1 | 2/2012 | Sheikh | |
| 2012/0054014 A1 | 3/2012 | Cho et al. | |
| 2012/0066037 A1 | 3/2012 | Glen | |
| 2012/0245990 A1* | 9/2012 | Agarwal | G06Q 30/0202 705/14.25 |
| 2013/0073336 A1 | 3/2013 | Heath | |
| 2013/0073366 A1 | 3/2013 | Heath | |
| 2013/0073374 A1 | 3/2013 | Heath | |
| 2013/0073376 A1 | 3/2013 | Heath | |
| 2013/0073377 A1 | 3/2013 | Heath | |
| 2013/0073387 A1 | 3/2013 | Heath | |
| 2013/0073388 A1 | 3/2013 | Heath | |
| 2013/0073400 A1 | 3/2013 | Heath | |
| 2013/0073473 A1 | 3/2013 | Heath | |
| 2013/0268357 A1 | 10/2013 | Heath | |
| 2014/0006129 A1 | 1/2014 | Heath | |

OTHER PUBLICATIONS

International Search Report and Written Opinion of the International Searching Authority. International Application No. PCT/US2012/036896, issued by the United States Patent Office, dated Jul. 20, 2012, Alexandria Virginia.

\* cited by examiner

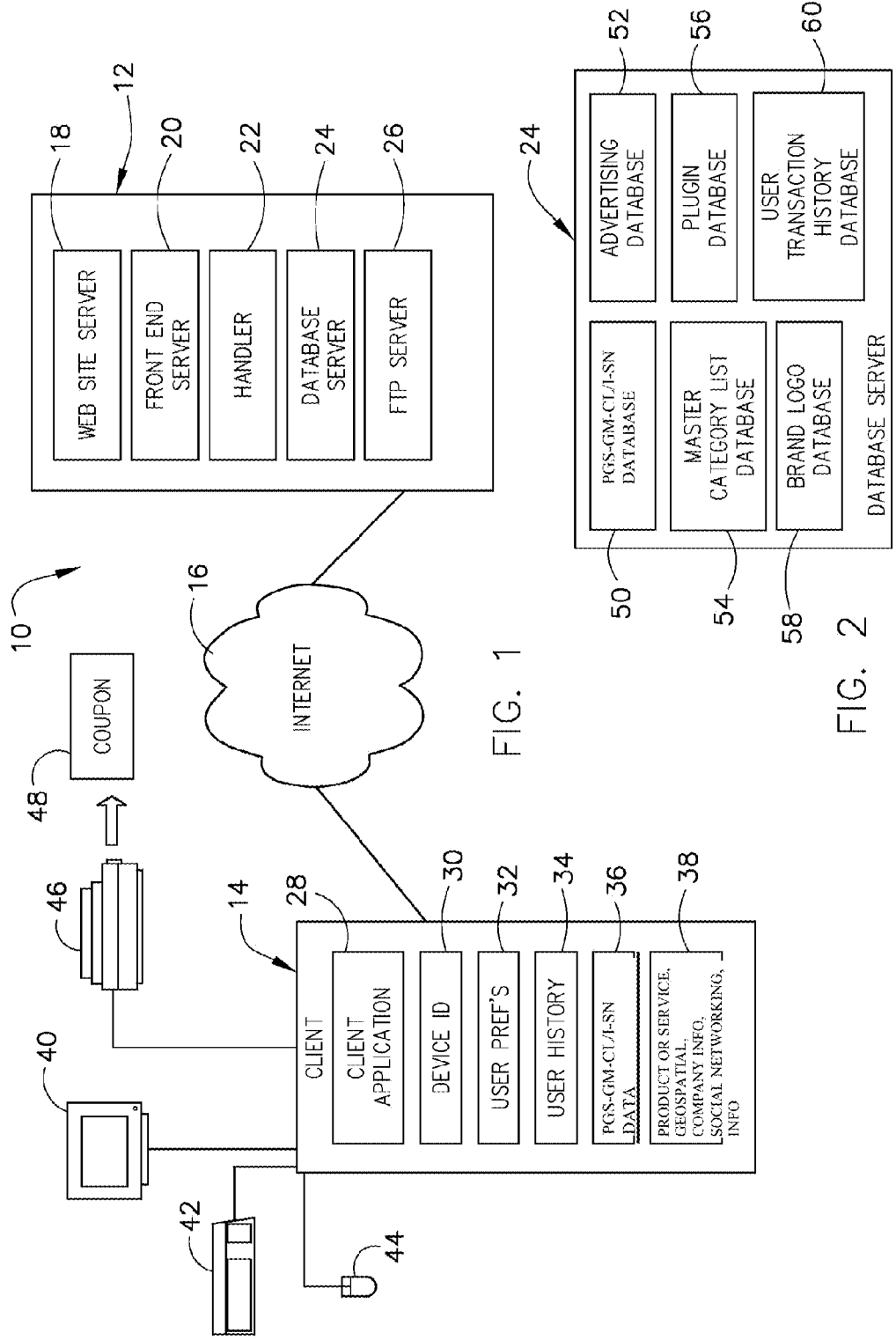

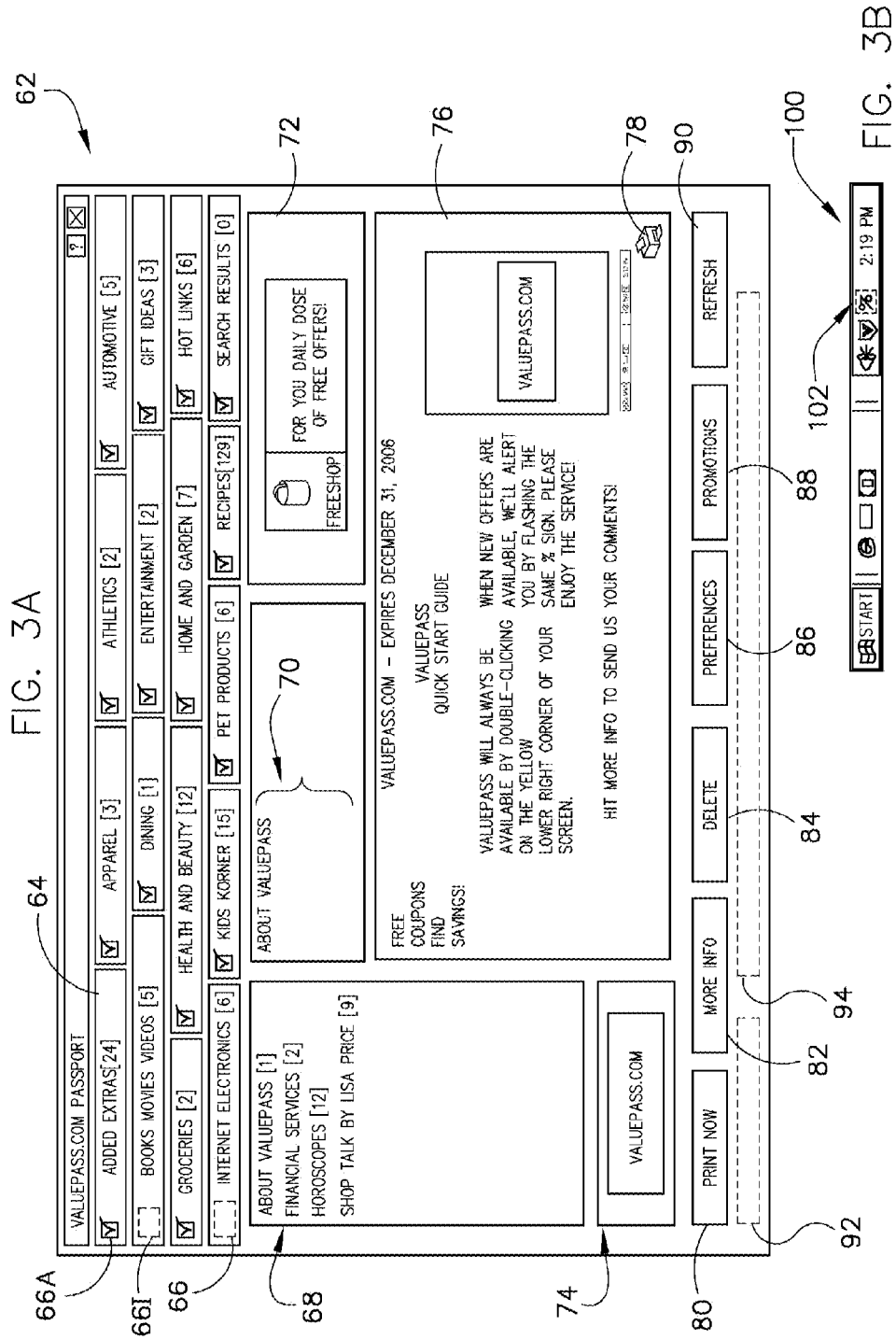

SPORTS AND SPORTING EVENTS RELATED
SOCIAL EARTH GEOSPATIAL WEBSITE FOR MULTIDIMENSIONAL
RESPRESENTATIONS OF SCALABLE GLOBAL PLATFORM WITH:

WITH:

GEOSPATIAL MAPPING

LOCAL, GLOBAL & COMPANY INFORMATION

SOCIAL NETWORKING

MOBILE PRODUCTS & SERVICES

SPORTS AND SPORTING EVENTS RELATED:

PROMOTIONS, ONLINE SERVICES,
MOBILE SERVICES,
PRODUCTS, GOODS, SERVICES,
ENTERTAINMENT SHOPPING,
PENNY AND ONLINE AUCTIONS,
ADVERTISEMENTS AND AFFILIATE ADVERTISING,
E-COMMERCE,
SPORTS,
PERSONAL AND FINANCIAL NETWORK,
TRAVEL AND HOSPITALITY SERVICES,
REAL ESTATE, EDUCATIONAL SERVICES,
ANCILLARY SERVICES, SERVICE PROVIDERS,
ONLINE DATING,
GAMING, RETAIL STORES,
VIRTUAL COMMUNITIES AND GOODS

FIG.23

SOCIAL EARTH SPORTS AND SPORTING EVENT RELATED SOCIAL/GEO/PROMO LINK PROMOTIONS AND SALES OF PRODUCTS, GOODS AND SERVICES

PROMOTIONS,
ONLINE COUPONS,
MOBILE SERVICES,
PRODUCTS, GOODS,
SERVICES,
ENTERTAINMENT SHOPPING,
PENNY/ONLINE AUCTIONS,
ADVERTISEMENTS/AFFILIATE
ADVERTISING,
E-COMMERCE,
SPORTS,
PERSONAL/FINANCIAL
NETWORK,
TRAVEL/HOSPITALITY
SERVICES,
REAL ESTATE
EDUCATIONAL SERVICES,
ANCILLARY SERVICES,
SERVICE PROVIDERS,
ONLINE DATING,
GAMING, RETAIL STORES,
VIRTUAL COMMUNITIES
VIRTUAL GOODS

ANALYSIS
PREDICTION
TARGET
MARKETS
CUSTOMIZED
WEBSITE
DISPLAYS

END USER'S ONLINE ACTIVITY, LOCATION, COMMUNICATIONS, SEARCH INQUIRIES ONLINE COMMUNICATIONS, PURCHASING, AND BEHAVIOR, FOR COLLECTION AND ANALYSI USED TO PROVIDE CUSTOMIZED PROMOTIONAL WEBSITE DISPLAYS OF PROMOTIONS, PRODUCTS, GOODS AND SERVIVCES, AND RELATED COMPANY AND LOCAL INFORMATION USING THREE DIMENSIONAL AND SCALABLE GEOSPATIAL MAPPING

FIG.24

SYSTEM AND METHOD FOR PROVIDING SPORTS AND SPORTING EVENTS RELATED SOCIAL/GEO/PROMO LINK PROMOTIONAL DATA SETS FOR END USER DISPLAY OF INTERACTIVE AD LINKS, PROMOTIONS AND SALE OF PRODUCTS, GOODS, GAMBLING AND/OR SERVICES INTEGRATED WITH 3D SPATIAL GEOMAPPING, COMPANY AND LOCAL INFORMATION FOR SELECTED WORLDWIDE LOCATIONS AND SOCIAL NETWORKING

PRIORITY

This application is a continuation in part of, and claims priority to, U.S. application Ser. No. 13/233,352, filed 15 Sep. 2011, Ser. No. 13/337,271, filed 26 Dec. 2011, Ser. No. 13/337,275, filed 26 Dec. 2011, Ser. No. 13/359,498, filed 27 Jan. 2012, Ser. No. 13/369,244, filed Feb. 8, 2012, and Ser. No. 13/430,600, filed Mar. 26, 2012, each of which applications are entirely incorporated herein by reference.

FIELD OF THE INVENTION

The subject matter relates to online systems, methods, and computer related aspects of providing broad and alternative category clustering of the same, similar or different categories in social/geo/promo link promotional data sets for end user display of interactive ad links, promotions and sale of sports and sporting events related products, goods, gambling, and/or services integrated with 3D spatial geomapping and social networking.

BACKGROUND

The Geospatial Revolution examines the world of digital mapping and how it is changing the way we think, behave and interact. Geospatial information influences nearly everything. Seamless layers of satellites, surveillance, and location-based technologies create a worldwide geographic knowledge base vital to the interconnected global community. The Geospatial Revolution explores compelling human stories that explain the history, applications, related privacy issues, and impact of location-based technologies including GPS and GIS. The video episodes are useful for teaching history, social studies, geography, environment, and ecology, science and technology and for learning about career development.

Time and resources are wasted in the marketing of online products and services. Consumers waste time shopping in person or attempting to search for products or services online where they lack control or create suitable preferences for access to the search results. One approach taken in response to these and other shortcomings involves providing for products or services over the Internet, e.g., a system for shopping online over public computer networks such as the Internet. However, users and members of such systems stem usually must be registered, wherein registration and/or subscription by the user can provide information sufficient to identify the user, such as the users and members name, address, Internet e-mail address, and/or an identification number, using an Internet server and a user display terminal in communication therewith. There are, however, numerous shortcomings to such a system. Group buying sites leverage the power of collective bargaining, providing local product or services deals that offer savings for consumers while delivering improved sales numbers to participating merchants.

In standard geographic information system (GIS) (also called geographic mapping and/or "GM") system, geographically-referenced information is maintained confidential and protected datastores by the creators and/or collectors of such data. Access to information in the datastores is controlled and provided directly by the creator and/or owner. Without knowledge of the source and/or location of particular geographically-referenced information and a password and/or certificate to access the information, the information is inaccessible. Integration of geographically-referenced information to provide an integrated interface and/or view of the information in context with a geographic map is usually performed at a user's computer using sophisticated GM and/or GIS software.

Alternatively, a user can interface with a server device managed by the creator through a client device running specialized software applications to interact with the GM and/or GIS databases of the data creators. At present access to data in a public forum is generally restricted by standard network security measures such as digest authentication and certificates. However, there are problems and shortcomings with online products or services which should also provide socially conscious information about the companies that supply the online products or services so that consumers can see where the companies and/or stores are located and can find out information about the companies, communities they are located in, what interaction and help they provide to communities and/or other economic and/or socially responsible activities, and to associate the geographical and other geospatially available information connecting also by the use of integrated social media, which combination is not current provided and/or available.

Consumers enjoy interacting with friends, acquaintances and strangers across many media channels, but that doesn't mean they trust them as a source of advertising. However, a new host of companies are connecting brands to consumers through their social connections. New web technology has created unexpected ways for advertisers to track your web activity without your knowledge enabling advertising networks to secretly monitor a user's activity across multiple websites and build detailed profiles of their behavior and interests.

Social software applications include communication tools and interactive tools. Communication tools typically handle the capturing, storing and presentation of communications, usually written but increasingly including audio and video as well. Interactive tools handle mediated interactions between a pair or group of users. They focus on establishing and maintaining a connection amount users, facilitating the mechanics of conversation and talk.

Interactive media (e.g., the Internet) has great potential for the targeting of advertisements ("ads") to receptive audiences. One form of online advertising is ad syndication, which allows advertisers to extend their marketing reach by distributing ads to additional partners. For example, third party online publishers can place an advertiser's text or image ads on web properties with desirable content to drive online customers to the advertiser's website. An example of such a system is AdSense™ offered by Google, Inc.

Ad syndication can also include related social/geo/promo link promotional data sets as one type of ad format. Related social/geo/promo link promotional data sets display a list of selectable topics or categories as links. For example, third party online publishers can place one or more related social/geo/promo link promotional data sets on a requested web page, where the related social/geo/promo link promotional data sets display topics or categories relevant to the content of the requested web page. When a user selects one of the categories of the related social/geo/promo link promotional data set, the user can be presented with ads in the selected category, which are related to the content of the requested web page. Related social/geo/promo link promotional data sets can provide ads which are closely targeted to the interests of a user.

Related social/geo/promo link promotional data sets can display one or more (e.g., four or five) categories. However, if the categories of a related social/geo/promo link promotional data set are very similar, a user will likely choose the first category, ignoring the remaining categories on the list. This can reduce the distribution potential of the ads in the remaining categories on the list. If multiple related social/geo/promo link promotional data sets are displayed with a web page, a user may have difficulty finding a particular category of interest if the categories are scattered across the multiple related social/geo/promo link promotional data sets without regard to the correlation or diversity of the categories.

SUMMARY OF THE INVENTION

The present invention provides one or more of a method, apparatus, computer readable medium, computer system, wireless or wired network, or system to provide sports and sports events related and integrated social networking, real time geospatial mapping, geo-target location and multiple points of interest, receiving current location of user's electronic or mobile device and multiple points of interest, cloud-type configuration storing and handling user data across multiple enterprises, generating user behavior data, ad links and promotions ("social/geo/promo") links on a website for sports and sporting event related products, goods, gambling, or services, including sports related social/geo/promo data sets for user customized visual displays showing 3D map presentations with correlated or related broad or alternative categories of social/geo/promo links to be displayed with web page content for view by an end user.

The present invention provides in one aspect a system and method for providing combined technologies for social networking interactions using tracking, predicting, and implementing online consumer communications, browsing behavior, buying patterns, social networking, social networking communications, embedded advertisements and affiliate advertising and communications, for ad links, promotions, online coupons, mobile services, Sports related Products, Goods, Gambling, and/or Services, on a three dimensional geospatial platform using geospatial mapping technology, company-local information, social networking, and social networking communities ("PSGGS-GM-CL/I-SN").

The present invention addresses problems and/or shortcomings of prior online products and services, which should also provide socially conscious information about the companies that supply the online products and services so that consumers can see where the companies and/or stores are located and can find out information about the companies, communities they are located in, what interaction and help they provide to communities and/or other economic and/or socially responsible activities, and to associate the geographical and other geospatially available information connecting also by the use of integrated social media, which combination is not current provided and/or available.

As users and members and/or subscribers of the website Sports related Products, Goods, Gambling and/or Services, (e.g., "Social Shoppers") shop the world for ad links, promotions, online coupons, mobile services. Such users and members and/or subscribers (e.g., "Social Shoppers") can find great ad links, promotions, online coupons, mobile services, Sports related Products, Goods, Gambling, and/or Services from leading travel & hospitality industry, restaurant, toy and/or entertainment companies and/or top retailers around the world.

Users and members of the present invention can do one or more of the following: Use the present invention after installing Google Earth™ or similar plug-ins; View Social Earth ad links, promotions, Sports related Products, Goods, Gambling, and/or Services, optional information about microloans or microcredit, humanitarian aid and support other worldly causes through charitable donations or sustainable gifts for those in need around the world by geo-target location on the present inventions unique Live View of the planet; View "live social feeds" from social networking sites such as Facebook™ and Twitter™; Zoom to birds-eye and human scale view and navigate around stunning 3D satellite images of the virtual Earth; Type in an address and fly directly to the location on the platform by using the zoom technology; and/or Watch videos from RSS links. The present invention provides a unique interactive user experience; view live links to places and events knowing that a portion of the dollars spent on the present invention are going to help those in impoverished conditions around the world.

The delivery system for a host geospatial website (accessible via a mobile device or computer) can provide for a multidimensional representation of information and/or sealable version of web content for an infrastructure and global platform that provides users and members and businesses of all types and sizes with access to broad markets for the delivery system and method for providing combined social behavior tracking, online surveillance and web bot software technologies via a mobile device or computer for tracking online consumer behavior and data, cookies, embedded advertisements and affiliate advertising, social plugins, social applications, predicting online consumer behavior, buying patterns, monitoring online activity, location, online communications, search inquiries, social networking, social plugins, ad links, promotions, social applications, products, goods and services, on a three dimensional geospatial platform using geospatial mapping technology.

A host geospatial website can include realistic virtual landscape using satellite and/or aerial photography that can include many content layers of web based information, e-commerce and mobile banking links, social networking, social networking communities and/or advertisements and affiliate advertising for a richer user experience. A host geospatial website shall store images, web-based content, social data and/or share live social feeds from social networking giants Facebook™ and Twitter™, social networking, social networking communities, social plugins, social applications, ad links, promotions, Sports related Products, Goods, Gambling, and/or Services, and/or other communications in real-time. The use of geospatial mapping for associating information to specific places can include, but is not limited to, one or more of: Live links to places and events; Data on the landscape; Zoom to birds-eye and human scale views; 3D custom audio/visual content; Interactive 360 panoramas; Fly-through tours with content, narration, music; Stunning imagery and videos; 3D buildings and landscaping e-commerce and mobile banking tools and hooks; Advertising on the landscape; Advanced search for private and public information; Social networking, social plugins, social applications, social integration and social networking communities; Self-posting for uploading user generated content; Custom tools, social and mobile apps and widgets; tracking social behavior and the like.

Accordingly, it is an object of the present invention to provide a new mechanism for tracking social behavior and profiling a user during the marketing of digital content, by any means known in the art, e.g., as disclosed in U.S. application Ser. No. 09/797,647, filed Mar. 1, 2001, which is entirely incorporated herein by reference.

Another object of the invention is to provide such a mechanism which is substantially ambivalent to the underlying nature of the digital content.

Another object of the invention is to provide such a mechanism which works when the user is off-line and accessing a local inventory of the digital content.

Another object of the invention is to provide geo-target location or mobile device and receiving current location of user's electronic device and multiple points of interest.

Another object of the invention is to provide group chat, circle of friends, hangouts, games, search, uploading videos or photos and instant messenger in connection with social networking and multiple points of interest.

Another object of the invention is to provide media and entertainment, sporting events, stadiums, venues, athletes, players and player profiles, coaches, scores and updates, scoreboards, sports memorabilia or other merchandise, advertisements, popular sports around the world such as auto racing, horse racing, Summer & Winter Olympics, baseball, basketball, boxing, cricket, cycling, fighting, golf, hockey, football (American), football (soccer), World Cup Soccer, motorsports, polo, rowing, rugby, swimming, tennis, volleyball and more, RSS links, videos and other Products, Goods, Gambling or Services.

Another object of the invention is to provide cloud-type configuration storing and handling user data across multiple applications and generating user behavior data.

And, another object of the invention is to provide such a mechanism which operates continuously, whenever consumers want and without need for the actual physical availability of vendor and financial intermediary parties.

Briefly, preferred embodiment of the present invention is a method for collecting user data, and optionally creating a user profile. A part of an end user's online or user profile is their Volunteered Geographic Information (VGI) such as a user's current geographical location. Social network members in different cities, countries, or continents engage in different activities due to accessibility, economy, culture, or other factors. Data mining can be included in combined or separate groups of social network profiles according to their geography in order to discover information about a place. This results in keywords associated with a specific location and provides an automated way to describe a place in an up to date fashion based upon its current local residents. Location-Based Social Network (LBSN) profiles from four different places are analyzed here and the results are presented as they relate to space, time, and activities. An inventory of digital content is supplied, wherein at least part of the inventory is pre-stored on a client computer. The inventory includes at least one asset, collateral for an asset, or advertisement. Information about the inventory is displayed to a user of the client computer and user data is collected about the user based on their actions with regard to the information about the inventory. Optionally, a user profile is then constructed based on the user data.

An advantage of the present invention is that it provides behavior tracking and user profiling at the speed of digital electronics, yet operates in the context of the conventional, time proven, widely understood, and trusted transactional interrelation of consumer, financial intermediary, and vendor.

Another advantage of the invention is that it may be entirely automated and may employ communications with outside services which may also be entirely automated.

And, another advantage of the invention is that it is efficient and economical for all involved. The initial user being tracked and profiled are not burdened and the end users of the information provided can automatically and cheaply obtain the data being generated.

These and other objects and advantages of the present invention will become clear to those skilled in the art in view of the description of the best presently known mode of carrying out the invention and the industrial applicability of the preferred embodiment as described herein and as illustrated in the several figures of the drawings.

Social Networking Integration: The present invention can also provide in certain embodiments integrated social plugins with "live social feeds" from social networking giants Facebook™ and Twitter™, e.g., but not limited to Facebook™ and Twitter™, into its website(s), which allows Social Shoppers to interact and share the latest ad links, promotions, online coupons, mobile services, Sports related Products, Goods, Gambling and/or Services with their friends, acquaintances, strangers, family, business associates, and others. Tapping into the power of social networking users through social networking integration will help users of the present invention connect with thousands or millions of users around the world in real time. Twitter™ the latest social networking phenomenon, enables its users to send and read other users messages called "tweets." The present invention provides opportunities to use open source technology to rapidly grow its Social Shoppers around the world by utilizing social networking integration and developing social applications with feeds" from social networking sites Facebook™ and Twitter™ into its website and encouraging Social Shoppers to share the latest products or services or deals with their friends in these popular social networks. A technique, method, apparatus, and system are described to provide related social/geo/promo link promotional data sets with correlated or related broad or alternative categories to be displayed with web page content for view by a user. A composite correlation measure between two social/geo/promo link categories can be determined, where the composite correlation measure is one of a maximum, a minimum, or a combination of separate correlation criteria for a first social/geo/promo link category with a second social/geo/promo link category. In general, in one aspect, a method is provided. The method includes selecting a first social/geo/promo link category for a first position of a social/geo/promo link promotional data set. One or more second social/geo/promo link categories are identified using one or more correlation criteria, where at least one second social/geo/promo link category has one or more correlation criteria associated with the first social/geo/promo link category.

Implementations can include one or more of the following features. A third social/geo/promo link category can be selected for a second position of the social/geo/promo link promotional data set, where the third social/geo/promo link category is different from the one or more identified second social/geo/promo link categories.

The social/geo/promo link promotional data set can be associated with a web page, and the social/geo/promo link categories can be ordered by relevance to the web page. Identifying one or more second social/geo/promo link categories using one or more correlation criteria can include identifying one or more social/geo/promo link categories having a correlation measure that is less than a correlation threshold. The social/geo/promo link categories can be associated with one or more category identifiers, and at least one of the one or more correlation criteria of a second social/geo/promo link category can be a measure of the correlation between a category identifier associated with the second social/geo/promo link category and a category identifier associated with the first social/geo/promo link category. At least one second social/geo/promo link category can have a separate correlation measure for at least one pair-wise combination of a category identifier associated with the at least one second social/geo/promo link category and a category identifier associated with the first social/geo/promo link category. The at least one second social/geo/promo link category can have a composite correlation measure, where the composite correlation measure can be one of a maximum, a minimum, or a combination of the separate correlation criteria for the at least one second social/geo/promo link category. Identifying one or more social/geo/promo link categories having a correlation measure that is less than a correlation threshold can include identifying one or more social/geo/promo link categories having a composite correlation measure that is less than a correlation threshold.

In general, in one aspect, a method is provided. The method includes selecting a first social/geo/promo link category for a first position of a social/geo/promo link promotional data set, where the first social/geo/promo link category is in a set of candidate social/geo/promo link categories. For at least one empty position in the social/geo/promo link promotional data set, social/geo/promo link categories having a correlation measure that is less than a correlation threshold are identified, where the identified social/geo/promo link categories are in the set of candidate social/geo/promo link categories, and at least one social/geo/promo link category in the set of candidate social/geo/promo link categories has one or more correlation criteria associated with a most recently selected social/geo/promo link category. For at least one empty position in the social/geo/promo link promotional data set, a next social/geo/promo link category for a next empty position of the social/geo/promo link promotional data set is selected, where the next social/geo/promo link category is in the set of candidate social/geo/promo link categories.

Implementations can include one or more of the following features. The identified social/geo/promo link categories can be removed from the set of candidate social/geo/promo link categories. The selected social/geo/promo link categories can be removed from the set of candidate social/geo/promo link categories. The social/geo/promo link categories in the set of candidate social/geo/promo link categories can be associated with a web page, and the social/geo/promo link categories in the set of candidate social/geo/promo link categories can be ordered by relevance of the social/geo/promo link categories to the web page.

In general, in one aspect, a method is provided. The method includes, for a set of candidate social/geo/promo link categories and at least one social/geo/promo link promotional data set associated with a web page, selecting a first social/geo/promo link category for a first position of the social/geo/promo link promotional data set, where the first social/geo/promo link category is in the set of candidate social/geo/promo link categories. For at least one empty position in the social/geo/promo link promotional data set, social/geo/promo link categories having a correlation measure that is greater than a correlation threshold are identified, where the identified social/geo/promo link categories are in the set of candidate social/geo/promo link categories, and at least one social/geo/promo link category in the set of candidate social/geo/promo link categories has one or more correlation criteria associated with a most recently selected social/geo/promo link category. For at least one empty position in the social/geo/promo link promotional data set, a next social/geo/promo link category is selected for a next empty position of the social/geo/promo link promotional data set, where the next social/geo/promo link category is in the set of candidate social/geo/promo link categories.

Implementations can include the following feature. The identified social/geo/promo link categories can be removed from the set of candidate social/geo/promo link categories before selecting a next social/geo/promo link category for a next empty position of the social/geo/promo link promotional data set, and at least one removed identified social/geo/promo link category can be added to the set of candidate social/geo/promo link categories before selecting a first social/geo/promo link category for a first position of a next social/geo/promo link promotional data set.

Other implementations are disclosed, including implementations directed to systems and computer-readable medium.

Particular embodiments of the subject matter described in this specification can be implemented to realize one or more of the following advantages. The quality of related social/geo/promo link promotional data sets and user experience can be improved by increasing the variety of categories displayed in a single related social/geo/promo link promotional data set. When multiple related social/geo/promo link promotional data sets are to be displayed, individual related social/geo/promo link promotional data sets can include similar categories while sets of categories can be diversified across the multiple related social/geo/promo link promotional data sets.

BRIEF DESCRIPTION OF THE DRAWINGS

FIG. 1 is a diagrammatic and block diagram view of an electronic Sports related Product, Good, Gambling, or Service with /Geospatial Mapping/Company-Local Information/Social Networking/Communities ("PSGGS-GM-CL/I-SN") information and/or product/good/service distribution system, according to an exemplary embodiment;

FIG. 2 is a simplified block diagram showing, in greater detail, a database server portion of the main server system shown in FIG. 1;

FIGS. 3A-3B illustrate a screen display defining an interface associated with a client system portion, according to an exemplary embodiment;

FIG. 23 is flow chart and a list of representative sports related products and services that can be provided in combination with geospatial mapping, socially responsible information, local, global and company information, social networking, and charity/aid, according to the present invention.

FIG. 24 presents a flow chart showing a typical transaction for the purchase online coupons, mobile services, Sports related Products, Goods, Gambling, and/or Services and more that provides a portion of each sale shall be attributed to microloans or microcredit, humanitarian aid and support other worldly causes through charitable donations or sustainable gifts. In addition, users will also be able to donate money to a worthy cause through the Shopping Cart or purchasing a online coupons, mobile services, sports related products, good and/or services, on the "Giving Back" Layer; "View Social Earth ad links, promotions, online coupons, mobile services, Sports related Products, Goods, Gambling, and/or Services, with information, optionally about microloans or microcredit, humanitarian aid and support other worldly causes through charitable donations or sustainable gifts that will help those in need around the world by geo-target location or anywhere in the world on the present inventions unique Live View of the planet.

DETAILED DESCRIPTION

Figure 4:
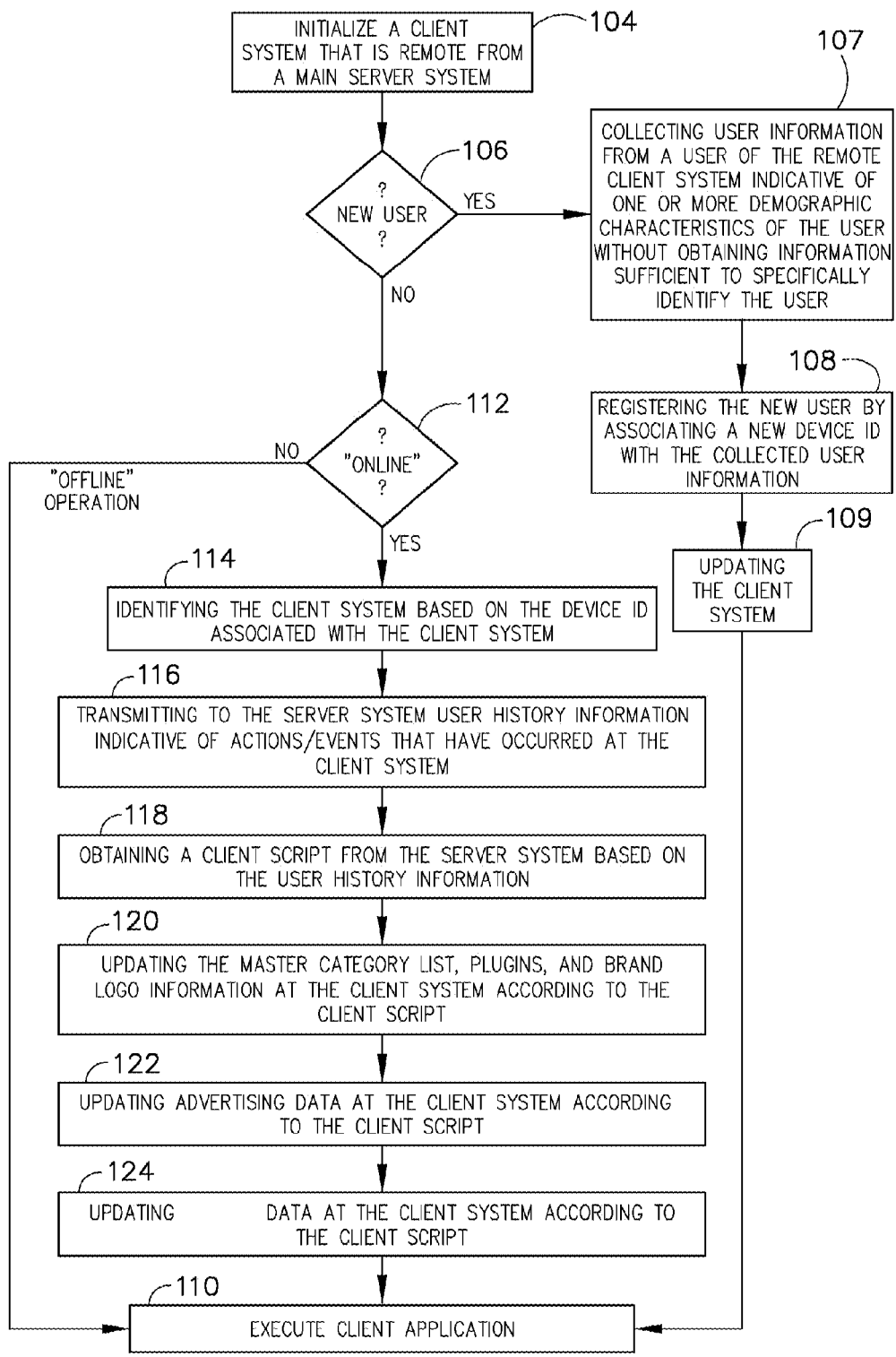
FIG. 4 is a simplified flowchart diagram view illustrating interactions between the client system, and the main server system, according to an exemplary embodiment.
Figure 5:
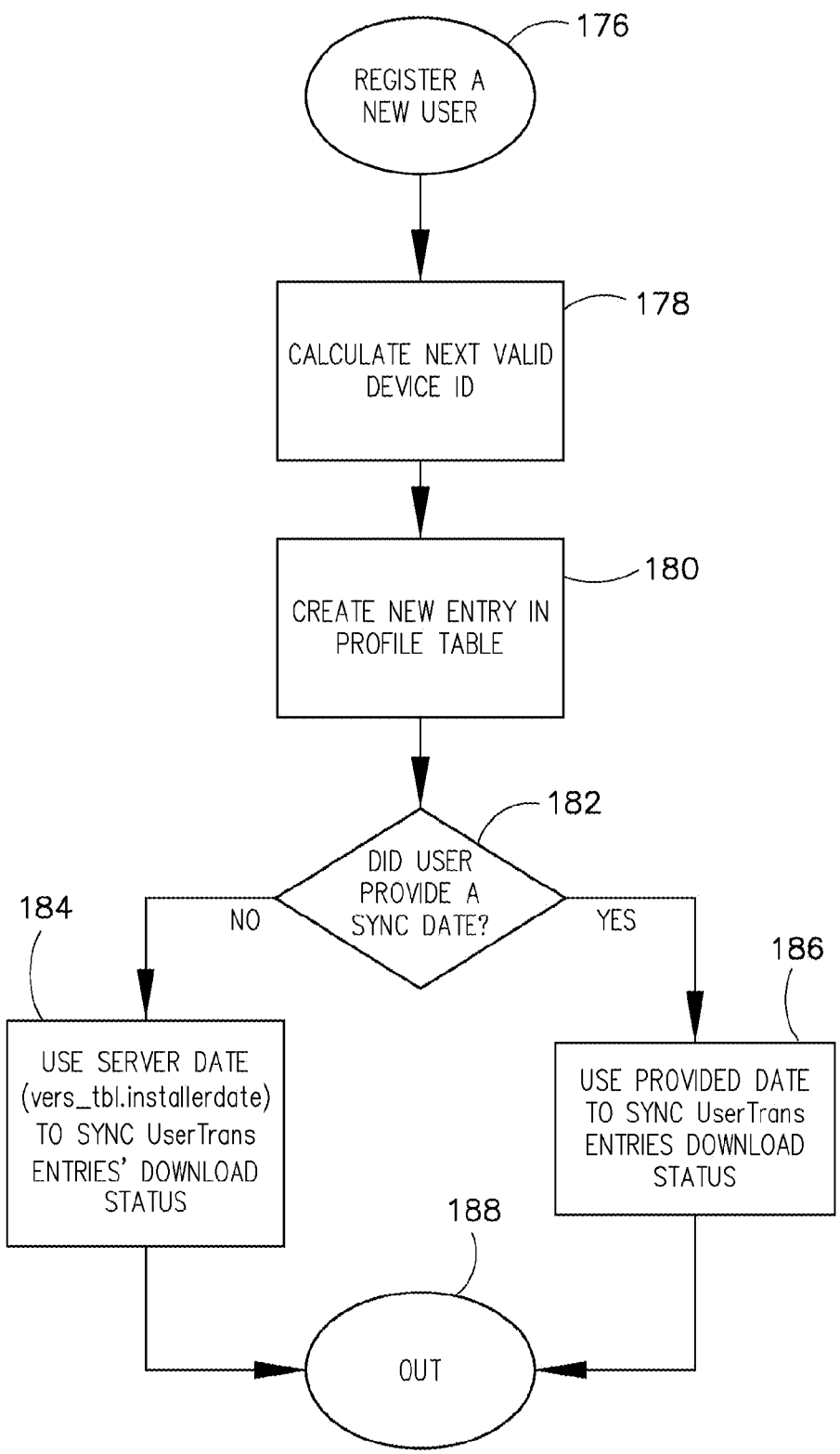
FIG. 5 is a simplified flowchart diagram view showing the steps for registration of a new user on the main server system, according to an exemplary embodiment.
Figure 6:
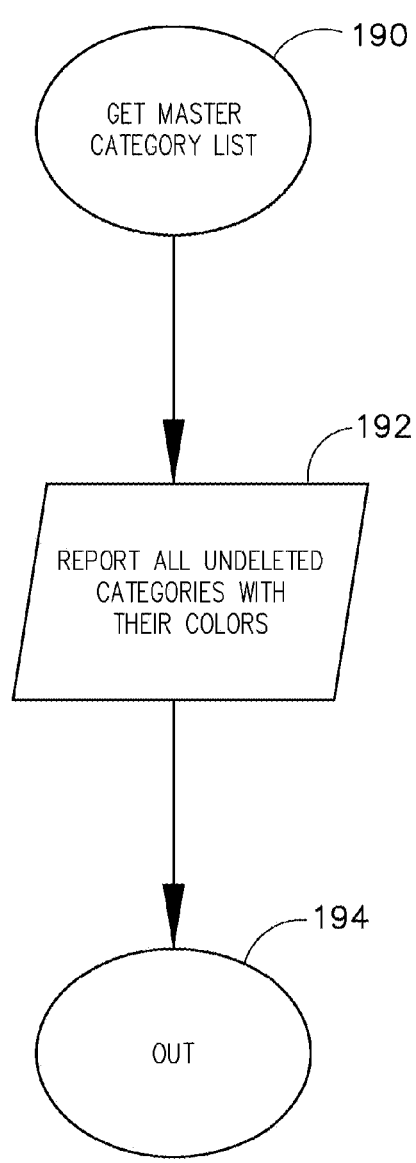
FIGS. 6-8 are simplified flowchart diagram views showing, in greater detail, the steps of updating the master category list, plugins, and brand logo information, respectively, that are shown in block diagram form in FIG. 4, according to an exemplary embodiment.
Figure 7:
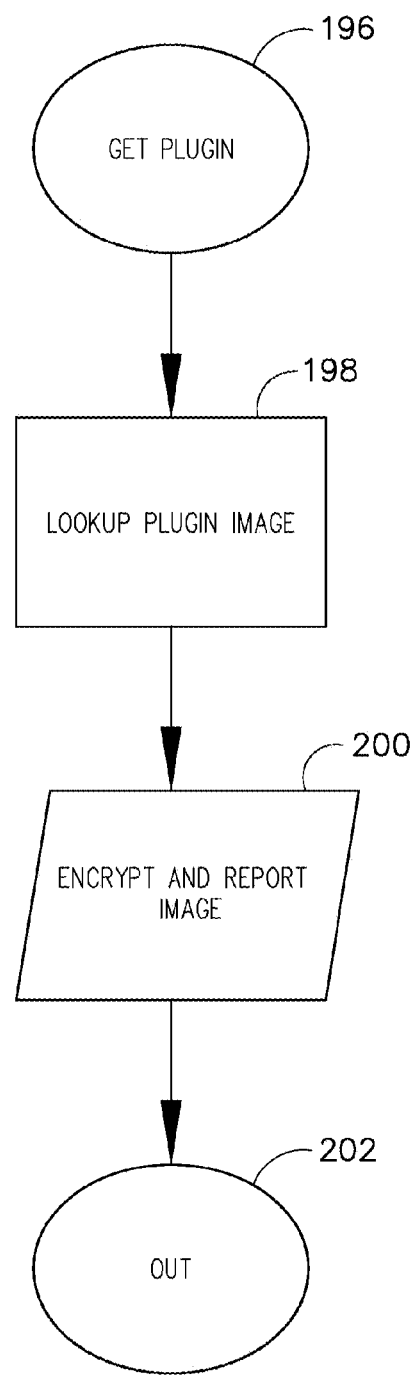
Figure 8:
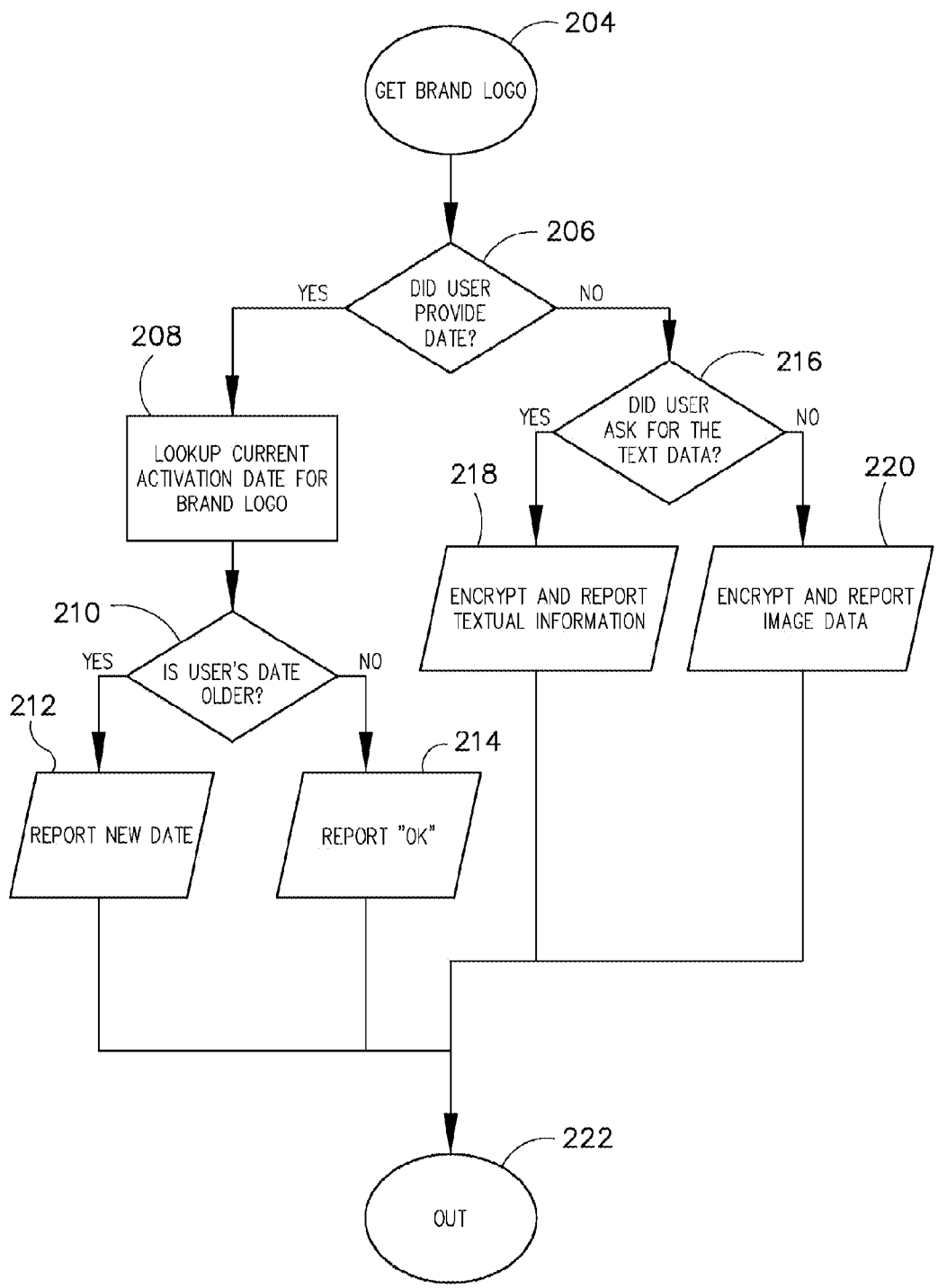

The present invention provides in one aspect a system and method for providing combined technologies for social networking interactions using tracking, predicting, and implementing online consumer communications, browsing behavior, buying patterns, and advertisements and affiliate advertising, for ad links, promotions, online coupons, mobile services, for Sports related Products, Goods, Gambling, and/or Services for related company and local information on a three dimensional geospatial platform using geospatial mapping technology, company-local information, social networking, and social networking communities ("PSGGS-GM-CL/I-SN"). The present invention provides one or more of a method, apparatus, or system to provide sports and sports events related and integrated social networking, real time geospatial mapping, geo-target location or mobile device and receiving current location of user's electronic device and multiple points of interest, cloud-type configuration storing and handling user data across multiple applications, generating user behavior data and ad links, promotions ("social/geo/promo") links on a website for any product, good or service, including social/geo/promo data sets for user customized visual displays showing 3D map presentations with correlated or related broad or alternative categories of social/geo/promo links to be displayed with web page content for view by an end user. In one implementation, a method is provided. The method includes selecting a first social/geo/promo link category for a first position of a social/geo/promo link promotional data set to be displayed on an interactive 3D geospatial mapping display for promotion or sale of online products, goods or services with social networking and sports related company and local information for selected worldwide locations. One or more second social/geo/promo link categories are identified using one or more correlation criteria, where at least one second social/geo/promo link category has one or more correlation criteria associated with the first social/geo/promo link category. The present invention provides in one aspect a system and method for providing social networking and social networking interactions using combined social behavior tracking, online surveillance and web bot software technologies via a mobile device or computer for tracking online consumer behavior and data, cookies, embedded advertisements, predicting online consumer behavior, buying patterns, monitoring online activity, location, online communications, search inquires, social networking, social plugins, ad links, promotions, social applications, purchasing, behavior and buying patterns, consumer address books & contact lists, blogs, chat rooms, friends, acquaintances and strangers, instant messaging, text chat, internet forum, service providers, travel and hospitality services, real estate, educational services, ancillary services (as defined herein or as known in the art) and delivery system for behavior targeting and filtering of ad links, promotions, mobile services, Sports related Products, Goods, Gambling, and/or Services, for related company information on a three dimensional geospatial platform using multi-dimensional and scalable geospatial mapping associated with entities providing and/or members of the service and/or social networking for a geospatial website (accessible via a mobile device or computer) for a multidimensional representation of information and/or scalable versions of web and mobile device content for the delivery of Sports related Products, Goods, Gambling, and/or Services with /Geospatial Mapping/Company-Local Information/Social Networking/Communities ("PSGGS-GM-CL/I-SN") on a three dimensional geospatial platform using geospatial mapping technology.

Definitions

Promotions/Promoting As used herein the term "promoting" or "promoting" means providing any type of information relating to any product, goods or service, including, but not limited to providing an end user with one or more of publicity, advertising, auctions, bidding, coupons, discounts, company or local information, affiliate or related company information, local information, products, goods, or services, and related social networking, user profiles, online behavior and prediction, scalable geospatial mapping, customized end user webpages or displays, and end user interactions, wherein the providing of information is through any form of electronic communication involving the use of one or more of a computer related system, computer readable medium, internet access, mobile device, computer related access, or other electronic communication.

Sports related Products, Goods, Gambling, and/or Services means any sports related or sporting event related product, goods or service described herein, or as known in the art: Non-limiting examples of Sports related Products, Goods & Services provided by the present invention, can include, but are not limited to: sports related search engines; online ad links, promotions, online coupons, mobile services, assortment of entertainment shopping, online casinos, online sports betting, NBA and college basketball lines, football, soccer, boxing, fighting, merchandise, penny auctions or online auctions, advertisements and affiliate advertising or services, including without limitation, for such items as e-commerce, media and entertainment, sports, player and player profiles, personal & financial network, travel & hospitality services, real estate, educational services, ancillary services, service providers, online dating, gaming, retail stores, virtual communities and virtual goods, real estate information on market trends, mortgage quotes auto loans, insurance and home equity loans; mortgage rates to refinance your home, lender quotes, real estate properties, advertisers, service providers and business owners, auto quotes, car loans; messaging, user profiles; RSS links with e.g., news feeds, weather, sports, media and entertainment news and financial markets, real estate (e.g. vacant land, residential, commercial, recreational, retail, shopping malls, hotels, motels, golf courses, resorts, marinas, industrial, vacation, time shares, condominiums, multifamily, and other types of real estate, etc.), educational services, ancillary services e.g. (e.g. brokers, agents, relocation services, internet marketing, concierge, transportation, entertainment, travel and hospitality services, lenders, appraisers, education, developers, contractors, inspectors, home improvements/remodeling, basement designs, landscaping, home warranties, insurance, indoor and outdoor furniture, fixtures, windows, siding, roofing, heating/cooling, solar, plumbing, electrical, mechanical, and similar types) and delivery system for behavior targeting and filtering of ad links, promotions.

Sports and Sporting Events that can be included in one or more of Sports related products, goods or services, players and player profiles, include any known or potential sport or sporting event. Non-limiting examples include, but are not limited to: any sporting event as amateur, high school, college, university, recreation, professional, local, city, county, state, region, Provence, country, union, league, associated, or group of countries, continental, hemisphere, or any other grouping of any of the above, e.g., collegiate or professional. Professional teams or individuals can be of any form or type or grouping, e.g., but not limited to, minor league, major league, A, AA, AAA, scouting, professional and the like, the top 10 sporting events in the world, e.g., NFL, NCAAF, NCAAB, NBA, NASCAR, Horse racing, Golf, MLB, NHL, Indy Car, Cricket, Soccer, Football, Basketball, Tennis, Motor racing, Hockey, Boxing, Fighting; one of top 10 sports in the world: Summer Olympics (e.g. Aquatics, Athletics, Basketball, Boxing, Cycling Equestrian, Gymnastics, Volleyball, Weightlifting, Wrestling, Track & Field); & Winter Olympics (e.g. Bobsled, Ice Hockey, Figure Skating, Speed Skating, Curling, Alpine Skiing, Freestyle Skiing, Biathlon, Ski Jumping, Nordic Skiing), Paralympics, Youth Olympics, Special Olympics, Commonwealth Games; Soccer (e.g., World Cup, FIFA events, Premier League, AFC, CAF, CONCACAF, CONMEBOL, OFC, UEFA, Olympics, men's, women's, college, NCAA, professional); Cricket (e.g. ICC World Cup, World Twenty, Olympics, men's, women's, college, NCAA, professional, Olympics, etc.); Tennis (e.g., Wimbledon, Australian Open, French Open, Shanghai Open, US Open, Indian Wells, ATA, WTA, Olympics, etc.); Hockey (e.g., NHL, WHA, IIHF, junior hockey leagues, adult sport leagues, Olympics, etc.); Cycling (e.g. USA cycling, UCI World Championship, Tour de France, Giro d'Italia, Vuelta a Espana); Volleyball (e.g., College, professional, beach volleyball, Olympics, men's, women's, college, NCAA, professional, Olympics); Golf (e.g., PGA, Masters, The Open Championship, The PGA Championship, men's, women's, college, NCAA, professional, USGA, Golf Canada, International Golf Network, World Golf Federation, GCSAA, National Golf Federation, IGF, World Senior Golf Federation, Ryder Cup, Olympics, etc.); American Football (e.g., college, professional, high school, NFL, WFL, IFAF, CFL, UFL, IFL, APFL, Arena Football League, Professional Indoor Football League, Ultimate Indoor Football League, Empire Football League, Mid Continental Football League, Empire Football League, Mid Continental Football League, New England Football League, North American Football League, Alberta Football League, Maritime Football League, Northeastern Football Alliance, Rocky Mountain Football League, Central Football League, Southern States Football League, Minor League Football Association, Oklahoma Metro Football League, Florida Football Alliance, Big Northeast Football Federation, Gridiron Developmental Football League, Five Star Football League, Regional American Football League, Stars Football League, Texas Six man Football League, Canadian Junior Football League, National Collegiate Athletic Association, Collegiate Sprint Football League, National Junior College Athletic Association, National Association of Intercollegiate Athletics, National Capital Amateur Football Association, Canadian Interuniversity Sport, Quebec Junior Football League, Canadian Colleges Athletic Association, ONEFA Organización Nacional Estudiantil de Fútbol Americano—Collegiate; Women's leagues: Independent Women's Football League, Lingerie Football League, Women's Football Alliance, Women's Spring Football League); Basketball (e.g., men's, women's, college, NCAA, professional, NBA, Table Tennis (e.g., men's, women's, college, professional, ABA, BAA, CBA, NCAA, D-League, NBL, USBL, WNBA, Dream Team, Olympics, WBC, TOA, Olympic Games, World Championships, World Table Tennis Championships, Top International Table Tennis Tournaments, World Cup, World Clubs Championships, ITTF Pro Tour Events, ITTF Pro Tour Grand Finals, African Championships, Asian Championships, European Championships, Latin American Championships, North American Championships, Oceania Championships, Pan-American Games, Commonwealth Games, Mediterranean Games, Arab Championship); Baseball (e.g., MLB, AL, NL, Japan's Central League and Pacific League; Cuba's West League and East League; Caribbean Series; Latin American winter leagues: the Dominican Winter League, Mexican Pacific League, Puerto Rican Professional Baseball League, and Venezuelan Professional Baseball League. South Korea, Taiwan, and China professional leagues; European professional leagues, Dutch league, Italian league, Australia, Olympic Games, Confédération Européene de Baseball (European Baseball Confederation), Baseball World Cup, Olympic baseball tournament, International Baseball Federation (IBAF), Women's baseball amateur basis, Women's Baseball World Cup, World Baseball Classic); Horse Racing (e.g. The Kentucky Derby, The Preakness, The Belmont Stakes, Santa Ana Handicap, Breeder's Cup); Polo (e.g. The Queen's Cup, Polo in the Park, Prince of Wales Cup, Veuve Clicquot Gold Cup, Mercedes-Benz Polo Championship, Cartier International Polo, The Warwickshire Cup); Auto Racing (e.g. dirt track, electric drag racing, karting, open wheel racing, rally racing, road rallying, sports car racing, stock car racing, formula-one racing, Indy car racing); Boxing (e.g. title fights, promotion fights, amateur, UFC, Olympics); Wrestling (e.g. WWE, TNA, CMLL, OVW, APW, UPW, CWF, HWA, AWF, WOW, ECWA, JCW, WCWO, WWA, Olympics); Fighting (e.g. TFC, UFC, MMA); Cycling from International Cycling Union ProTour, Five Continent Circuit Championship (America, Africa, Asia, Europe, Oceania), World Championships, National Cycling Championships, Giro d'Italia, Tour de France, Vuelta a Espana, Olympics; Alternative sports selected from Racing, Backpacking, Water and Snow Skiing, Bicycling, Big Wave Surfing, Bodyboarding, Riding, Canoeing, Diving, Hiking, Motor Sports, Kayaking, Scuba Diving, Running, Motocross, Motor racing, Boxing, Hang Gliding, Walking, Horseback Riding, Climbing, Ice and Roller Skating, Jet Skiing, Stilts, Kite flying, Kneeboarding, Motorcycling, Mountain Biking, Sailing, Scootering, Skate Boarding, Snow Shoeing, Snowboarding, cross country skiing, fishing, Trekking, Wakeboarding, Rafting, Windsurfing, Badminton, Chess; and Adventure Sports such as Adventure Racing, Airsoft, Backpacking, Ballooning, Barefoot Skiing, Base Jumping, Bicycling, Big Wave Surfing, Bike Trials, BMX, BMX Dirt, BMX Freestyle, BMX Street, BMX Vert, Bodyboarding, Bossaball, Bouldering, Buildering, Bull Riding, Bungee Jumping, Extreme Canoeing, Canopying, Cave Diving, Caving, Spelunking, Cliff Jumping, Dog Sledding, Extreme Biking, Extreme Hiking, Extreme Ironing, Extreme Motor Sports, Extreme Sea Kayaking, Extreme Skiing, Flowboarding, Four Wheel Driving, Free Diving, Free Running, Rugby, Freeboarding, Freestyle Motocross, Gliding, Hang Gliding, Heli Skiing, Hill Walking, Horseback Riding, Hot Air Ballooning, Ice Climbing, Indoor Rock Climbing, Inline Skating, Jet Skiing, Jumping Stilts, Kite Landboarding, Kite boarding, Kite surfing, Kite wing, Kneeboarding, Le Parkour, Luge, Motocross, Motorsports—Motorcycling, Drag racing, Freestyle Motocross, Mountain Biking, Mountain Biking Free ride, Mountain Biking North Shore, Mountain Biking Slope style, Mountain Boarding, Mountain Climbing, Mountaineering, Paintball, Parachuting, Paragliding, Paramotoring, Parasailing, Parkour, Pole Climbing, Poweriser—Jumping Stilts, Rafting, Rappelling—Abseiling, Rock Climbing, Roller Derby, Roller Skating, Russian Climbing, Extreme Sailing, Sand Kiting, Sand boarding, Scootering, Scuba Diving, Shark Diving, Skate Boarding, Ski Joring, Ski Jumping, Skiboarding, Extreme Skiing, Skimboarding, Sky Flying, Skydiving, Skysurfing, Slack lining, Slam ball, Snake boarding, Snorkeling, Snow Kiting, Snow Shoeing, Snowboarding, Snow cross, Snowmobiling, Snow skating, Soaring, Spearfishing, Speed Climbing, Speed Skiing, Street Climbing, Street Luging, Stunt Pogo, Swimming, Super cross, Surfing, Tree Climbing, Trekking, Trials Biking, Tricking, Unicycling, Urban Kayaking, Wakeboarding, Water Skiing, White Water Rafting, Whitewater Canoeing, Whitewater Kayaking, Whitewater Rafting, Wind sports, Windsurfing, Wingsuit Flying, Winter Swimming, Zorbing, and the like.

Products, Goods & Services means any product, goods or service described herein, or as known in the art: Non-limiting examples of Products, Goods & Services provided by the present invention, can include, but are not limited to: search engines; online ad links, promotions, online coupons, mobile services, assortment of entertainment and entertainment shopping, online casinos, online sports betting, NBA and college basketball lines, football, soccer, boxing, fighting, penny auctions or online auctions, advertisements and affiliate advertising or services, including without limitation, for such items as e-commerce, media and entertainment, sports, players and player profiles, personal & financial network, travel & hospitality services, real estate, educational services, ancillary services, service providers, online dating, gaming, retail stores, virtual communities and virtual goods, real estate information on market trends, mortgage quotes auto loans, insurance and home equity loans; mortgage rates to refinance your home, lender quotes, real estate properties, advertisers, service providers and business owners, auto quotes, car loans; messaging, user profiles; RSS links with e.g., news feeds, weather, sports, media and entertainment news and financial markets, real estate (e.g. vacant land, residential, commercial, recreational, retail, shopping malls, hotels, motels, golf courses, resorts, marinas, industrial, vacation, time shares, condominiums, multifamily, and other types of real estate, etc.), educational services, ancillary services e.g. (e.g. brokers, agents, relocation services; internet marketing, concierge, transportation, entertainment, travel and hospitality services, lenders, appraisers, education, developers, contractors, inspectors, home improvements/remodeling, basement designs, landscaping, home warranties, insurance, indoor and outdoor furniture, fixtures, windows, siding, roofing, heating/cooling, solar, plumbing, electrical, mechanical, and similar types) and delivery system for behavior targeting and filtering of ad links, promotions.

Gambling. The terms "gaming", "gambling" or the like, refers to either land-based or online events, activities, games, sessions, rounds, hands, rolls and operations etc., including video games, Web games, online casino, casino games, card games, poker, dice games, online sports betting, sporting events and/or any other gaming or gambling events. In addition, the word "bet", "bid" or the like, refer to any type of wagers, bets or gaming ventures that are placed on random events, whether of monetary or non-monetary value, as known in the art, and/or as presented herein and below.

Virtual Advertisements: Non-limiting examples of virtual advertisements services provided by the present invention, can include, but are not limited to the following: Providing virtual online advertisements, digital billboards and other products, goods or services that connects millions of users and members from around the world on a three dimensional geospatial platform using geospatial mapping technology.

Virtual Penny Auction or Online Auction Market: Non-limiting examples of virtual auctions services provided by the present invention, can include, but are not limited to the following. Providing an infrastructure and global platform that provides users and businesses of all types and sizes with access to broad markets of penny auctions or online auctions promoting the sale of Sports related Products, Goods, Gambling, and/or Services with millions of users and members from around the world on a three dimensional geospatial platform using geospatial mapping technology.

Virtual E-commerce Market: Non-limiting examples of e-commerce services provided by the present invention, can include, but are not limited to the following. Providing an infrastructure and global platform that provides users and members and businesses of all types and sizes with access to broad markets of e-commerce and other products, goods or services that connects millions of users and members from around the world on a three dimensional geospatial platform using geospatial mapping technology.

Virtual News, Media and Entertainment Market: Non-limiting examples of virtual media and entertainment services provided by the present invention, can include, but are not limited to the following. Providing an immersive, interactive virtual reality to news, media and entertainment, sporting events, stadiums, venues, athletes, celebrities, commentators, players, coaches, scores and updates, scoreboards, sports memorabilia or other merchandise, advertisements, popular sports around the world such as Summer & Winter Olympics, baseball, basketball, cricket, cycling, golf, hockey, football (American), football (soccer), World Cup Soccer, motorsports, rowing, rugby, swimming, tennis, RSS links, videos and other Products, Goods, Gambling or Services and other products, goods or services that connects millions of users and members from around the world on a three dimensional geospatial platform using geospatial mapping technology.

Virtual Sports Market: Non-limiting examples of virtual sports services provided by the present invention, can include, but are not limited to the following. Providing an immersive, interactive virtual reality to sports, media and entertainment, sporting events, stadiums, venues, athletes, celebrities, commentators, players and player profiles, coaches, scores and updates, scoreboards, sports memorabilia, merchandise, advertisements, popular sports around the world such as Summer & Winter Olympics, baseball, basketball, cricket, cycling, golf, hockey, football (American), football (soccer), World Cup Soccer, motorsports, rowing, rugby, swimming, tennis, RSS links, videos and other products, goods or services that connects millions of users and members from around the world on a three dimensional geospatial platform using geospatial mapping technology.

Virtual Personal & Financial Network Market: Non-limiting examples of virtual personal & financial network services provided by the present invention, can include, but are not limited to the following: Providing an infrastructure and global platform that provides users and members and businesses of all types and sizes with access to broad markets of virtual personal & financial network of service providers, products or services that connects millions of users and members from around the world on a three dimensional geospatial platform using geospatial mapping technology.

Virtual Travel & Hospitality Market: Non-limiting examples of virtual travel & hospitality services provided by the present invention, can include, but are not limited to the following: Providing travel & hospitality services and other products, goods or services with a powerful network of thousands of travel & hospitality service providers e.g. travel agents, hotels, motels, resorts, airlines, entertainment, transportation, and other related Sports related Products, Goods, Gambling, and/or Services, etc. and other professionals that connects millions of users and members from around the world on a three dimensional geospatial platform using geospatial mapping technology.

Virtual Real Estate Market: Non-limiting examples of virtual real estate services provided by the present invention, can include, but are not limited to the following: Providing information about various types of real estate, ancillary services and other products, goods or services with a powerful network of thousands of real estate professionals, ancillary services and other affiliates that connects millions of users and members from around the world on a three dimensional geospatial platform using geospatial mapping technology.

Virtual Service Providers: Non-limiting examples of service providers provided by the present invention, can include, but are not limited to: allowing service providers and business owners' to reach users and members and consumers online, offering advertising opportunities for service providers, business owners and affiliates for business services, healthcare services, specialty financial services, consumer products, specialty retail and media and entertainment, lenders, mortgage companies and the like; providing advertisements that can appear on consumers' property search results and connecting thousands of service providers and business owners for business services, healthcare services, specialty financial services, consumer products, specialty retail and media and entertainment, lenders, mortgage companies lenders and mortgage companies to provide financing quotes to millions of users and members and consumers online; providing real estate market information and mortgage quotes for, e.g., purchase of a new home, refinance, consolidating debt, auto loans, insurance quotes or home equity loans and other Sports related Products, Goods, Gambling, and/or Services, advertisers, service providers and business owners from around the world on a three dimensional geospatial platform using geospatial mapping technology.

Virtual Social Networking Market: Non-limiting examples of virtual social networking services provided by the present invention, can include, but are not limited to the following: Providing a social networking platform with social networking and social networking communities and a means for users and members to interact i.e. user profile, social links, share interests and/or activities, social plugins, ad links, promotions, social applications, messaging, online communications, viewing public & private user profiles, blogs, chat rooms, other entertainment, events and interests, emailing and instant messaging, games, groups, etc. for members and other products, goods or services that connects millions of users and members from around the world on a three dimensional geospatial platform using geospatial mapping technology.

Virtual Online Dating Market: Non-limiting examples of virtual online dating provided by the present invention, can include, but are not limited to the following: Providing an online community for dating, gathering and other types of services for users and members to interact i.e. user profiles, viewing public & private user profiles, online communications, messaging, social links, social plugins, social applications, blogs, chat rooms, sharing interests and/or activities, entertainment, events and interests, emailing and instant messaging, games, groups, etc. and other products, goods or services that connects millions of users and members from around the world on a three dimensional geospatial platform using geospatial mapping technology.

Virtual Social Gaming Market: Non-limiting examples of social gaming services provided by the present invention, can include, but are not limited to, gaming and social sites, add-ons for online games, digital gifts and other items, online virtual communities and similar or related forms of entertainment, virtual real estate, social networks, searching online for different types of real estate and other Sports related Products, Goods, Gambling, and/or Services, educational services, ancillary services that connects millions of users and members from around the world on a three dimensional geospatial platform using geospatial mapping technology.

Virtual Retail Stores Market: Non-limiting examples of virtual retail stores services provided by the present invention, can include, but are not limited to, virtual retail stores. Proving users and members and business owners with an online retail store and ability to create a central shopping location where buyers can learn about you and all the products that you sell. Providing online retail stores for members and business owners and other Sports related Products, Goods, Gambling, and/or Services, advertisers, service providers and business owners that connects millions of users and members from around the world on a three dimensional geospatial platform using geospatial mapping technology.

Virtual Communities Market: Non-limiting examples of virtual communities services by the present invention, can include, but are not limited to, virtual worlds. Virtual worlds are online communities in which individuals are able to interact with each other in real time, and can include v-businesses, which is virtual commerce of goods and services for use in these virtual worlds. Virtual communities have thousands and millions of members, namely people who join the virtual communities to exchange information, gain social support, or to seek entertainment and friendship. Providing users and members and business owners with an online virtual community and other Sports related Products, Goods, Gambling, and/or Services, advertisers, service providers and business owners that connects millions of users and members from around the world on a three dimensional geospatial platform using geospatial mapping technology.

Virtual Goods Market: Non-limiting examples of Sports related Products, Goods, Gambling, and/or Services provided by the present invention, can include, but are not limited to, virtual goods, which can relate to virtual worlds and multiplayer online role playing games (MMO or MMORPG), e.g., like Entropia and Second Life, for members and other products, services, service providers and businesses that connects millions of users and members via the Internet with thousands and millions of members from around the world on a three dimensional geospatial platform using geospatial mapping technology.

Giving Back: Social Shoppers will optionally be able to help those who have been impacted by a natural disaster, live in impoverished conditions or are less fortunate in the world. Social Earth plans to provide microloans or microcredit, humanitarian aid and support other worldly causes in developing countries and charities in their communities and local and global causes around our planet and other relief efforts for natural and man-made disasters including devastating earthquakes and/or tsunamis. For example, fly to Japan and view a video on the Japan relief effort. By tapping into the power of social networking and bringing together a collective consciousness with millions of Social Shoppers, Social Earth plans to raise awareness for global issues and millions of dollars for microloans or microcredit, humanitarian aid and support other worldly causes.

Microloans or Microcredit Market: Non-limiting examples of microloan or microcredit services provided by the present invention, can include, but are not limited to, information about microloans or microcredit, which is an extension of very small loans to those in poverty designed to spur entrepreneurship. Providing information about microloans or microcredit to men and women that lack collateral, steady employment and verifiable credit history and in impoverished conditions around the world and other Sports related Products, Goods, Gambling, and/or Services, advertisers, service providers and business owners that connects millions of users and members with organizations that support disadvantaged men and women from around the world on a three dimensional geospatial platform using geospatial mapping technology.

Humanitarian Aid Market: Non-limiting examples of humanitarian aid services provided by the present invention, can include, but are not limited to, humanitarian aid for poverty, natural disasters and man-made disasters. The primary objective of humanitarian aid is to save lives, provide food, clean water and shelter to alleviate suffering and maintain human dignity. Providing humanitarian aid to those in impoverished conditions and suffering from around the world from natural disasters and manmade disasters and including animals, animal rights and protecting endangered species and wildlife from extinction and that connects millions of users and members and members with organizations that support underprivileged men, women and children and including animals, animal rights and protecting endangered species and wildlife from extinction from around the world from poverty, natural disasters and man-made disasters on a three dimensional geospatial platform using geospatial mapping technology.

Charitable Donations or Sustainable Gifts Market: Non-limiting examples of charitable donations or sustainable gifts services provided by the present invention, can include, but are not limited to, charitable donations or sustainable gifts to benefit those in need from around the world and saving our planet from ecological harm and for such categories as: hunger & poverty, education & play, immunization, water, nutrition, health & emergency, global warming, Amazon Rain Forest. In addition, Social Earth supports saving the rain forest, lives and finding cures for infectious diseases, etc. A donation or sustainable gift may take various forms, including cash or a Social Earth Coupon, can include, but are not limited to, a goat, sheep, chicken, water buffalo, cow, stove, carpentry tools, class supplies, health clinic, food, clothing, water, medical or other supplies, services, new or used goods including clothing, toys, food and vehicles. It may also consist of emergency, relief or humanitarian aid items, development aid support and medical care needs as i.e. blood or organs for transplant. Providing charitable donations or sustainable gifts to those in need in impoverished conditions for such items as food, clothing, education, health or benefit a cause around the world and other products, services, service providers and business owners that connects millions of users and members from around the world on a three dimensional geospatial platform using geospatial mapping technology.

A Social Networking Service is an online service, platform, or site that focuses on building and reflecting of social networks or social relations among people, who, for example, share interests and/or activities. A social network service essentially consists of a representation of each user (often a profile), his/her social links, and a variety of additional services. Most social network services are web based and provide means for users to interact over the Internet, such as e-mail, blogs, chat rooms and instant messaging. Online community services are sometimes considered as a social network service, though in a broader sense, social network service usually means an individual-centered service, whereas online community services are group-centered. Social networking sites allow users to share ideas, activities, events, and interests within their individual networks. The main types of social networking services are those, which contain category places (such as former school year or classmates), means to connect with friends (usually with self-description pages) and a recommendation system linked to trust. Other non-limiting examples can include one or more of the following, e.g., w Facebook™ and Twitter™ widely used worldwide, Nexopia (mostly in Canada); Bebo, VKontakte, Hi5, Hyves (mostly in The Netherlands), Draugiem.lv (mostly in Latvia), StudiVZ (mostly in Germany), iWiW (mostly in Hungary), Tuenti (mostly in Spain), Nasza-Klasa (mostly in Poland), Decayenne, Tagged, XING, Badoo and Skyrock in parts of Europe; Orkut and Hi5 in South America and Central America; and Mixi, Multiply, Orkut, Wretch, renren and Cyworld in Asia and the Pacific Islands and LinkedIn and Orkut are very popular in India.

A Social Network is a social structure made up of individuals (or organizations) called "nodes", which are tied (connected) by one or more specific types of interdependency, such as friendship, kinship, common interest, financial exchange, dislike, sexual relationships, or relationships of beliefs, knowledge or prestige.

Geospatial Analysis is an approach to applying statistical analysis and other informational techniques to geographically based data. Such analysis employs spatial software and analytical methods with terrestrial or geographic datasets, including geographic information systems and geomatics. Google Earth™ is a non-limiting example of the application of geospatial analysis, where it provides a virtual globe, map and geographical information program. Google Earth™ is a virtual globe, map and geographic information program that layered with geographic information. Google Earth™ is available for Android, Windows 2000, XP, Vista 7, Mac OS X, Blackberry Storm, iOS and Linux. Google Earth™ provides a wealth of topographical information about our planet Earth on a variety of subjects. Google Earth™ lets you fly anywhere to view satellite imagery, maps, terrain, 3D buildings, galaxies in outer space, and the depths of the ocean. With Google Earth™ 6, users can explore the streets in 3D like never before. Fly from outer space down to the streets with the new Street View and easily navigate your way around. Google Earth™ has also been able to assist in promoting awareness of global problems such as Hurricane Katrina, the war in Iraq and photos of the post Japan earthquake panoramas in Google Earth™. Google Earth™ has many "layers" of data, including videos, photos, Wikipedia, real-time weather, real-time traffic, 3D buildings, GPS tracks and more. The release of free Web mapping applications opened up printable mapping to mainstream Internet users. Google™ also released free APIs for their Google Earth™ platform, allowing users to geo-locate and map their own data. Google is apparently working on a faster, easier Google Earth™ plug-in download as well as an improved Google Earth™ mobile app. The Google Earth™ API is a free service, available for any web site that is free to consumers. The Plug-in and its JavaScript API allows users to place a version of Google Earth™ into web pages. The API does not have all the features of the full Google Earth™ Application but enables sophisticated 3D map applications to be built, including use for GM of the present invention. The Google Earth™ Plug-in and its JavaScript API let you embed Google Earth™, a true 3D digital globe, into your web pages. Using the API you can draw markers and lines, drape images over the terrain, add 3D models, or load KML files, allowing you to build sophisticated 3D map applications.

Coupon: In marketing, a coupon is a ticket or document that can be exchanged for a financial discount or rebate when purchasing a product. Customarily, coupons are issued by manufacturers of consumer-packaged goods or by retailers, to be used in retail stores as a part of sales ad links, promotions. They are often widely distributed through mail, magazines, newspapers, the Internet, directly from the retailer, and mobile devices such as cell phones. Since only price conscious consumers are likely to spend the time to claim the savings, coupons function as a form of price discrimination, enabling retailers to offer a lower price only to those consumers who would otherwise go elsewhere. In addition, coupons can also be targeted selectively to regional markets in which price competition is great. Internet Coupons: Online retailers often refer to coupons as "coupon codes," "promotional codes," "promotion codes," "discount codes," "key codes," "promo codes," "surplus codes," "portable codes," "shopping codes," "voucher codes," "reward codes" "discount vouchers" or "source codes." Internet coupons typically provide for reduced cost or free shipping, a specific dollar or percentage discount, or some other offer to encourage consumers to purchase specific products or to purchase from specific retailers. Because paper coupons would be difficult to redeem, typically secret words or codes are distributed for consumers to type in at checkout. Marketers can use different codes for different channels our groups in order to distinguish response rates.

The present invention can in one embodiment gather basic demographic profile information including the user's current location and behavior data as they purchase and/or view ad links, promotions, online coupons, mobile services, Products, goods, gambling, or services, entertainment shopping, penny auctions or online auctions, advertisements and affiliate advertising or services on Social Earth, which can be sent to advertisers or otherwise capitalized by the users of the invention. By gathering this valuable demographic information, the present invention provides the ability to target market to Social Shoppers based upon specific location, demographic profile and selected social layer. This data can also include GPS for mobile user, which can be sent to advertisers servers for target mobile marketing based upon the users' location and buying preferences. The present invention can also provide fast access by, when visiting a website of a user of the present invention, Social Shoppers can access as easily as entering their email address and select a city to access the site. The present invention can use email addresses and selected city for future email marketing. For example, in just 2, 3, 4, 5, 6, 7 or other number of clicks, Social Shoppers are ready to use the inventions website after they download a Google Earth™ or similar plug-in, or visit the Apple™, Android™, or similar marketplace for their smart phone, Social Networking Integration: The present invention can also provide in certain embodiments social networking links, tracking, collection and/or analysis, including integrated social plugins with "live social feeds" from social networking sites, e.g., but not limited to Facebook™ and Twitter™, into its website(s), which allows Social Shoppers to interact and share the latest product or services deals with their friends, family, business associates, and others. Tapping into social networking users through social networking integration will help users and members of the present invention connect with thousands or millions of users and members. Twitter™ the latest social networking phenomenon, enables its users and members to send and read other users and members' messages called "tweets." The present invention provides opportunities to use open source technology to rapidly grow its Social Shoppers around the world by utilizing social networking integration with "live social feeds" from social networking sites into its website and encouraging Social Shoppers to share the latest ad links, promotions, online coupons, mobile services, Sports related Products, Goods, Gambling, and/or Services with their friends on Social Earth or in these popular social networks.

Social Software Applications. Social software applications include communication tools and interactive tools. Communication tools typically handle the capturing, storing and presentation of communications, usually written but increasingly including audio and video as well, which can also include tracking and predicting of online communications via a mobile device or computer with respect to third party applications and outside social networks such as e.g. Facebook™, Twitter™, Skype™ and other social networks around the world. Interactive tools handle mediated interactions between a pair or group of users. They focus on establishing and maintaining a connection amount users, facilitating the mechanics of conversation and talk.

Instant Messaging: An instant messaging application or client allows one to communicate with another person over a network in real time, in relative privacy. One can add friends to a contact or buddy list by entering the person's email address or messenger ID.

Text Chat: Internet Relay Chat (IRC) and other online chat technologies allow users to join and communicate with many people at once, publically.

Groupware: Groupware software allows subjects to share data such as files, photos, text, etc.

Internet Forums Internet forums allow users to post a "topic" for others to review. Other users can view the topic and post their own comments in a linear fashion, one after the other.

Wikis: A wiki is a web page whose content can be edited by its visitors.

Blogs: Blogs, short for web logs, are online journals for a particular person. The owner will post a message periodically, allowing others to comment. Topics often include the owner's daily life, views on politics or a particular subject important to them.

Prediction Markets: Many predictions market tools have become available that make it easy to predict and bet on future events. This is a more formal version of social interaction, although it qualifies as a robust type of social software.

Social Networking Services: Social networking services allow people to come together online around shared interests, hobbies or causes.

Social Engine: Social engine refers to a web based framework and platform for developing custom social apps as well as hosting them. A social engine acts as a web operating system for developing all kinds of social networking services and projects.

Social Guides: A social guide recommending places to visit or contains information about places in the real world such as coffee shops, restaurants and wifi hotspots, etc.

Social Bookmarking: Some web sites allow users to post their list of bookmarks or favorite website for others to search and view them.

Social Cataloging: Social cataloging is a software aimed towards academics. It allows the user to post a citation for an article found on the Internet or a website, online database like Academic Search Premier or LexisNexis.

Social Online Storage: Social online storage applications allow their users to collaboratively create file archives containing files of any type. Files can either be edited online or from a local computer which has access to the storage system.

Social Plug-ins: A button placed on a website and blogs that members can click to share their interests in a site with their friends. A Like Box can also be added to a web page that provides a scrolling window into the organization's Facebook™ page. The Like Button and Like Box are called "social plugins."

Virtual Worlds: Virtual worlds are services where it is possible to meet and interact with other people in a virtual environment reminiscent of the real world. Thus the term virtual reality. Typically, the user manipulates an avatar through the world, interacting with others using chat or voice chat.

Massively Multiplayer Online Games (MMOGs): MMOG's are virtual worlds that add various sorts of point systems, levels, competition and winners and losers to virtual world simulation.

Computer Surveillance: Computer surveillance is the act of perform surveillance of computer or mobile activity and of data stored on a hard drive or being transferred over the Internet.

Network Surveillance: The vast majority of computer surveillance involves the monitoring of data and traffic on the Internet. In the United States for example, under the Commissions Assistance For Law Enforcement Act, all phone calls and broadband internet traffic (emails, web traffic, instant messaging, etc.) are required to be available for unimpeded real-time monitoring by Federal law enforcement agencies.

Penny Auctions or Online Auctions: Is an auction where bidders pay-per-bid for an item and the time increases with each bid.

Web Bot: Web bot is a software program that is claimed to be able to predict future events by tracking keywords entered on the Internet. Internet bots monitor articles, blogs, forums and other forms of Internet chatter. Words in the lexicon are assigned numeric values for emotional quantifiers such as duration, impact, immediacy, intensity and others.

Mobile Device Network Operators. The term mobile device network operator includes any company, agency, administrator, network, system, provider, marketer, distributor, developer, and the like, for any mobile or wireless provider, or related hardware, software, server, infrastructure, network, switching, routing, maintenance, or service provider. Non-limiting examples include one or more of, but are not limited to, international, national, regional, provincial, state, county or local mobile network operators. Terrestrial mobile phone network operators, e.g. but not limited to, (1) China Mobile, China; (2) Vodafone, Telenor, Norway; (3) Airtel, India (Airtel); (4) América Móvil, Mexico; (5) Telefónica (Movistar, O2 & Vivo), Spain; (6) Orange, France Télécom; (7) VimpelCom, Russia (Beeline Russia, GT); (8) Telenor; Altimo (Alfa Group); (9) SingTel, Singapore; Temasek Holdings; (10) Axiata Group Berhad, Malaysia (Celcom); (11) China Unicorn, China; (12) TeliaSonera, Sweden; (13) Saudi Telecom Company, Saudi Arabia; (14) MTN Group, South Africa; (15) Etisalat, United Arab Emirates; (16) Reliance Communications. India; (17) T-Mobile, Germany (Telekom.de); (18) Verizon Wireless. USA (19) MTS. Russia (MTS Russia) Sistema; (20) AT&T Mobility, USA; AT&T Inc.; (21) China Telecom, China; (22) Telkomsel, Indonesia (Telkomsel); (23) Idea Cellular, India; Aditya Birla Group, Axiata Group Berhad, Providence Equity; (24) BSNL, India, Government of India; (25) Tata Teleservices, India, Tata Group, Temasek, Sivasankaran; (26) Telecom Italia/TIM, Italy (TIM), Telefonica; (27) Maxis Communications, Malaysia (Maxis); Ananda Krishnan, Saudi Telecom Company; (28) Turkcell, Turkey (Turkcell), Turkcell Group; (29) Qtel, Qatar. Five largest satellite phone network operators measured by number of subscribers (A) Iridium, Proprietary TDMA; (B) Globalstar, Proprietary CDMA; (C) Thuraya, Proprietary FDMA/GSM; (D) Inmarsat, Proprietary GSM; and (E) ACeS, Dual-mode Satellite/GSM. US Mobile phone network operators: Verizon Wireless, AT&T Mobility, Sprint Nextel (Includes Sprint Network, Nextel Network, Boost Mobile, Virgin Mobile USA, and Assurance Wireless), T-Mobile USA, TracFone Wireless (Includes NET10, Straight Talk, SafeLink Wireless); Clearwire (Includes CLEAR); MetroPCS; Cricket; U.S. Cellular; Qwest Wireless; C Spire Wireless); Alltel; Cincinnati Bell Wireless; nTelos (Includes Frawg); SouthernLINC; Movida Wireless; GCI Wireless (Includes GCI Network, and Alaska DigiTel Network); Bluegrass Cellular; and Alaska Communications Systems.

Mobile Device Communication Standards: Global System for Mobile Communications (GSM, around 80-85% market share) and IS-95 (around 10-15% market share) were the two most prevalent 2G mobile communication technologies in 2007. In 3G, the most prevalent technology was UMTS with CDMA-2000 in close contention. All radio access technologies have to solve the same problems: to divide the finite RF spectrum among multiple users as efficiently as possible. GSM uses TDMA and FDMA for user and cell separation. UMTS, IS-95 and CDMA-2000 use CDMA. WIMAX and LTE use OFDM. Time-division multiple access (TDMA) provides multiuser access by chopping up the channel into sequential time slices. Each user of the channel takes turns to transmit and receive signals. In reality, only one person is actually using the channel at a specific moment. This is analogous to time-sharing on a large computer server. Frequency-division multiple access (FDMA) provides multiuser access by separating the used frequencies. This is used in GSM to separate cells, which then use TDMA to separate users within the cell. Code-division multiple access (CDMA) This uses a digital modulation called spread spectrum which spreads the voice data over a very wide channel in pseudorandom fashion using a user or cell specific pseudorandom code. The receiver undoes the randomization to collect the bits together and produce the original data. As the codes are pseudorandom and selected in such a way as to cause minimal interference to one another, multiple users can talk at the same time and multiple cells can share the same frequency. This causes an added signal noise forcing all users to use more power, which in exchange decreases cell range and battery life.

Orthogonal Frequency Division Multiple Access (OFDMA) uses bundling of multiple small frequency bands that are orthogonal to one another to provide for separation of users. The users are multiplexed in the frequency domain by allocating specific sub-bands to individual users. This is often enhanced by also performing TDMA and changing the allocation periodically so that different users get different sub-bands at different times. In theory, CDMA, TDMA and FDMA have exactly the same spectral efficiency but practically, each has its own challenges—power control in the case of CDMA, timing in the case of TDMA, and frequency generation/filtering in the case of FDMA. For a classic example for understanding the fundamental difference of TDMA and CDMA imagine a cocktail party, where couples are talking to each other in a single room. The room represents the available bandwidth: TDMA: A speaker takes turns talking to a listener. The speaker talks for a short time and then stops to let another couple talk. There is never more than one speaker talking in the room, no one has to worry about two conversations mixing. The drawback is that it limits the practical number of discussions in the room (bandwidth wise). CDMA: any speaker can talk at any time; however each uses a different language. Each listener can only understand the language of his or her partner. As more and more couples talk, the background noise (representing the noise floor) gets louder, but because of the difference in languages, conversations do not mix. The drawback is that at some point, one cannot talk any louder. After this if the noise still rises (more people join the party/cell) the listener cannot make out what the talker is talking about without coming closer to the talker. In effect, CDMA cell coverage decreases as the number of active users increases. This is called cell breathing.

Celebrity or Entertainment News refers to the communication or presentation of any information about any aspect or activity relating one or more celebrities or the entertainment industry. Celebrities can optionally (also referred to a celeb), be one or more of a person who has a prominent profile and commands a great degree of public fascination and influence in day-to-day media, can be related to wealth, implied with great popular appeal, prominence in a particular field, and/or easily recognized by the general public, those with various careers within the fields of sports and entertainment (e.g., but not limited to, professional athletes, prominent entertainment figures, television talk show hosts, actors or actresses, television or webcast correspondents, comedians, and the like); celebrity status as a result of a successful career in a particular field, due to media attention for their lifestyle or wealth, (e.g., a socialite or their connection to a famous person (e.g., relative of a famous person, or for their misdeeds (e.g., a well-known criminal)). Celebrities can be known around the world, within a specific country, within a region, or locally. Entertainment can be an action, event or activity that aims to entertain, amuse and interest a public ("public" can consist of one person). This audience can have a passive role, as in the case of a play, a show on a TV or a movie, or active, as in the case of a video game. Entertainment can include where the supplier of the show is visible to the viewer, with the exception of video games. The entertainment can attract an audience and influence their actions and thoughts. Entertainment may also provide fun, enjoyment and laughter. The industry that provides entertainment is called the entertainment industry. There are many forms of entertainment for example, but not limited to, cinema, theatre, sports, games and social dance. General types of entertainment can include, but are not limited to, animation, live entertainment, comedy, comics, dance and music, games, gambling, adult entertainment, concerts, lectures, magic, mass media, radio, sports, storytelling, cinema. Animation can include the display of rapid movement in any kind of artwork. Live entertainment can include watching a film or theatrical production and other live performance such as circus, plays, musicals, farces, monologues and pantomimes provide cinematic or theatric entertainment. Comedy can provide laughter and amusement, e.g., where the audience is taken by surprise, by the parody or satire of an unexpected effect or an opposite expectations of their cultural beliefs, e.g., lapstick film, one-liner joke, observational humor are forms of comedy which have developed since the early days of jesters and traveling minstrels. Comics can include text and drawings which convey an entertaining narrative, e.g., super heroes), comic books. Manga is the Japanese word for comic and print cartoons. Caricature is a graphical entertainment. The purpose may vary from merely putting smile on the viewer's face, to raising social awareness, to highlighting the moral vices of a person being caricatured. Dance and music can include social dance, listening to or watching musical entertainment. Games can include activities that provide relaxation and diversion. Games may be played by one person for their own entertainment, or by a group of people. Games may be played for achievement or money such as gambling or bingo. Racing, chess or checkers may develop physical or mental prowess. Games may be geared for children, or may be played outdoors such as lawn bowling. Equipment may be necessary to play the game such as a deck of cards for card games, or a board and markers for board games such as Monopoly, or backgammon, or e.g., ball games, Blind man's bluff, board games, card games, children's games, croquet, Frisbee, hide and seek, number games, paintball and video games.

One example of an aspect of the invention is a geospatial website that aggregates, inter alia, ad links, promotions, online coupons, mobile services, Sports related Products, Goods, Gambling, and/or Services, for related company information on a three dimensional geospatial platform using multi-dimensional representation of information and/or scalable versions of web and mobile device for the delivery of ad links, promotions, online coupons, mobile services, Sports related Products, Goods, Gambling, and/or Services, from around the world and/or showcases them, e.g., in their actual, physical location on the websites live view of Earth in combination with social networking and/or socially conscious information and/or activities.

Social Earth intends to provide information and links to some of the top real estate websites and integrate real estate information into its website from third party websites such as, but not limited to, Yahoo Real Estate, Zillow, Realtor.com, Trulia, MSN Real Estate, Homes.com, AOL Real Estate, Rent.com, ZipRealty, MyNewPlace, LoopNet, Apartment Guide, Re/Max Real Estate, Apartments.com, Welchet.com, Redfin, HomeFinder, Listingbook Services, Rentals.com, ForRent.com and other real estate related websites.

The present invention addresses problems and/or shortcomings of current online products or services, retail stores, virtual communities and virtual Goods, Gambling, and will provide optional information about microloans or microcredit, humanitarian aid and support other worldly causes through charitable donations or sustainable gifts to help those in need, which should also provide socially conscious information about saving our planet from ecological harm, the companies that supply ad links, promotions, mobile services, Sports related Products, Goods, Gambling, and/or Services, so that consumers can see where the companies and/or stores are located and can find out information about the companies, communities they are located in, what interaction and help they provide to communities and/or other economic and/or socially responsible activities, and to associate the geographical and other geospatially available information connecting also by the use of integrated social media, which combination is not current provided and/or available. As users and members and/or subscribers of the website, (e.g., "Social Shoppers") shop the world for ad links, promotions, mobile services, Sports related Products, Goods, Gambling, and/or Services, around the world.

A delivery system for a host geospatial website (accessible via a mobile device or computer) can provide for a multidimensional representation of information and/or scalable version of web content for an infrastructure and global platform that provides users and members and businesses of all types and sizes with access to broad markets for the delivery of ad links, promotions, online coupons, mobile services, Sports related Products, Goods, Gambling, and/or Services, and optional information about microloans or microcredit, humanitarian aid and support other worldly causes through charitable donations or sustainable gifts on a three dimensional geospatial platform using geospatial mapping technology.

The use of geospatial mapping for associating information to specific places can included, but it not limited to, one or more of: Live links to places and events; Data on the landscape; Zoom to birds-eye and human scale views; 3D custom audio/visual content; Interactive 360 panoramas; Fly-through tours with content, narration, music; Stunning imagery and videos; 3D buildings and landscaping, e-commerce and mobile banking tools and hooks; Advertising on the landscape; Advanced search for private and public information; Social networking integration; Self-posting for uploading user generated content; Custom tools, mobile apps and widgets; and the like. Connecting buyers and sellers with Sports related Products, Goods, Gambling, and/or Services with users and members known as "Social Shoppers" in real-time on a geographical area across multiple social layers that are displayed as graphic animated color overlays on a three dimensional geospatial platform using geospatial mapping technology." The invention can also provide mobile payment method and/or system for effectuating an online payment through a computer or a mobile device to complete an e-commerce and mobile banking transaction on a three-dimensional geospatial platform using geospatial-mapping technology.

The invention can further provide in one aspect geospatial website aggregates buyers and sellers with ad links, promotions, online coupons, mobile services, Sports related Products, Goods, Gambling and/or Services from merchants and sellers around the world and/or showcases them in their actual, physical location on the websites unique live view of Earth around the world.

Social Shoppers can to use "a mobile device payment method and/or system" for effectuating an online payment through a mobile device equipped carrier and/or a mobile device equipped bank using a mobile users device or computer in connection with an e-commerce and mobile banking transactions on the host geospatial website or mobile device (e.g., mobile device, PDA, laptop computer, etc.); wherein users and members create and/or maintain a rich-media application via a geospatial mapping platform via the Internet comprising: mobile banking and/or electronic payments.

Social Earth Mobile allowing Social Shoppers to receive ad links, promotions, online coupons, mobile services, Sports related Products, Goods, Gambling, and/or Services, based upon their precise location. Mobile apps for smart phones (e.g., but not limited to, Android™ and tablets, e.g., iPhone™, iPod Touch™ and iPad™) are provided that will allow Social Shoppers to receive ad links, promotions, online coupons, mobile services, Sports related Products, Goods, Gambling, and/or Services, based upon their online activities, precise location, GPS, online communications, search inquiries, social networking, social networking communities, social plugins, ad links, promotions, social applications, entertainment shopping, penny auctions or online auctions, bidding, bidding behavior, bidding results, advertisements and affiliate advertising, purchasing, behavior, buying patterns and other criteria, such as shopping or interest preferences.

With Social Earth Mobile, Social Shoppers can explore the same 3D imagery and terrain as on the desktop version. Users will be able to fly to their current location or anywhere in the world by typing in the address in the search bar. With a touch of a button, users will be able to Pan, zoom, and tilt their view as they virtually travel around the globe. Users will be able to Search for people, cities, places and businesses around the world and View many layers of geographic information and other information on a three-dimensional geospatial platform using geospatial-mapping technology. The invention provides opportunities to connect buyers and sellers and reach people at the point of shopping through GPS—a benefit both to shoppers and merchants. The delivery system for a host geospatial website can provide for a multidimensional representation of information and/or sealable version of web content for an infrastructure and global platform that provides users and members and businesses of all types and sizes with access to broad markets for the delivery of ad links, promotions, online coupons, mobile services, Sports related Products, Goods, Gambling, and/or Services, for related company information on a three dimensional geospatial platform using geospatial mapping technology. A host geospatial website can include realistic virtual landscape using satellite and/or aerial photography that can include any content and many layers of web based information, ad links, promotions, online coupons, mobile services, Sports related Products, Goods, Gambling, and/or Services and mobile banking links, social networking, social networking communities and/or advertisements (including but not limited to embedded advertisements) for a richer user experience. A host geospatial website shall store images, web-based content, social data and/or share "live social feeds" from social networking giants Facebook™ and Twitter™ and/or other communications in real-time.

More specifically, it relates to a method for users and members known as "Social Shoppers" to effectuate banking and/or electronic payments via a computer or mobile device; accessing a user account, engaging in mobile social activities and/or viewing available options via a three dimensional geospatial mapping platform using geospatial mapping technology.

The present invention thus provides alternative social networking interactions; as functions or content, access, systems, and the like, as known in the art, or as described herein, which can include, but are not limited to, access to trusted user-generated content using social networks, accessing information from multiple networks, social graphs, and content sites, accumulating social relation information for social network services, adaptive packaging of network resources, adaptive social network management, advertising products to groups within social networks, aggregation of social network data, aggregation, standardization and extension of social networking contacts to enhance a television consumer experience, application of social networking data, assigning access privileges in a social network, associative memory operators, methods and computer program products for using a social network for predictive marketing analysis, automatically locating web-based social network members, automatically manage social connections, auto-shared photo album, biometric social networking, blocking objectionable communications in a social network, broadcast notifications using social networking systems, clarifying search results using social-networking information, collective socializing using a mobile social network, collectively giving gifts in a social network environment, commercializing ideas or inventions, communicating between users, community detection, community translation on a social network, confirming an association in a web-based social network, consumption management systems and methods integrated with social networks, content sharing across enterprise social networks, contingent rights exchange associated with a social network, controlling access of user information using social-networking information, coordinated location aware brokering of social networks, correlation of psycho-demographic data and social network data to initiate an action, creating a social network map of non-voice communications, creating a social-networking online community, cross-network social networking application architecture, defined searching and web crawling, defining user relationships in a social networking environment, determining a group preference in a social network, device, system, and method of generating location-based social networks, discerning human intent based on user-generated metadata, discovering, creating, using, and managing social network circuits, displaying demographic information of members discussing topics in a forum, dynamically generating a privacy summary, dynamically generating segmented community flyers, dynamically managing a social network group, dynamically providing a news feed about a user of a social network, elements of an enterprise event feed, email confirmation page for social network notifications, enabling location-dependent value exchange and object of interest identification, enabling messaging between users of different social networks and between users of social networks and users of other communication systems, enterprise social graph and contextual information presentation, establishing a social network system based on motif, social status and social attitude, facilitate real time communications between members of a social network, feature propagation, federation and interoperability between social networks, feeding updates to landing pages of users of an online social network from external sources, file sharing based on social network, friends toolbar for a virtual social venue, generating a feed of stories personalized for members of a social network, generating segmented community flyers in a social networking system, giving gifts and displaying assets in a social network environment, graphical representation of social network vitality, highlighting email recipients, hosting a social network that enables granular management of the privacy of posted information, hot video prediction system based on user interests social network, incentivize transactions to enhance social goodness, incorporation of variables into textual content, information handling system low power network communications, information security for recovery based social networking, integrating a social network and data repository to enable map creation, integrating social contact identifiers into wagering games, integrating social networking with financial services, integrating social networks and wagering games, integrating updates into a social-networking service, interacting with social networking in an internet protocol television system, leveraging a social graph from a social network for social context in other systems, leveraging information in a social network for inferential targeting of advertisements, managing information about relationships in a social network via a social timeline, managing information flow between members of an online social network, managing organizational resources, marketing system having multiple fulfillment channels and a method for directing a personalized invitation to members of a social network, markup language for incorporating social networking system information by an external website, measuring social capital index in an online social network, mobile device and method of operating same to interface content provider website, mobile network operator controlled content to mobile subscribers using social networking messages, mobile social networking enabled by bar codes, mobile social networking system and method, modeling social networks using analytic measurements of online social media content, modification of social networks via design codes, monetizing a social network platform, monitoring activity of a specified user on internet-based social networks, multi-governance social networking groups, name conflict resolution, name resolution, networking across web based and telecommunication based portals, observing responses to invitations by users in a web-based social network, offering discounts, online ad links, promotions through a social network-based platform, online promotions through social media networks, organization of a contact list based on social network context, page caching for rendering dynamic web pages, page rendering for dynamic web pages, personalized platform for accessing internet applications, platform for providing a social context to software applications, predictive resource identification and phased delivery of structured documents, presenting social networking events via a television receiver, processing social relation oriented service, profile rating and verification system, promoting shopping information on a network based social platform, providing an answer to a question from a social network site using a separate messaging site, providing social networking content, publish/subscribe mashups for social networks, random voice communications through a social network, ranking search results using social-networking information, ranking search results based on the frequency of access on the search results by users of a social-networking system, ranking search results based on the frequency of clicks on the search results by members of a social network who are within a predetermined degree of separation, ranking social network objects, real time media-based social network notifications, recommending new individuals to be invited into a confirmed social network based on mined social data, recording usage of an online social network, relationship characterization and utilization from a user's social networks, remote work sessions, reputation evaluation of online users in a social networking scheme, resource management of social network applications, scoring individual network competitiveness and network effect in an online social network, searching data in a social network to provide an answer to an information request, selecting advertisements for output by a television receiver based on social network profile data, self-funding emergency and other notification system, setting cookies in conjunction with phased delivery of structured documents, sharing digital content on a social network, sharing social network information, sharing social networking content in a conference user interface, single login procedure for accessing social network information across multiple external systems, situation-aware ad-hoc social interaction, social behavior analysis and inferring social networks for a recommendation system, social capital, social context for inter-media objects, social graph search system, social graph that includes web pages outside of a social networking system, social home page, social marketing, social mobilized content sharing, social network analysis with prior knowledge and non-negative tensor factorization, social network construction based on data association, social network marketing plan monitoring method and system, social network message categorization systems and methods, social network notifications for external updates, social network qualification systems, social network virtual private network, social network-driven cooperative characterization with non-social network sites, social networking architecture in which profile data hosting is provided by the profile owner, social networking via communications over interactive devices, social notification for a set-top box, storing data related to social publishers and associating the data with electronic brand data, suggesting contacts for social networks, tagging digital media, targeting messages to users in a social network, targeting online ads using social neighborhoods of a social network, targeting third party content to users based on social networks, tie strength prediction and social media filtration, tracking significant topics of discourse in forums, travel related commercial interactions, use with and integration into a video game, user pivot navigation of shared social media, using social information for authenticating a user session, using social networks while respecting access control lists, vehicle based social networking, visual tags for search results generated from social network information, visualization application for mining of social networks, visualizing communications within a social setting, web-based social networking database, weighting social network relationships based on communications history, youth based social networking, Non-limiting examples, include, e.g., those disclosed in one or more of e.g., but not limited to, such social networking functions and/or features as presented in the following US patents and patent applications: US20100082693, US20100017431, US20110276631, US20100268655, US20100293247, US20080040428, US20090106822, US20110282944, US20110137722, US20090327432, US20100057859, U.S. Pat. No. 7,958,193, US20100268830, US20090271247, US20110022602, US20090292814, US20080033776, US20090049525, US20090271244, US20110047229, US20100114788, US20090144075, US20100153175, US20090215469, US20110131095, US20080281710, US20090292549, US20110314017, US20110225518, US20080306822, US20100132049, US20100082695, US20100203963, US20110167071, US20100088364, US20110196922, US20090319288, US20110258429, US20090150380, US20120023085, US20100036936, US20090210480, US20100042511, US20100241468, US20100121849, US20110320250, US20110258556, U.S. Pat. No. 7,987,110, US20090030927, U.S. Pat. No. 7,801,971, US20110023101, US20110153553, US20110179161, US20110265011, US20110022657, US20090187624, US20100229223, US20110173051, US20110055333, US20100287256, US20100005518, US20090265604, US20090249451, US20080255989, US20110060793, US20100058417, US20110145052, US20090327437, US20110107382, US20110106884, US20120028623, US20080320139, US20080104225, US20090157439, US20090182664, US20090300502, US20090171691, US20110106597, US20100318925, US20090222348, US20100319034, US20100217721, U.S. Pat. No. 8,010,460, US20080208971, US20110046980, US20080189188, US20090222322, US20100293170, US20110251970, U.S. Pat. Nos. 8,073,794, 7,970,657, US20060042483, US20070288464, US20110197224, US20110258203, US20090164400, US20120030210, US20100174747, US20100228617, US20110246560, US20080294678, US20090125230, US20080243933, US20100318619, US20110238752, US20080109296, US20100185935, US20110213762, US20110078252, US20080140786, US20090282144, US20090259970, US20110271328, US20110167117, US20090171904, US20110209192, US20100185578, US20110196923, US20050216300, US20110082747, U.S. Pat. No. 7,941,535, US20090043844, US20110225514, US20110015981, US20110153740, US20090222448, US20110022669, US20090132652, US20110270923, US20090055263, US20110126121, US20110185285, US20080275849, US20080133445, US20100077045, US20110125846, US20090307057, US20100319031, US20110113096, US20110264737, US20100216553, US20100217757, US20110167115, US20090031301, US20120028718, US20100070335, US20080133658, US20090307073, US20110004660, US20110179125, U.S. Pat. No. 8,010,460, U.S. Pat. No. 8,027,943, U.S. Pat. No. 8,010,458, U.S. Pat. No. 7,827,208, U.S. Pat. No. 7,890,501, U.S. Pat. No. 7,809,805, U.S. Pat. No. 8,099,433, U.S. Pat. No. 7,933,810, U.S. Pat. No. 7,970,657, U.S. Pat. No. 7,669,123, U.S. Pat. No. 7,797,256, U.S. Pat. No. 7,788,260, U.S. Pat. No. 7,725,492, U.S. Pat. No. 8,081,817, U.S. Pat. No. 8,037,093, U.S. Pat. No. 7,945,653, U.S. Pat. No. 7,827,265, U.S. Pat. No. 8,108,377, US20110093498, US20080033739, US20100049852, US20080046976, US20110044354, US20110093346, US20110145321, US20100229223, US20110087658, US20100257023, US20100169327, US20100198581, US20090144392, US20110055314, US20110145287, US20110093506, US20110055683, US20090198487, US20100164957, US20100132049, and US20110093460, which are each entirely incorporated herein by reference.

The present invention also provides alternative affiliated promotion or advertising functions, components, and systems, including, but not limited to: one or more of (a) advertising content management system and method; (b) advertising method and product; (c) affiliate distribution of advertisements with compensation for attention; (d) affiliate system and affiliate device; (e) affiliate system on social networking or social networking communities; (f) affiliated advertising widget; (g) apparatus and method for internet advertising compensation; (h) apparatus, method and article to evaluate affiliate performance; (i) arranging delivery of advertisements over a network such as the internet; (j) assured comprehension advertising system; (k) bond issue information management and distribution system; (l) buying and selling spots for advertisements in mass-market media; (m) centralized affiliated marketplaces systems and methods; (n) computerized networking device with embedded advanced content and web traffic monetization functionality; (o) context-based transactions using broadcast advertising; (p) customer loyalty and advertising; (q) customizing an advertisement; (r) delivery, targeting, and measuring advertising over networks; (s) electronic publication advertising system; (t) email-based advertising system; (u) evaluating content based advertising and affiliate advertising; (v) internet business co-op with rotating banners; (w) internet-based and tangible referral system; (x) network interaction correlation; (y) non-authentication access management system for affiliated websites linked with advertisement; (z) offering advertising services; (a) online platform for web advertisement partnerships or affiliate program; (b) providing purchasing incentives and advertisements; (c) providing targeted advertisements based on current activity; (d) quality-based online advertisement trading system; (e) revenue generation and sharing for content sharing services; (f) selecting a website affiliate based on maximum potential revenue generation; (g) selecting personalized non-competitive electronic advertising for electronic display; (h) self-funded commission management system; and (i) service system and mobile communication terminal for free using of data communication, e.g., but not limited to those disclosed in the following US patents and patent applications: US20080208682, US20100324965, US20070244756, US20080120156, US20080021783, US20030220837, U.S. Pat. No. 6,763,334, U.S. Pat. No. 7,599,853, US20100069157, US20050065847, U.S. Pat. No. 7,788,130, US20080147499, US20110066479, US20100268582, US20020066488, US20070192369, US20090319372, US20040111319, US20100198670, US20080126515, US20090106098, US20060167820, US20050234775, US20050171838, US20070218876, US20080172329, US20050038702, US20020072965, US20110191176, US20040172331, US20100023392, US20040172332, U.S. Pat. No. 7,930,207, U.S. Pat. No. 7,827,062, U.S. Pat. No. 7,844,488, US20040172324, US20030028433, U.S. Pat. No. 5,948,061, US20070214227, US20020087631, US20110270686, US20090307081, US20090240582, US20040153366, US20080306823, US20090198551, U.S. Pat. No. 5,774,534, US20020042914, US20110246391, US20080059575, each of which patents or patent application is entirely incorporated herein by reference.

The present invention also provides one or more of a method, apparatus, or system to provide sports and sports events related and integrated social networking, real time geospatial mapping, geo-target location or mobile device and receiving current location of user's electronic device and multiple points of interest, cloud-type configuration storing and handling user data across multiple applications, generating user behavior data and ad links, promotions ("social/geo/promo") links on a website for any product, good or service, including social/geo/promo data sets for user customized visual displays showing 3D map presentations with correlated or related broad or alternative categories of social/geo/promo links to be displayed with web page content for view by an end user. In one implementation, a method is provided. The method includes selecting a first social/geo/promo link category for a first position of a social/geo/promo link promotional data set to be displayed on an interactive 3D geospatial mapping display for promotion or sale of online products, goods or services with social networking and sports related company and local information for selected worldwide locations. One or more second social/geo/promo link categories are identified using one or more correlation criteria, where at least one second social/geo/promo link category has one or more correlation criteria associated with the first social/geo/promo link category Non-Limiting Examples of Alternative
Implementations of the Present Invention The present invention provides in one aspect combining social behavior tracking, online surveillance and web bot software technologies via a mobile device or computer for tracking consumer behavior and data, cookies, embedded advertisements and affiliate advertising, predicting online consumer behavior by monitoring online activity, online communications, search inquiries, social networking, social plugins, ad links, promotions, social applications, entertainment shopping, penny auctions or online auctions, bidding, bidding behavior, bidding results, advertisements and affiliate advertising, purchasing behavior, buying patterns and other criteria, consumer address books & contact lists, blogs, chat rooms, friends, acquaintances and strangers, instant messaging, text chat, internet forum, service providers, travel & hospitality, real estate, educational services, ancillary services (as defined herein) and delivery system for behavior targeting and filtering of ad links, promotions, online coupons, mobile services, Sports related Products, Goods, Gambling, and/or Services, penny auctions or online auctions, advertisements and affiliate advertising or services and service providers, business centers and affiliates for related company information on a three dimensional geospatial platform using multi-dimensional and scalable geospatial mapping associated with entities providing and/or members of the service and/or social networking communities.

Unlike other shopping sites, when site subscribers using the present invention, called Social Shoppers (or "SE SHOPPERS"), visit a website of the invention, they are invited to travel virtually just about anywhere in the world in search of the best ad links, promotions, online coupons, mobile services, Sports related Products, Goods, Gambling, and/or Services or services as they shop for the best bargains on the planet. This one-of-a-kind social networking website that will use GPS technology to reach people at the point of shopping displaying the exact location of daily deals, coupons, products & services from merchants and major brands and showcase them in their actual, physical location on the planet (collectively referred to as "Social Earth Coupons"). Users will be able to connect online just like in the real world. Users will be able to interact with their friends, play games, search for a great restaurant, museum, art gallery and more, upload photos, send instant messages and video chat with their circles of friends. Users will also be able to participate in online auctions and find great bargains for up to 90% off the retail price.

After users install a Google Earth™ plug-in, which has been downloaded more than one billion times since October 2011, they will be able to select their favorite cities and virtually travel around the globe in search of great bargains. Users will be able to choose from a menu of coupons categories such as "Purchase Coupons" for Arts & Entertainment, Travel, Giving Back, Eat & Drink, Deal of the Day or "Free Coupons" for Health & Beauty, Sports, Shopping & Groceries. As Social Shoppers make their selections, daily deals, coupons and other products and services will populate the 3D globe based upon their preferences and targeted city. Members will be able to virtually travel around the selected city and search for great deals. Click on one of the featured City icons on Social Earth™ and virtually fly there in an instant. This global shopping site is going to bring users to the exact point of shopping in an instant.

As Social Shoppers shop the world for ad links, promotions, online coupons, mobile services, Sports related Products, Goods, Gambling, and/or Services or services as well as view bargains, online coupons and offers from major brands for family fun, sports, restaurants, events and hundreds of top consumer packaged goods brands for groceries, apparel, beverages, books & magazines, foods, health care, household, office, personal care, pet care, photography and the like. Social Shoppers will find great ad links, promotions, online coupons, mobile services, Sports related Products, Goods, Gambling, and/or Services or services from merchants and sellers from the leading travel & hospitality industry, restaurants, toy and entertainment companies and top retailers'around the world.

Social Shoppers can select target locations anywhere in the U.S. such as Atlanta, Austin, Dallas, Denver, San Diego, and San Francisco or in any other cities around the world. Social Shoppers, e.g., can find products, goods or services or advertisements and affiliate advertising around the world in place such as London, Paris or Rome or they can tour the planet at will, jumping from Hong Kong to Amsterdam to Buenos Aires to check out the local ad links, promotions, online coupons, mobile services, Sports related Products, Goods, Gambling, and/or Services, as well as entertainment shopping, penny auctions or online auctions, advertisements and affiliate advertising or servicing from merchants and sellers from around the world. Because the Earth view comes live from satellite and webcam images, shoppers can zoom in for a closer look or zoom out to gain perspective on the location. Such an aspect of the present invention displays, organizes and delivers information across many social layers and social media sites featuring top-notch content, stunning satellite imagery, aerial photography and graphic animated color overlays on top of Google Earth™.

The present invention delivers a delightful mash-up of content, Coupons and live social feeds" from Facebook™ and Twitter™ or other popular social networks around the world. The present invention utilizes social networking platforms such as, but not limited to, Facebook™ and Twitter™, to allow Social Shoppers to share the latest ad links, promotions, online coupons, mobile services, Sports related Products, Goods, Gambling, and/or Services, entertainment services, penny auctions or online auctions, advertisements and affiliate advertising or services with their friends on Social Earth or in these popular social networking giants. Unlike other sites, the present invention aggregates ad links, promotions, online coupons, mobile services, Sports related Products, Goods, Gambling, and/or Services or services on its site daily, but they won't last just one day. The present invention can further provide products, goods or services or advertisements and affiliate advertising can last for days, weeks or even months. Social Shoppers are encouraged to share these ad links, promotions, online coupons, mobile services, Sports related Products, Goods, Gambling, and/or Services or services with their friends on Social Earth or in Facebook™ and Twitter™ or other social networking avenues. The global sharing capabilities are built into the present inventions technology using sophisticated technology integrating geospatial mapping, layering location-relevant data and GPS technologies. Social Shoppers are able to find great ad links, promotions, online coupons, mobile services, Sports related Products, Goods, Gambling, and/or Services or services in their local areas or just about anywhere else in the world with the click of a mouse or mobile device. Capitalizing on the popularity of social networking giants Facebook™ and Twitter™ with more than 750 million or more users worldwide, the present invention provides an online community that taps into the power of social networking by integrating "live social feeds" from these social networking giants directly into its website. By creating a highly engaged social networking community on Social Earth, Facebook™ and Twitter™ and encouraging users and members to share the latest promotion, online coupons, mobile services, Sports related Products, Goods, Gambling, and/or Services, entertainment shopping, penny auction or online auctions, advertisement and affiliate advertising or services with their friends on Social Earth, Facebook™ or Twitter™ the present invention creates "stickiness," keeping the Social Shoppers on the site for long periods of time, as well as bringing them back again and again.

The present invention provides long-time customer loyalty, not just a one-off deal. The present invention also provides that a portion of each "Social Earth Coupon" that is sold on the platform will be allocated to microloans or microcredit, humanitarian aid or other worldly cause or sustainable gifts. In addition, users will be able to make charitable donations through the Shopping Cart and purchase online coupons, Sports related Products, Goods, Gambling, and/or Services, assortment of entertainment and entertainment shopping, online casino, online sports betting, NBA and college basketball lines, football, soccer, boxing, fighting, penny auction or online auction, advertisements and affiliated advertising or services that support humanitarian aid or sustainable gifts to help those in need around the world. The community aspect of the present invention is the driver behind building awareness of the website and its featured ad links, promotions, online coupons, mobile services, Sports related Products, Goods, Gambling, and/or Services or services. Existing and potential customers provide advertising by spreading the word to their friends about the great ad links, promotions, online coupons, mobile services, Sports related Products, Goods, Gambling, and/or Services or services they've found on a shopping site of the present invention. Add to that the power of collective buying with the power of social networking and it's easy to see how the community provided by the present invention can leverage group size in exchange for larger discounts. The present invention delivers Social Earth ad links, promotions, online coupons, mobile services, Sports related Products, Goods, Gambling, and/or Services or services from merchants and sellers from around the world to its Social Shoppers via its unique live view of the Earth on a geospatial platform that includes links to places and events, data on the landscape, interactive 360 panoramas, and fly-through shopping tours with stunning 3D imagery. The use of geospatial mapping for associating information to specific places can included, but it not limited to, one or more of: Live links to places and events; Data on the landscape; Zoom to birds-eye and human scale views; 3D custom audio/visual content; Interactive 360 panoramas; Fly-through tours with content, narration, music; Stunning imagery and videos; 3D buildings and landscaping, e-commerce and mobile banking tools and hooks; Advertising on the landscape; Advanced search for private and public information; Social networking integration, social plugins, social applications; Self-posting for uploading user generated content; Custom tools, social & mobile apps and widgets; and the like. The present invention further provides mobile device access from any device to provide Social Earth ad links, promotions, online coupons, mobile services, Sports related Products, Goods, Gambling, and/or Services or services from merchants and sellers from around the world to Social Shoppers based upon their precise location and GPS technology. This provides the ability to create an infrastructure and global platform that provides users and members and businesses of all types and sizes with access to broad markets and connect buyers and sellers and to reach people at the point of shopping—a benefit both to shoppers and merchants.

Social Layers. Social Shoppers using or part of the present invention virtually travel just about anywhere in the world in search of shopping products or services, as well as bargains. The present inventions technology drives content, ad links, promotions, online coupons, mobile services, Sports related Products, Goods, Gambling, and/or Services or services into a "virtual Earth" based upon its precise location based technologies including GPS and GIS. Users will be able to enjoy the shopping scene on the planet Earth and view Social Earth ad links, promotions, online coupons, mobile services, Sports related Products, Goods, Gambling, and/or Services, entertainment shopping penny auctions or online auctions, advertisements and affiliate advertising or services from merchants and sellers from around the world by geo-target location using GPS technologies. This website of the invention aggregates Social Earth ad links, promotions, online coupons, mobile services, Sports related Products, Goods, Gambling, and/or Services or services from merchants and sellers from around the world (in different languages) and showcase them in their actual, physical location on the virtual Earth. Because the virtual Earth is "interactive," one can zoom in for a more detailed view or zoom out to gain perspective on where they are in the world. Social Earth ad links, promotions, online coupons, mobile services, Sports related Products, Goods, Gambling, and/or Services or services can last for days, weeks or even months. What makes the present inventions website different from other group buying websites is that websites of the present invention allow Social Shoppers to search for ad links, promotions, online coupons, mobile services, Sports related Products, Goods, Gambling, and/or Services, entertainment shopping, penny auctions or online auctions, as well as advertisements and affiliate advertising or services from merchants and sellers from around the world on a virtual Earth. Users will be able to customize their buying preferences, engage in social networking activities, support worthwhile causes and much more. Websites of the present invention can allow Social Shoppers to select from a menu of coupons based upon their online activities, location, online communications, search inquiries, social networking, social plugins, ad links, promotions, social applications, entertainment shopping, penny auctions or online auctions, advertisements and affiliate advertising or services, purchasing, behavior, buying patterns and other criteria, which is integrated into the virtual Earth along with other layer location-relevant data as Social Shoppers shop online and interact with their friends in other popular social networks.

Advertisers and merchants will be able to target Social Shoppers based on geo-target location.

The present invention provides layer applications, which are known as "social layers." These social layers allow Social Shoppers to customize their personal experience on SOCIAL EARTH as they search for Social Earth ad links, promotions, online coupons, mobile services, Sports related Products, Goods, Gambling, and/or Services or services from merchants and sellers in their local area or just about anywhere else in the world based upon their precise location, GPS, buying preferences, interests or travels take them. Social Shoppers select from a menu of "Purchase" coupon categories such as. (Arts & Entertainment, Travel, Giving Back, Eat & Drink, Deal of the Day) and "Free" coupon categories such as: (Health & Beauty, Sports, Shopping, Groceries). The present invention provides methods and systems that drive traffic to its website by targeting Social Earth Sports related Products, Goods, Gambling, and/or Services and connecting buyers and sellers from around the world on a global platform, based upon a user's preference, which are displayed on a unique Live View of planet Earth. Once a Social Shopper selects one or more coupon categories, advertisements for Social Earth ad links, promotions, online coupons, mobile services, Sports related Products, Goods, Gambling, and/or Services or services from merchants and sellers from around the world will populate the virtual Earth. Social Shoppers are able to double click on Social Earth ad links, promotions, online coupons, mobile services, Sports related Products, Goods, Gambling, and/or Services or services and virtually fly directly to its location on Earth. Social Shoppers can also click on one of the featured cities and take a tour of London, San Francisco or Denver and zoom down to street level to take a closer look. Social Shoppers enjoy the experience of virtually traveling around the world, zooming in and out to street level in search for great ad links, promotions, online coupons, mobile services, Sports related Products, Goods, Gambling, and/or Services or services and sharing them with their friends on Social Earth or in these popular social networks.

In connection with a one-of-a-kind geospatial website aggregates Social Earth ad links, promotions, online coupons, mobile services, Sports related Products, Goods, Gambling, and/or Services, entertainment shopping, penny auctions or online auctions, advertisements and affiliate advertising or services from merchants and sellers from around the world and showcases them in their actual, physical location on the websites unique live view of Earth. As Social Shoppers shop the world for bargains, they can view Social Earth promotions, online coupons, mobile services, Sports related Products, Goods, Gambling, and/or Services or services from merchants and sellers of major brands for such items as family fun, sports, restaurants, events and hundreds of top consumer packaged goods brands for groceries, apparel, beverages, books & magazines, foods, health care, household, office, personal care, pet care, photography and other embodiments.

Social Shoppers can find great ad links, promotions, online coupons, mobile services, Sports related Products, Goods, Gambling, and/or Services or services from merchants and sellers from the leading travel & hospitality industry, restaurants, toy and entertainment companies and top retailers around the world. Social Shoppers can use "a mobile device payment method and system for effectuating an online payment through a computer or a mobile device equipped carrier or a mobile device equipped bank using a mobile users device in connection with an e-commerce and mobile banking transactions on the host geospatial website or mobile device (e.g., mobile telephone, PDA, laptop computer, etc.); wherein users and members create and maintain a rich-media application via a geospatial mapping platform via the Internet comprising: mobile banking and electronic payments. The delivery system for a host geospatial website (access via a mobile device or computer) will provide for a multidimensional representation of information and scalable version of web content for the delivery of Social Earth ad links, promotions, online coupons, mobile services, Sports related Products, Goods, Gambling, and/or Services or services from merchants and sellers from around the world on a three dimensional geospatial platform using geospatial mapping technology.

A host geospatial website will include realistic virtual landscape using satellite and aerial photography that will include many content layers of web based information, e-commerce and mobile banking links, social networking, social networking communities, social networking activities, social plugins, ad links, promotions, social applications, online dating, entertainment shopping, penny auctions or online auctions and advertisements and affiliate advertising or services from merchants and sellers from around the world for a richer user experience. A host geospatial website shall store images, web-based content, social data and share "live social feeds" from social networking giants Facebook™ and Twitter™ and other communications in real-time, which can also include tracking and predicting of online communications via a mobile device or computer with respect to third party applications and outside social networks such as e.g. Facebook™, Twitter™, Skype™ and other social networks around the world. Connecting Social Earth products, goods or services from merchants around the world with users and members known as "Social Shoppers" in real-time on a geographical area across multiple social layers that are displayed as graphic animated color overlays on a three-dimensional geospatial platform using geospatial-mapping technology. More specifically, it relates to a method for users and members known as "Social Shoppers" to effectuate banking and electronic payments; accessing a user account, engaging in mobile social activities and viewing available options via a three dimensional geospatial mapping platform using geospatial mapping technology."

The present invention further provides the use of various marketing and customer generation methods, including, but not limited to, social media platforms to generate traffic to the websites and access points for the present invention, e.g., but not limited to, a SOCIAL EARTH website, in order to provide a large subscriber base of Social Shoppers; which can include, but is not limited to, one or more of the following: Virtual Penny Auctions or Online Auctions—Social Shoppers can view, bid and purchase items from penny auctions or online auction from around the world on Social Earth. Virtual Coupons—Social Shoppers can view Social Earth ad links, promotions, online coupons, mobile services, Sports related Products, Goods, Gambling, and/or Services or services by geo-target location; Video Coupons—Social Earth "video" ad links, promotions, online coupons, Sports related Products, Goods, Gambling, and/or Services or services from merchants and sellers from around the world that are displayed on one or more pages, links, on the website; Email Marketing—featured Social Earth ad links, promotions, online coupons, mobile services, Sports related Products, Goods, Gambling, and/or Services or services will be emailed to users and contain a brief headline deal(s) with a full description of upcoming events; Website—Visitors are prompted to register as a Social Shopper when they first visit website and thereafter use the website as a portal for featured Social Earth ad links, promotions, online coupons, mobile services, Sports related Products, Goods, Gambling, and/or Services, entertainment services, penny auctions, or online auctions, advertisements and affiliate advertising or services from merchants and sellers from their local area or just about anywhere in the world; Mobile Applications—Consumers can access Social Earth ad links, promotions, online coupons, mobile services, Sports related Products, Goods, Gambling, and/or Services, entertainment shopping, penny auction or online auctions, advertisements and affiliate advertising or services via a smartphone or similar device, which is compatible with Google Earth™ and similar geospatial mapping technologies, and smart phones; Google Ad Words™—Google Ad Words or similar advertising is provided to maximize search results for Social Earth Coupons; Pay Per Ad—the invention can provide a PPC Ad link on other "high traffic" websites to drive traffic to websites of the invention; In-stream Advertising—In-stream advertising is also provides to use social media platforms such as "live social feeds" from Facebook™ and Twitter™ to spread the word about Social Earth Coupons; User Generated Traffic—the invention can provide rewards to Social Shoppers for sharing and spreading the word about Sports related Products, Goods, Gambling, and/or Services that are offered. e.g., if a certain number of people sign up for Social Earth Coupon, then the deal becomes available to all included; Share Coupons with Friends—the present invention provides this way to make it easy for users and members to share "Social Earth Coupons with friends on social networking and similar sites, e.g., but not limited to, Twitter™, Facebook™, StumbleUpon™, Delicious™, Friendfeed™, or Digg™; Refer A Friend—the invention can provide a Referral Widget and encourage Social Shoppers to refer their friends and receive $10 worth of loyalty credits; Loyalty Card Program—the invention can provide Loyalty Card Programs that reward Social Shoppers each time they purchase a Social Earth Coupon; Social Network Feeds—the invention provides where Social Shoppers can suggest a business to others in the Social Shopper community, track their friends and share "live social feeds" from Facebook™ and Twitter™;

SOCIAL EARTH For Your Business—the present invention can provides for help for businesses to reach new customers with the inventions Live View Earth business platform, where are provided businesses featured in a sponsor ads, such as, but not limited to, Premium Sponsor Ads; Gift Cards—Social Shoppers and businesses can purchase Gift Cards for friends, family and customers; Foursquare™—the invention can provide ad links, promotions via Foursquare so consumers can act and immediately share the information with their friends; Open Source Technologies—the invention provides that Social Shoppers can connect with millions of Social Shoppers in popular social networks such as Facebook™ and Twitter™ using open source technologies; Data Mining—the invention provides for gathering social data for online, mobile advertisers and social brands that are interested in a target market of a particular segment based upon their precise location or other criteria; Image Sharing Sites—the invention provides for Social Shoppers to upload images on image sharing sites such as Flickr™ and Picasaweb™; Social Bookmarking: the invention provides for the use of social bookmarking with sites like Digg™, Delicious™, StumbleUpon™, etc.; Search Engine Optimization—Key words can be used in the present invention to optimize visibility to top search engines such as: Google™, Yahoo™, Bing Ask™ and AOL Search™. Other search engines such as: Collecta™, Topsy™, 48ers™, Leapfish™, Scoopler™ and Sency™ are powerful tools that will show live streams of microblog updates from Twitter™, Jaiku™ and Identica™, photos from Flickr™, TwitPic™ and yFrog™ and videos from YouTube™ and Ustream™; YouTube™: the present invention can provide periodic YouTube videos outlining how to use and maximize user purchasing power using the present invention, e.g., SOCIAL EARTH, as well as soliciting and providing video testimonials from Social Shoppers on an ongoing basis, e.g., incentivizing "four star" videos with a special "Best Expert User" badge to be featured on their profile page; Video Viral Marketing can also be used in the present invention; as well as Blogging, and using article servers (such as ezinearticles.com, goarticles.com, selfgrowth.com, isnare.com); Twitter™ Marketing, including, e.g., but not limited to, discounts or other special ad links, promotions, online coupons, mobile services, Sports related Products, Goods, Gambling, and/or Services, entertainment shopping, penny auctions or online auctions, advertisements and affiliate advertising or services with their friends on Social Earth and Twitter™; Affiliates—the invention can further provide API widgets or geo-targeted social links that can be downloaded by affiliates. Social Shoppers can get paid X percent (X %) of sales of Social Earth Coupons on their websites; Independent Coupon Distributors—the invention can provide network(s) of independent coupon distributors that own Valupak™ or other franchises (and other direct mail coupon companies) to include "Social Earth Coupons" that can be distributed to local businesses.

Referring now to the drawings wherein like reference numerals are used to identify identical components in the various views, FIG. 1 shows an example of a combined Products, Goods, Gambling, or Services with /Geospatial Mapping/Company-Local Information/Social Networking/ Communities ("PSGGS-GM-CL/I-SN") system 10 in accordance with an exemplary embodiment combined online Product or Service in combination with geospatial mapping/ company/Local Information/and/or social networking distribution system 10 includes a main server system 12 and a client system 14 that is remote from main server system 12, connected together by a distributed computer network, such as the Internet 16 (network, or mobile device access system). A user desiring to obtain one and/or more of online Products, Goods or Services in combination with geospatial mapping/ company/Local Information/and/or social networking uses client system 14 to interact with main server system 12 to obtain online Products, Goods or Services. An electronic coupon can be but is not limited to any advertisement that is electronic (e.g., electronic advertisement on website, electronic advertisement sent to client device, a hyper link based on a search result from a search engine and/or any other push/pull techniques).

Main server system 12 is configured to be connected to, and/or otherwise receive, ad links, promotions, online coupons, social activity, location, Product, Good and/or services information from the issuer of such coupons (i.e., the coupons sponsor) and/or as provided by the website and/or other electronically provided information, e.g., by PDA, cell phone, portable electronic tablet, etc., including mobile banking or e-commerce system. Although not shown, this function can be performed by a direct electronic connection with a sponsor system, and/or can involve loading data from a physically transportable data storage medium (e.g., diskette, tape, CD-ROM, USB drive, etc.). The coupon sponsor may, and in most cases will, issue in connection with the coupon an associated set of instructions that define how the coupon is to be distributed. For example, such instructions can include restrictions as to the number of coupons that any one user can print out for redemption, the state and/or zip code associated with a user for such user to have access to the coupon, the expiration date, the item and discount amount, etc. Main server system 12 is further configured to be connected to, and/or otherwise receive, advertising information from an advertising sponsor, or purchasing system, e.g., Amazon, or company purchase website or mobile application, or through mobile banking system. Although not shown, this function can be performed by direct electronic connection with the ad sponsors system, and/or can involve loading data from a physically transportable data storage medium (i.e., diskette, tape, CD-ROM, etc.). The advertising impressions are displayed on client system 14, as described in greater detail below.

Main server system 12 can include a website server 18, a front-end server 20, a handler 22, a database server 24, and an FTP server 26. Website server 18 is configured to provide "web pages", mobile app, e-commerce or electronic or mobile banking, to consumers (including possible users and members of electronic coupon distribution system 10) with Internet access. Internet 16, more particularly, the World Wide Web portion thereof, "WWW", is an interconnected computer network that is generally distributed throughout the world on discrete interconnected computer nodes having software interfaces generally referred to as "web pages," which further includes geospatial mapping, social networking, company and local information for selected worldwide locations, and/or any other useful data. Access to Internet 16 can be made by various methods; typically, however, a non-institutional user obtains access from one of a plurality of Internet Service Providers (ISPs), which in turn obtain authorized access to Internet 16. Navigation on the WWW portion of Internet 16 involves knowledge of a directory structure of various nodes of the Internet (i.e., an "address" to each given resource on Internet 16). Such an address is generally referred to as a Uniform Resource Locator (URL), which typically starts with a protocol name followed by a domain name, for example: http://www.valuepass.com. Website server 18 is configured to provide, among other things, an interface for effecting a download of client software that a consumer can download and execute to establish a client system 14 on his and/or her computer system. In this way the consumer can become an authorized user ("user") of electronic coupon distribution system 10. In particular, website server 18 can refer an Internet consumer to FTP server 26 for the client installation file.

Front-end server 20 provides multiple interface and allocation/direction features for electronic coupon distribution system 10. Front-end server 20 is the entity that is initially contacted by client system 14 at the start of each new session of combined Products, Goods, Gambling, or Services with /Geospatial Mapping/Company-Local Information/Social Networking/Communities ("PSGGS-GM-CL/I-SN") distribution system 10, and/or when automatic coupon updates occur. Handler 22 is configured to interface with database server 24. After a new session is established by a user, all subsequent requests by client system 14 can be directed to and are "handled" by handler 22. As a result, handler 22 can thereafter issue a request and/or a command to database server 24, and/or directly respond to client system (if configured to do so). Database server 24 can comprise a plurality of physical, individual general-purpose digital computers configured as database servers, which can be further configured in a cluster arrangement. Database server 24, in one embodiment, can be configured to operate using SQL server software, such as, but not limited to, Microsoft SQL Server Version 7, commercially available from, for example, Microsoft Corporation, Redmond, Wash., U.S.A.

FTP server 26 can be configured to operate in cooperation with website server 18 to provide, for example, installation and/or setup programs. The installation program(s) are downloaded to a general-purpose computer (e.g., PC and/or a MAC) for installation of the client software in accordance with the present disclosure.

Client system 14 includes client application software 28, DeviceID data 30 (ID) data 30, user preference data 32, user history data 34, PSGGS-GM-CL/I-SN information data 36, and advertising data 38. In addition, client system 14 can comprise a general purpose computing apparatus configured to operate in accordance with an operating system having a graphical user interface, such as, for example, Windows 95/98/NT 4.0/2000/Vista/7, and Apple Computer, Inc. MAC OS Operating System for Macintosh platforms. Client system 14 can further include standard peripherals such as a display device 40, a keyboard 42, a pointing device, such as a mouse 44, and an output device, such as a printer 46, for producing a "hard copy" of PSGGS-GM-CL/I-SN 48. DeviceID data 30 can be stored on main server system 12, according to an exemplary embodiment. In exemplary embodiments, one, a few, a plurality and/or all DeviceID data 30 can be stored on main server system 12.

Client application software 28 comprises software compatible with and executing on client system 14 configured to implement the present disclosure as described herein. Client application software 28 performs various functions including, but not limited to, collecting user information, including preferences, communicating with main server system 12 via Internet 16, and providing an interface for the user for browsing through, and selecting, PSGGS-GM-CL/I-SN information for printout. DeviceID data 30 can comprise a multi-digit number that is assigned by main server system 12, more particularly, database server 24, when a user registers with PSGGS-GM-CL/I-SN information distribution system 10. DeviceID data 30 can have a format, such as XXXXXXXX, where X is a digit between 0-9. DeviceID data 30, however, does not specifically identify the user personally, but rather, more accurately associates a physical machine defining client system 14 with user profile information obtained during registration. DeviceID data 30 is stored on client system 14, main server system 12, and/or both as a part of a User Info object. If the DeviceID data 30 is stored on client system 14, then DeviceID data 30 is provided to main server system 12 when making requests, for example, for new PSGGS-GM-CL/I-SN information data. If a client system 14 operates multiple independent operating systems (e.g., a Mac operating system (a product of Apple Computer, Inc.) and a Windows operating system (a product of Microsoft Corp.)), then there can be a separate DeviceID data 30 for each operating system assigned to that client system 14. Main server system 12 can correlate the provided DeviceID data 30 with user information stored in a profile database. The user information can then be used in identifying PSGGS-GM-CL/I-SN information suitable for the user. In this embodiment, however, the user is not personally identified nor is it even possible (e.g., through the "hacking" of main server system 12) to identify the user personally, as such information is not even collected from the user. Accordingly, the approach described herein maintains privacy of the user of PSGGS-GM-CL/I-SN information distribution system 10.

The User Info object further includes user information collected from the user of client system 14 indicative of one and/or more demographic characteristics of the user. In this embodiment, the user information is insufficient to specifically identify the user. In a constructed embodiment, such information comprises a postal zip code associated with the user, and a state in which the user resides. Client application software 28 allows the user to update this information after initial registration. In addition, the User Info object includes the mode in which the Internet is accessed, for example, through use of a modem (e.g., dial-up), through use of a Local Area Network (LAN), and/or use of a proxy server. The User Info object can further include the version number of the client application software 28.

User preference data 32 comprises two main groups. The first group of information contained in user preference data 32 includes information defining how often the main server system 12 is checked for new PSGGS-GM-CL/I-SN information. In a constructed embodiment, the options include one hour, two hours, four hours (the default), twice a day, and once a day. The first group of information contained in user preference data 32 can also include a miscellaneous item of information indicating whether the user prefers that certain PSGGS-GM-CL/I-SN information be automatically printed (this can be selected and/or deselected by the user). The second main group of information included in user preference data 32 includes a comprehensive listing of main categories of PSGGS-GM-CL/I-SN information selected by the user that the user wishes to receive. While the particular main PSGGS-GM-CL/I-SN information category descriptions can be changed on main server system 12 and downloaded to client system 14 at any time, exemplary categories include "Apparel", "Athletics", "Automotive", and "Internet Electronics", among others. A user can deselect a category, in which case PSGGS-GM-CL/I-SN information pertaining to that category will not be sent from main server system 12 to client system 14.

User history data 34 comprises data corresponding to events occurring at the remote client system 14, as well as other items pertaining to the operation of client system 14. All these items are stored in a user history file. For example, when a user is browsing through available PSGGS-GM-CL/I-SN information each PSGGS-GM-CL/I-SN information that is selected for viewing is noted in the user history file. Likewise, when PSGGS-GM-CL/I-SN information is selected for printing, that action is also recorded in the user history file. Other examples include when PSGGS-GM-CL/I-SN information is actually printed, and when an advertising impression (described in further detail below) is displayed on display device 40. The information contained in the user history data 34 is encrypted by client application software 28 in accordance with a client system encryption strategy to protect the integrity of the data contained therein. The contents of the user history data 34 are described and illustrated in greater detail in connection with FIG. 17.

PSGGS-GM-CL/I-SN information data 36 includes information corresponding to the PSGGS-GM-CL/I-SN information available (e.g., for browsing) on client system 14. Each PSGGS-GM-CL/I-SN information, such as PSGGS-GM-CL/I-SN information 48, includes a plurality of items of information associated therewith. Therefore, an exemplary, non-limiting, structure is defined for each PSGGS-GM-CL/I-SN information having the items of information set forth in Table 1 below.

TABLE 1

PSGGS-GM-CL/I-SN information Data Structure

1. PSGGS-GM-CL/I-SN information Sponsor Name
2. Product and/or Service Description
3. Savings and/or Discount Amount TABLE 1-continued PSGGS-GM-CL/I-SN information Data Structure 4. The Number of PSGGS-GM-CL/I-SN information Available for Printout
5. The Number of PSGGS-GM-CL/I-SN information Printed Out Thus Far
6. Expiration Date
7. Optional Text/Image(s)
8. PSGGS-GM-CL/I-SN information Identification Number In addition, when PSGGS-GM-CL/I-SN information 48 is actually printed out, additional information can be printed out on the "hard copy" of the PSGGS-GM-CL/I-SN information. These additional items can include the DeviceID data 30, portions of the demographic data such as the postal zip code, one and/or more items of the user information contained in user preference data 32, the date and time, and optionally various Internet URLs. Coupon sponsors have found some of the information appearing on printed PSGGS-GM-CL/I-SN information 48 desirable. That is, when the user redeems PSGGS-GM-CL/I-SN information 48, for example, at a retail store, information appearing on PSGGS-GM-CL/I-SN information 48 (which is eventually returned by the retailer to the PSGGS-GM-CL/I-SN information issuer and/or sponsor) is available to the PSGGS-GM-CL/I-SN information sponsor. This information can thereafter be used in analyzing and assessing the efficacy of various advertising/promotional strategies. PSGGS-GM-CL/I-SN information data 36 can be stored on a hard drive and/or the like associated with client system 14, and is preferably stored in an encrypted form. In particular, and in accordance with the present disclosure, PSGGS-GM-CL/I-SN information data 36 corresponding to PSGGS-GM-CL/I-SN information is encrypted by main server system 12 in accordance with a server system encryption strategy.

The encrypted PSGGS-GM-CL/I-SN information data is then transmitted to client system 14. Client system 14 further encrypts the once-encrypted PSGGS-GM-CL/I-SN information data in accordance with a client system encryption strategy to thereby generate doubly encrypted PSGGS-GM-CL/I-SN information data. The doubly encrypted PSGGS-GM-CL/I-SN information data 36 can then be stored on the client system 14. The foregoing encryption steps substantially minimize the occurrence of fraud in the distribution of PSGGS-GM-CL/I-SN information compared to known systems. A user, for example, can therefore not easily defeat the PSGGS-GM-CL/I-SN information counting scheme that limits the number of printouts by, for example, exploring the client systems hard drive, identifying PSGGS-GM-CL/I-SN information data, and thereafter producing printed copies of the PSGGS-GM-CL/I-SN information. Use of the environment established by client application software 28 is therefore practically the only means for the user to obtain usable PSGGS-GM-CL/I-SN information 48. Advertising data 38 comprises a plurality of advertising impressions wherein each impression can include a predetermined combination of text and images. Advertising data 38 is also stored on client system 14 in an encrypted form. Display device 40, keyboard 42, mouse 44, and printer 46 can comprise an apparatus known to those of ordinary skill in the art.

FIG. 2 shows, in greater detail, database server 24 of main server system 12. As described above, database server 24 can comprise a plurality of physical database servers arranged in a cluster. Further physical machines can be added to provide for load balancing (i.e., scalability, and the ability to quickly add additional hardware as load and responsiveness criteria require). Database server 24 can include PSGGS-GM-CL/I-SN information database 50, an advertising database 52, a master category list master category list database 54, a plugin database 56, a brand logo database 58, and a user transaction history database 60.

PSGGS-GM-CL/I-SN information database 50 includes PSGGS-GM-CL/I-SN information data similar to that described in connection with PSGGS-GM-CL/I-SN information data 36, but is more in the nature of a master PSGGS-GM-CL/I-SN information database including the entire universe and/or a larger set of PSGGS-GM-CL/I-SN information available on PSGGS-GM-CL/I-SN information distribution system 10. Advertising database 52 includes a plurality of ad impressions, which can be a combination of text and/or images. Again, advertising database 52 is in the nature of a master advertising database including all of the advertising impressions included in main server system 12.

Master category list database 54 includes the main PSGGS-GM-CL/I-SN information category names presently established on PSGGS-GM-CL/I-SN information distribution system 10. In addition, display characteristics, such as the color of a main PSGGS-GM-CL/I-SN information category button (to be described in connection with FIG. 3A) can also be stored in database 54.

Plugin database 56 includes information as to available plugins for use in connection with client application software 28 of client system 14. Plugin database 56 includes a plurality of plugins. The particular plugins that are selected for use in connection with client application software 28 depends on what added functionality has been configured in client system 14. For example, plugins can be configured to provide Zodiac information, recipe information, and stock quote information to the user. Additionally, a plugin can be configured to provide a new PSGGS-GM-CL/I-SN information style for the user. In this way, client system 14 can be updated remotely with new functionality.

Brand logo database 58 includes information as to how the user interface of client system 14 is "branded." The default "branding" of the user interface involves the display of a company logo of the assignee of the present disclosure. Also, a corresponding Internet URL for "click through" purposes is associated with the brand image. However, in alternate embodiments, other companies can arrange (e.g., through a referral of potential new users and members of PSGGS-GM-CL/I-SN information distribution system 10) to have the user interface of client application software 28 "branded" with the referring company's logo (and Internet URL for "click through").

User transaction history database 60 includes information contained in user history data 34 uploaded from client system 14. User transaction history database 60 therefore contains information corresponding to actions and/or events taken by and/or involving the user of client system 14. User transaction history database 60 therefore includes a record for each PSGGS-GM-CL/I-SN information that has been downloaded and/or otherwise provided to client system 14. As each PSGGS-GM-CL/I-SN information is displayed, and/or printed by the user, for example, the corresponding record in user transaction history database 60 is updated.

Referring now to FIGS. 3A and 3B, FIG. 3A shows a Graphical User Interface (GUI) 62 displayed on display device 40 in connection with the execution of client application software 28. User interface 62 includes a plurality of main PSGGS-GM-CL/I-SN information category "buttons" 64 each having a respective status indicator 66 associated therewith. User interface 62 also includes PSGGS-GM-CL/ I-SN information subcategory list 68, PSGGS-GM-CL/I-SN information list 70, an advertising pane 72, a logo pane 74, a main PSGGS-GM-CL/I-SN information display area 76, an "Add-To-Print-Cart" button 78, a "Print Now" button 80, a "More Info" button 82, a "Delete" button 84, a "Preferences" button 86, a "Ad links or Promotions" button 88, a "Refresh" button 90, a printout status display area 92, and a general message display area 94.

Main PSGGS-GM-CL/I-SN information category buttons 64 allow the user of client system 14 to select the general category of PSGGS-GM-CL/I-SN information that the user is interested in viewing. For example, the user who is interested in browsing through media and entertainment PSGGS-GM-CL/I-SN information, would select the main category button 64 designated "Media and Entertainment" using a pointing device such as mouse 44 (e.g., via "clicking" on the button). Status indicator 66 associated with each main PSGGS-GM-CL/I-SN information category button 64 indicates whether there are PSGGS-GM-CL/I-SN information under that main category that have not yet been displayed in PSGGS-GM-CL/I-SN information display area 76. As shown in FIG. 3A, when a status indicator 66 is "checked" (i.e., active), as indicated generally at 66.sub.A for the main PSGGS-GM-CL/I-SN information category button labeled "Added Extras", such indication informs the user that PSGGS-GM-CL/I-SN information are available under that main PSGGS-GM-CL/I-SN information category that have not yet been displayed.

Alternatively, when there are no undisplayed PSGGS-GM-CL/I-SN information under a main category, the "checked" status indicator 66 becomes inactive and is removed, as shown by a dashed line box designated 66.sub.I where a status indicator would otherwise be displayed had it been "active."

When one of the plurality of main PSGGS-GM-CL/I-SN information category buttons 64 is selected, a corresponding subcategory list is displayed in PSGGS-GM-CL/I-SN information subcategory list 68. A user can then browse through the items contained in PSGGS-GM-CL/I-SN information subcategory list 68 and make a selection. When one of the items contained in PSGGS-GM-CL/I-SN information subcategory list 68 is selected by the user (e.g., via "clicking"), the corresponding individual PSGGS-GM-CL/I-SN information and/or informational messages are displayed in PSGGS-GM-CL/I-SN information list 70. The user can then select an item from PSGGS-GM-CL/I-SN information list 70, which will then be displayed in PSGGS-GM-CL/I-SN information display area 76. Through the foregoing interface, users and members of PSGGS-GM-CL/I-SN information distribution system 10 can quickly and easily navigate from broad main PSGGS-GM-CL/I-SN information categories, to individual PSGGS-GM-CL/I-SN information, for printout and later redemption if the user desires to print out a particular PSGGS-GM-CL/I-SN information, the user can select the print cart button 78 to add the selected PSGGS-GM-CL/I-SN information to a print cart and/or queue for subsequent printout on printer 46. Alternatively, the user can print the selected PSGGS-GM-CL/I-SN information immediately by selecting the "Print Now" button 80.

Advertising pane 72 is configured to display an advertising impression. In one embodiment, the advertising impression is selected from a plurality of advertising impressions as a function of a selected PSGGS-GM-CL/I-SN information subcategory. For example, a vendor of electronic equipment can arrange to have an ad impression for that vendors company displayed in advertising pane 72 when the user selects a particular PSGGS-GM-CL/I-SN information subcategory from list 68 when the "Internet Electronics" category button 64 is selected. As a further feature, the advertiser can provide an Internet URL (e.g., to its home page) and have it associated with the ad impression. Client application software 28 is configured such that when a user selects (e.g., "clicks") advertising pane 72, an Internet browser program associated with client system 14 is launched and is directed to the URL as specified by the advertiser. This is a so-called "click through" occurrence, which is recorded in the user history file.

Logo pane 74 provides a display area through which the user interface 62 of PSGGS-GM-CL/I-SN information distribution system 10 can be "branded." As with advertising pane 72, an Internet URL can be associated with the brand logo displayed in logo pane 74. Client application software 28 is configured such that when the user selects (e.g. "clicks") logo pane 74, an Internet browser program associated with client system 14 is launched and is directed to the specified URL.

The "Print Now" button 80 is configured under client application software 28 such that when selected, the PSGGS-GM-CL/I-SN information currently being viewed is printed out on printer 46. If there are one and/or more other PSGGS-GM-CL/I-SN information currently in the print queue, as a result of prior selection of the print cart button 78 for previously displayed PSGGS-GM-CL/I-SN information, then selection of the "Print Now" button 80 by the user will operate to print all such selected PSGGS-GM-CL/I-SN information 48 on printer 46. The "More Info" button 82 is configured under client application software 28 to launch an Internet browser program associated with client system 14 when selected, and, further, to direct the browser to a specified URL. In accordance with a secure e-couponing embodiment of the present disclosure, predetermined ones of the PSGGS-GM-CL/I-SN information displayed in PSGGS-GM-CL/I-SN information display area 76 can be redeemed by the user electronically (as opposed to printing out the displayed PSGGS-GM-CL/I-SN information and physically tendering the same to the retailer). Generally, a portion of the PSGGS-GM-CL/I-SN information being displayed in PSGGS-GM-CL/I-SN information display area 76 will tell the user to click on the "More Info" button 82 to instantly redeem the PSGGS-GM-CL/I-SN information. Client application software 28 is configured to invoke, in response to the "click", the specified but completely hidden and inaccessible URL (including the appended promotional code) using an Internet browser program. Client application software 28 disables access to the invoked URL/code. For example, moving the mouse arrow over the PSGGS-GM-CL/I-SN information/ad does not cause the URL to be displayed, nor is "right-button clicking" operative to allow capture of the URL. Accordingly, the specified URL (and code) is neither displayed nor available, and cannot be discovered by, for example, "right-clicking" on PSGGS-GM-CL/I-SN information display area 76, like a web-based e-PSGGS-GM-CL/I-SN information distribution systems. The browser takes the user to the website corresponding the specified URL, where the appended promotional code is processed, and the user provided an opportunity to redeem the same. The present disclosure therefore provides secure PSGGS-GM-CL/I-SN information distribution. In another embodiment, the specified URL that is invoked when the "More Info" button 82 is "clicked" comprises the URL associated with an advertiser's website (i.e., the advertiser associated with an ad impression displayed in advertising pane 72). The "Delete" button 84 is configured under client application software 28 to delete the currently viewed PSGGS-GM-CL/I-SN information when selected by the user.

The "Preferences" button 86 is configured under client application software 28 to allow the user to set and/or modify the information contained in the user preference data 32, when selected by the user. For example, the refresh interval referred to above can be updated by the user to extend and/or foreshorten the PSGGS-GM-CL/I-SN information update interval. The "Ad links or Promotions" button 88 is configured under client application software 28 to prompt the user to enter a promotion code to obtain a special promotion PSGGS-GM-CL/I-SN information, when selected by the user. For example, a third-party website, and/or the like, can advise the user of a promotional code, with instruction to establish client system 14 (if they are not already a registered user), and then to enter the promotion code as described above, to obtain the promotional PSGGS-GM-CL/I-SN information.

The "Refresh" button 90 is configured under client application software 28 to transmit an update request from client system 14 to main server system 12, when selected by the user. This action, in-effect, requests that any new PSGGS-GM-CL/I-SN information waiting for the user on main server system 12 at that point in time be downloaded to client system 14. Additionally, any data in the user history file is uploaded. Printout status display area 92 is provided for displaying messages pertaining to the status of the print cart (e.g., "Items to Print: 2"). Message display area 94 is provided for displaying various messages to the user of client system 14.

Referring now to FIG. 3B, the graphical user interface associated with the operating system of client system 14 can include a taskbar 100. In accordance with the present disclosure, taskbar icon 102 is provided. Client application software 28 is configured to display taskbar icon 102 to the user in a first display state when no new PSGGS-GM-CL/I-SN information and/or messages are available to the user. Taskbar icon 102 in the first display state can assume a static display. In constructed embodiment, taskbar icon 102 includes a generally black-colored "%" symbol on a yellow-colored background, all enclosed by a dashed-line box. Client application software 28 is further configured to display taskbar icon 102 in a second display state different from the first display state when new PSGGS-GM-CL/I-SN information and/or messages are available for the user. In a constructed embodiment, the second display state associated with taskbar icon 102 comprises a quasi-flashing display state wherein (i) the color of the "%" symbol is indexed and/or rotated through a plurality of different colors, and (ii) the dashed-line enclosure box is manipulated to give the sense of movement, particularly rotation, around the perimeter of taskbar icon 102.

Referring now to FIG. 4, a brief description of the operation of PSGGS-GM-CL/I-SN information distribution system 10, particularly the main interactions between client system 14 and main server system 12, will now be set forth. Each time a new session is commenced, the basic steps set forth in FIG. 4 are performed. In step 104, client system 14, by way of execution of client application software 28, is initialized. In step 106, client application software 28 determines whether there is an identified user device for client system 14, and/or whether the present user is a "new" user device. Client application software 28 can make this determination based on the existence and/or absence of particular files on client system 14 (e.g., a file containing a DeviceID data 30) indicative of whether and/or not this is a "new" user device. If "NO", then the method branches to step 1 12. Otherwise, if the answer to step 106 is "YES", then the method branches to step 107.

In step 107, client application software 28 obtains user information from the user. In particular, client application software 28 is configured to collect user information from a user of client system 14 indicative of one and/or more demographic characteristics of the user without obtaining information sufficient to specifically identify the user. In a constructed embodiment, the information obtained comprises a postal zip code associated with the user, and a State where the user resides. Personal information such as the users and members name, e-mail address, residence address, social security number, telephone number, and the like is not obtained in step 107. In accordance with the present disclosure, the foregoing step provides useful information to main server system 12 in the selection of PSGGS-GM-CL/I-SN information appropriate for the user (e.g., geographic area). PSGGS-GM-CL/I-SN information from merchants located geographically proximate the users and members residence can be more easily redeemed by the user, thus increasing the efficacy of the PSGGS-GM-CL/I-SN information offer. Other information, such as the type of Internet connection (e.g., modem), can also be obtained from the user in step 107.

In step 108, main server system 12 registers the "new" user device. Main server system 12 determines whether the user of remote client system 14 is a "new" user device based on the presence and/or absence of DeviceID data 30 in a message from client system 14 to main server system 12. The "new" user device is then registered on main server system 12. Main server system 12 is configured to register the new user by performing, among other things, the steps of allocating a new DeviceID data 30, and associating the new DeviceID data 30 with the user information obtained in step 107. Through the foregoing, remote client system 14 can always be identified by its DeviceID data 30.

In step 109, client system 14 and main server system 12 communicate so as to update the master category list, plugins, brand logo information, advertising data and PSGGS-GM-CL/I-SN information data at the remote client system 14. This is done, for the first time client application software 28 is executed, by searching the main server system 12 for new information that has come into being between the time the installation and/or setup program that the user used to install client system 14 was populated with such data (the "sync" date), and the present time (the server date). The identified information is downloaded to thereby update client system 14. This step ensures that the user of client system 14 has the most up-to-date information in these categories. The method then proceeds to step 110 wherein main client application software 28 is executed. When the answer to step 106 is "NO", then the method branches to step 112. In step 112, client application determines whether client system 14 is "online." Client system 14 is "online" when the user is connected to the Internet such that client system 14 can communicate with main server system 12. While this basic step are described in greater detail below (FIG. 9), it bears emphasizing that client system 14, in an exemplary embodiment, will not force a connection to Internet 16. Rather, if there is no "online" connection, the user of client system 14 will have access to PSGGS-GM-CL/I-SN information in an "offline" mode of operation. Thus, if the answer to step 112 is "NO", then the method branches to step 110. Otherwise, when the answer step 112 is "YES", then the method branches to step 114.

In step 114, main server system 12 identifies the remote client system 14 based on a DeviceID data 30 provided by client system 14. In this way, main server system 12 can utilize the information "on file", such as state and zip code, for a variety of purposes. In a constructed embodiment, the state and zip code data are included in a request by front-end server 20 to database server 24 to select a server that will service this user for this session (described in detail in connection with FIG. 10). The response to the request is a virtual IP address to a particular handler 22, and a selected database "name" of a selected database server 24.

In step 116, main server system 12, particularly the assigned handler 22 and database server 24, is updated with any information contained in user history data 34 that has not yet been uploaded and processed. The user history file contains information indicative of actions taken by, or, events occurring in response to actions taken by, the user of remote client system 14. As described above, user history data 34 contains information such as the identity of PSGGS-GM-CL/I-SN information selected, PSGGS-GM-CL/I-SN information printed, advertising impressions displayed in advertising pane 72, etc. The assigned handler 22 in conjunction with database server 24 uses the user history file in at least two ways: (i) to produce data from which a user script can be built by the remote client system 14 and, (ii) to update the user transaction history database 60, which can then be queried to prepare reports that are provided as feedback to the various advertising sponsors, PSGGS-GM-CL/I-SN information issuers, and PSGGS-GM-CL/I-SN information referral agents.

Step 118 involves obtaining a client script for execution by client system 14. Step 118 includes the substep of identifying PSGGS-GM-CL/I-SN information at main server system 12 suitable for the user. What is suitable for any particular user can be based on DeviceID data 30, the user information associated with DeviceID data 30, the main PSGGS-GM-CL/I-SN information categories selected by the user, the OS platform (e.g., MAC OS vs. Windows), the version of client application software 28, the cobrand ID, and the promotional code, if any. Use of these criteria can be either inclusive and/or exclusive. Client system 14 can be sent lists of undownloaded PSGGS-GM-CL/I-SN information, undownloaded ads, etc. The lists can only identify, for example, the PSGGS-GM-CL/I-SN information to be downloaded (not the PSGGS-GM-CL/I-SN information itself). Steps 120, 122, and 124 involve obtaining the actual PSGGS-GM-CL/I-SN information data, ad data, etc.

In step 120, the master category list, plugins, and brand logo information is updated, based on execution of the client script by client system 14. Particularly, client system 14 works through the list of needed items. In step 122, advertising data comprising advertising impressions from advertising database 52 are updated at the remote client system 14. This step ensures that the user has the most up-to-date advertising available. Again, client system 14 works through a list of needed ads, sequentially making requests from database server 24.

In step 124, PSGGS-GM-CL/I-SN information data from PSGGS-GM-CL/I-SN information database 50 is updated at remote client system 14. Updating of the PSGGS-GM-CL/I-SN information data includes retrieving PSGGS-GM-CL/I-SN information data corresponding to the identified PSGGS-GM-CL/I-SN information (i.e., the list provided as part of the client script).

Figure 11:
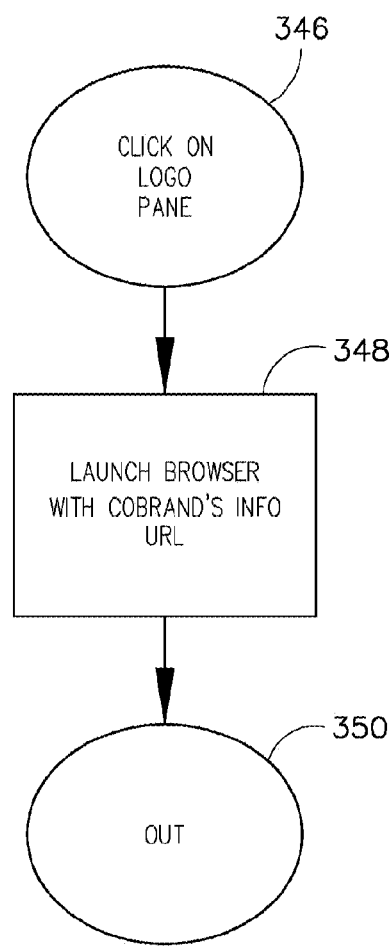
FIGS. 11-12 are simplified flowchart diagram views showing alternate actions taken by the client system in response to selection by the user of a logo pane and an advertising pane, respectively, according to exemplary embodiments.

FIG. 11 shows the steps performed on main server system 12 to register a new user device. The process begins in step 176 with commencement of the registration routine. In step 178, a new DeviceID data 30 is calculated by database server 24. In step 180, a new entry and/or record is created in a user profile table. The profile entry will associate DeviceID data 30 with the user information collected from the user. The method then proceeds to step 182.

In step 182, database server 24 determines whether a "sync date" was provided from client system 14. This is a date that describes how "up-to-date" client system 14 is, particularly the PSGGS-GM-CL/I-SN information and advertising information portions thereof. The use of the sync date has been described above in connection with FIG. 4. This "sync date" is automatically provided from client system 14 to database server 24 via the assigned handler 22. If a "sync date" was not provided by client system 14, then the method branches to step 184 where a nominal sync date based on the version of the software installed on the client system is used for downloading and updating purposes. Alternatively, if the answer to step 182 is "YES", then the method branches to step 186.

In step 186, the date provided by client system 14 is used as the "sync date" to synchronize the data on client system 14 relative to the master data on main server system 12. It should be emphasized that the "sync date" is not a date that client application software 28 solicits from the user, but rather, is simply a date available within client application software 28 relating to how "current" the data is (i.e., PSGGS-GM-CL/I-SN information/advertising data, etc.). In either case, the method proceeds to and ends at step 188.

Figure 9:
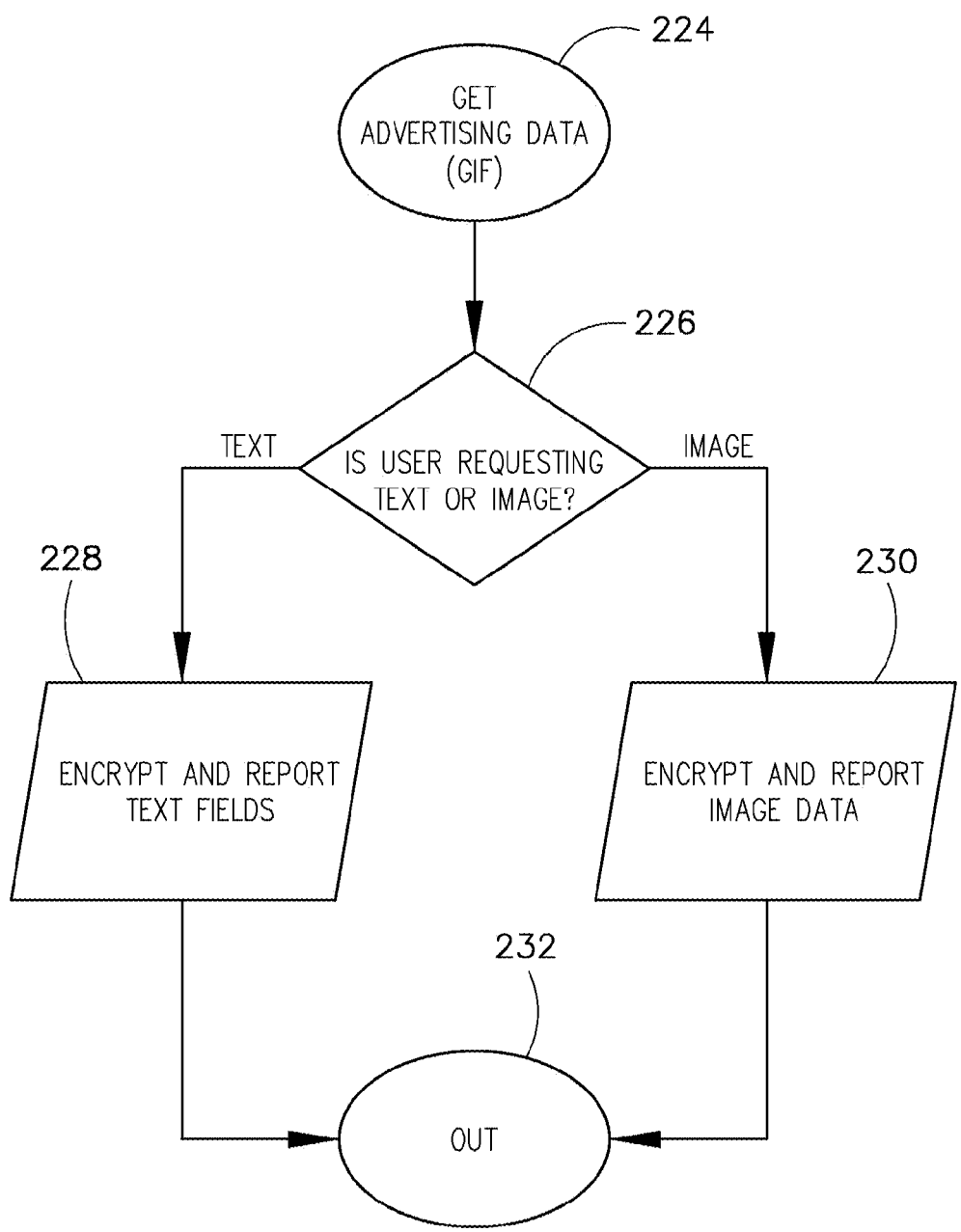
FIG. 9 is a simplified flowchart diagram view showing, in greater detail, the step of updating advertising data that is shown in block diagram form in FIG. 4, according to an exemplary embodiment.
Figure 10:
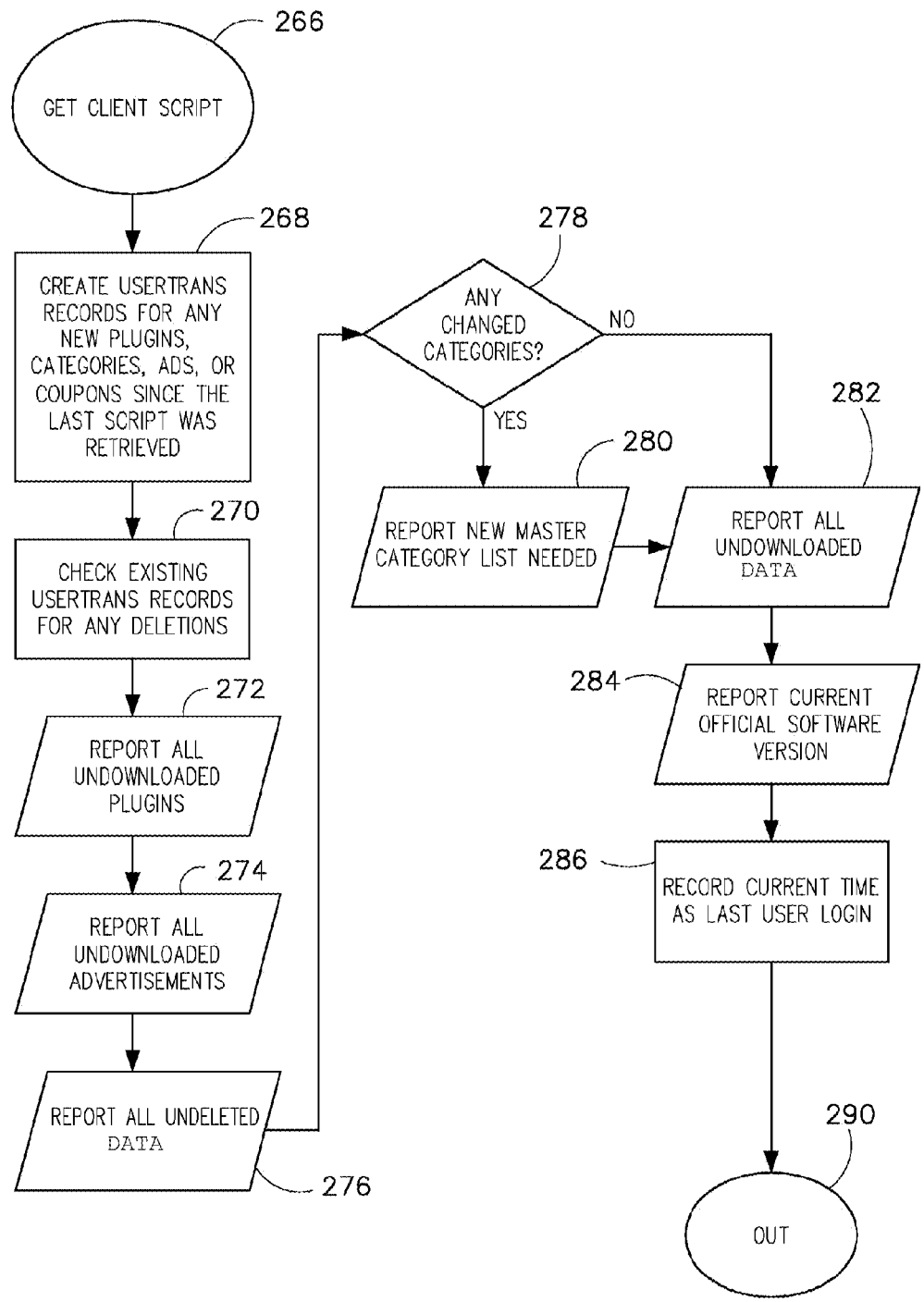
FIG. 10 is a simplified flowchart diagram view showing the steps involved in obtaining a client script, according to an exemplary embodiment.
Figure 12:
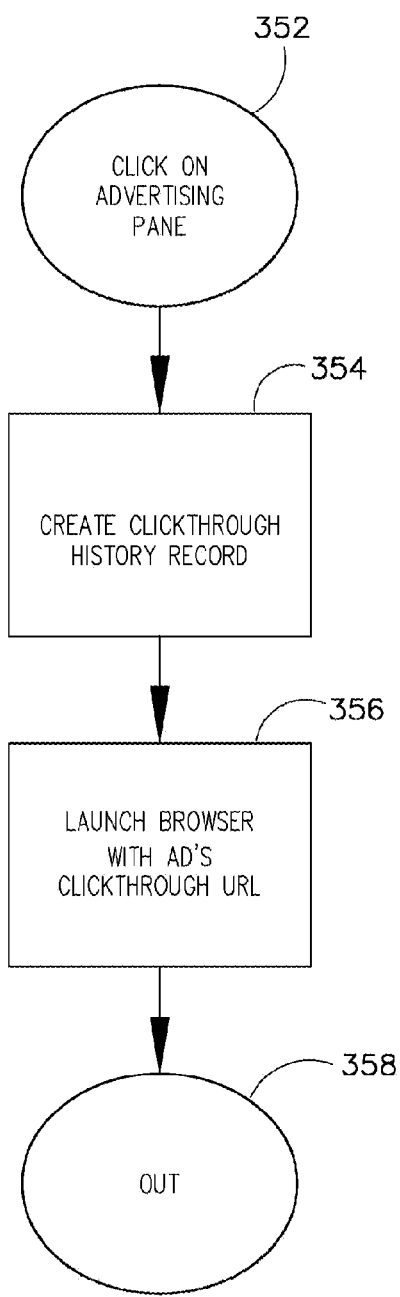

FIGS. 9, 10 and 11 show step 120 (FIG. 4) in greater detail. Referring to FIG. 12, step 190 represents a request to obtain a master category list (i.e., the up-to-date list). This request is made from client system 14 to the selected database server 24 via handler 22. Such a request is directed to the selected "virtual" IP address as described above. The master PSGGS-GM-CL/I-SN information category list (e.g., "Athletics", "Automotive", "Internet Electronics", etc.) can be updated on main server system 12, particularly database server 24. That is, categories can be added, and/or categories can be deleted. In either case, such a change are reflected in user interface 62 of the respective client systems 14 when the next session is invoked by a user.

In step 192, all undeleted master PSGGS-GM-CL/I-SN information categories, along with their display color (as displayed on display device 40 of client system 14) are reported out to client system 14 for use by client application software 28. Step 194 ends the master PSGGS-GM-CL/I-SN information category list updating process.

Figure 13:
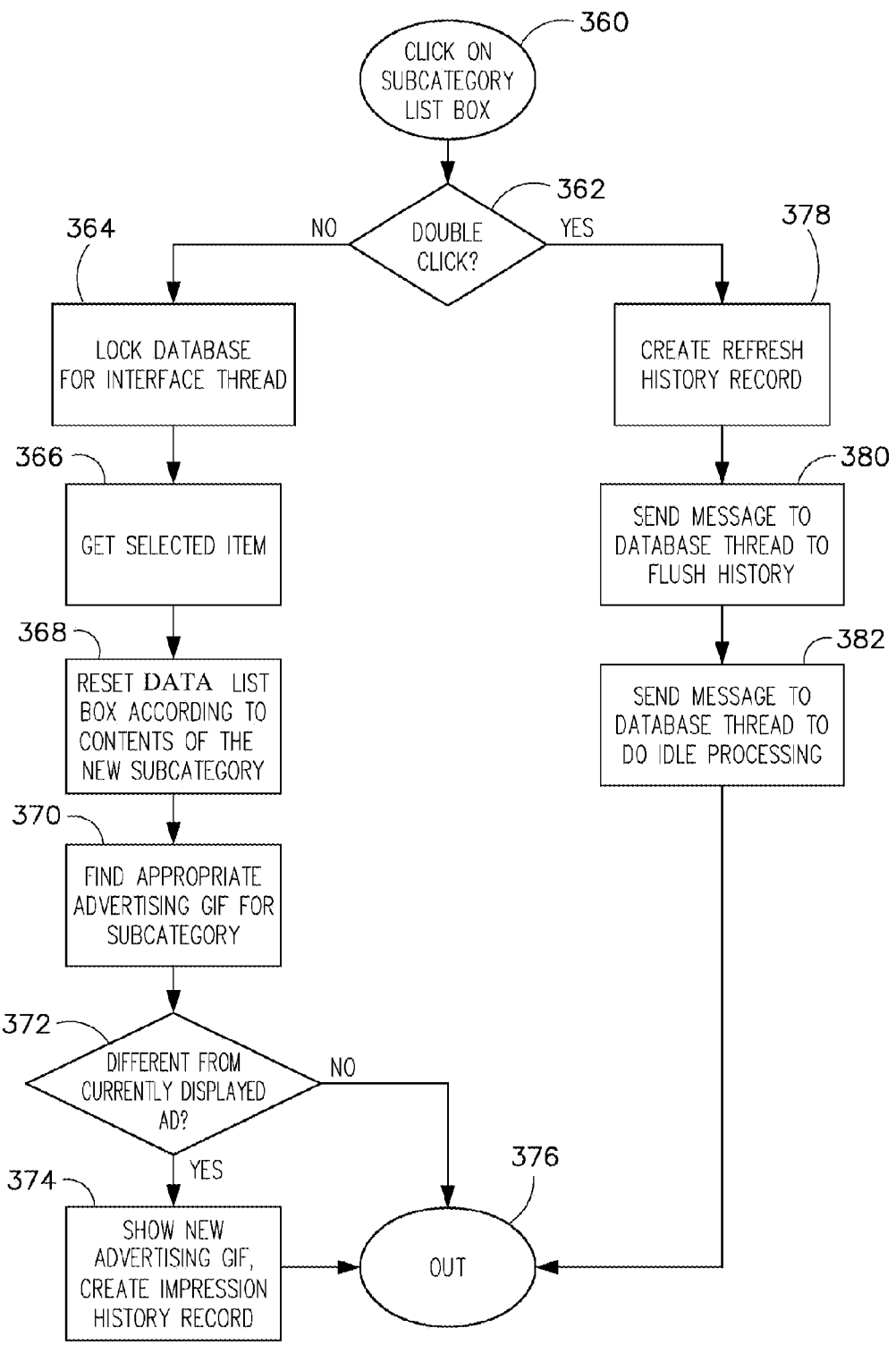
FIG. 13 is a simplified flowchart diagram view showing the steps executed by the client system when a user selects an item from PSGGS-GM-CL/I-SN information and/or data subcategory list, according to an exemplary embodiment.

Referring now to FIG. 13, step 196 represents a request from client system 14 to database server 24 via handler 22 to obtain a new and/or an up-to-date plugin(s). It should be understood that for an existing user, client system 14 can be executing a client script that includes a list containing needed plugins. The process outlined in FIG. 13 would be executed for each plugin on the list.

In step 198, database server 24 performs a look-up of the needed plugin to locate the corresponding plugin file (or image).

In step 200, an "image" and/or copy of the file of the sought-after plugin is encrypted in accordance with a server system encryption strategy, and is reported and/or transmitted via Internet 16 to client system 14. In step 202, the plugin update process is completed.

Figure 14:
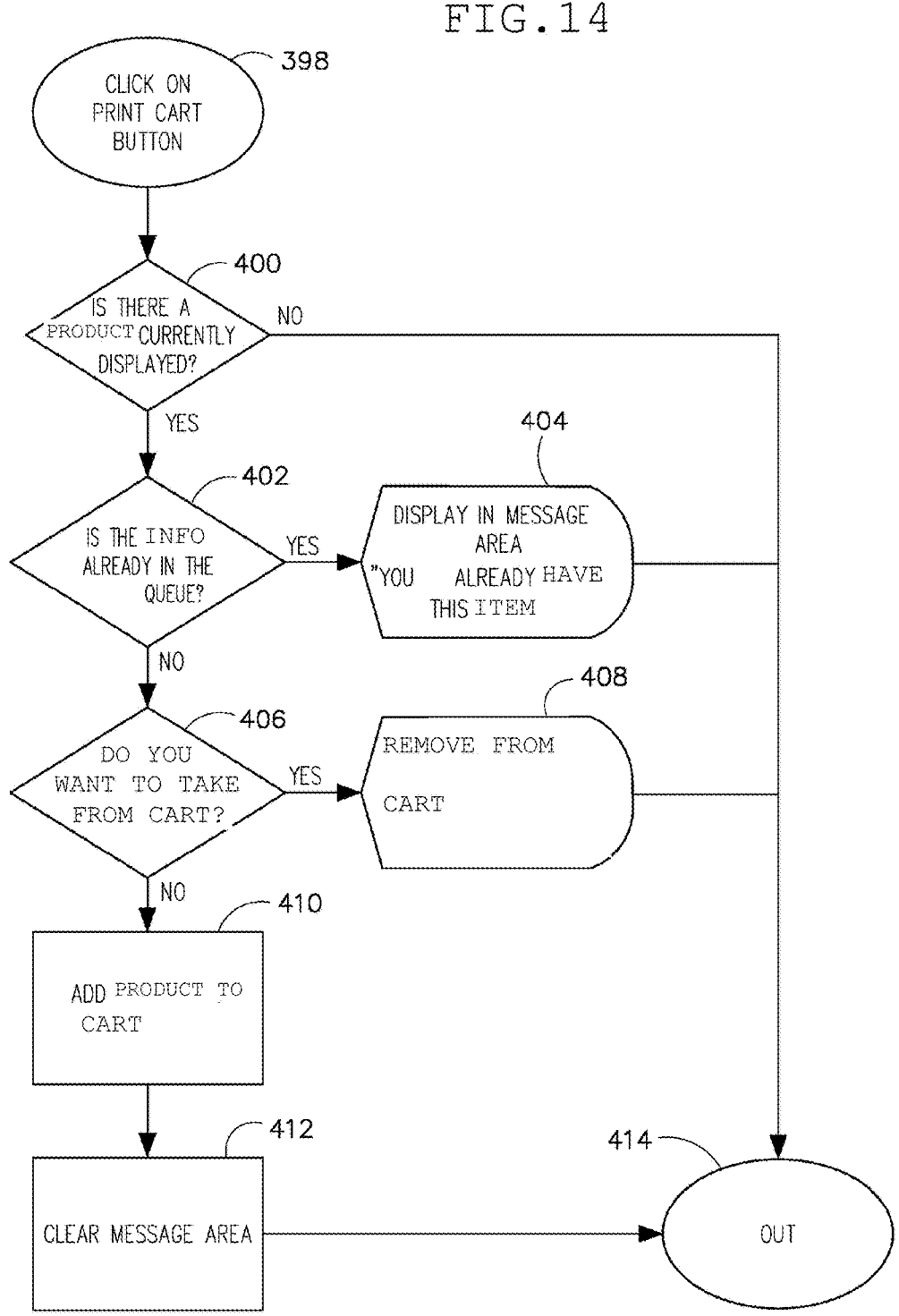
FIG. 14 is a simplified flowchart diagram view showing the steps executed by the client system when PSGGS-GM-CL/I-SN product, good and/or service is selected and added to a cart, according to an exemplary embodiment.

Referring now to FIG. 14, steps 204-222 illustrate the steps involved in determining whether to maintain a default brand logo in logo pane 74 (FIG. 3A), or, in the alternative, whether to download a different brand logo. While a default brand and/or company logo is associated with client system 14 initially, the default can be changed. For example, a user of Internet 16 can be informed of the existence of PSGGS-GM-CL/I-SN information distribution system 10 by a third-party vendor who also maintains a website, and refers that Internet user to website server 18 of main server system 12. The referral mechanism, a hyperlink and/or the like to website server 18, appends the identification of the referring vendor to the HTTP reference (the ID herein referred to as the "cobrand ID"). Website server 18 is configured to recognize and respond to such appended data (the cobrand ID) by putting a "cookie" (i.e., a file used by Internet browser programs) on such Internet users and members' computer system that contains the cobrand ID. Then, if such potential user of PSGGS-GM-CL/I-SN information distribution system 10 decides to download and install the client software, the client installation software will search for the "cookie." If it finds the "cookie", and certain other qualifying criteria are satisfied, then the cobrand ID are passed to main server system 12 upon installation with a request to download the text and/or image data of the other (non-default) brand logo.

Some client systems 14 are deployed with both a default brand logo, and an alternate brand logo (including text/ images), in alternative embodiments. The following steps apply when client application software 28 determines that it should display an alternate brand logo. In step 204, client system 14 requests a brand logo (non-default). The process proceeds to step 206. In step 206, database server 24 determines whether client system 14 provided a date along with the request for the alternate brand logo. If so, then client system 14 already has the text/images corresponding to the brand logo and just needs to determine whether to turn the requested brand logo "on" at client system 14.

Thus, if the answer to step 206 is "YES", then the method branches to step 208. In step 208, database server 24 conducts a look-up to determine an activation date for the subject brand logo. The method then proceeds to step 210. In step 210, database server 24 determines whether the client-provided date is "older" than the current activation date. If "YES", then the method branches to step 212, where the new activation date is reported out to client system 14. Client system 14 will therefore defer activation of the alternate, non-default brand logo until such new date. Otherwise, the method branches to step 214, where database server 24 reports an "ok" to client system 14. Client system 14 will then implement (i.e., display) the brand logo corresponding to the cobrand ID.

When the method branches to step 216, (a "NO" to step 206), database server 24 performs another test to determine whether client system 14 asked for text corresponding to the cobrand ID. If "YES", then the method branches to step 218, where the textual information is encrypted according to a server system encryption strategy, and reported out to client system 14. Otherwise, step 220 is performed, where image data corresponding to the cobrand ID is encrypted (according to a server system encryption strategy), and reported to client system 14. The method ends in step 222.

FIG. 15 shows step 122 ("updating advertising data") of FIG. 4 in greater detail. In particular, steps 224-232 illustrate, in accordance with the present disclosure, that advertising text, and images are encrypted to thereby provide secure transmission to client system 14. It should be understood that for an existing user device, client system 14 can be executing a client script that includes a list containing needed advertising impressions. The process outlined in FIG. 15 would be executed for each advertising impression on the list. Step 224 marks the beginning of the advertising update method.

In step 226, main server system 12 determines whether the user, more particularly client system 14, is requesting "text" and/or "image" advertising data. If the answer is "text", then the method proceeds to step 228.

In step 228, main server system 12, particularly database server 24, encrypts the text of the advertising data, and reports out the resulting encrypted advertising data. It should be understood this encryption occurs in accordance with a server system encryption strategy.

Otherwise, the method proceeds to step 230 when the advertising data requested is "image" data. In step 230, the advertising data ("image" data) is encrypted by main server system 12 according to a main server system encryption strategy, resulting in encrypted advertising image data. The encrypted ad image data is then reported out to client system 14. Step 232 defines the end of the advertising update process.

Figure 18:
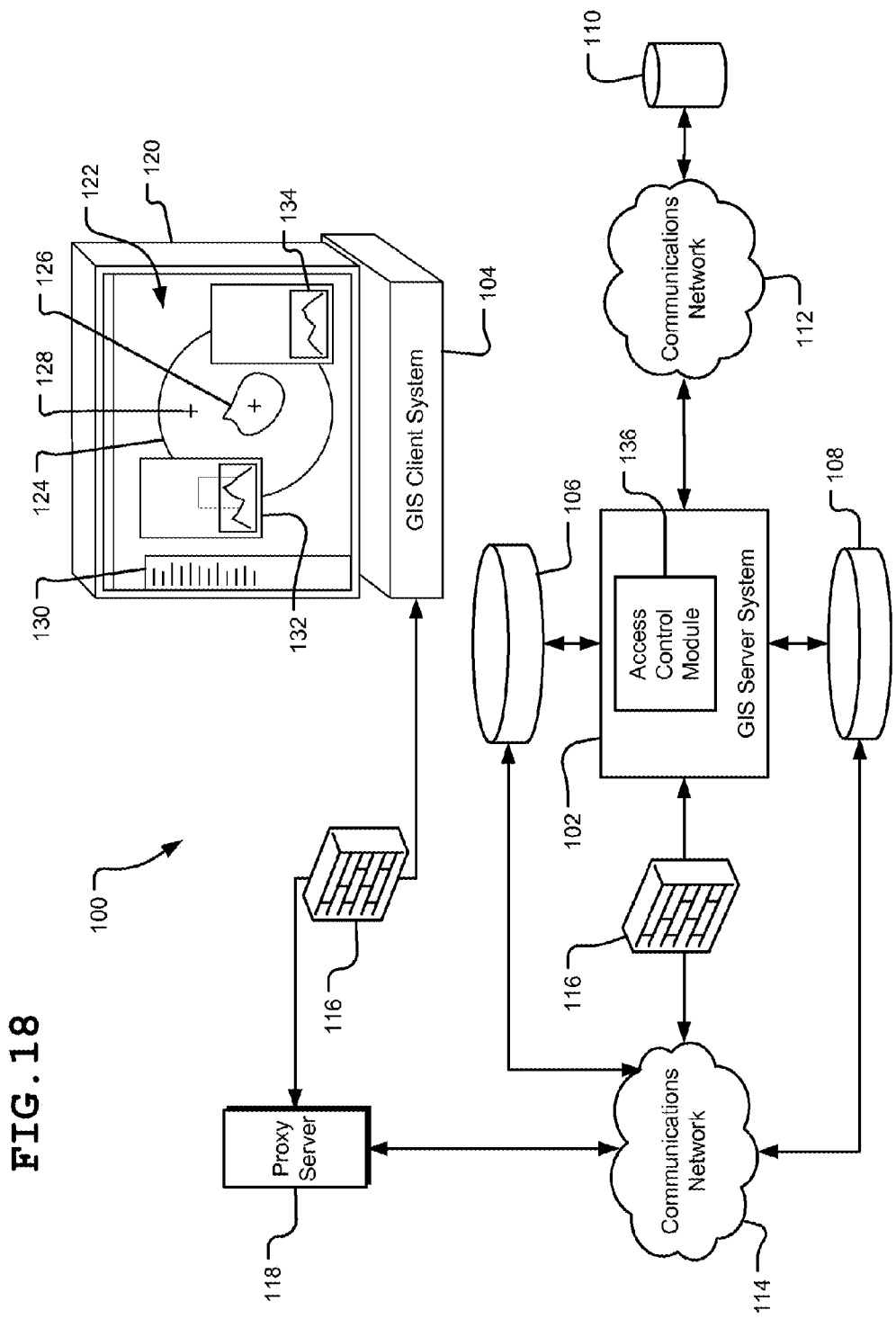
FIG. 18 is a schematic diagram of an exemplary implementation of a geospatial decision management system for implementing a geographic information system over a network.

Referring now to FIG. 18, after the user history codes from user history data 34 have been extracted and decoded, a "client script" is built by client system 14 based on information (e.g., lists) from handler 22 in cooperation with database server 24. The client script provides instructions for main server system 12 to execute. In step 266, client system 14 issues a request to handler 22 to obtain the "user" and/or "client" script. The client script is then returned to client system 14. Step 268 show the execution of the client script by client system 14, which issues the commands shown in the steps 268-290. In step 268, client system 14 issues commands via handler 22 to database server 24 to create user transaction records for any new plugins, main PSGGS-GM-CL/I-SN information categories, advertising data, and/or PSGGS-GM-CL/I-SN information data received by client system 14 since the last client script was retrieved. In step 270, client system 14 issues commands via handler 22 to database server 24 to check existing user transaction records for any deletions. Any deletions are processed whereby the affected user transaction record is modified to indicate that the client PSGGS-GM-CL/I-SN information has been deleted. In step 272, client system 14, in execution of the client script, issues a command via handler 22 to database server 24 to report all undownloaded plugins. Database server 24, through handler 22, returns a message containing a listing of all undownloaded plugins. This list is processed by client system 14 after the client script has been completed. In step 274, client system 14, in execution of the client script, issues a command via handler 22 to database server 24 to report all undownloaded advertising impressions. Database server 24 returns a list of all undownloaded ad impressions. In step 276, client system 14, in execution of the client script, issues a command via handler 22 to database server 24 to report all undeleted PSGGS-GM-CL/I-SN information. In step 278, client system 14, in execution of the client script, issues a command via handler 22 to database server 24 to determine whether any of the main PSGGS-GM-CL/I-SN information categories have been changed. If the answer to this inquiry is "YES", then flow of the process continues at step 280, wherein the database server 24 reports to client system 14 that a new master category list is needed. Flow then proceeds to step 282.

If the answer to the inquiry in step 278 is "NO", then flow of the process proceeds to step 282. In step 282, client system 14, in execution of the client script, issues a command via handler 22 to database server 24 to report all undownloaded PSGGS-GM-CL/I-SN information. Database server 24 returns a listing of all undownloaded PSGGS-GM-CL/I-SN information. In step 284, client system 14, in execution of the client script, issues a command via handler 22 to database server 24 to report the current official software version. Database server 24 returns the latest version number. In step 286, database server 24 is requested to record the current time as the last user login. Flow of the process then continues to step 290, which marks the end of the client script execution.

In FIG. 11, steps 346-350 illustrate the response of client application software 28 when a user "clicks" and/or otherwise selects logo pane 74 of user interface 62 (best shown in FIG. 3A). Step 346 marks the beginning of the routine. Step 346 is entered when client application software 28 (via the OS) detects that the user has "clicked" on and/or otherwise selected a portion of logo pane 74.

In step 348, client application software 28 invokes an Internet browser registered with the operating system of client system 14 as the default browser and passes thereto a URL. The Internet browser then connects to a website server resource corresponding to the specified URL. This "click" action, therefore, takes the user to the website of the company displayed in logo pane 74. Step 350 marks the end of this routine.

FIG. 12 shows the response of client application software 28 when a user "clicks" on and/or otherwise selects a portion of advertising pane 72 (best shown in FIG. 3A). Step 352 marks the beginning of the routine. In step 354, client application software 28 creates a click-through history record indicative of the fact that the user has "clicked" and/or otherwise selected the advertiser displayed in advertising pane 72. This is included in user history data 34, which will thereafter be encrypted and transmitted to main server system 12 for processing.

In step 356, the client application software 28 launches an Internet browser registered with the operating system of client system 14, and passes thereto a URL corresponding to the advertiser displayed in advertising pane 72. When the Internet browser executes, it connects to a website server resource defined by the URL. In-effect, the foregoing actions take the user to the advertisers website specified in the URL. Step 358 marks the end of this routine.

FIG. 13 illustrates a response taken by client application software 28 when a user "clicks" on and/or otherwise selects an item appearing in PSGGS-GM-CL/I-SN information subcategory list 68 (best shown in FIG. 3A). Step 360 marks the beginning of the process. Step 360 is entered when client application software 28 (via the OS) determines that an item in PSGGS-GM-CL/I-SN information subcategory list 68 has been "clicked" on. In step 362, client application software 28 determines whether the selection was a "click" and/or a "double-click." Depending on which of these events occurred, client application software 28 will take alternative courses of action. If the action is a single-click, then the method branches to step 364.

In step 364, the local PSGGS-GM-CL/I-SN information database is locked by client application software 28. The process proceeds to step 366. In step 366, the selected subcategory item is retrieved from the local database on client system 14. In step 368, the contents of PSGGS-GM-CL/I-SN information list 70 is reset by client application software 28 according to the contents of the new subcategory. For example, if the new subcategory pertains to PSGGS-GM-CL/I-SN information, then the new PSGGS-GM-CL/I-SN information associated with the new selected subcategory is displayed in PSGGS-GM-CL/I-SN information list 70 (best shown in FIG. 3A). In step 370, client application software 28 determines and/or otherwise selects an advertising impression to be displayed in advertising pane 72 in accordance with a predetermined advertising impression selection strategy. In the illustrated embodiment, the selection criteria includes the identity of the selected PSGGS-GM-CL/I-SN information subcategory. In step 372, a test is performed by client application software 28 to determine whether the newly selected advertising impression is different from the advertising impression currently being displayed. If the answer is "YES", then the process branches to step 374, where the new advertising impression is displayed in advertising pane 72, and an advertising impression history record is created for inclusion in the user history data 34. The method proceeds to step 376, which exits the thread shown in FIG. 13.

If the answer to step 372 is "NO", however, then the process branches to step 376, which is an exit step. If the action evaluated in step 362 is determined to be a "double click", then the process branches to step 378. "Double clicking" PSGGS-GM-CL/I-SN information subcategory is a user request to refresh the contents of that subcategory. In step 378, client application software 28 creates a refresh history event for that subcategory. In step 380, client application software 28 sends to the database thread a request to flush the current history. The contents of that subcategory are then downloaded (available on display device 40) as if they were new. In step 382, a message is sent to the database thread to do idle processing.

FIG. 14 illustrates the process carried out by client application software 28 when the "Add to Cart" button 78 is "clicked" on and/or otherwise selected by the user. Step 398 is invoked when client application software 28 (VIA the OS) determines that the Add to Cart button has been "clicked" on. The process then proceeds to step 400.

In step 400, client application software 28 performs a test to determine whether there is PSGGS-GM-CL/I-SN product or service information currently displayed in PSGGS-GM-CL/I-SN information display area 76. If the answer to step 400 is "NO", then the method branches to step 414, which is an exit step. If the answer to step 400 is "YES", then the method branches to step 402. In step 402, client application software 28 determines whether the PSGGS-GM-CL/I-SN product or service information currently being displayed in PSGGS-GM-CL/I-SN product or service information display area 76 is already in the cart. If the answer to this inquiry is "YES", then the method branches to step 404. In step 404, client application software 28 causes a predetermined message to be displayed in message display area 94 advising, for example, the user that the PSGGS-GM-CL/I-SN product or service information is already in queue of the cart. This insures that PSGGS-GM-CL/I-SN product or service information is not added to the shopping cart more times than the user desires. If the user in-fact wishes to make multiple entries of a product or service into the shopping cart, the user can alternatively click on the "add to cart" button to add more than one product or service to the shopping cart. The process then proceeds to step 414, which is an exit step.

If the answer to step 402 is "NO", then the method branches to step 406. In step 406, client application software 28 determines whether the proposed adding to the cart of the product or service corresponding to the PSGGS-GM-CL/I-SN information displayed is confirmed as an error by the user. If the answer to this step is "YES", then the method branches to step 408. In step 408, an appropriate message is displayed to the user in message display area 94, advising that the selected product or service has been removed from the cart. The method then proceeds to step 414, which is an exit step.

If the answer to step 406 is "NO", then the method branches to step 410. In step 410, the PSGGS-GM-CL/I-SN information currently being displayed in PSGGS-GM-CL/I-SN information display area 76 is used to add a selected product or service to the cart. The method proceeds to step 412, wherein message display area 94 is cleared, thereby clearing any pre-existing message displayed therein. The process then proceeds to step 414, which is an exit step. For some PSGGS-GM-CL/I-SN information displayed, it is of value to limit the number of times a specific user can access the PSGGS-GM-CL/I-SN information. For example, a particular vendor can wish to limit the number of PSGGS-GM-CL/I-SN information available to a user to a specific amount. Similarly, for clickable links from advertisers (i.e., clickable advertisements), it is also of value to limit the number of times a specific user can click on the advertisement. In response to a click on a clickable advertisement, a user is typically transferred to another website that relates to the information present in the clickable advertisement. By being able to limit the number of times a specific user can click on the advertisement, the advertiser can be more certain that the click on the advertisement was a true access and/or intended click by a particular user.

Limiting the clicking of clickable advertisements is particularly useful to avoid click fraud. Click fraud can occur, for example, in pay per click online advertising when a person, automated script, and/or computer program imitates a legitimate user of a web browser clicking on an ad for the purpose of generating a charge per click without having actual interest in the target of the ads link. Pay per click advertising is an arrangement in which webmasters (operators of web sites), acting as publishers, display clickable advertisements from advertisers, in exchange for a charge per click. By limiting the number of times a particular client system 14 can click on a clickable advertisement to a set amount, e.g., three, the ability to commit click fraud is significantly reduced. Moreover, if an advertiser can control the number of clicks to a clickable advertisement from a particular client system 14, the advertiser is more likely to increase the amount it will pay for each unique click of the clickable advertisement. To promote control over the clicking on of clickable advertisements, each clickable advertisement can include an access limit, which defines the number of times any client system can click on the clickable advertisement. For example, if the access limit for a clickable advertisement is three, then client application software 28 of a particular client system 14 would only be able to click on that clickable advertisement three times. In an exemplary embodiment, client application software 28 can be configured to allow access to the advertisement but not increment the count for revenue generation purposes (e.g., search engine revenue, etc.).

The system for displaying an advertisement from an advertisement database on a client computer on a network can include processing circuit 502 configured to receive a display request for an advertisement and to provide access to display the advertisement. Processing circuit 502 can be further configured to determine a revenue counting display limit and a number of times the advertisement has been displayed. Processing circuit 502 can also be configured to increment a revenue account and/or revenue counter based on a comparison of the number of times the advertisement has been displayed to the revenue counting display limit.

The system for displaying an advertisement from an advertisement database on a client computer on a network can also not increment the revenue account if the number of times the advertisement has been, displayed exceeds the revenue counting display limit. The system for displaying an advertisement from an advertisement database on a client computer on a network can also increment the revenue account if the number of times the advertisement has been displayed does not exceed the revenue counting display limit.

The system for displaying an advertisement from an advertisement database on a client computer on a network can also include processing circuit 502 and/or components thereof being configured to be partially operated on main server system 12. Processing circuit 502 and/or components thereof can also be configured to be partially operated on client system 14 and/or client computing device. The system for displaying an advertisement from an advertisement database on a client computer on a network can also include the revenue counting display limit being stored on main server system 12.

The access limit for each clickable advertisement could be stored, for example, in database server 24, and/or in a secure area of client system 14. In addition, for each clickable advertisement, a counter can be maintained in the database server 24 for each DeviceID data 30. The counter counts the number of times a particular DeviceID data 30 has clicked on the associated clickable advertisement.

The method for controlling access to PSGGS-GM-CL/I-SN information can include assigning an identifier (e.g., DeviceID data 30) to a client computer and receiving a request from client application software 28 operating on the client computer to view PSGGS-GM-CL/I-SN information image data for the PSGGS-GM-CL/I-SN information. The method can also include displaying the PSGGS-GM-CL/I-SN information image data on the client computer and receiving a request to access the PSGGS-GM-CL/I-SN information from client application software 28. The request can include the identifier assigned to the client computer. The method can also include determining an access limit for the PSGGS-GM-CL/I-SN information. The access limit being a number of times that the client computer is permitted to access the PSGGS-GM-CL/I-SN information. The method can also include determining the number of times the PSGGS-GM-CL/I-SN information has been accessed based on the identifier and controlling access to the PSGGS-GM-CL/I-SN information based on the number of times the PSGGS-GM-CL/I-SN information has been accessed and the access limit.

The method can further include transmitting the PSGGS-GM-CL/I-SN information to the client computer based on the controlling step. The method can also include transferring the user to a website corresponding to the PSGGS-GM-CL/I-SN information in response to a request for more information from the client computer. The method can also include incrementing a counter associated with the PSGGS-GM-CL/I-SN information in response to the request wherein the counter corresponding to the number of times the PSGGS-GM-CL/I-SN information has been accessed. The method can also include transmitting the PSGGS-GM-CL/I-SN information access report to a remote device. The method can further include that the PSGGS-GM-CL/I-SN information image data comprises a thumbnail image and an overlay information.

It should be noted that access can include transmitting data to a print queue, transmitting data based on clicking on and/or any other method of activating a hyper link, initiating a search (e.g., an internet search engine, an intranet search engine, a local computing device search, and/or any other search known to a person skilled in the art), displaying data, receiving data, transmitting data and/or any combination thereof. Access as used herein can refer to any of a number of ways that client system 14 can be configured to provide access to the user, in various alternative embodiments. It should also be noted that access limit can include number of times client system 14 can print an advertisement, number of times client system 14 can send an advertisement to a print queue, number of times client system 14 can be allowed to display an advertisement, the number of times client system 14 can be allowed to click thorough a clickable link to display an advertisement, the number of times client system 14 can be allowed to download an advertisement from the advertisement server, the number of times a user can click on a link which is a result of a search performed on an internet search engine, and/or any other way client system 14 can be allowed to access an advertisement. The access limit can be limits on other user accesses to advertisement. Accordingly, providing access, limiting access, and/or requesting access as used herein can refer to steps relating to any of the above mentioned types of access.

Figure 15A:
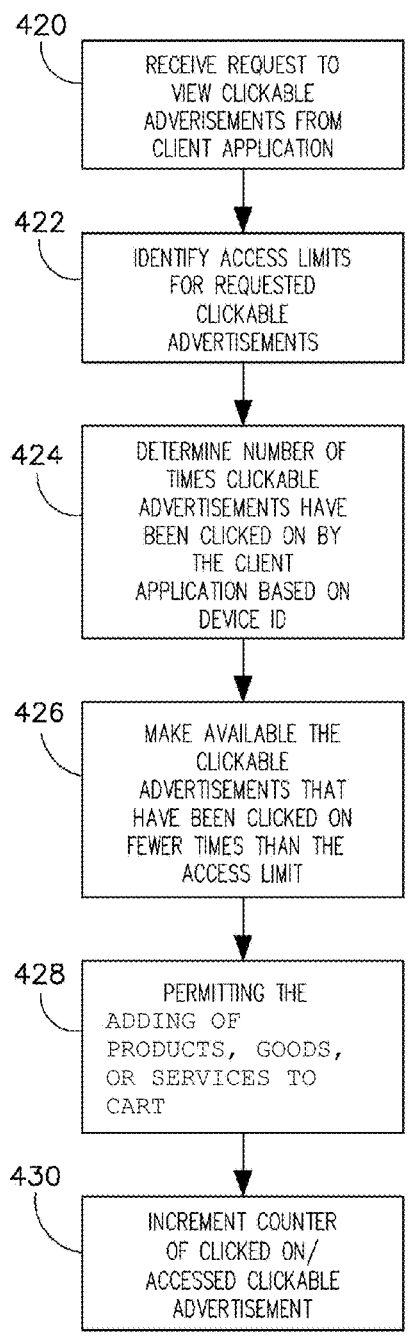
FIGS. 15A/B are flow diagrams of processes for controlling the number of clicks to a clickable advertisement, according to exemplary embodiments.
Figure 15B:
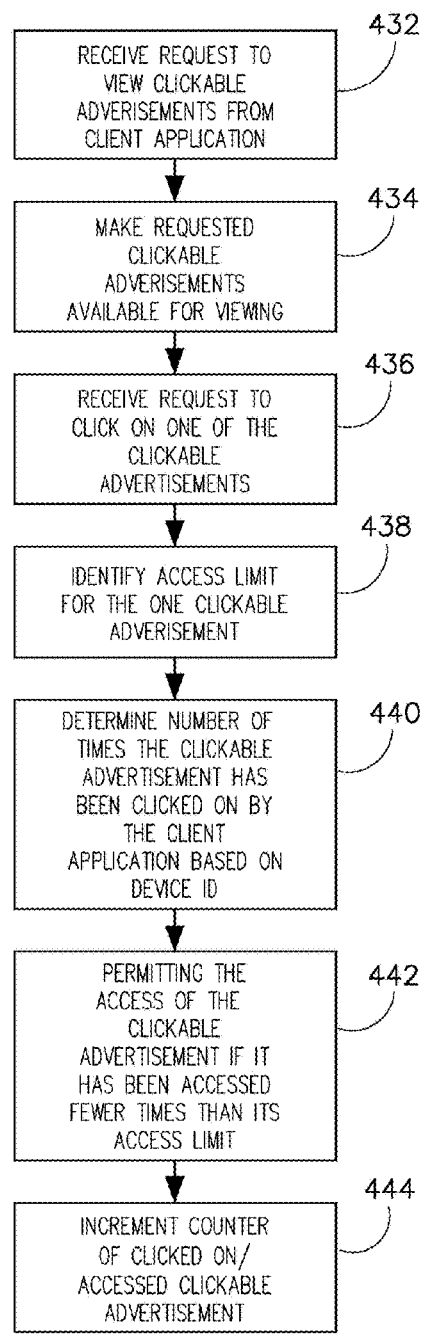

FIGS. 15A and 15B are flow diagrams of processes for controlling the number of clicks to a clickable advertisement. As shown in FIG. 15A, in step 420, a request is received from client application software 28 of a particular client system 14 to view clickable advertisements. The request preferably includes DeviceID data 30, which is a unique identifier assigned to the client system 14 that uniquely identifies client system 14 making the request. The request can be made in response to linking and/or accessing a particular website and/or by submitting the request through user interface 62.

In step 422, an access limit is identified for each of the clickable advertisements that are responsive to the received request. Based on the received request, main server system 12 can identify an appropriate handler 22 and database server 24 for servicing the request. Handler 22 accesses database server 24, which can includes a list of available clickable advertisements, to identify the clickable advertisements (including PSGGS-GM-CL/I-SN information) responsive to the request and to identify the access limits associated with those clickable advertisements.

In step 424, for each of the clickable advertisements responsive to the request, it is determined how many times each clickable advertisement has been clicked on by client application software 28 and/or client system 14 based on the associated DeviceID data 30. This information can be determined by checking the values of the counters held in database server 24 for each clickable advertisement corresponding to DeviceID data 30 provided in the request.

In step 426, clickable advertisements are made available to the requesting client system 14 that have been accessed (i.e., clicked on) by client system 14 fewer times than the access limit. To determine if a clickable advertisement should be made available, main server system 12 compares the identified access limit to the determined number of accesses set in the corresponding counter. If the access limit is greater than the determined number of accesses set in the corresponding counter, then the clickable advertisement is made available to the requesting client system 14. On the other hand, if the access limit is equal to (or less than) the determined number of accesses set in the corresponding counter, then the clickable advertisement is not made available to the requesting client system 14. The clickable advertisements made available to the client system 14 can be viewed, for example, in advertising pane 72 and/or logo pane 74. Each of the clickable advertisements made available to client system 14 can be accessed, i.e., clicked on, by the user at client system 14.

In step 428, in addition to making the clickable advertisement available to be clicked on by the user at client system 14, if the clickable advertisement is PSGGS-GM-CL/I-SN information, then the user is permitted to print PSGGS-GM-CL/I-SN information as well. To print PSGGS-GM-CL/I-SN information, the user can select the "Print Now" button 80, which prints the PSGGS-GM-CL/I-SN information currently being viewed on printer 46. In step 430, in response to the click of the clickable advertisement, the counter associated with that clickable advertisement and corresponding to DeviceID data 30 of client application software 28 and/or client system 14 is incremented. More specifically, client application software 28 can generate a signal to main server system 12 indicating that the clickable advertisement has been clicked on, and based on that signal the server increments the applicable counter in database server 24. The signal can include information identifying the clickable advertisement, as well as DeviceID data 30 of client system 14. Accordingly, each time a clickable advertisement is clicked on, the counter associated with the clickable advertisement is incremented, and once the count in the counter reaches the access limit, the user at that client system 14 is no longer permitted to click on that clickable advertisement. It should be noted that client system 14 can be a client computer.

The method for controlling access to advertisement in a network can include assigning an identifier to a client computer and receiving a request from client application software 28 operating on the client computer to access the advertisement. The request can include the identifier assigned to the client computer. The advertisement can have an access limit. The method can also include determining the number of times that the advertisement has been accessed by the client computer based on the identifier. The method can further include comparing the number of times the advertisement has been accessed to the access limit and providing the client computer with access to the advertisement based on the comparison. The method can also include sending to the client computer the advertisement if the access limit has not been exceeded. The method can further include transferring the user to a website corresponding to the advertisement if the access limit has not been exceeded. The method can further include refusing access for the client computer to the advertisement if the access limit has been met and/or exceeded. The method can also include sending to the client computer a message indicating that access has been refused. The method can also include incrementing the access counter based on receiving the request from the client application operating on the client computer to access the advertisement. The method can further include transmitting an advertisement access report to a remote server. The method can further include the identifier being assigned to the client computer by the client application. The method can also include that the identifier being assigned to the client computer is not one of a DeviceID data 30 and/or an Internet protocol address. The method can also include encrypting the advertisement at a server to generate a first encrypted advertisement and further encrypting the first encrypted advertisement at the client computer to generate a second encrypted advertisement.

The system for monitoring access to an advertisement can include processing circuit configured to determine an advertisement access limit and the number of times the advertisement has been accessed, according to an exemplary embodiment. The system can further include processing circuit being configured to be partially operated on a server, according to an exemplary embodiment. The system can also include processing circuit being configured to be partially operated on a client computing device, according to an exemplary embodiment. The system can further include processing circuit being configured to receive a request to access an advertisement, according to an exemplary embodiment. The request can include an identifier assigned to the computing device, according to an exemplary embodiment. Processing circuit can determine the number of times that the advertisement has been accessed by the computing device based on the identifier, according to an exemplary embodiment. Processing circuit can generate a comparison based on an access counter module/circuit data and an access limit module/circuit data, according to an exemplary embodiment. Processing circuit can transmits an access control signal based on the comparison, according to an exemplary embodiment. The system can also include processing circuit determining that the access limit has not been exceeded based on the comparison and transmits the advertisement to the computing device, according to an exemplary embodiment. The system can further include the user being transferred to a website corresponding to the advertisement based on a request for more information, according to an exemplary embodiment. The system can also include processing circuit determining that the access limit has been exceeded and the advertisement is not sent to the computing device, according to an exemplary embodiment.

FIG. 15B illustrates a process similar to the one in FIG. 15A. Like the process of FIG. 15A, in step 432 of FIG. 15B, a request is received from the client application software 28 to view clickable advertisements, the request including DeviceID data 30 that uniquely identifies client system 14 making the request. However, instead of checking the access limit of responsive clickable advertisements, all clickable advertisements that are responsive to the request are made available to the requesting client system 14 in step 434. To determine which clickable advertisements are responsive, main server system 12 can identify an appropriate handler 22 and database server 24 for servicing the request. Handler 22 can access database server 24 to identify the clickable advertisements responsive to the request. The user at client system 14 can try to click on any of the clickable advertisement made available to client system 14.

In step 436, in response to clicking on a selected clickable advertisement, a request is received by main server system 12 for access to that clickable advertisement. The request can include information identifying the selected clickable advertisement, as well as DeviceID data 30 of the requesting client system 14. In step —438, in response to the received request, an access limit is identified for the selected clickable advertisement. More particularly, main server system 12 can identify an appropriate handler 22 to access database server 24 and identify the access limits associated with the selected clickable advertisement. In step 440, it is determined how many times the selected clickable advertisement has been clicked on by client application software 28 and/or client system 14 based on the associated DeviceID data 30. This information can be determined by checking the values of the counter held in database server 24 for the selected clickable advertisement corresponding to DeviceID data 30 provided in the request.

In step 442, the user is permitted to click on and access the selected clickable advertisement if it is determined that the clickable advertisement has been accessed by client system 14 fewer times than the access limit. To determine if a clickable advertisement should be made available, main server system 12 compares the identified access limit to the determined number of accesses (i.e., clicks) set in the corresponding counter. If the access limit is greater than the determined number of accesses set in the corresponding counter, then the user is permitted to click on and access the clickable advertisement at the requesting client system 14. On the other hand, if the access limit is equal to (or less than) the determined number of accesses set in the corresponding counter, then the user is not permitted to click on and access the clickable advertisement at client system 14. If permitted to click on and access the clickable advertisement, and the clickable advertisement is PSGGS-GM-CL/I-SN information, then the user can print or add to a cart the PSGGS-GM-CL/I-SN information, for example, by selecting the "Print Now" button 80, which prints the PSGGS-GM-CL/I-SN information currently being viewed on printer 46.

In step 444, in response to the click of a clickable advertisement, the counter associated with that clickable advertisement and corresponding to DeviceID data 30 of client application software 28 and/or client system 14 is incremented. More specifically, client application software 28 can generate a signal to main server system 12 indicating that the accessed clickable advertisement has been clicked on, and based on that signal main server system 12 increments the applicable counter in database server 24. The signal can include information identifying the clickable advertisement, as well as DeviceID data 30 of client system 14. Accordingly, each time a clickable advertisement is clicked on and accessed, the counter associated with the clickable advertisement is incremented, and once the count in the counter reaches the access limit, no user at that client system 14 is permitted to click on and access that clickable advertisement.

The method for controlling access to a clickable advertisement in a network includes assigning a computer identifier to a client computer and receiving a request from client application software 28 operating on the client computer to access the clickable advertisement. The request includes the computer identifier assigned to the client computer. The clickable advertisement having an access limit. The access limit being the number of times that the client computer is permitted to access the clickable advertisement. The method can include determining the number of times that the clickable advertisement has been accessed by the client computer based on the computer identifier. The method also can include comparing the number of times the clickable advertisement has been accessed to the access limit. The method can include providing the client computer with access to the clickable advertisement based on the comparison and storing the comparison. The method can further include sending to the client computer the clickable advertisement based on the comparison because the comparison determined that the access limit has not been exceeded.

Figure 16:
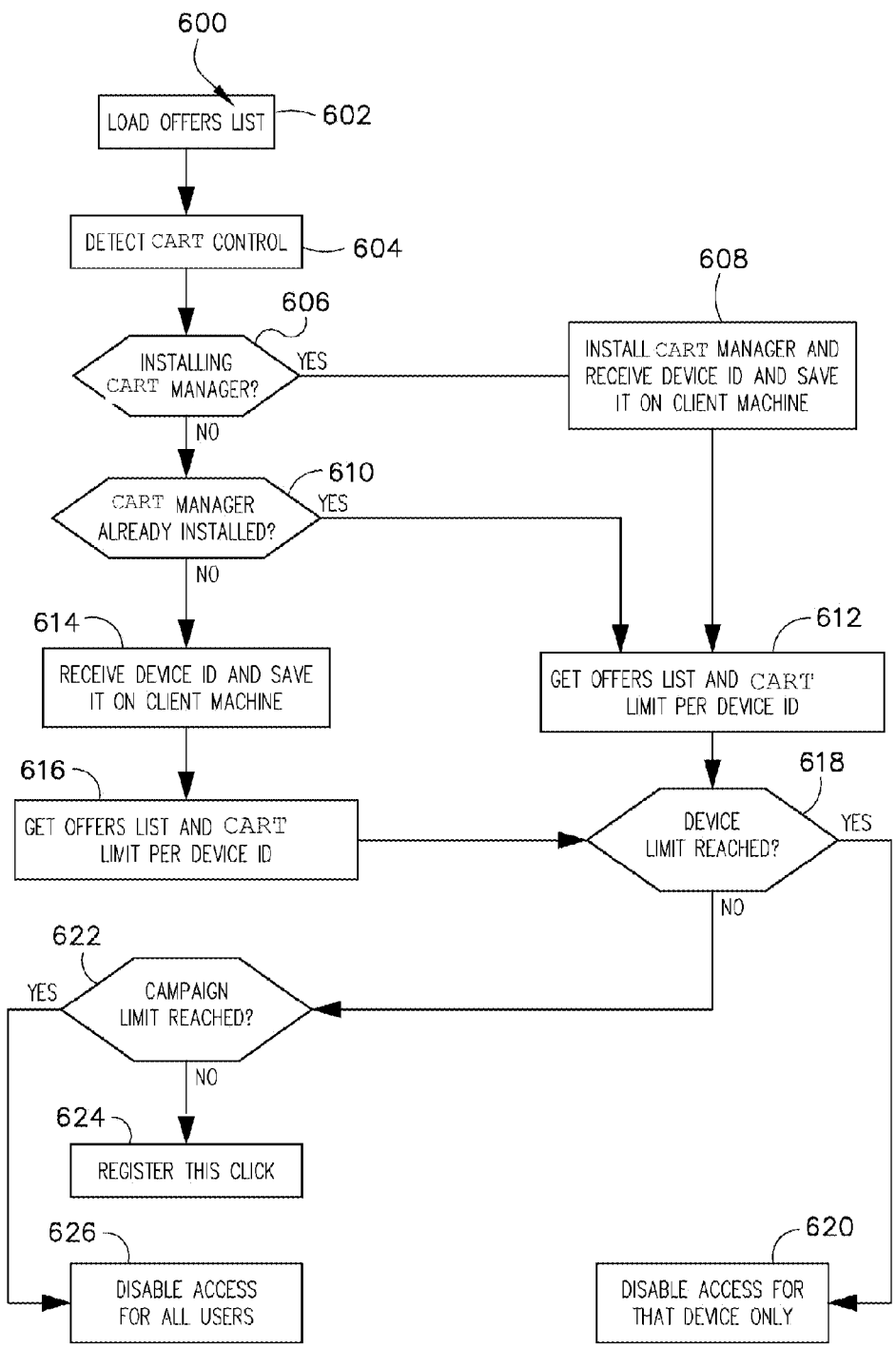
FIG. 16 is another flow diagram of the process for controlling the number of clicks to a clickable advertisement, according to an exemplary embodiment.

The method can further include transferring the user to a website corresponding to the clickable advertisement based on the comparison because the comparison determined that the access limit has not been exceeded. The method can further include refusing access for the client computer to the clickable advertisement based on the comparison because the comparison determined that the access limit has been exceeded. The method can also include sending a message to the client computer indicating that access has been refused. The method can further include incrementing an access counter based on receiving the request from client application software 28 operating on the client computer to access the clickable advertisement. The method can further include transmitting a clickable advertisement access report. Referring to FIG. 16, a flow diagram 600 of the process for controlling clicks to a clickable advertisement is shown, according to an exemplary embodiment. In step 602, the system loads an offers list onto the client device, a server, and/or another computing device. An offers list is a set of advertisements, PSGGS-GM-CL/I-SN information, websites, and/or any other offers. In step 604, the system detects the cart control of the client device, server, and/or another computing device. In step 606, the system determines whether the cart manager are installed. If the cart manager are installed, then the process moves to step 608. In step 608, the system installs the cart manager and receives DeviceID data 30 and save it on client device, server, and/or another computing device. After installing cart manager and receiving DeviceID data 30 (step 608), the process moves to step 612. If the print manager will not be installed, then the process moves to step 610. In step 610, the system determines whether the cart manager is already installed. If the cart manager is not already installed, the process moves to step 614. In step 614, the system receives DeviceID data 30 and saves it on client device, server, and/or another computing device. In step 616, the system receives the offering lists, limits per DeviceID data 30 and click limits per DeviceID data 30. If the cart manager is already installed, the process moves to step 612. In step 612, the system receives the offering lists per DeviceID data 30 and click limits per DeviceID data 30. In step 618, the system determines whether the device limit has been reached. If the device limit has been reached, then in step 620 the system disables access to the data requested by that device. If the device limit has not been reached, then the process-moves to step 622. In step 622, the system determines whether the campaign limit has been reached. A campaign limit can be a promotional limit, a budget limit, a sales limit and/or any other limit placed on the advertisement. If the campaign limit has been reached, then the system in step 626 disables access to the data for all devices. If the system determines that the campaign limit has not been reached, then the system in step 624 registers the access to the data.

Figure 17:
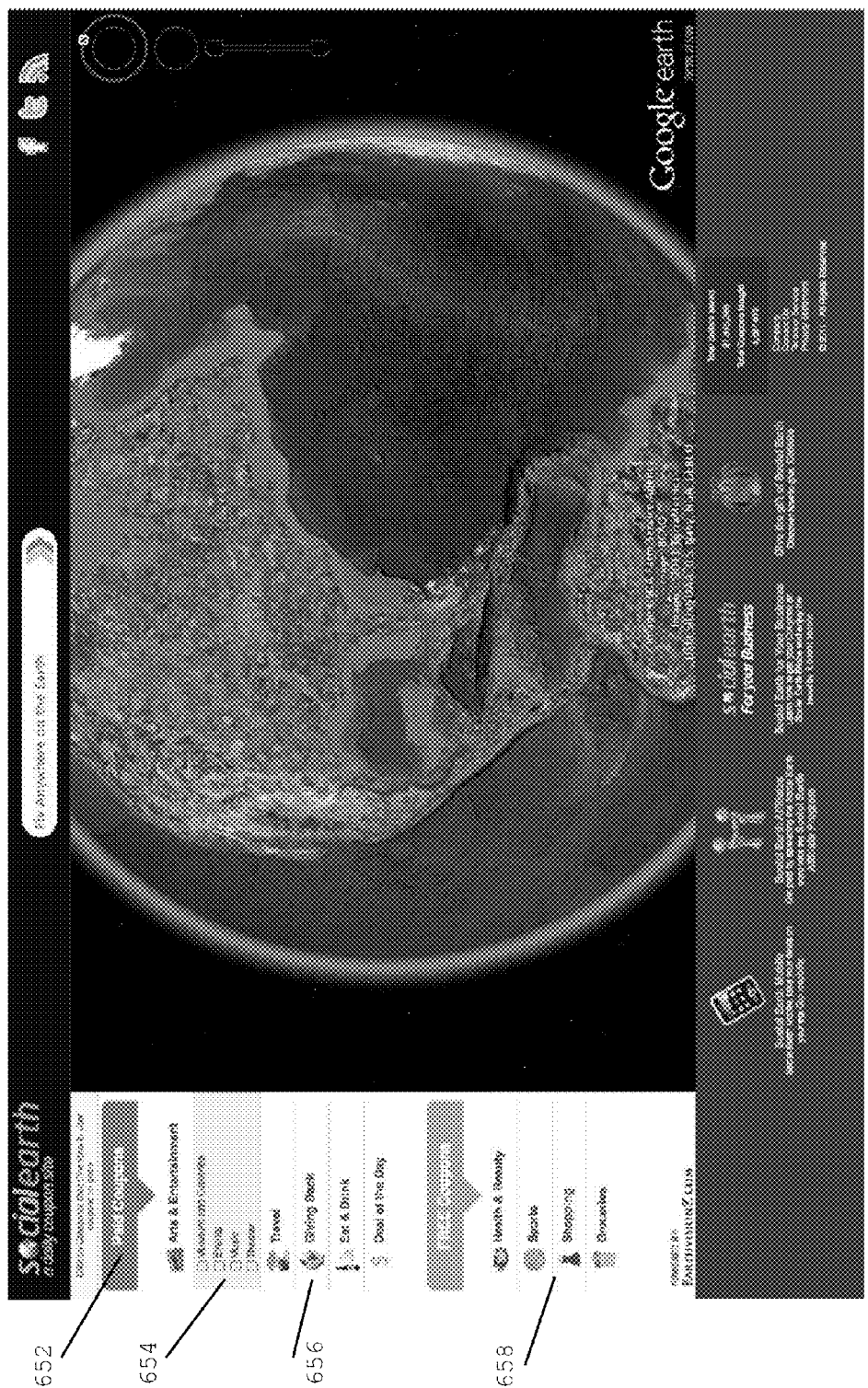
FIG. 17 illustrates a screen display defining an interface associated with a client system portion, according to an exemplary embodiment.

Referring to FIG. 17, illustrations of a screen display defining an interface associated with a client system portion are shown, according to exemplary embodiments, e.g., as Social Earth. FIG. 17 is similar to FIGS. 3A and 3B with the added feature of being able to utilize a pull down menus 652, 654, 656, and 658 to retrieve PSGGS-GM-CL/I-SN information data. It is to be understood that the above description is merely exemplary rather than limiting in nature, the disclosure being limited only by the appended claims. Various modifications and changes can be made thereto by one of ordinary skill in the art, which embody the principles of the disclosure and fall within the spirit and scope thereof. For example, one and/or more steps described herein as being performed by client system 14 and/or main server system 12 can be performed by the other of client system 14 and/or main server system 12, and/or by both.

For example, a thin client can be operable on client system 14 to interface with main server system 12. A thin client is a client computer and/or client software in client-server architecture networks, which depends primarily on the central server for processing activities, and mainly focuses on conveying input and output between the user and the remote server. In contrast, a thick and/or fat client does as much processing as possible and passes only data for communications and storage to the server. Many thin client devices run only web browsers and/or remote desktop software, meaning that all significant processing occurs on the server.

The present invention provides in one aspect a delivery system for a geospatial website for a multidimensional representation of information and/or scalable versions of web content for the delivery of Sports related Products, Goods, Gambling, and/or Services combined with /Geospatial Mapping/Company-Local Information/Social Networking/Communities ("PSGGS-GM-CL/I-SN") on a three dimensional geospatial platform using geospatial mapping technology. One example of an aspect of the invention is a geospatial website that aggregates, inter alia, ad links, promotions, online coupons, mobile services, Sports related Products, Goods, Gambling, and/or Services or services, including without limitation, such items as service providers, business centers and affiliates for related company information, media and entertainment, sports, personal & financial network, travel & hospitality services, real estate, educational services, ancillary services, penny auctions or online auctions, advertisements, service providers, social networking, social networking communities, social plugins, ad links, promotions, social applications, entertainment shopping, penny auctions or online auctions, advertisements and affiliate advertising or services, social networking, social networking communities, online communications, messaging, user profiles, viewing public & private user profiles, online dating, gaming, retail stores, virtual communities and virtual goods and information about microloans or microcredit, humanitarian aid and support other worldly causes through charitable donations or sustainable gifts to those in need (collectively "Sports related Products, Goods, Gambling, and/or Services") from around the world and/or showcases them in their actual, physical location on the websites live view of Earth in combination with social networking and/or socially conscious information and/or activities. The present invention addresses problems and/or shortcomings of online products, goods, gambling, or services, which should also provide socially conscious information about the companies that supply the coupons so that consumers can see where the companies and/or stores are located and can find out information about the companies, communities they are located in, what interaction and help they provide to communities and/or other economic and/or socially responsible activities, and to associate the geographical and other geospatially available information connecting also by the use of integrated social media, which combination is not current provided and/or available.

As users and members and/or subscribers of the website, (e.g., "Social Shoppers") shop the world for bargains, they can view ad links, promotions, online coupons, mobile services, Sports related Products, Goods, Gambling, and/or Services or services for such items as e.g., but not limited to, family fun, spoils, restaurants, events and/or hundreds of top consumer packaged goods brand/branders for, e.g., but not limited to, groceries, apparel, beverages, books & magazines, foods, health care, household, office, personal care, pet care, photography and/or the like. Such users and members and/or subscribers (e.g., "Social Shoppers") can find great ad links, promotions, online coupons, mobile services, Sports related Products, Goods, Gambling, and/or Services or services from merchants and sellers from around the world in the leading travel & hospitality industry, restaurants, toy and/or entertainment companies and/or top retailers around the world. The delivery system for a host geospatial website can provide for a multidimensional representation of information and/or scalable version of web content for an infrastructure and global platform that provides users and members and businesses of all types and sizes with access to broad markets and connect buyers and sellers and to reach people at the point of shopping through GPS technology—a benefit both to shoppers and merchants and delivery of ad links, promotions, online coupons, mobile services, Sports related Products, Goods, Gambling, and/or Services or services from merchants and sellers from around the world on a three dimensional geospatial platform using geospatial mapping technology. A host geospatial website can include realistic virtual landscape using satellite and/or aerial photography that can include many content layers of web based information, e-commerce and mobile banking links, social networking, social networking communities, social plugins, ad links, promotions, social applications and/or advertisements for a richer user experience. A host website shall store images, web-based content, social data and/or share live social feeds from social networks and/or other communications in real-time. Connecting ad links, promotions, online coupons, mobile services Sports related Products, Goods, Gambling, and/or Services or services from merchants and sellers from around the world with a highly-engaged social networking community of savvy Social Shoppers based upon a desired location in real-time on a geographical area across multiple social layers that are displayed as graphic animated color overlays on a three dimensional geospatial platform using geospatial mapping technology." The invention can also provide mobile payment method and/or system for effectuating an online payment through a mobile device to complete an e-commerce and mobile banking transaction on a three dimensional geospatial platform using geospatial mapping technology.

The invention can further provide in one aspect geospatial website aggregatesad links, promotions, online coupons, mobile services, Sports related Products, Goods, Gambling, and/or Services or services from merchants and sellers from around the world and/or showcases them in their actual, physical location on the websites unique live view of Earth. As users and members and/or subscribers shop the world for bargains, they can view online ad links, promotions, online coupons, mobile services, Sports related Products, Goods, Gambling, and/or Services or services for such items as family fun, sports, restaurants, events and/or hundreds of top consumer packaged goods brand/branders for groceries, apparel, beverages, books & magazines, foods, health care, household, office, personal care, pet care, photography and/or more! Social Shoppers can to find great product, goods or services deals from leading travel & hospitality, restaurant, toy and/or entertainment companies and/or top retailers around the world. Social Shoppers can to use "a mobile device payment method and/or system for effectuating an online payment through a computer or mobile device equipped carrier and/or a mobile device equipped bank using a mobile users and members device in connection with e-commerce and mobile banking transactions on the host geospatial website via a computer or mobile device (e.g., mobile telephone, PDA, laptop computer, etc.); wherein users and members create and/or maintain a rich-media application via a geospatial mapping platform via the Internet comprising: mobile banking and/or electronic payments. The delivery system for a host geospatial website can provide for a multidimensional representation of information and/or sealable version of web content for the delivery of ad links, promotions, online coupons, mobile services, Sports related Products, Goods, Gambling, and/or Services or services from merchants and sellers from around the world on a three dimensional geospatial platform using geospatial mapping technology. A host geospatial website can include realistic virtual landscape using satellite and/or aerial photography that can include many content layers of web based information, e-commerce and mobile banking links, social networking and/or virtual advertisements for a richer user experience.

A host geospatial website shall store images, web-based content, social data, social networking, social networking communities, ad links, promotions, social applications, user profiles, messaging, viewing public & private user profiles and live social feeds from social networks such as Facebook™ and Twitter™, social plugins, social applications, advertisements and/or other communications based upon a desired location in real-time. Connecting ad links, promotions, online coupons, mobile services, Sports related Products, Goods, Gambling, and/or Services or services with merchants and sellers from around the world with Social Shoppers based upon a desired location in real-time on a geographical area across multiple social layers that are displayed as graphic animated color overlays on a three dimensional geospatial platform using geospatial mapping technology. More specifically, it relates to a method for users and members known as "Social Shoppers" to effectuate banking and/or electronic payments; accessing a user account, engaging in mobile social networking, social networking communities, social networking activities and/or viewing user profiles, sending messages, online communications, viewing public & private user profiles and other available options via a three dimensional geospatial mapping platform using geospatial mapping technology.

The foregoing description of exemplary embodiments of the disclosure has been presented for purposes of illustration and description. It is not intended to be exhaustive and/or to limit the disclosure to the precise form disclosed, and modifications and variations are possible in light of the above teachings and/or can be acquired from practice of the disclosure. The embodiments (which can be practiced separately and/or in combination) were chosen and described in order to explain the principles of the disclosure and as a practical application to enable one skilled in the art to make and use the disclosure in various embodiments and with various modifications suited to the particular uses contemplated. It is intended that the scope of the disclosure is not limited to the disclosure herein, but covers any embodiment expressed to one of ordinary skill in the relevant arts in combination with what is known in the art, and their equivalents.

A Geographic Information System (GIS) (Also Called Geographic Mapping and/or "GM") is a computer technology that provides an analytical framework for managing and integrating data, solving problems, and/or understanding past, present, and/or future situations. A GIS can link information and/or attributes to location data (hereinafter referred to as a "feature"), for example, people to addresses, buildings to parcels, and/or streets within a network. GIS and/or GM can further layer such information to present a better and/or clearer understanding of how many different variables interrelate and/or work together. Layers can be in the form of colored and/or textured overlays, graphics, icons, graphs, and/or other visual indicators of data in context with a geographic location associated with the data. GIS and geospatial technologies are used in the present invention in all fields such as, but not limited to, business and marketing, emergency management, environmental planning, geo-intelligence and security, risk assessment, urban planning and utilities management, as well as industries such as telecommunications, utilities, transportation, education and scientific research constitute some of the largest consumers of this technology, and through its application in numerous daily tasks, as well as logistics companies using it to plan optimal delivery routes, insurance industry to assess risk and vulnerability with geospatial data, the retail sector to understand its customer base to provide more efficient services, while in the communications realm, location-specific applications such as Foursquare, Microsoft GeoLife and Google Buzz on cell phones or social media websites help diffuse this technology to the general public. The invention also includes future growth in the geospatial technologies industry including building capacity and developing broad citizen access to the technology, constructing innovative value-added applications to help businesses make informed decisions, gathering and sharing reliable geospatial data, and training a capable work force, as well as the Internet and advances in information and communications technologies also can be included in its expansion. The invention also can include the purchase and use of place-based GIS-generated products without necessarily being familiar with the technology itself, such the use of GPS or Internet-based maps to locate a particular business outlet, while user access and awareness can stimulate a greater demand for new applications of this technology, which will fuel innovation, and a domino effect can help the industry expand into new markets. User access to geospatial technologies and data are slowly revolutionizing how we view the world. GIS has restored the importance of understanding people-place interactions in an array of activities and decision-making processes. With such value and possibility, leaders and users of this technology should promote its application as broadly as possible.

A GIS and/or GM are most often associated with maps formed within a framework of a common coordinate system, such as the World Geodetic System 1984 (WGS84). Reference locations within the framework can be specified by and/or translated to and/or from locations defined within a common coordinate system, so as to allow integration of disparate data and functionality with a geospatial browser. A map, however, is only one way a user can work with geographic data in a GIS and/or GM and is only one type of output generated by a GIS and/or GM. Furthermore, a GIS and/or GM can provide many more problem-solving capabilities than using a simple mapping program and/or adding data to an online mapping tool (e.g., in a "mash-up").

Generally, a GIS and/or GM can be viewed in at least three ways, (1) as a database; (2) as a map; and/or (3) as a model. As a database, a GIS provides a unique kind of database relating to the Earth and/or other mapped region, such as a geographic database and/or geo-database. Fundamentally, a GM is based on a structured database that describes the mapped region in geographic terms. GM maps can be either two and/or three dimensional in presentation. GM maps are generally constructed of "tiles" that are unit areas of a geographic region. Tiles can be identified in the database by coordinate boundaries and/or individual reference identifications allocated to each tile. The number of tiles covering a particular geographic region will vary depending upon the resolution of the map requested; a high resolution map (e.g., 1 m) of a geographic area will have substantially more tiles than a lower resolution map of the same area. Maps combining the underlying geographic information with overlays of associated data can be constructed and used as "windows into the database" to support queries, analysis, and editing of the information in a process called "geo-visualization." As a model, a GM is a set of information transformation and/or "geo-processing" tools that derive new geographic datasets from existing datasets. This geo-processing functionality can take information from existing datasets, apply analytic functions, and write results into new derived datasets that show features and feature relationships with the mapped region and present the results to a user.

A GM allows mapping of locations and things and identification of places with requested features. GIS mapping can provide information about individual feature and/or present a distribution of features on a map to identify patterns. GM and/or GIS mapping can be based upon and/or filtered by quantities, for example, locations of most and least of a feature. GM and/or GIS mapping can also find and establish relationships between places, features, conditions, and/or events and determine where certain criteria are met and/or not met. GM and/or GIS mapping can also present densities to view concentrations. A density map allows measurement of a number of features using a uniform area unit, such as acres and/or square miles, to clearly present the distribution. This functionality provides an additional level of information beyond simply mapping the locations of features.

GM and/or GIS can also be used to depict events occurring within and/or nearby an area. For example, a district attorney might monitor drug-related arrests to find out if an arrest is within 1,000 feet of a school; if so, stiffer penalties can apply. GM and/or GIS can be used to determine items within a set distance of a feature by mapping an area within a range of the feature. GM and/or GIS can also be used to map the change in an area to anticipate future conditions, decide on a course of action, and/or to evaluate the results of an action and/or policy. By mapping where and how things move over a period of time, insight into trends and/or behaviors can be gained.

GM and/or GIS can be used to map changes to anticipate future needs. For example, a police chief might study how crime patterns change from month to month to help decide where officers should be assigned. GM and/or GIS can also be used to map conditions before and after an action and/or event to see the impact. For example, a retail analyst might map the change in store sales before and after a regional ad campaign to see where the ads were most effective.

A GM and/or GIS can be implemented in a geospatial decision management system (GDMS) 100, shown in FIG. 18 to provide the geo-processing power and infrastructure to process the data and render geo-visualizations of the data in a user interface. The GDMS 100 of FIG. 18 can be implemented in a combination of a server computer system 102, one and/or more client computer systems 104, and various data sources 106, 108, and 110. GDMS data can be saved in the GDMS server system 102 and/or in a datastore 106, 108, and 110 at a local and/or remote location. The data sources 106 and 108 are depicted as local to the server system 102, whereas the data source 110 is depicted as coupled remotely to the server system 102 via a communications network 112. GDMS data can also be cached in a proxy server.

The client system 104 can be coupled remotely to the server system 102 via a communication network 114 (or alternatively, the same communications network 112), although a local connection between the client system 104 and the server system 102 can be employed. It should be understood that multiple client systems can be coupled with the server system 102 concurrently. It should also be understood that the client system 104 and server system 102 can be implemented in an integrated system. The network connection 114, such as an Internet connection, can be used by GDMS client systems 104 to access the data (e.g., data defining layers and/or providing financial information, chemical concentrations, test results, project state reports, etc.) at the remote data sources 106, 108, 110, directly and/or through an intermediate computing system (e.g., a proxy server and/or GDMS server).

The client computer 104 can be coupled to an intermediate server, such as a proxy server 118. The proxy server 118 can be positioned between the client computer 104 and the server system 102. The proxy server 118 intercepts all requests to the server system 102 to see if it can fulfill the requests itself with cached data from prior requests. If not, the proxy server 118 forwards the request to the server system 102 to be fulfilled. The proxy server 204 can also be coupled to the communications network 114 and accessed by the client computer 104 and the server system 102 via the network 114. Firewalls 116 can also be implemented between the server system 102 and the client computer 104 and the network 114 for an added layer of security.

The connection can be established as a secure connection between the client system 104 and the server 102 and/or the remote data sources 106, 108 and 110. The secure connection can be accomplished by a variety of different methods including, but not limited to, authentication codes and passwords, secure user management tools, firewalls, user authentication, secure user management tools, user pathway mapping and/or encryption, etc. In another example, the server system 102 can include an administrative website that can allow authorized users and members to manipulate and assign user rights (e.g., an administrative tier). The server system 102 can also include a security feature, for example, an access control module 136 to establish, control, and monitor access by client computers 104 to certain data stored within and/or accessible within the GDMS 100. Access control can be governed by an administrator and/or it can be an automated function of the access control module 136 based upon attributes of the data requested and permissions held by the user as further described below.

The server system 102 can represent one and/or more hardware and software servers providing multiple server functions. In addition, one and/or more of the server system 102, the client system 104, and the databases 106, 108 and 110 can form an N-tier system. The server system 102 can also include a web server application subsystem, whereby World Wide Web-enabled applications can provide various aspects of functionality of the GDMS 100. For example, the server system 102 can provide a website where content creators and/or generators can upload geospatially-related data that can be transformed into features referenced to locations within a map of the GDMS 100 for access through the client system 104 connected to the GDMS 100 for geo-visualization of the information. In an alternative implementation, the client system 104 can be implemented as a "thick" client and execute client-installed software for some and/or all of the functionality of the GDMS 100.

A monitor 120, coupled to the client system 104, presents a GDMS interface 122 constructed from data and functionality received through the server system 102. When a user is working within a GDMS 100, s/he is said to be in a GDMS session. The GDMS interface 122 can be generated by a GDMS application executing on the client system 104 and/or alternatively through a server-executed GDMS application that provides the interface components over the network to a dumb terminal and/or a browser application running on the client system 104. The GDMS interface 122 can be a geospatial browser window including a map 124 (e.g., a globe in this illustration), a geo-visualization of data as a layer 126 and individual features 128 on the map 124, a layer manager 130 for selecting data and other features from the databases 106, 108, 110. The GDMS view can also include tool palettes 132 and 134, which can be distinct features of the browser interface, browser plug-ins, and/or separate utilities and/or applications.

In one implementation, the GDMS interface 122 can be in the form of a geospatial browser window and one and/or more geospatially-referenced tools. Access to the data and/or functionality is provided by geospatially-referenced tools (e.g., tool palettes 132 and 134) that are associated with and triggered in relation to a specific location in a common coordinate system (e.g., WGS84 and/or some other shared coordinate system) shared by the tools and the geospatial browser. For example, a tool can provide chemical analysis results pertaining to soil samples taken from the location over time. In another example, a tool can retrieve and analyze financial data pertaining to a construction project on a specified region on the map (e.g., a location). The data available to such tools is provided from a variety of data sources and associated with each location within the common coordinate system of the GDMS system 100, such as through specified coordinates (e.g., longitude and latitude), other geographic constraints, and/or organizational constraints (e.g., a project identifier of a project having a specific geographic location and/or constraint, a feature identifier of a feature having a specific geographic location and/or constraint, etc.). In this manner, the user can view a location through the geospatial browser and access data and/or functionality associated with a location that is accessible through the tools in the browser. These locations can be the same location and/or distinct locations.

Figure 19:
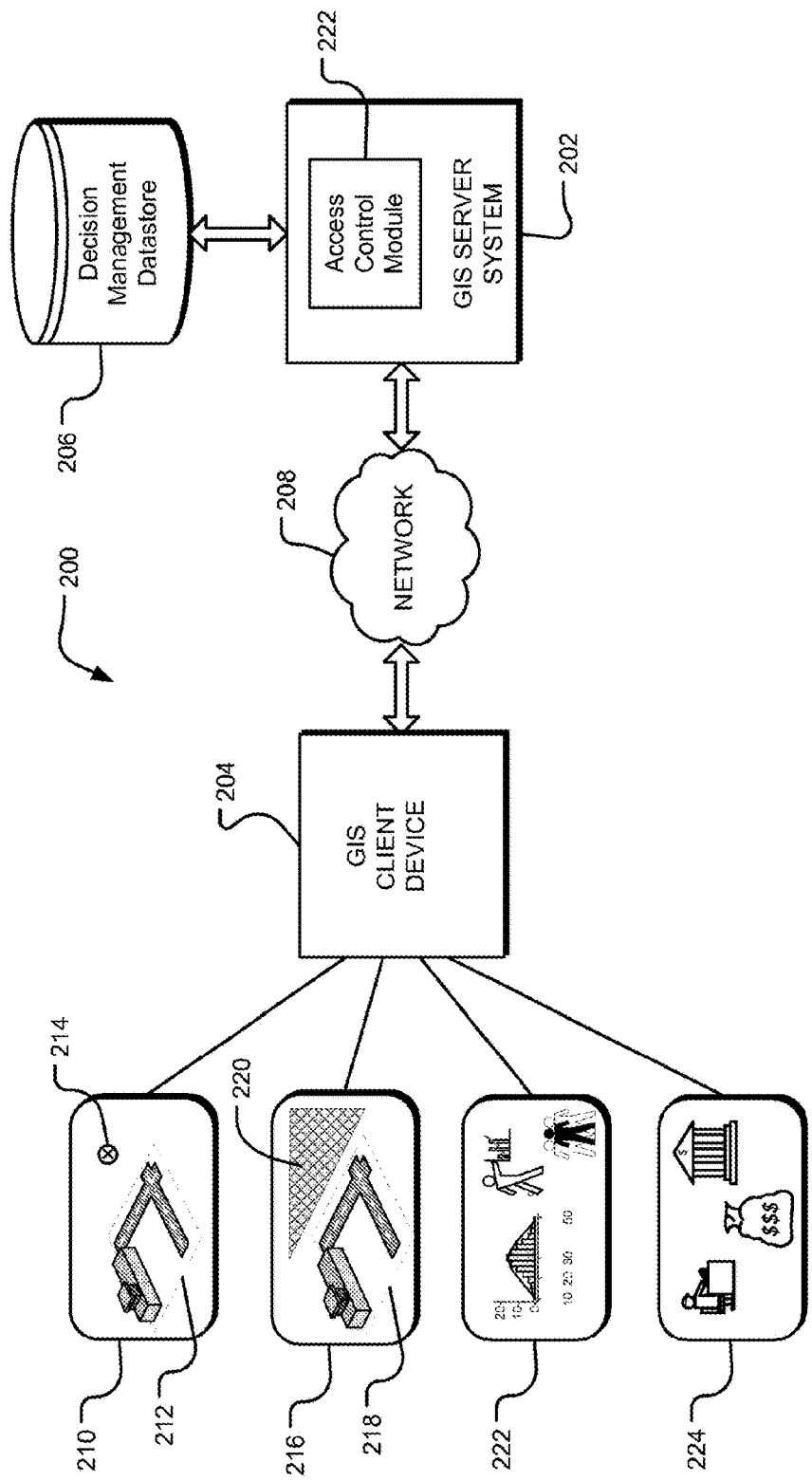
FIG. 19 is a schematic diagram of a geospatial decision management system depicting exemplary implementations of technical and management interface tools available to a client user.

FIG. 19 further illustrates an example of a GDMS 200 for accessing specific data and/or information within a database based on the association of the information with geospatial coordinates. Again, the GDMS 200 can be implemented by a GM and/or GIS server system 202 in communication with a GM and/or GIS client computer 204 over a communication network 208, e.g., the Internet. The GM and/or GIS client computer 204 can be used to access information in a decision management datastore (DMD) 206 connected with the GM and/or GIS server system 202. The communication network 208 ideally provides the GM and/or GIS client computer 204 with high-speed access to indexed data on the DMD 206.

The GM and/or GIS server system 202 can also include a security feature, for example, an access control module 222 to establish, control, and monitor access by GM and/or GIS client computers 204 to certain data stored within and/or accessible via the DMD 206. Access control can be governed by an administrator and/or it can be an automated function based upon attributes of the data requested and permissions held by the user as further described below The data retrieved from the DMD 206 can be presented in a user interface 210, 216, 222, 224 (of which four exemplary configurations are presented in FIG. 19 at the GM and/or GIS client computer 204. A feature presented in the user interface 210 (e.g., a geospatial coordinate and/or geographic location) on the client computer 204 can be used to access information indexed by features using the DMD 206.

The GM and/or GIS client computer 204 can access the indexed data in the DMD 206 by using applications and/or plug-ins, such as technical interfaces 210, 216 and management interfaces 222, 224. The technical interfaces 210, 216 can be used to access technical data associated with particular features. In exemplary implementations such technical data might be biochemical, geochemical, hydro-geological, and/or other physical data on analytes. The management interfaces 118, 120 can be used to access business management data. In exemplary implementations such management data might be business and organizational documents and data associated with particular features. Several examples of the use of such tools to interface with the DMD 206 and extract the data are presented below.

As shown in the first technical interface 210 in FIG. 19, if the GM and/or GIS client computer 204 requests information about a particular feature, such as a ground water well located near an airport 212, the GM and/or GIS client computer 204 can select the feature 214, i.e., the ground water well, to receive information related to that feature 214. The first technical interface 210 can include a concentric area data tool that can provide technical data related to the ground water well feature 214, for example, latitude and longitude, physical inspection data, water level information, and water contamination information, in a the form of information windows and visual geographic information overlays on a base location map. In an alternate implementation shown in the second technical interface 216, technical data concerning an area of land 220 around, adjacent, and/or near the airport 218 at the location of the feature 214, for example, landscaping, slope, soil composition, and/or grading information can be presented.

In a further implementation shown in a first management interface 222, a contract management concentric data tool can provide management data based upon the selected feature 214, for example, information on construction and/or work in progress, zoning and/or easement information, and/or information on any contracts applicable to the feature 214. In a further implementation shown in a second management interface 224, a finance management concentric data tool 120 can also provide management data relating to financial information applying to the feature 214 selected, for example, costs of past repairs and/or current maintenance fees. In some implementations the management interfaces 222, 224 can further comprise a real-time link to a video camera providing a view of the selected feature 214 and any construction and/or activity occurring at the selected feature 214.

Figure 20:
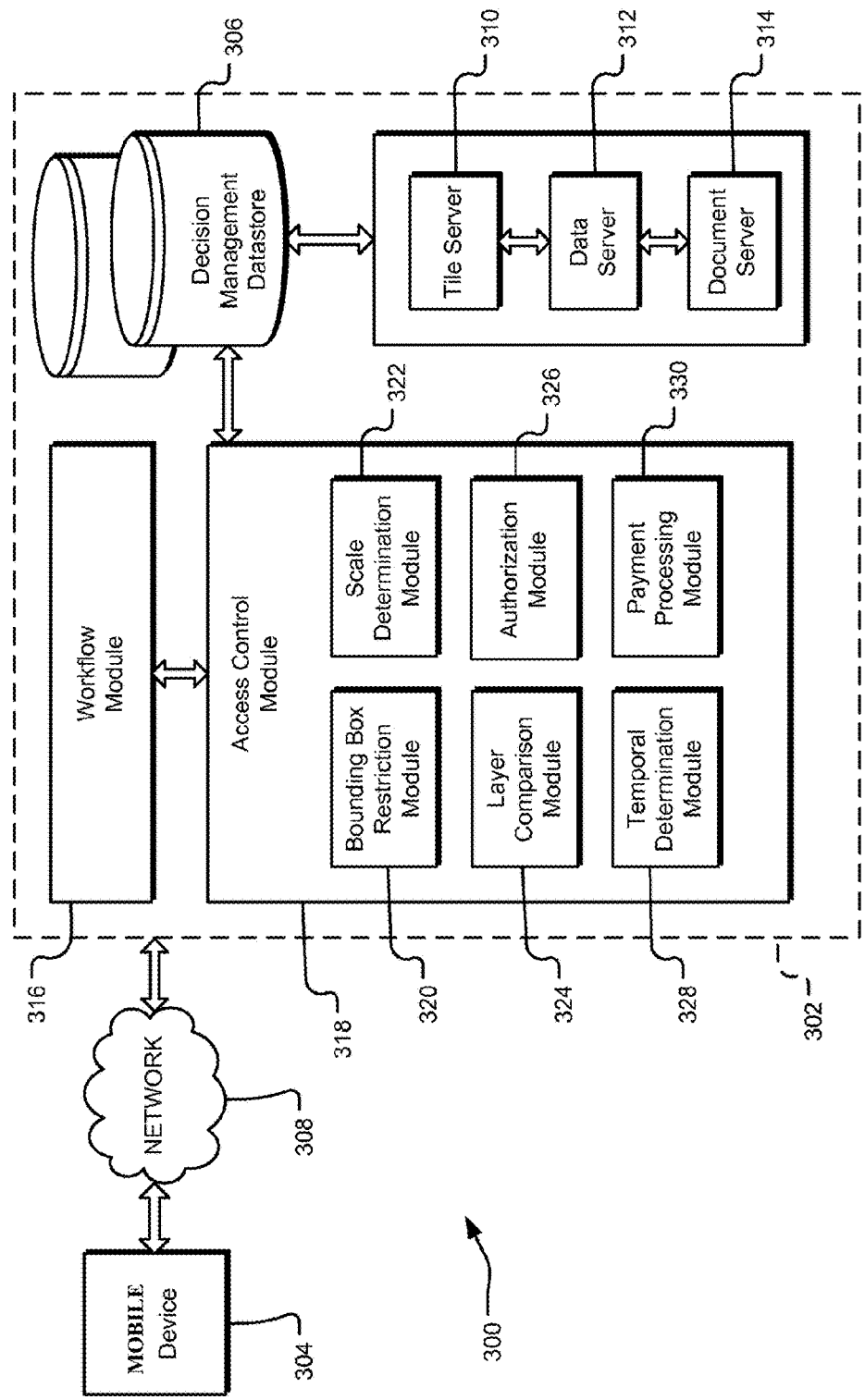
FIG. 20 is a schematic diagram of additional components of a geospatial decision management system for implementing access control to presentation of geospatial attributes within a network.
Figure 21:
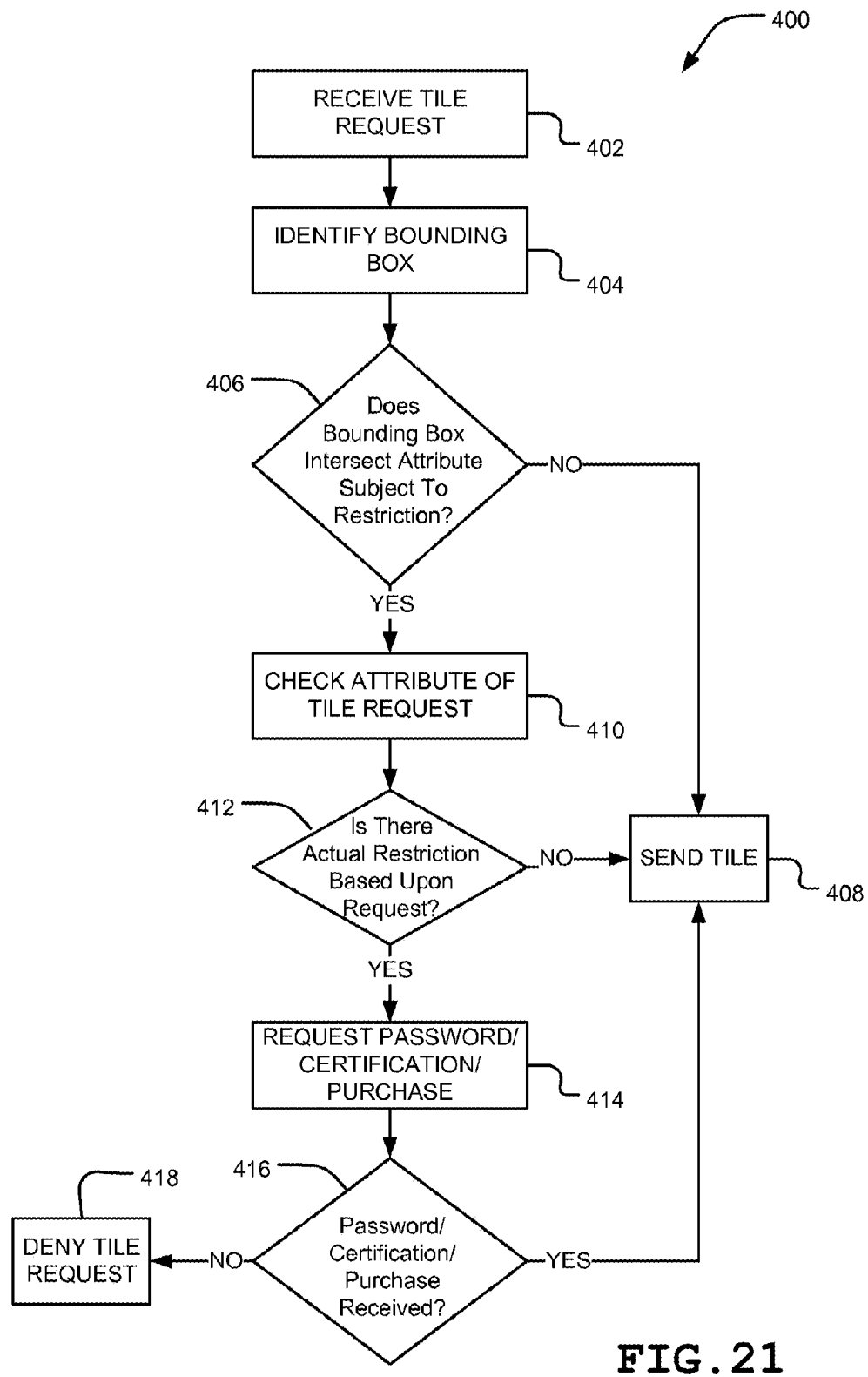
FIG. 21 is a flow diagram of exemplary operations for implementing access control to presentation of geospatial attributes within a geospatial decision management system.

The GDMS shown in FIGS. 20 and 21 is an innovative, GM and/or GIS-based management decision support tool that optimizes the geo-processing and geo-visualization of available GM and/or GIS data, for example, natural resources, building resources, time-management resources, personnel resources, financial resources, and information resources, and others. The GDMS can enable a GM and/or GIS client to easily visualize and interpret large, multifaceted, and complex information sets in order to make comparative analyses of alternatives, identify potential liabilities and opportunities, and optimize program strategies.

The GDMS provides full convergence, and/or integration, of multiple (essentially limitless) disparate data sets within a single virtual three-dimensional (geospatial) model. The disparate data sets, and even sub-data sets within them, can be organized by association with relevant features on the model. For example, groundwater analytical data can be associated with a given groundwater well; building data can be associated with a given building; installation information can be associated with the installation; and command information can be associated with the command. The GDMS full data convergence allows data to be accessed relative to position, scale, resolution, time, and other geospatial attributes and serves as an extremely intuitive and efficient way to organize and access essentially limitless quantities of information.

The GDMS allows queries, filters, and comparisons of data to be completed at the GM and/or GIS server system and then visually represented in three dimensions in near real time at the GM and/or GIS client device. The three-dimensional representation of data helps users and members gain a better understanding of the meaning contained within the data more rapidly than using traditional tabular and/or two-dimensional representations of data. The GDMS thus allows the meaning represented in the three-dimensional data to be rapidly communicated to users and members.

The GDMS improves on traditional closed and/or organization-specific GM and/or GIS by affording live connections to multiple databases. As the databases are updated, the representations afforded by GDMS can thus be current. This allows a fourth dimension, time, to be factored into resource management decisions. Time is an important additional data factor because previous "views" of the data can be compared to current "views" of the data, in order to gain an understanding of the rates of change (or dynamics) of the real system. In other words, the GDMS allows for differences between time states to be understood and factored into a decision process.

In FIG. 18 a GDMS 100 can be used to provide access to specific sections within documents, which are associated with a particular geographic coordinate, e.g., Sports related Products, Goods, Gambling, and/or Services-Geographic Mapping-Company/Local Information-Social Networking (PSR-GM-C/L-SN) information. More specifically, a GDMS 100 user (or GM and/or GIS client) can select a specific location and/or 'feature' on a map and be directed to Sports related Products, Goods, Gambling, and/or Services-Geographic Mapping-Company/Local Information-Social Networking (PSR-GM-C/L&SC-SN) information, e.g., information and/or documents, as well as entire sets of information and/or documents themselves associated with a promotion, online coupons, mobile services, Products, goods, gambling, or services, for related company and/or local information, including socially conscious information, which contain data and/or information relevant to that specific 'feature' and/or location selected. Said another way, specific relevant data can be provided to a user based upon the 'feature' selected, not just based upon a traditional search query. Thus, GDMS 100 links and/or ties a 'feature' and/or specific geographic location, to an indexed database of data. Examples of documents that can have a geospatial associated, but are not amenable to layered geo-visualization can include one and/or more components of Sports related Products, Goods, Gambling, and/or Services-Geographic Mapping-Company/Local Information-Social Networking (PSR-GM-C/L&SC-SN) information, e.g., but not limited to, ad links, promotions, online coupons, mobile services, Sports related Products, Goods, Gambling, and/or Services or services, product information, socially conscious information about companies, their Sports related Products, Goods, Gambling, and/or Services, local cities and/or communities, and/or the like, e.g., real estate contracts concerning a particular property, title records, covenants, plats, zoning regulations, construction plans, and others. The specific relevant data provided to a user can comprise only portions and/or sections of documents, maps, and/or images related to that specific 'feature' selected. This can greatly increase efficiency of GM and/or GIS by taking a user directly to a relevant section of a document, which can be hundreds and/or thousands of pages in length.

The GDMS speeds the process of bringing discordant stakeholder groups to consensus by providing real-time and highly comprehensible (due to the visual output) answers to questions offered in meetings and/or any networking and/or social networking methods, systems and/or resources. Moreover, the technology introduced in the GDMS yields truly optimal solutions to highly complex and nonlinear physical problems using reasonable computational times and resources, including associating company, local and product and/or service information, comprising social conscious information, data, and other resources. The modular design of GDMS permits coupling to virtually any simulation code. The GDMS can also be linked to and implemented within user-friendly and widely-accepted graphical user interfaces (GUIs) including web browser applications.

As should be apparent from the above discussion, the GDMS is a powerful tool that can be used to access enormous quantities of data stored at remote locations. When using the GDMS, control access to data stored at remote locations, for example, an access control module 222 as depicted in FIG. 19 can be implemented. An administrator of the data stored at the remote location to have server-side control over varying levels of access to data. Thus, in some implementations, access control can be exercised on the server-side; however, in other implementations this level of access control can be exercised on the client side. Further, access control can also be exercised at/by a given database. It can also be desirable to have different levels of authorization to control data access for employees having different roles within an organization. For example, a higher level officer, such as a supervisor and/or general, can have unlimited access to classified data, while entry-level employees can only have access to non-classified data. These levels of authorization can be created and adjusted by an administrator to permit varying levels of access to the data.

The GDMS can specifically establish different levels of access to the data can be controlled for each individual and/or can be controlled in groups (e.g., hierarchically) by the administrator and can be created and maintained using operations implemented within the access control module 222.

The varying levels of accessibility to data can be controlled using a number of different methods including, but not limited to, authentication codes and passwords, secure user management tools, firewalls, user authentication, user pathway mapping, and/or encryption. The levels of access control to the data can also be controlled by the creation of an individual profile for each user identifying the user's role in the organization and specifying their level of access to the data. Then, when a user logs onto a system, their level of access to data can be known by the system and the user can then only be able to view and/or access data that was commensurate with their level of authorization.

The layers of data can also be saved so that other authorized users and members can access the saved layers to view and make additional changes to (or comments on) the layers and then save those additional changes. This allows a given user to open the selected state, make changes, alterations, and comments, and save this new altered state for review and potential further modification by others. Certain GDMS view state data and/or functionality can and/or cannot be accessible to and/or be editable by a user based upon access permissions that have been granted to and/or withheld from the user.

In one implementation, access to the different map tiles and/or layers of data can be based upon the scale and/or resolution of the map and/or layer, i.e., access is 'scale-driven.' The contextual and/or 'smart' layers of data can be turned on and/or off by an administrator based upon the authorization to access each layer of data. A user's ability to change and/or alter the layers of data can also be dependent upon their level of authorization.

With reference now to FIG. 20, an exemplary GDMS 300 is implemented in a server system 302 with a DMD 306 as described above. The server system 302 can further include additional data servers, for example, a map tile server 310 indexed by coordinates, reference number, and/or feature; one and/or more layer servers 312 that provide feature and layer information also indexed by reference to geospatial coordinates, tile reference number, and/or feature; and a document server 314 that can provide Product/Service/Retail-Geographic Mapping-Company/Local Information-Social Networking (PSR-GM-C/L&SC-SN) information, and/or other documents and information associated with a geospatial location (again indexed by coordinate, reference number, and/or feature) in a format not amenable to geo-visualization. As shown in FIG. 20, the data servers 310, 312, 314 can be connected to the DMD 306 and/or to one another to maximize operating efficiency of the datastore 306. In some implementations, the data servers 310, 312, 314 and the datastore 306 can be located within the same server system 302, while in other implementations, the data servers 310, 312, 314 and the datastore 306 can be distributed across a network.

The server system 302 can further comprise a workflow module 316 and an access control module 318 through one and/or a number of different types of software programs (i.e., programming logic and/or computer executable instructions) utilizing a variety of different types of measures to control access to the DMD 306. The workflow module 316 and the access control module 318 can be positioned between the client computer 304 and the DMD 306, as shown in FIG. 20, to provide a layer of access control between the client device 304 and the DMD 306 and/or the data servers 310, 312, 314. In other implementations, the access control module 318 and workflow module 316 can be partially and/or substantially implemented in other locations, for example, on the client device 304, and/or within the communications network 308.

In one implementation of the GDMS 300, as shown in FIG. 20, the access control module 318 and workflow module 316 can be separate from the DMD 306 and the servers 310, 312, 314. In other implementations, the access control module 318 and 310, 312, 314. The access control module 318 and workflow module 316, DMD 306, and data servers 310, 312, 314 are shown as separate components in FIG. 20 for simplicity of illustration, but can all be combined into one server system 302, system datastore, and/or network.

The access control module 318 and workflow module 316 can be operatively associated and can control access to different layers of data via the DMD 306 to facilitate control over what users and members can access through the DMD 306. The access control module 318 and workflow module 316 can work in concert to provide a security control function that grants and/or denies a user access to map tiles, information, documents, features, applications, resolution, elevation views, aerial extent views, and/or system access based on the users and members identification. This also allows the DMD 306 to provide only the information, documents, features, and applications that are authorized and relevant to a given user, which can provide workflow efficiencies.

By streamlining user workflow, the availability of information and applications can be assigned by appropriate and relevant scale and/or resolution intervals. In this construct, application icons and information layers can appear and disappear based on the scale and/or resolution presented to the user within the system at any given point in time. This streamlines tasks by eliminating those information and application choices that are not relevant at a certain scale (and hence represent clutter) and by allowing more efficient navigation to the information and application choices that remain, i.e., those that are relevant at a given scale.

The workflow module 316 is a tool, which can also lead users and members though data sets by progressively 'walking' a user through design steps using interactive design tools, which can traverse more than one layer of data. The workflow module 316 can be particularly helpful for novice users and members as they attempt to navigate through the vast amounts of data accessible via the DMD 306. In one exemplary implementation, the features and functionality of the workflow module 316 can be turned on and off based upon the scale and/or resolution that a user attempts to access. In this embodiment, the workflow module 316 can operate by correlating the resolution and/or magnification of the geo-visualization data to conform to a user's level of authorization, thus controlling which users and members are able to view the most detailed and/or secure data.

The workflow module 316 can allow a system administrator to create within the DMD 306 different levels and/or groups of levels of access to the data for each individual within an organization. In this implementation, each individual within an organization can be given an individual profile. The individual profile can include information such as their role and/or security clearance within an organization. The individual profiles can be stored on a database coupled to, and/or integral with, the DMD 306. The profiles and/or lists of users and members can contain information on the level of information, and/or data, that each user is permitted to view. This individual profile can be accessed by the workflow module 316 and/or access control module 318 when individuals attempt to access data through the DMD 306 to permit the individual to have only a pre-determined level of access to data. When individuals attempt to access the DMD 306, their individual identities can be linked to their profile such that their access to the DMD 306 can be referenced and/or validated before they are permitted to access the DMD 306.

The workflow module 316 and access control module 318 can also allow system administrator of the DMD 306 to create and edit different levels of access to data for individuals and/or groups within an organization. For example, in the military, all individuals having equivalent rank and/or security clearance can have the same amount of access to the data within the datastore 306. Thus, the limited access is applied uniformly to the entire group of individuals, such that all of the individuals in the group have the same level of access to the data. This can be referred to as 'hierarchical access control' because groups and/or individuals can be grouped together for purposes of determining server-side access control levels.

Alternately, in an implementation of the GDMS 300 in an open and/or public platform, rather than a system internal to and/or controlled by a particular organization, access to data can be controlled based merely upon geospatial attributes, for example, the geospatial location (coordinates) of a tile request, scale of a tile request, resolution of a tile request, payment for access, the combination of layers requested, and/or freshness and/or staleness of data requested. Another example of a geospatial attribute can be the ability to download a geospatial dataset as opposed to merely having the ability to view a geo-visualization of such data, e.g., as a layer and/or set of features, e.g., Product, Goods &

Services Geographic Mapping-Company/Local Information-Social Networking (PSR-GM-C/L&SC-SN) information. A further example of a geospatial attribute can be the ability to save and/or bookmarks geo-visualization states defines by various combinations of underlying mar tiles and overlying layers and features for easily returning to such states as opposed to having to recreate the same filter query to return to a prior state. In such a public platform, contributors of GM and/or GIS data accessible for geo-visualization can place limits and/or restrictions on the availability of and/or accessibility of the GM and/or GIS data. A public implementation of the workflow module 316 can be used as an interface for data sources to either upload data to the DMD 306 and/or otherwise register data with the DMD 306 so that the DMD 306 can locate and access the data from a remote server and/or data store managed by the data source.

In order to place access restrictions on data, the data source can use the workflow module 316 to tag and/or otherwise encode an entire dataset and/or portions of the dataset with restriction instructions associated with one and/or more geospatial attributes. In one implementation, the workflow module 316 can provide tools to tag datasets, for example, using extensible mark-up language (XML) to indicate the presence and nature of a restriction tied to a particular map tile, data layer, and/or feature. In an alternate embodiment, a data source can encode a dataset itself as long as the tags are in a language and format that the DMD 306 understands.

As depicted in FIG. 20, the access control module 318 can be understood as composed of a number of functional sub-modules for implementing a public platform with controlled access to GM and/or GIS data. Such sub-modules can include, for example, a bounding box restriction module 320, a scale determination module 322, a layer comparison module 324, an authorization module 326, a temporal determination module 328, and a payment processing module 330. Each of these modules can provide separate functionality, but often can operate in conjunction with each other to make an access control determination as further described below. It can be desirable to control access to data for a variety of reasons, for example, to generate revenue for a particular data source.

The bounding box restriction module 320 within the access control module 318 can be used to provide a gross initial screening to determine whether a tile request by a user falls within the range of a bounding box that is entirely off-limits for presentation without a password and/or certificate due to proprietary and/or security concerns. The bounding box restriction module 320 monitors all tile requests for GM and/or GIS data to determine whether any of the requested tiles falls within a restricted bounding box. The bounding box can be also understood as defining a collection of records in a GM and/or GIS database that have geospatial coordinate fields associated with the data with values falling within the range of the bounding box. An additional field in the data records can indicate whether there is a restriction placed on the data record and the nature of the restriction.

If a requested tile is restricted, then the bounding box restriction module 320 can interface with the DMD 306 and instruct that the requested GM and/or GIS data and/or the tiles thereof that fall within the bounding box be withheld from delivery by the DMD 306 to the client 304. However, this access restriction can be overridden if the requestor can provide a valid password and/or certificate as further discussed below. The functions provided by the bounding box restriction module 320 can be used by the other modules within the access control module 318 in order to identify the geographic boundaries of a map tile request and/or data layer.

The scale determination module 322 can be used to control access to data based upon the scale and resolution of the GM and/or GIS data requested. The term "scale" is used herein in the cartographic sense, e.g., 1 cm: 1 km (1 cm of the image presented on the screen corresponds to 1 km in real terms), whereas "resolution" refers to the sharpness of the image file available for presentation on the screen (e.g., the number of pixels and/or dots per inch in a raster image). A large scale, e.g., 1:1 generally will correspond to an image of high resolution whereas a small scale, e.g., 1:100,000 will generally correspond to an image of low resolution as there is a limited ability of a presentation screen to present a very high resolution at a small scale—there is physically no room. In the context of access control, it can be perfectly acceptable to provide map tiles of a particular coordinate area at a scale of 1 cm: 100 m at a relatively coarse resolution (e.g., 60 dpi), but it can be unacceptable to provide a larger scale (e.g., 1 cm:1 m) at a high resolution (e.g., 300 dpi), and/or at any resolution at all, e.g., because that combination of scale and resolution has a premium value and is coded as inaccessible without payment of a fee.

The scale determination module 322 monitors requests for GM and/or GIS data having a scale and/or resolution attribute. If there is a scale and/or resolution change requested, the scale determination module 322 can interface with the DMD 306 and request that the GM and/or GIS data be held for screening by the scale determination module 322 to determine whether the requested GM and/or GIS data has a scale and/or resolution restriction, and/or a combination thereof, and the nature of the restriction.

The layer comparison module 324 can be used to control access to data based upon the types and combinations of data layers of the GM and/or GIS data requested for overlay on a map. For example, it can be perfectly acceptable to provide a geo-visualization of a data layer showing locations of Sports related Products, Goods, Gambling, and/or Services-Geographic Mapping-Company/Local Information-Social Networking (PSR-GM-C/L&SC-SN) information. In a further implementation, the layer comparison module 324 can be configured to save identifying information of a user making a layer combination request associated with interaction relating to one and/or more Sports related Products, Goods, Gambling, and/or Services-Geographic Mapping-Company/Local Information-Social Networking (PSR-GM-C/L&SC-SN) information.

In each of the examples of geospatial attribute-driven access control presented above, it is noted that request denials of map tiles and/or data layers can be overridden by the provision of a valid certificate and/or password. The authorization module 326 provides an opportunity for requestors to enter a password, certificate, and/or other identification sufficient to overcome a denial of presentation of a requested map region, data layer, and/or feature. In such a case, if a requester enters the appropriate password and/or presents an appropriate certificate, the authorization module 326 can direct the DMD 306 to access and present the requested GM and/or GIS data.

Another exemplary function of the access control module 318 can be embodied in the temporal determination module 328 that allows and/or denies access to map tiles and/or layers based upon the age of the information comprising the particular dataset, e.g. Sports related Products, Goods, Gambling, and/or Services-Geographic Mapping-Company/Local Information-Social Networking (PSGGS-GM-C/L&SN)

information. In an example, data that is significantly older can develop additional value again for use in temporal studies to identify trends. In such a case, the data can again only be accessible upon payment of a fee for the service. The temporal determination module 328 manages the temporal worth of GM and/or GIS data, for example, by examining time stamps associated with particular GM and/or GIS datasets and comparing the timestamps to any tags that can be encoded with the data indicating that the GM and/or GIS dataset is subject to a fee for service within particular ranges of age.

A further exemplary function of the access control module 318 can be the acceptance of payment for access to GM and/or GIS datasets through the payment processing module 330. Upon receipt of a request for a GM and/or GIS dataset, the payment processing module 330 can query the relevant datastore to determine whether the dataset is subject to a fee for service, for example membership, registration, and/or subscription for website access for providing coupons and/or discounts and associated company, local information, including socially conscious information, such as Product, Goods & Services-Geographic Mapping-Company/Local Information-Social Networking (PSR-GM-C/L&SC-SN) information. If so, the payment processing module 330 can instruct the DMD 306 to withhold delivery of a dataset to a requestor until payment is made. In an alternate implementation, the payment processing module 330 can maintain a schedule of fees charged by each contributor for particular datasets and compare incoming dataset requests with the schedule to determine whether a fee is required to access the data and instruct the DMD 306 accordingly. In another implementation, upon payment of a fee for access to a restricted dataset, the payment processing module 330 can issue a password and/or certification to the requester who would then present the password/certificate to the authorization module 326 to seek access to the dataset through that component. The payment processing module 330 can actually accept and process access payments from requesters, and/or it can interface with a third party payment processing service (e.g., PayPal,®) to actually process fund transfers.

FIG. 21 depicts an exemplary set of access control operations 400 that can be performed according to one implementation of an access control module within a GDMS. Initially the access control module receives a tile request in a receiving operation 402 associated with one and/or more Sports related Products, Goods, Gambling, and/or Services-Geographic Mapping-Company/Local Information-Social Networking (PSR-GM-C/L&SC-SN) information. It should be understood that any request from a client device for GM and/or GIS data, e.g., Sports related Products, Goods, Gambling, and/or Services-Geographic Mapping-Company/Local Information-Social Networking (PSR-GM-C/L&SC-SN) information be it a particular map and/or a dataset for a layer and/or a feature and/or even a document, will necessarily be associated with one and/or more map tiles. In order to present a geo-visualization interface, all of the data can have a reference to particular geospatial coordinates, which can optionally broken down in units of map tiles.

Once a tile request is received, the access control module can next identify a bounding box containing all the tiles in the tile request in identification operation 404. Creation of a bounding box allows the access control module to easily determine whether access is restricted to presentation of any of the map tiles requested. In a comparison operation 406, the access control module can simply compare whether any of the entire region of the bounding box intersects with a geospatial attribute that can be subject to a presentation restriction. Recall that there can be any number of geospatial attributes that can be designated as having restriction requirements, for example, the geospatial location (coordinates) of a tile request itself, the scale of the tile request, resolution of a tile request, an angle of view (e.g., plan, aerial, street level, etc.), payment for access, the combination of layers requested, and/or the freshness and/or staleness of data requested. If there are no geospatial attribute restrictions associated with any of the tiles in the bounding box, the process 400 can approve all of the tiles and instruct the DMD to send the particular map tiles, layer dataset, features, and/or other information in sending operation 408.

If the access control module recognizes that there is a restriction associated with one and/or more of the tiles in the bounding box, the access control module can next determine what kind of geospatial attribute is implicated in the bounding box restriction in checking operation 410. The access control module can then invoke one and/or more of the sub-modules described above for further processing assistance. The appropriate sub-module(s) can first determine whether an actual restriction must be imposed on the data request pursuant to the geospatial attribute in determination operation 412. This operation determines whether the requested a value of the geospatial dataset and/or feature actually conflicts with the restriction set by the data contributor. For example, the tile request at a resolution value restricted by the data contributor without additional authorization and/or payment and the tile would be considered actually restricted. Alternatively, if the tile request is at a resolution value within the allowable bounds set by the contributor, then the attribute of the request would not be considered restricted and the tiles and/or associated data would be approved for presentation in sending operation 408.

If the geospatial attribute associated with the tile request is found to be "set high," then the access control module will request that some form of authentication be presented by the requester before the data are released for presentation in requesting operation 414. Responses to the requesting operation are then examined in determination operation 416 to determine what information should be provided relating to Sports related Products, Goods, Gambling, and/or Services-Geographic Mapping-Company/Local Information-Social Networking (PSR-GM-C/L&SC-SN) information. Similarly, if the GM and/or GIS dataset is a premium service requiring additional payment, upon payment by the requester the access control module can approve the request and the tile are sent in sending operation 408. If a requester cannot provide the appropriate password and/or certification, and/or chooses not to pay for a premium service, then the access controller will deny the tile request in denying operation 418. The GDMS can either inform the requester that the request has been denied and/or alternatively return a GM and/or GIS data set as responsive as possible to the request, but without providing the restricted information.

Some implementations described herein can be implemented as logical steps in one and/or more computer systems. The logical operations of the described systems, apparatus, and methods are implemented (1) as a sequence of processor-implemented steps executing in one and/or more computer systems and (2) as interconnected machine modules within one and/or more computer systems. The implementation is a matter of choice, dependent on the performance requirements of the computer system implementing the described system, apparatus, and method. Accordingly, the logical operations making up the implementations of the systems, apparatus, and methods described herein are referred to variously as operations, steps, objects, and/or modules.

In some implementations, articles of manufacture are provided as computer program products that cause the instantiation of operations on a computer system to implement the invention. One implementation of a computer program product provides a computer program storage medium readable by a computer system and encoding a computer program. Another implementation of a computer program product can be provided in a computer data signal embodied in a carrier wave by a computing system and encoding the computer program.

Figure 22:
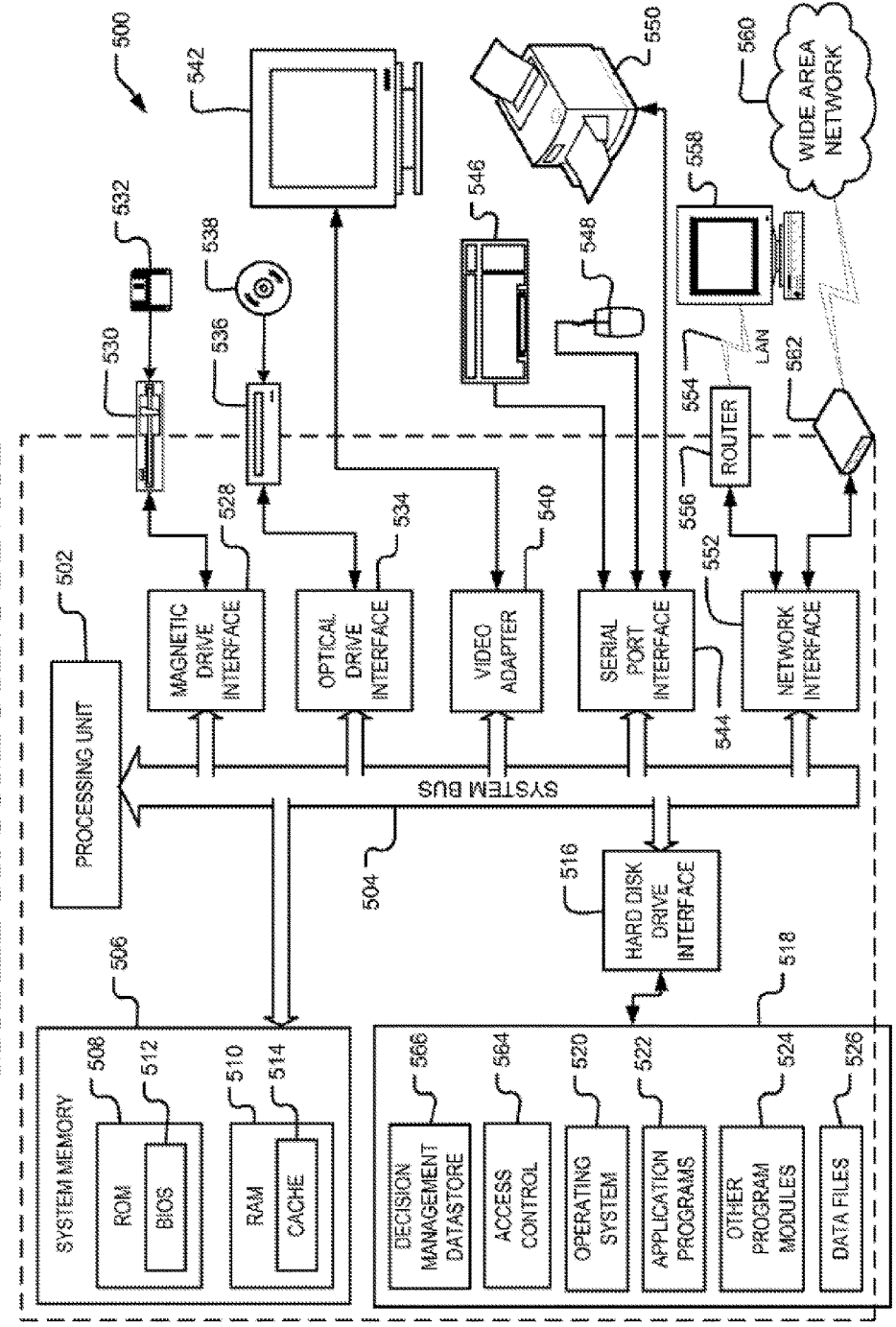
FIG. 22 is a schematic diagram of an exemplary implementation of a general-purpose computer system that that can be used to implement various aspects of a geospatial decision management system, including access control.

An exemplary computer system 500 for implementing the file origin determination processes above is depicted in FIG. 22. The computer system 500 can be a computer server with internal processing and memory components as well as interface components for connection with external input, output, storage, network, and other types of peripheral devices. Internal components of the computer system in FIG. 22 are shown within the dashed line and external components are shown outside of the dashed line. Components that can be internal and/or external are shown straddling the dashed line. Alternatively to a server, the computer system 500 can be in the form of any of a personal computer (PC), a notebook and/or portable computer, a tablet PC, a handheld media player (e.g., an MP3 player), a smart phone device, a video gaming device, a set top box, a workstation, a mainframe computer, a distributed computer, an Internet appliance, and/or other computer devices, and/or combinations thereof.

The computer system 500 includes a processor 502 and a system memory 506 connected by a system bus 504 that also operatively couples various system components. There can be one and/or more processors 502, e.g., a single central processing unit (CPU), and/or a plurality of processing units, commonly referred to as a parallel processing environment. The system bus 504 can be any of several types of bus structures including a memory bus and/or memory controller, a peripheral bus, a switched-fabric, point-to-point connection, and a local bus using any of a variety of bus architectures. The system memory 506 includes read only memory (ROM) 508 and random access memory (RAM) 510. A basic input/output system (BIOS) 512, containing the basic routines that help to transfer information between elements within the computer system 500, such as during start-up, is stored in ROM 508. A cache 514 can be set aside in RAM 510 to provide a high speed memory store for frequently accessed data.

A hard disk drive interface 516 can be connected with the system bus 504 to provide read and write access to a data storage device, e.g., a hard disk drive 518, for nonvolatile storage of applications, files, and data. A number of program modules and other data can be stored on the hard disk 518, including an operating system 520, one and/or more application programs 522, other program modules 524, and data files 526. In an exemplary implementation, the hard disk drive 518 can further store access control module 564 for restricting access to map and data files and the decision management datastore 566 for housing and managing GM and/or GIS databases according to the exemplary processes described herein above. Note that the hard disk drive 518 can be either an internal component and/or an external component of the computer system 500 as indicated by the hard disk drive 518 straddling the dashed line in FIG. 25. In some configurations, there can be both an internal and an external hard disk drive 518.

The computer system 500 can further include a magnetic disk drive 530 for reading from and/or writing to a removable magnetic disk 532, tape, and/or other magnetic media. The magnetic disk drive 530 can be connected with the system bus 504 via a magnetic drive interface 528 to provide read and write access to the magnetic disk drive 530 initiated by other components and/or applications within the computer system 500. The magnetic disk drive 530 and the associated computer-readable media can be used to provide nonvolatile storage of computer-readable instructions, data structures, program modules, and other data for the computer system 500.

The computer system 500 can additionally include an optical disk drive 536 for reading from and/or writing to a removable optical disk 538 such as a CD ROM and/or other optical media. The optical disk drive 536 can be connected with the system bus 504 via an optical drive interface 534 to provide read and write access to the optical disk drive 536 initiated by other components and/or applications within the computer system 500. The optical disk drive 530 and the associated computer-readable optical media can be used to provide nonvolatile storage of computer-readable instructions, data structures, program modules, and other data for the computer system 500.

A display device 542, e.g., a monitor, a television, and/or a projector, and/or other type of presentation device can also be connected to the system bus 504 via an interface, such as a video adapter 540 and/or video card. Similarly, audio devices, for example, external speakers and/or a microphone (not shown), can be connected to the system bus 504 through an audio card and/or other audio interface (not shown).

In addition to the monitor 542, the computer system 500 can include other peripheral input and output devices, which are often connected to the processor 502 and memory 506 through the serial port interface 544 that is coupled to the system bus 506. Input and output devices can also and/or alternately be connected with the system bus 504 by other interfaces, for example, a universal serial bus (USB), a parallel port, and/or a game port. A user can enter commands and information into the computer system 500 through various input devices including, for example, a keyboard 546 and pointing device 548, for example, a mouse. Other input devices (not shown) can include, for example, a microphone, a joystick, a game pad, a tablet, a touch screen device, a satellite dish, a scanner, a facsimile machine, and a digital camera, and a digital video camera. Other output devices can include, for example, a printer 550, a plotter, a photocopier, a photo printer, a facsimile machine, and a press (the latter not shown). In some implementations, several of these input and output devices can be combined into a single device, for example, a printer/scanner/fax/photocopier. It should also be appreciated that other types of computer-readable media and associated drives for storing data, for example, magnetic cassettes and/or flash memory drives, can be accessed by the computer system 500 via the serial port interface 544 (e.g., USB) and/or similar port interface.

The computer system 500 can operate in a networked environment using logical connections through a network interface 552 coupled with the system bus 504 to communicate with one and/or more remote devices. The logical connections depicted in FIG. 22 include a local-area network (LAN) 554 and a wide-area network (WAN) 560. Such networking environments are commonplace in home networks, office networks, enterprise-wide computer networks, and intranets. These logical connections can be achieved by a communication device coupled to and/or integral with the computer system 500. As depicted in FIG. 22, the LAN 554 can use a router 556 and/or hub, either wired and/or wireless, internal and/or external, to connect with remote devices, e.g., a remote computer 558, similarly connected on the LAN 554. The remote computer 558 can be a PC client, a server, a peer device, and/or other common network node, and typically includes many and/or all of the elements described above relative to the computer system 500.

To connect with a WAN 560, the computer system 500 typically includes a modem 562 for establishing communications over the WAN 560. Typically the WAN 560 can be the Internet. However, in some instances the WAN 560 can be a large private network spread among multiple locations. The modem 562 can be a telephone modem, a high speed modem (e.g., a digital subscriber line (DSL) modem), a cable modem, and/or similar type of communications device. The modem 562, which can be internal and/or external, is connected to the system bus 518 via the network interface 552. In alternate embodiments the modem 562 can be connected via the serial port interface 544. It should be appreciated that the network connections shown are exemplary and other means of and communications devices for establishing a communications link between the computer system and other devices and/or networks can be used. Connection of the computer system 500 with a WAN 560 allows the decision management datastore 566 the ability to access remote GM and/or GIS datastores to provide for a distributed GM and/or GIS platform.

All directional references (e.g., proximal, distal, upper, lower, upward, downward, left, right, lateral, front, back, top, bottom, above, below, vertical, horizontal, clockwise, and counterclockwise) are only used for identification purposes to aid the readers understanding of the present invention, and do not create limitations, particularly as to the position, orientation, and/or use of the invention. Connection references (e.g., attached, coupled, connected, and joined) are to be construed broadly and can include intermediate members between a collection of elements and relative movement between elements unless otherwise indicated. As such, connection references do not necessarily infer that two elements are directly connected and in fixed relation to each other. The exemplary drawings are for purposes of illustration only and the dimensions, positions, order and relative sizes reflected in the drawings attached hereto can vary.

As presented in FIG. 23, The present invention provides in one aspect a delivery system for a geospatial website for a multidimensional representation of information and/or scalable versions of web and mobile device content for an infrastructure and global platform that provides users and members and businesses of all types and sizes with access to broad markets for the delivery of ad links, promotions, online coupons, mobile services, Sports related Products, Goods, Gambling, and/or Services or services from merchants and sellers from around the world for such items as: e-commerce, media and entertainment, sports, personal & financial network, travel & hospitality services, real estate, educational services, ancillary services, advertisers, service providers, social networking, online dating, gaming, retail stores, virtual communities and virtual goods end user's online activity, location, online communications, search inquiries, social networking, social networking communities, social plugins, ad links, promotions, social applications, entertainment shopping, bidding, bidding behavior, bidding results, advertisements, purchasing, behavior, buying patterns and other criteria for collection and analysis used to provide customized promotional website displays of ad links, promotions, online coupons, mobile services, Sports related Products, Goods, Gambling, and/or Services or services from merchants and sellers from around the world, service providers and related company and local information for selected worldwide locations using three-dimensional and scalable geospatial mapping. (collectively referred to as "Sports related Products, Goods, Gambling, and/or Services" as any product or service or subgroup thereof) through combined Products, Goods and Service with Geospatial Mapping/Company-Local Information/Social Networking/Communities ("PSGGS-GM-CL/I-SN") on a three dimensional geospatial platform using geospatial mapping technology.

FIG. 24 presents a flow chart showing a typical transaction for the purchase a Social Earth online coupons, mobile services, Products, Goods and Service, entertainment shopping, penny auctions or online auctions, advertisements and affiliate advertising or services from merchants and sellers from around the world that provides a portion of the sale proceeds will be allocated to microloans or microcredit, humanitarian aid and support other worldly causes through charitable donations. "View Social Earth ad links, promotions, online coupons, mobile services, Sports related Products, Goods, Gambling, and/or Services or services from merchants and sellers from around the world, retail stores, virtual communities and virtual goods and information about microloans or microcredit, humanitarian aid and support other worldly causes through charitable donations from around the world by geo-target location or anywhere in the world on the present inventions unique Live View of the planet."

Techniques, methods, apparatus, and a system for presenting sponsored content (e.g., ad links, promotions and advertising) are described. In some implementations, the techniques, methods, apparatus and system can be used to facilitate online advertising, being advertising occurring over a network including one or more local area networks (LANs) or a wide area network (WAN), for example, the Internet. Any reference herein to "online promotion" is meant to include any such advertising occurring over a network and is not limited to advertising over the Internet. Further, the techniques and system described can be used to distribute other forms of sponsored content over other distribution media (e.g., not online), including those over broadcast, wireless, radio or other distribution networks. By way of example, the techniques and system are discussed in an online advertising context, but other contexts are possible. For example other forms of content can be delivered other than advertisements.

Figure 25:
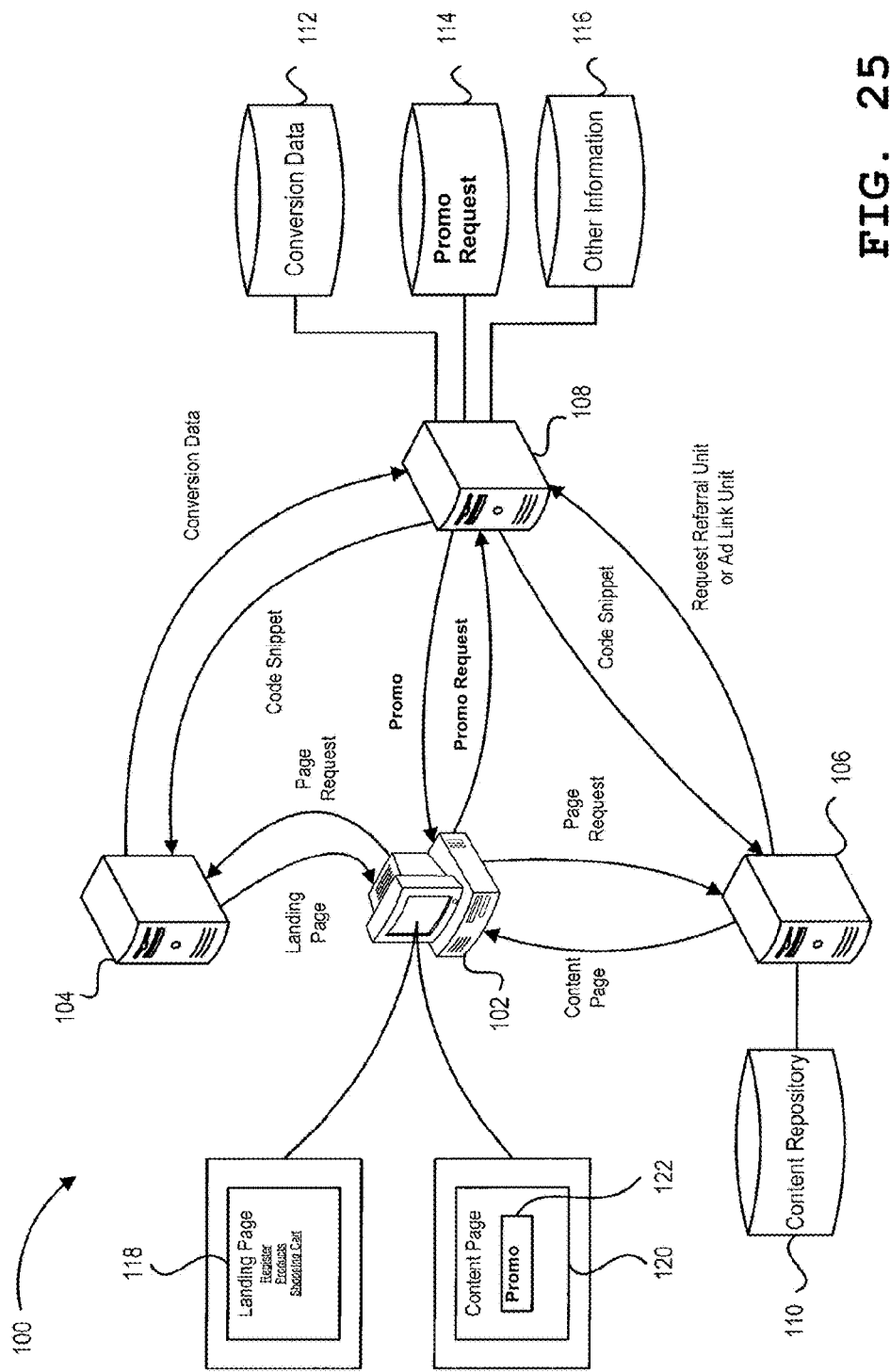
FIG. 25 is a block diagram of an example online advertising system.

FIG. 25 is a block diagram of an example online advertising system 100. In some implementations, one or more advertisers 104 can directly, or indirectly, enter, maintain, and track advertisement ("ad") information in an ad management system 108. The ads can be stored in a repository 114 coupled to the system 108 (e.g., a MySQL® database). The ads may be in the form of graphical ads, such as banner ads, text only ads, image ads, audio ads, video ads, ads combining one of more of any of such components, etc. The ads may also include embedded information, such as embedded media, links, meta-information, and/or machine executable instructions. One or more publishers 106 may submit requests for ads or social/geo/promo link promotional data sets to the system 108. The system 108 responds by sending ads, social/geo/promo link promotional data sets, or information that will allow for the retrieval of ads or social/geo/promo link promotional data sets to the requesting publisher 106 for placement/serving on one or more of the publisher's web properties (e.g., websites and other network-distributed content). The ads or social/geo/promo link promotional data sets can be placed with or embedded in the publisher's content (e.g., videos, articles, search results), which can be stored in a repository 110 at the publisher 106, and/or placed with content received from other sources (e.g., other publishers, advertisers).

In some implementations, publisher's properties available in this system may also include both Internet-distributed and broadcast distributed content such as, but not limited to, television spots, radio spots, print advertising, billboard advertising (electronic or printed), on-vehicle advertising, and the like.

Other entities, such as users 102 and advertisers 104, can provide usage information to the system 108, such as, for example, whether or not a conversion or click-through related to an ad has occurred. In some implementations, conversion data can be stored in a repository 112, where it can be used by the system 108 to improve ad targeting performance. The usage information provided to the system 108 can include measured or observed user behavior related to ads that have been served. In some implementations, the system 108 performs financial transactions, such as crediting the publishers 106 and charging the advertisers 104 based on the usage information.

A computer network, such as a local area network (LAN), wide area network (WAN), the Internet, wireless network or a combination thereof, can connect the advertisers 104, the system 108, the publishers 106, and the users 102.

One example of a publisher 106 is a general content server that receives requests for content (e.g., articles, electronic mail messages, discussion threads, music, video, graphics, networked games, search results, web page listings, information feeds, dynamic web page content, etc.), and retrieves the requested content in response to the request. The content server may submit a request (either directly or indirectly) for ads or social/geo/promo link promotional data sets to an ad server in the system 108. The ad request may include a number of ads desired. The social/geo/promo link promotional data set request may include a number of social/geo/promo link promotional data sets desired and the number of social/geo/promo links per social/geo/promo link promotional data set. The ad or social/geo/promo link promotional data set request may also include content request information. This information can include the content itself (e.g., page or other content document), a category or keyword corresponding to the content or the content request (e.g., arts, business, computers, arts-movies, arts-music, etc.), part or all of the content request, content age, content type (e.g., text, graphics, video, audio, mixed media, etc.), geo-location information, demographic information related to the content, keyword, web property, etc., and the like.

In some implementations, the content server (or a browser rendering content provided by the content server) can combine the requested content with one or more of the ads or social/geo/promo link promotional data sets provided by the system 108. The combination can happen prior to delivery of the content to the user or contemporaneously where the advertising server can serve the ads or social/geo/promo link promotional data sets directly to an end user. The combined content and ads or social/geo/promo link promotional data sets can be delivered to the user 102 that requested the content for presentation in a viewer (e.g., a browser or other content display system). The content server can transmit information about the ads or social/geo/promo link promotional data sets back to the ad server, including information describing how, when, and/or where the ads or social/geo/promo link promotional data sets are to be rendered (e.g., in HTML or JavaScript™). The content page 120 can be rendered in the user's viewer with one or more ads 122. When the user 102 clicks on a displayed ad 122 of an advertiser, the user 102 can be redirected to a landing page 118 of the advertiser's web site.

In another example, the publisher 106 is a search service. A search service can receive queries for search results. In response, the search service can retrieve relevant search results from an index of content (e.g., from an index of web pages). An exemplary search service is described in the article S. Brin and L. Page, "The Anatomy of a Large-Scale Hypertextual Search Engine," Seventh International World Wide Web Conference, Brisbane, Australia and in U.S. Pat. No. 6,285,999, both of which are incorporated herein by reference each in their entirety. Search results can include, for example, lists of web page titles, snippets of text extracted from those web pages, and hypertext links to those web pages, and may be grouped into a predetermined number of search results (e.g., ten).

The search service can submit a request for ads or social/geo/promo link promotional data sets to the system 108. The request may include a number of ads or social/geo/promo link promotional data sets desired. A social/geo/promo link promotional data set request may include a number of social/geo/promo link promotional data sets desired and the number of social/geo/promo links per social/geo/promo link promotional data set. The number of ads or number of social/geo/promo link promotional data sets may depend on the search results, the amount of screen or page space occupied by the search results or other content to be displayed contemporaneously with the sponsored content, the size and shape of the ads, etc. In some implementations, the number of desired ads can be from one to ten, or from three to five. In some implementations, the number of desired social/geo/promo link promotional data sets can be greater than one (e.g., three). The request for ads or social/geo/promo link promotional data sets may also include a query (as entered or parsed), information based on the query (such as geo-location information, whether the query came from an affiliate and an identifier of such an affiliate), and/or information associated with, or based on, the search results. Such information may include, for example, identifiers related to the search results (e.g., document identifiers or "docIDs"), scores related to the search results (e.g., information retrieval ("IR") scores), snippets of text extracted from identified documents (e.g., web pages), full text of identified documents, feature vectors of identified documents, etc. Other information can be included in the request including information related to the content that is to be displayed contemporaneously with the sponsored content. In some implementations, IR scores can be computed from, for example, dot products of feature vectors corresponding to a query and a document, page rank scores, and/or combinations of IR scores and page rank scores, etc.

A search service can combine the search results with one or more of the ads or social/geo/promo link promotional data sets provided by the system 108. This combined information can then be forwarded/delivered to the user 102 that requested the content. The search results can be maintained as distinct from the ads or social/geo/promo link promotional data sets, so as not to confuse the user between paid advertisements and presumably neutral search results. The search service can transmit information about the ad or social/geo/promo link promotional data set and when, where, and/or how the ad or social/geo/promo link promotional data set was to be rendered back to the system 104.

As can be appreciated from the foregoing, the advertising management system 108 can serve publishers 106, such as content servers and search services. The system 108 permits serving of ads targeted to content (e.g., documents, web pages, web blogs, etc.) served by content servers. For example, a network or inter-network may include an ad server serving targeted ads in response to requests from a search service with ad spots for sale. Suppose that the inter-network is the World Wide Web. The search service can be configured to crawl much or all of the content. Some of this content will include ad spots (also referred to as "inventory") available. In this example, one or more content servers may include one or more documents. Documents may include web pages, email, content, embedded information (e.g., embedded media), meta-information and machine executable instructions, and ad spots available. The ads inserted into ad spots in a document can vary each time the document is served or, alternatively, can have a static association with a given document. In one implementation, for the system 104 to provide advertisements to the publisher that are targeted to the user 108 upon whose browser the advertisements will be displayed, it is advantageous for user profile information about the user 108 to be provided to the system 104. In some implementations, user profile information and other types of data can be collected by the system 108 and stored in a repository 116. The stored data may include, for example, geographic locations of users, ad context information, etc. The system can then select the advertisements to provide for viewing by the user 108 based at least in part on the user profile information.

Figure 26A:
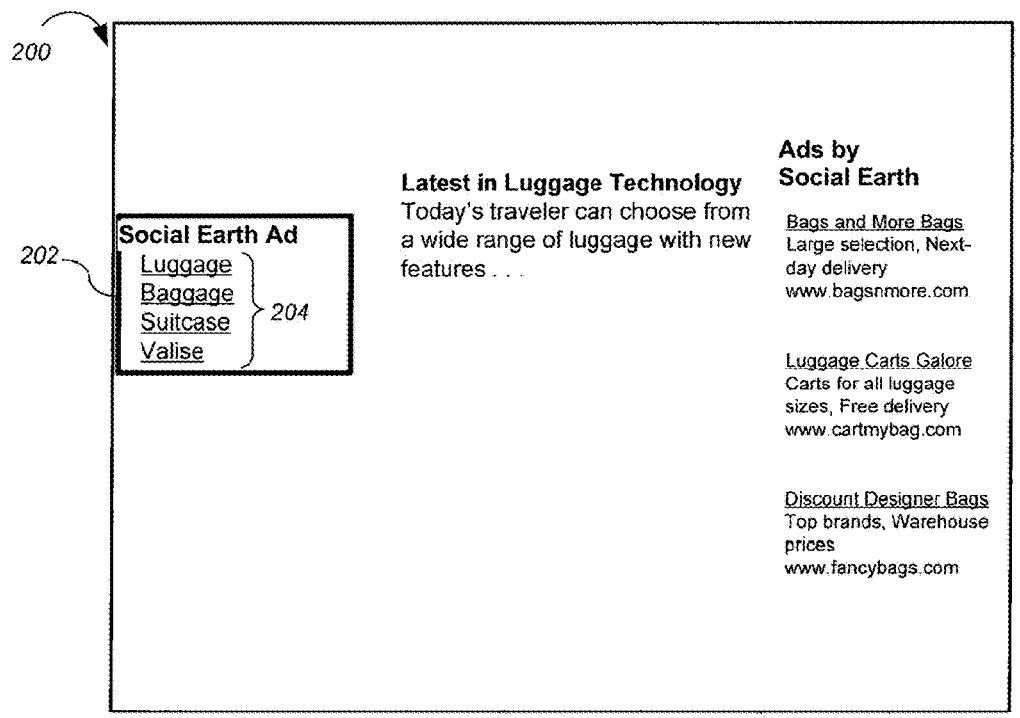
FIG. 26A illustrates an example of a related social/geo/promo link promotional data set provided with web page content.

FIG. 26A illustrates an example 200 of a related social/geo/promo link promotional data set 202 provided with web page content. In example 200, the content of the web page is directed to the latest in luggage technology. The content of the web page is displayed with related ads and the related social/geo/promo link promotional data set 202.

The related social/geo/promo link promotional data set 202 includes a list of selectable topics or categories 204 related to the content of the web page. The related social/geo/promo link promotional data set 202 can present multiple (e.g., four) social/geo/promo links. In some implementations, the related social/geo/promo link promotional data set 202 also includes a label (e.g., "Ads by Google") identifying the link unit 202 as advertisement.

Example 200 includes one related social/geo/promo link promotional data set 202 for the web page. The related social/geo/promo link promotional data set includes the following selectable categories 204: luggage, baggage, suitcase, and valise. These categories 204 are related to the content of the web page. However, the categories 204 in the list are very similar to one another. In particular, these categories 204 are synonyms of each other. A user presented with the luggage technology web page content and the related social/geo/promo link promotional data set 202 is likely to find little variety in the listed categories 204. If the user decides to select any category, the user is likely to select the first category, (e.g., luggage) and ignore the other three categories because of their high correlation to the first category.

Despite the correlation in the categories 204, the list of ads presented when one category is selected may differ from the list of ads presented when another category is selected. The ads associated with the similar categories that are lower on the related social/geo/promo link promotional data set list are at a disadvantage relative to the ads associated with the first category in the list.

Figure 26B:
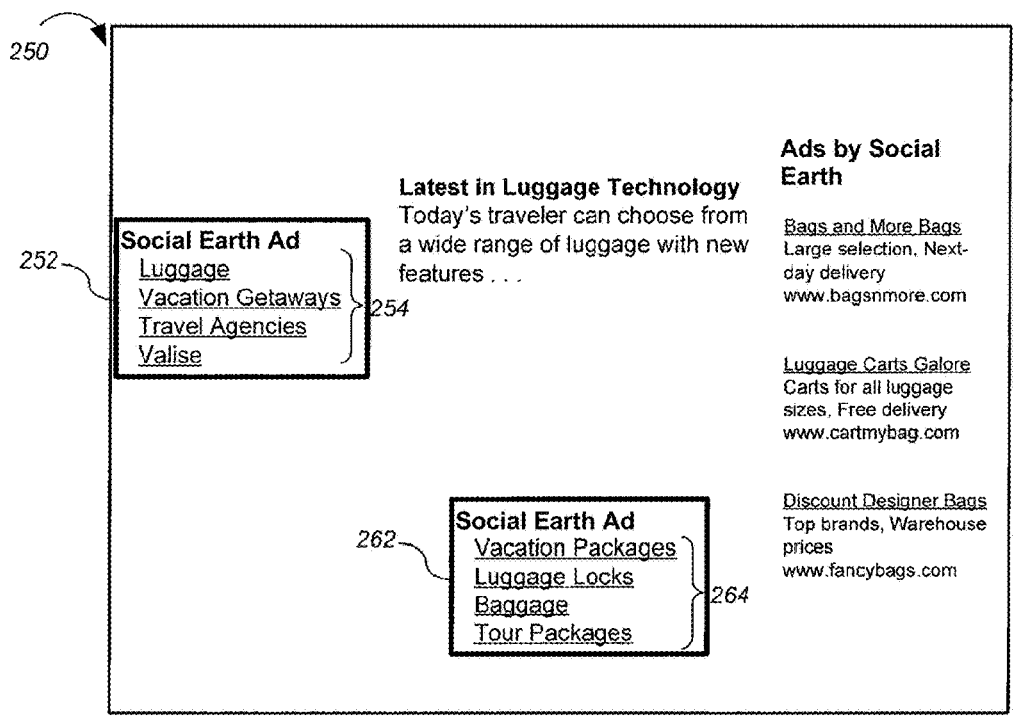
FIG. 26B illustrates an example of multiple related social/geo/promo link promotional data sets provided with the web page content.

FIG. 26B illustrates an example 250 of multiple related social/geo/promo link promotional data sets 252, 262 provided with web page content. As with example 200 of FIG. 2A, the content of the web page is directed to the latest in luggage technology.

Example 250 includes two related social/geo/promo link promotional data sets 252, 262 for the web page. The related social/geo/promo link promotional data set 252 includes the following selectable categories 254: luggage, vacation getaways, travel agencies, and valise. The related social/geo/promo link promotional data set 262 includes the following selectable categories 264: vacation packages, luggage locks, baggage, and tour packages. The categories 254, 264 are related to the content of the web page. However, the categories are scattered across the two related social/geo/promo link promotional data sets 252, 262 without regard to the correlation or diversity of the categories. For example, the luggage category of related social/geo/promo link promotional data set 252 is a synonym of the baggage category of related social/geo/promo link promotional data set 262. The vacation getaways category of related social/geo/promo link promotional data set 252 is a synonym of the vacation packages category of related social/geo/promo link promotional data set 262. Additionally, the categories within each link unit are diverse. For example, vacation packages and luggage locks are disparate categories in the related social/geo/promo link promotional data set 262. If the categories are incoherently assembled in multiple related social/geo/promo link promotional data sets without considering correlation or diversity, a user may have difficulty finding a particular category of interest.

A technique, method, apparatus, and system are described to provide related social/geo/promo link promotional data sets with correlated broad or alternative categories to be displayed with web page content for view by a user. The determination whether to cluster or anti-cluster can be based on, for example, the number of related social/geo/promo link promotional data sets to be displayed with web page content Clustering and alternative category clustering can be relative to a category classification of the related social/geo/promo link categories. Categories can represent industries or broad topics at a high level of a taxonomy system, which includes concepts, themes, or characteristics. Some examples of categories are travel, entertainment, office supplies, and education. Related social/geo/promo link categories can be ordered in this hierarchy of categories. In other words, related social/geo/promo link categories can be classified according to one or more categories. For example, "Hawaiian travel" can be categorized under both a Hawaii category and a travel category. The related social/geo/promo link category "luggage" can fall into a category for containers for travel.

Figure 27A:
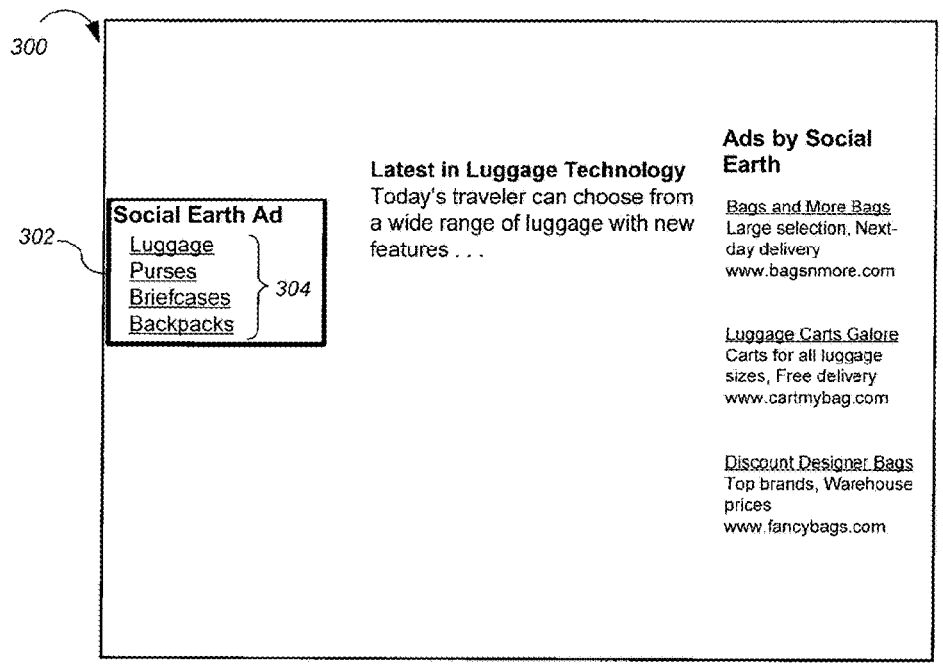
FIG. 27A illustrates an example implementation of a related social/geo/promo link promotional data set with correlated alternative categories provided with web page content.

FIG. 27 illustrates an example implementation 300 of a related social/geo/promo link promotional data set 302 with correlated broad categories 304 provided with web page content. As with the example 200 of FIG. 2A, the content of the web page is directed to the latest in luggage technology. However, in the example implementation 300, the listed categories 304 are not limited to the containers for travel category, and the listed categories 304 are not synonyms of each other. Instead, the related social/geo/promo link promotional data set 302 provides varied categories 304 (e.g., luggage, purses, briefcases, and backpacks) which are related to the content of the web page. The varied categories 304 fall into a number of categories including, for example, accessories, office supplies, and education supplies. The categories 304 are clustered broad categories to provide a diversity of promotional topics for the user. The technique of alternative category clustering is described in more detail below. User experience can be improved by presenting the varied categories 304 within the single related social/geo/promo link promotional data set 302, allowing the user to better distinguish between available promotional topics.

Figure 27B:
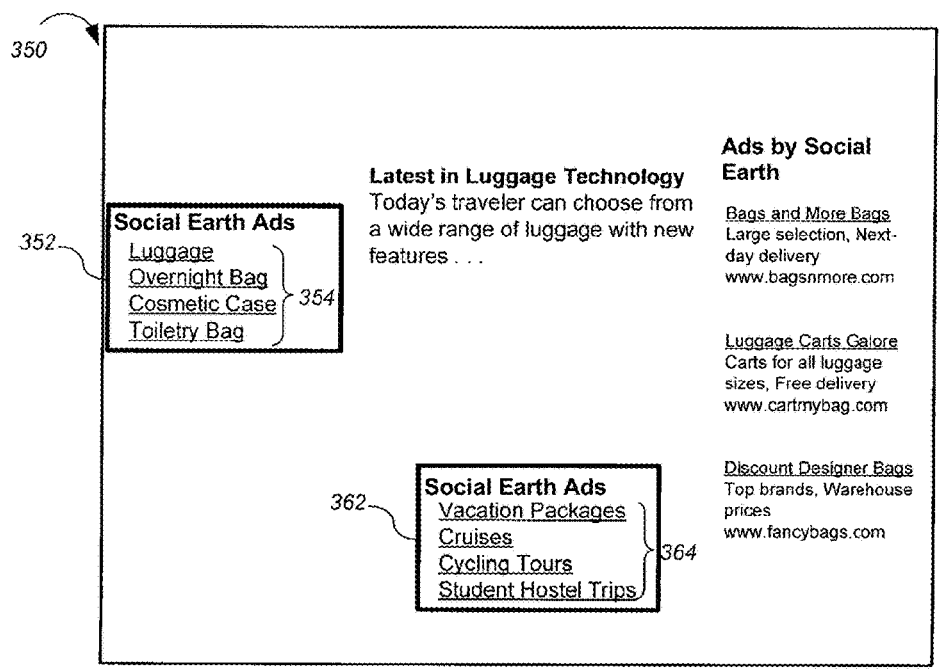
FIG. 27B illustrates an example implementation of multiple related social/geo/promo link promotional data sets with clustered categories provided with web page content.

FIG. 27B illustrates an example implementation 350 of multiple related social/geo/promo link promotional data sets 352, 362 with clustered categories 354, 364 provided with web page content. The link unit 352 includes the following selectable categories 354: luggage, overnight bag, cosmetic case, and toiletry bag. The link unit 362 includes the following selectable categories 364: vacation packages, cruises, cycling tours, and student hostel trips. The categories 354, 364 are related to the content of the web page and are assembled such that the categories in one related social/geo/promo link promotional data set are chosen from the same, similar, categories, while the categories in the other related social/geo/promo link promotional data set are chosen from the same or similar alternative categories. That is, the categories 354 of related social/geo/promo link promotional data set 352 are all containers for travel while the categories 364 of related social/geo/promo link promotional data set 362 are all types of travel. Assembling related social/geo/promo link categories in multiple related social/geo/promo link promotional data sets by similar or diverse categories brings coherency to the presentation of the related social/geo/promo link promotional data sets, allowing a user to better distinguish between available promotional topics and to more easily find a particular category of interest.

Figure 28:
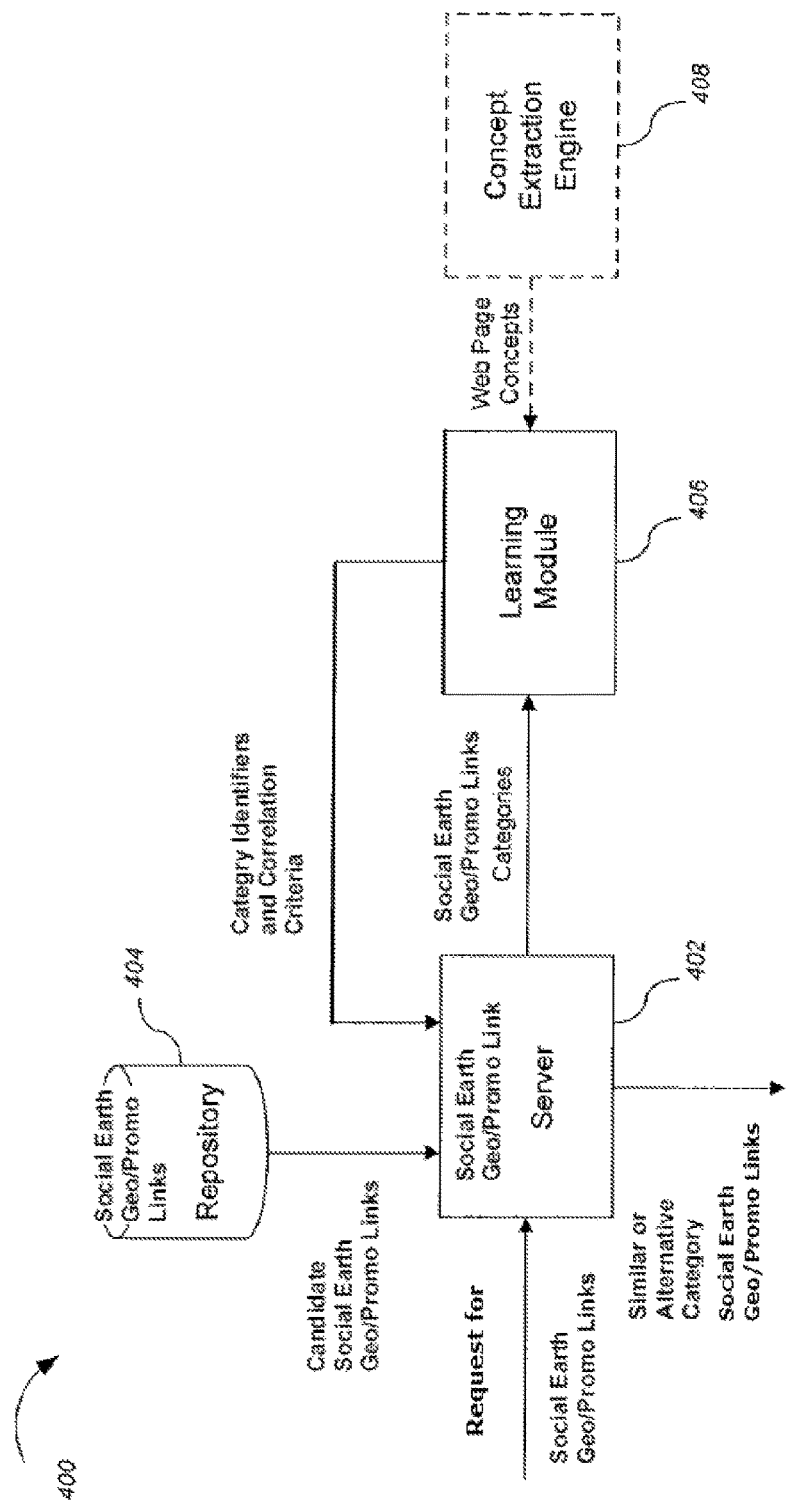
FIG. 28 is a block diagram of an example implementation of an advertising management system of FIG. 1 that provides related social/geo/promo link promotional data sets with correlated broad and alternative categories.

FIG. 28 is a block diagram of an example implementation 400 of an advertising management system 108 of FIG. 25 that provides related social/geo/promo link promotional data sets with correlated broad and alternative categories. The advertising management system 108 includes a social/geo/promo link server 402, a social/geo/promo link repository 404, and a learning module 406. In some implementations, the system 108 also includes a concept extraction engine 408. In some implementations, the ad server in system 108 also serves related social/geo/promo links.

The social/geo/promo link server 402 receives requests for related social/geo/promo link promotional data sets. In some implementations, the social/geo/promo link server 402 receives related social/geo/promo link promotional data set requests from one or more content servers. A social/geo/promo link promotional data set request can accompany an ad request, where both the ad and social/geo/promo link promotional data set are to be displayed with the same content. In some implementations, a content server sends a combined request for both ads and social/geo/promo link promotional data sets. The related social/geo/promo link promotional data set request may include a number (e.g., one, two, or three) of related social/geo/promo link promotional data sets desired and the number (e.g., four or five) of related social/geo/promo link promotional data set categories for each related social/geo/promo link promotional data set. The related social/geo/promo link promotional data set request may also include content request information. For example, the information can include the content itself or one or more categories or keywords corresponding to the content or the content request.

The social/geo/promo link server 402 receives candidate related social/geo/promo links from a social/geo/promo link repository 404. In some implementations, the candidate related social/geo/promo links are determined based on keywords corresponding to the requested content with which the related social/geo/promo link promotional data set is to be displayed. Other matching techniques can be used.

The social/geo/promo link server 402 identifies categories for the candidate related social/geo/promo links and forwards the categories to a learning module 406. In some implementations, the categories are the same as the candidate related social/geo/promo links. In some implementations, the candidate related social/geo/promo links are a subset of the categories that can be selected for social/geo/promo link promotional data sets displayed with requested content.

In some implementations, the related social/geo/promo link promotional data set request can include an identifier (e.g., the Uniform Resource Locator (URL)) of the webpage with the requested content with which the related social/geo/promo link promotional data set is to be displayed. Using the identifier, the web page can be crawled to determine one or more concepts evoked by the content of the web page. An optional concept extraction engine 408 can extract concepts from the web page content. The web page concepts can be forwarded to the learning module 406. Some examples of concept extraction engines are described in U.S. Pat. No. 7,231,393 and U.S. 2004/0068697, each of which is incorporated by reference herein in its entirety.

The learning module 406 receives related social/geo/promo link categories from the social/geo/promo link server 402. The learning module 406 generates or retrieves one or more category identifiers associated with each related social/geo/promo link category. As described above, each related social/geo/promo link category can be classified under one or more categories. In some implementations, the category identifiers are predetermined. For example, the category identifiers for the related social/geo/promo link categories can be determined before a related social/geo/promo link promotional data set request is served. In some implementations, the category identifiers are pre-computed for the keywords for ads in the social/geo/promo link repository 404.

In some implementations, the learning module 406 also receives web page concepts from the concept extraction engine 408. Web page concepts can also be classified under one or more categories. Category identifiers for the web page concepts can be determined when a related social/geo/promo link promotional data set request is received.

The learning module 406 computes one or more correlation criteria for each related social/geo/promo link category. A correlation measure provides a measure of how "close" or "distant" in correlation two category identifiers are, where the pair of category identifiers corresponds to two related social/geo/promo link categories. If category identifiers are determined for the web page concepts, correlation criteria can also be computed between a category identifier associated with a related social/geo/promo link category and a category identifier associated with one of the web page concepts.

In some implementations, the correlation measure can be computed using statistics accumulated over a large set of documents (e.g., web pages). For example, the number of instances of a document evoking two category concepts can be determined. The number of instances can be used as a heuristic to measure the correlation between the two categories. That is, the lamer the number of instances, the more likely the two categories are similar. Techniques for associating documents and co-occurring category concepts are described in U.S. Patent Publication No. 2006/0242013 A1, filed Oct. 26, 2006, for "Suggesting Targeting Information for Ads, Such as Websites and/or Categories of Websites for Example," which published patent application is incorporated by reference herein in its entirety. The correlation measure is further discussed below.

The social/geo/promo link server 402 receives from the learning module 406 one or more correlation criteria for each related social/geo/promo link category. In some implementations, the social/geo/promo link server 402 also receives the category identifiers from the learning module 406. The social/geo/promo link server 402 generates the same, similar, broad or alternative, social/geo/promo link categories based on the correlation criteria of the candidate social/geo/promo link categories. The same, similar, broad or alternative, social/geo/promo link categories are organized into one or more related social/geo/promo link promotional data sets which can be provided by the system 108 to the content server to be combined with the requested content.

In some implementations, the social/geo/promo link server 402 provides the functionality of the learning module 406, including generation or retrieval of the category identifiers and the correlation criteria. In these implementations, the learning module 406 is not part of system 108.

Figure 29:
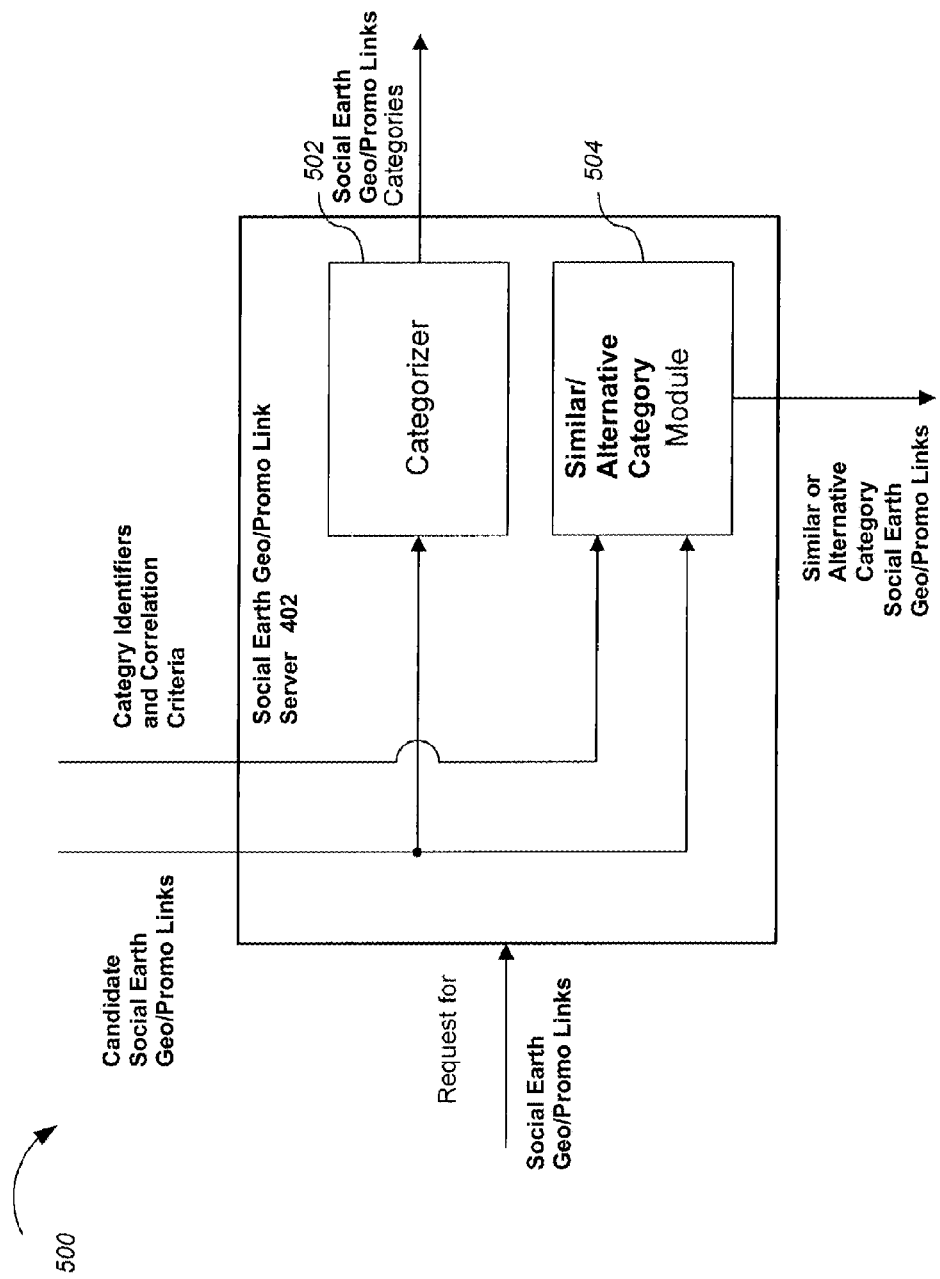
FIG. 29 is a block diagram of an example implementation of the social/geo/promo link server of FIG. 4.

FIG. 29 is a block diagram of an example implementation 500 of the social/geo/promo link server 402 of FIG. 4. The social/geo/promo link server 402 includes a categorizer 502 and a duster/anti-cluster module 504. The social/geo/promo link server 402 receives requests for related social/geo/promo link promotional data sets. The related social/geo/promo link promotional data set request may include a number of related social/geo/promo link promotional data sets desired and the number of related social/geo/promo link categories per related social/geo/promo link promotional data set. The number of related social/geo/promo link promotional data sets desired can be used to determine whether related social/geo/promo link categories should be same, similar, broad or alternative, clusters or groupings.

The social/geo/promo link server 402 receives candidate related social/geo/promo links. In some implementations, the candidate related social/geo/promo links are ordered by relevance to the requested content. The social/geo/promo link server 402 can receive the ordered list of candidate social/geo/promo links. Alternatively, the social/geo/promo link server 402 can receive an unordered list, and the social/geo/promo link server 402 can order the candidate social/geo/promo links by relevance to the requested content using a relevance measure.

The categorizer 502 of the social/geo/promo link server 402 identifies categories for the candidate related social/geo/promo links. In some implementations, the categories are the same as the related social/geo/promo links, and the categorizer 502 is not included in the social/geo/promo link server 402. The social/geo/promo link server 402 receives one or more correlation criteria for each category. In some implementations, the social/geo/promo link server 402 also receives the one or more category identifiers associated with each category. In some implementations, category identifiers are also received for the web page concepts and are used to cluster or anti-cluster social/geo/promo link categories.

The candidate social/geo/promo links and the correlation criteria are provided as inputs to the cluster/anti-cluster module 504. If the request is for a single related social/geo/promo link promotional data set, the classification of the categories by characteristics (also called categories) is used to improve the diversity of categories coverage (alternative category clustering) of the related social/geo/promo link categories displayed in the single related social/geo/promo link promotional data set. If the request is for multiple related social/geo/promo link promotional data sets, the classification of the related social/geo/promo link categories by categories is used to cluster related social/geo/promo link categories in one related social/geo/promo link promotional data set in the same category or similar categories while those in other related social/geo/promo link promotional data sets are from different categories.

Figure 30:
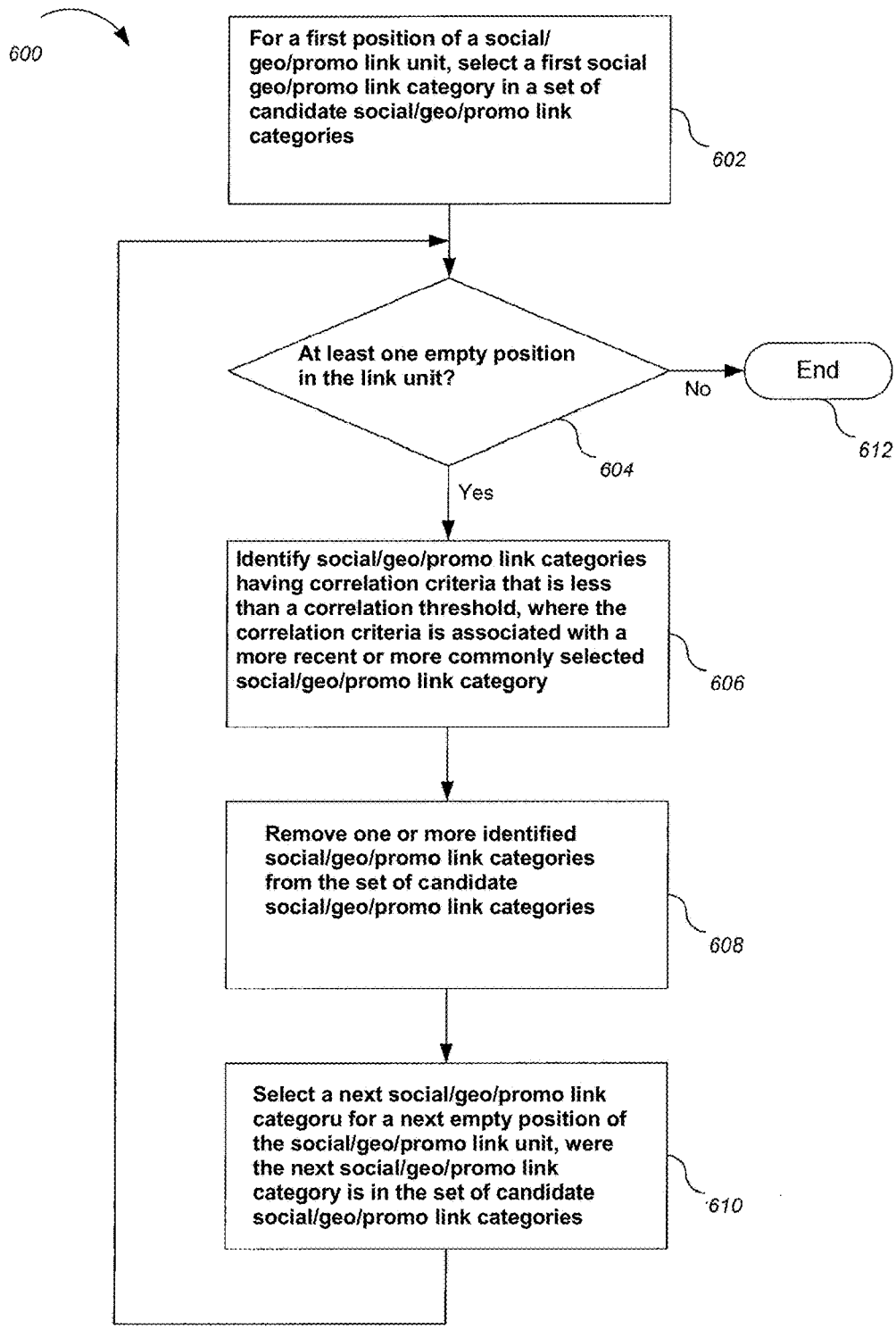
FIG. 30 is a flow diagram of an example process for providing a related social/geo/promo link promotional data set with correlated broad categories.

FIG. 30 is a flow diagram of an example process 600 for providing a related social/geo/promo link promotional data set with anti-clustered categories. The process 600 begins by selecting a first social/geo/promo link category for a first position of the social/geo/promo link promotional data set, where the first social/geo/promo link category is in a set of candidate social/geo/promo link categories (602). In some implementations, the set of candidate social/geo/promo link categories is ordered according to the relevance of the social/geo/promo link categories to the requested content of the web page with which the related social/geo/promo link promotional data set is to be displayed. For an ordered set of candidate social/geo/promo link categories, the top relevance scoring social/geo/promo link category is selected for the first position of the social/geo/promo link promotional data set. In some implementations, selected social/geo/promo link categories are removed from the set of candidate social/geo/promo link categories.

As an example, the set of candidate social/geo/promo link categories can be ordered by relevance to the requested content of a web page. For a set with the following order: A, B, C, D, . . . , L, category A can be chosen as the most relevant social/geo/promo link category for the first position of the social/geo/promo link promotional data set.

The process 600 determines whether there is at least one empty (e.g., unfilled) position remaining in the related social/geo/promo link promotional data set (604). In some implementations, the link unit request can include the number of social/geo/promo link categories desired for the related social/geo/promo link promotional data set. If there are a predetermined number (e.g., zero) of empty positions remaining in the related social/geo/promo link promotional data set, the process 600 ends (612). Generally, a related social/geo/promo link promotional data set is displayed with multiple social/geo/promo link categories. If there is at least one empty position remaining in the related social/geo/promo link promotional data set, social/geo/promo link categories having a correlation measure that is less than a correlation threshold are identified, where the identified social/geo/promo link categories have one or more correlation criteria associated with the most recently selected social/geo/promo link category (606). The identified social/geo/promo link categories are in the set of candidate social/geo/promo link categories. In some implementations, the correlation threshold can be predetermined.

In some implementations the correlation measure can indicate the "distance" between the category identifiers of two social/geo/promo link categories. That is, the smaller the correlation measure, the smaller the "distance" between the category identifiers, and the more similar the category identifiers are. For this type of correlation measure, the larger the correlation measure, the less similar the category identifiers are. Identifying categories that have correlation criteria that are less than a correlation threshold means identifying the categories with a category identifier that is close (within the correlation threshold) to a category identifier of the most recently selected category.

Alternatively, in some implementations, the correlation measure can indicate the "closeness" of the category identifiers of two social/geo/promo link categories. That is, the larger the correlation measure, the more similar the category identifiers are. For this type of correlation measure, the process 600 would identify the categories having a correlation measure that is greater than a correlation threshold.

Continuing the example, if the requested social/geo/promo link promotional data set has three positions and only the first position is filled (by category A), the social/geo/promo link categories having a correlation measure that is less than a correlation threshold are identified, where the correlation measure is a measure of how "distant" the identified category is to category A. For example, the categories B, C, E, F, and H can be identified as being too close to category A if one of the correlation criteria (associated with category A) of each of these categories is found to be less than the correlation threshold.

In some implementations, a given social/geo/promo link category in the set of candidate social/geo/promo link categories can have a separate correlation measure for at least one pair-wise combination of a category identifier of the given social/geo/promo link category and a category identifier of the most recently selected social/geo/promo link category. If a given social/geo/promo link category in the set of candidate social/geo/promo link categories has multiple correlation criteria associated with the most recently selected social/geo/promo link category, a composite correlation measure can be determined for the given social/geo/promo link category. The composite correlation measure can be a maximum, a minimum, or a combination (e.g., a weighted combination) of the separate correlation criteria for the given social/geo/promo link category. In these implementations, the candidate social/geo/promo link categories which are too close to previously selected social/geo/promo link categories can be identified by comparing the composite correlation criteria of the candidate categories to the correlation threshold.

Consider the case, in the above example, where each social/geo/promo link category (A through L) has two category identifiers. Category B has a separate correlation measure for each pair-wise combination of one of category B's two category identifiers ($VI_{B1}$ and $VI_{B2}$) and one of category A's two category identifiers ($VI_{A1}$ and $VI_{A2}$). That is, category B has four separate correlation criteria ($SM_{B1,A1}$, $SM_{B1,A2}$, $SM_{B2,A1}$, and $SM_{B2,A2}$), where $SM_{Bi,Aj}$ is the separate correlation measure for the pair-wise combination of category B's category identifier $VI_{Bi}$ and category A's category identifier $VI_{Aj}$. A composite correlation measure $CSM_{B,A}$ can be determined for category B by taking the maximum, the minimum, or a combination of the separate correlation criteria $SM_{B1,A1}$, $SM_{B1,A2}$, $SM_{B2,A1}$, and $SM_{B2,A2}$. To find the correlation measure that indicates the most similar category identifiers when the correlation measure represents "distance," the composite correlation measure $CSM_{B,A}$ can be set to the minimum of the correlation criteria. That is, $CSM_{B,A} = \min_{i,j}\{SM_{Bi,Aj}\}$. A composite correlation measure can be computed for each social/geo/promo link category in the set of candidate social/geo/promo link categories (e.g., categories B through L) with multiple correlation criteria associated with category A.

Alternatively, to find the correlation measure that indicates the most similar category identifiers when the correlation measure represents "closeness," the composite correlation measure $CSM_{B,A}$ can be set to the maximum of the correlation criteria. That is, $CSM_{B,A} = \max_{i,j}\{SM_{Bi,Aj}\}$. For this type of composite correlation measure, the process 600 would identify the categories having a composite correlation measure that is greater than a correlation threshold.

In the example described above, the categories B, C, E, F, and H are identified as being too close to category A. These candidate categories can be identified by comparing the composite correlation criteria with the correlation threshold. In this example, $CSM_{B,A}$, $CSM_{C,A}$, $CSM_{E,A}$, $CSM_{F,A}$, and $CSM_{H,A}$ are less than the correlation threshold, where the separate correlation criteria represent "distance."

Social/geo/promo link categories which are identified are removed from the set of candidate social/geo/promo link categories (608). That is, social/geo/promo link categories that are too similar to the most recently selected social/geo/promo link category are eliminated from further consideration based on the correlation criteria.

In the above example, identified categories B, C, E, F, and H are removed from the set of candidate social/geo/promo link categories as being too close in correlation to category A. After the identified categories are removed, the set of candidate social/geo/promo link categories includes categories D, G, I, J, K, and L. A next social/geo/promo link category is selected for the next empty (e.g., unfilled) position of the social/geo/promo link promotional data set, where the next social/geo/promo link category is selected from the set of candidate social/geo/promo link categories (610). For an ordered set of candidate social/geo/promo link categories, the next most relevant social/geo/promo link category remaining in the set is selected for the next position of the social/geo/promo link promotional data set.

Continuing the example, category D is selected to fill the next (e.g., second) position of the social/geo/promo link promotional data set. Category D is selected, because category D has the highest relevance score of the remaining categories in the set of candidate social/geo/promo link categories. After category D is selected, the set of candidate social/geo/promo link categories includes categories G, I, J, K, and L.

In some implementations, when the set of candidate social/geo/promo link categories is ordered according to relevance, the correlation criteria for a particular social/geo/promo link category are not compared to the correlation threshold unless the preceding social/geo/promo link categories in the ordered set have already been selected or eliminated. That is, after the first most relevant social/geo/promo link category is selected, the second social/geo/promo link category in the ordered set is selected if the second social/geo/promo link category is not too similar to the first social/geo/promo link category. If the second social/geo/promo link category is too similar, the next social/geo/promo link category in the ordered set is checked for correlation. The process continues until the social/geo/promo link positions of the social/geo/promo link promotional data set are filled. Referring to the above example where category A is selected for the first position and categories B and C are eliminated due to correlation to category A, category D is checked for correlation and selected to fill the next (e.g., second) position of the social/geo/promo link promotional data set. Categories E through L are not checked for closeness to category A.

If there is at least one empty position remaining in the related social/geo/promo link promotional data set (604), the process repeats steps 606 through 610. The elimination and selection process repeats until a number (e.g., all) of the social/geo/promo link positions for the related social/geo/promo link promotional data set have been filled. If the number (e.g., all) of the positions of the related social/geo/promo link promotional data set have been filled, the process 600 ends (612).

In the above example, only two of the three social/geo/promo link positions have been filled, so the elimination and selection process repeats for the remaining empty social/geo/promo link position. Categories G, I, and J can be identified as being too close in correlation to category D (e.g., the most recently selected social/geo/promo link category) by comparing the composite correlation measure (associated with category D) of these categories to the correlation threshold. The identified categories G, I, and J are eliminated from the set of candidate social/geo/promo link categories, and the set then includes categories K and L. Category K is selected to fill the third and final social/geo/promo link position of the related social/geo/promo link promotional data set.

In some implementations, correlation criteria of social/geo/promo link categories can be used to reorder the set of candidate social/geo/promo link categories. That is, instead of or in addition to using the correlation criteria to eliminate social/geo/promo link categories, correlation criteria can be used to boost or lower the order position of a social/geo/promo link category in the ordered set of candidate social/geo/promo link categories. For example, the boosting or lowering can be based on the correlation measure of a social/geo/promo link category relative to the correlation criteria of other social/geo/promo link categories. In this implementation, the ordering of the set of candidate social/geo/promo link categories can account for both relevance to requested content and correlation to previously selected social/geo/promo link categories.

Figure 31:
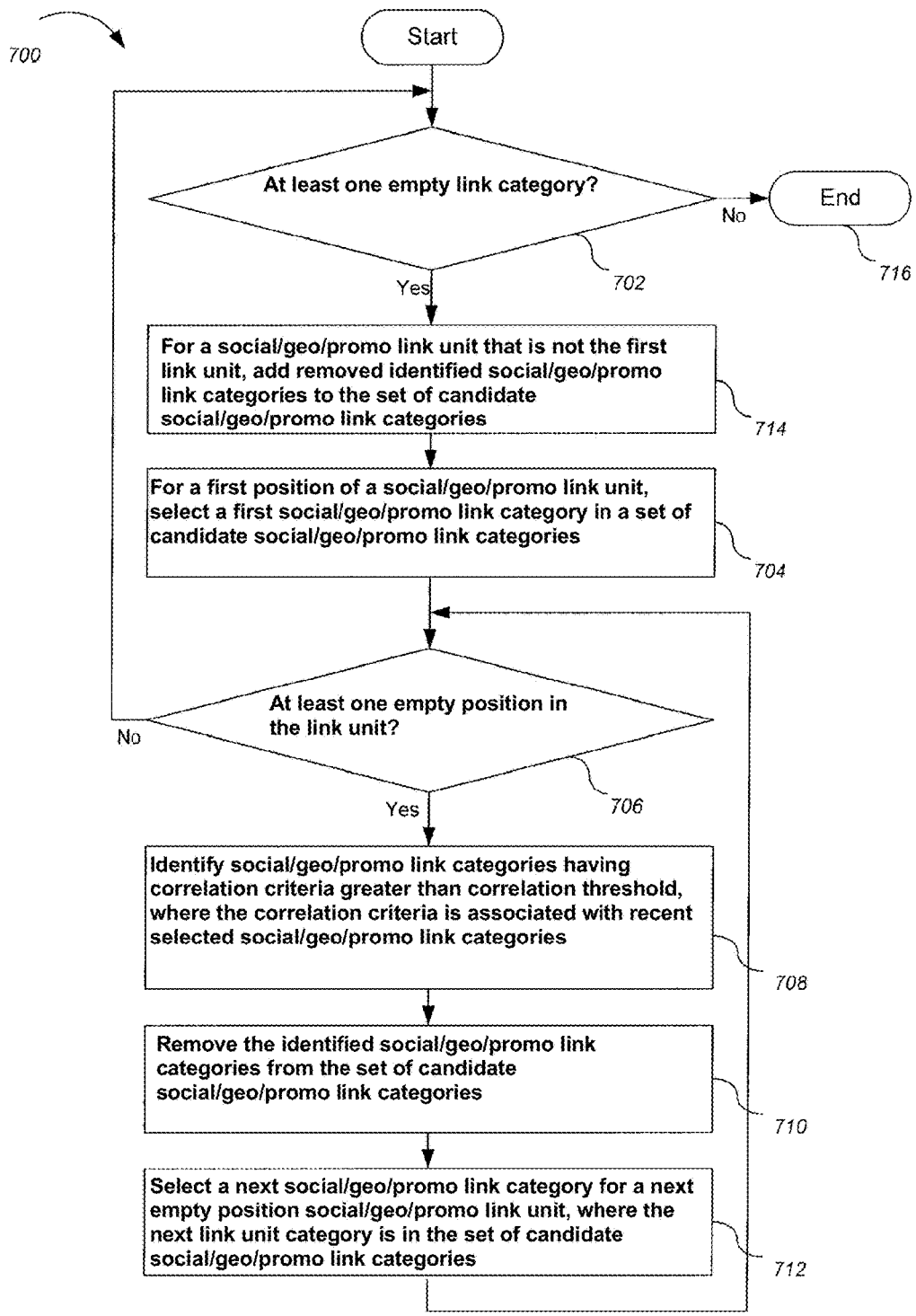
FIG. 31 is a flow diagram of an example process for providing multiple related social/geo/promo link promotional data sets with clustered categories.

FIG. 31 is a flow diagram of an example process 700 for providing multiple related social/geo/promo link promotional data sets with clustered categories. The process 700 begins by determining whether there is at least one empty (e.g., unfilled) related social/geo/promo link promotional data set (702). In some implementations, the related social/geo/promo link promotional data set request can include the number of related social/geo/promo link promotional data sets desired. If there are a predetermined number (e.g., zero) of empty related social/geo/promo link promotional data sets remaining, the process 700 ends (716).

At the start of the process 700, the requested social/geo/promo link promotional data sets have not been filled, so the process 700 continues to the next step to fill the first requested social/geo/promo link promotional data set. A first social/geo/promo link category is selected for a first position of the social/geo/promo link promotional data set, where the first social/geo/promo link category is in a set of candidate social/geo/promo link categories (704). In some implementations, the set of candidate social/geo/promo link categories is ordered according to the relevance of the social/geo/promo link categories to the requested content of the web page with which the related social/geo/promo link promotional data sets are to be displayed. For an ordered set of candidate social/geo/promo link categories, the top relevance scoring social/geo/promo link category is selected for the first position of the first social/geo/promo link promotional data set.

As a second example, the ordered set can have the following order: A, B, C, D, . . . , L. Category A can be chosen as the most relevant social/geo/promo link category for the first position of the first social/geo/promo link promotional data set.

The process 700 determines whether there is at least one empty (e.g., unfilled) position remaining in the related social/geo/promo link promotional data set (706). In some implementations, the related social/geo/promo link promotional data set request can include the number of social/geo/promo link categories desired for each related social/geo/promo link promotional data set.

If there is at least one empty position remaining in the related social/geo/promo link promotional data set, social/geo/promo link categories having a correlation measure that is greater than a correlation threshold are identified, where at least one identified social/geo/promo link category has one or more correlation criteria associated with the most recently selected social/geo/promo link category (708). The identified social/geo/promo link categories are in the set of candidate social/geo/promo link categories. In some implementations, the correlation threshold can be predetermined. Because the social/geo/promo link categories within a social/geo/promo link promotional data set are being clustered, the social/geo/promo link categories with correlation criteria which are greater than the correlation threshold are identified. That is, for a correlation measure that indicates "distance," the social/geo/promo link categories with a correlation measure greater than the correlation threshold are the categories that are too diverse to be clustered with the most recently selected social/geo/promo link category.

Alternatively, in some implementations, the correlation measure can indicate the "closeness" of the category identifiers of two social/geo/promo link categories. For this type of correlation measure, the process 700 would identify the categories having a correlation measure that is less than a correlation threshold.

In some implementations, a given social/geo/promo link category in the set of candidate social/geo/promo link categories can have a separate correlation measure for at least one pair-wise combination of a category identifier of the given social/geo/promo link category and a category identifier of the most recently selected social/geo/promo link category. A composite correlation measure can be determined for the given social/geo/promo link category, for example, by taking a maximum, a minimum, or a combination (e.g., a weighted combination) of the separate correlation criteria for the given social/geo/promo link category. In these implementations, the social/geo/promo link categories which are too diverse can be identified by comparing the composite correlation criteria to the correlation threshold.

Continuing the second example, if the first social/geo/promo link promotional data set has three positions and only the first position is filled (by category A), the social/geo/promo link categories having a composite correlation measure that is greater than a correlation threshold are identified, where the correlation measure is a measure of how "distant" the identified category is to category A. For example, the categories D, G, I, J, and K can be identified as being too diverse relative to category A if the composite correlation measure (associated with category A) of these categories is found to be greater than the correlation threshold. Social/geo/promo link categories which are identified are removed from the set of candidate social/geo/promo link categories (710). That is, social/geo/promo link categories that are too diverse relative to the most recently selected social/geo/promo link category are eliminated from further consideration based on the correlation criteria.

In the above second example, identified categories D, G, I, J, and K are removed from the set of candidate social/geo/promo link categories as being too diverse relative to category A. After the identified categories are removed, the set of candidate social/geo/promo link categories includes categories B, C, E, F, H, and L.

A next social/geo/promo link category is selected for the next empty (e.g., unfilled) position of the social/geo/promo link promotional data set, where the next social/geo/promo link category is selected from the set of candidate social/geo/promo link categories (712). For an ordered set of candidate social/geo/promo link categories, the next most relevant social/geo/promo link category remaining in the set is selected for the next position of the social/geo/promo link promotional data set.

Continuing the second example, category B is selected to fill the next (e.g., second) position of the first social/geo/promo link promotional data set. Category B is selected, because category B has the highest relevance score of the remaining categories in the set of candidate social/geo/promo link categories. After category B is selected, the set of candidate social/geo/promo link categories includes categories C, E, F, H, and L.

In some implementations, when the set of candidate social/geo/promo link categories is ordered according to relevance, the correlation criteria for a particular social/geo/promo link category are not compared to the correlation threshold unless the preceding social/geo/promo link categories in the ordered set have already been selected or eliminated. Referring to the second example where category A is selected for the first position, category B is checked for correlation and selected to fill the next (e.g., second) position of the social/geo/promo link promotional data set. Categories C through L are not checked for closeness to category A.

If there is at least one empty position remaining in the related social/geo/promo link promotional data set (706), the process repeats steps 708 through 712. The elimination and selection process repeats until a number (e.g., all) of the social/geo/promo link positions for the related social/geo/promo link promotional data set have been filled.

In the above second example, only two of the three social/geo/promo link positions have been filled, so the elimination and selection process repeats for the remaining empty social/geo/promo link position. In this example iteration, none of the categories are identified as being too distant relative to category B (e.g., the most recently selected social/geo/promo link category), so none of the categories are eliminated from the set of candidate social/geo/promo link categories. The set still includes categories C, E, F, H, and L. Category C is selected to fill the third and final social/geo/promo link position of the first related social/geo/promo link promotional data set. The set of candidate social/geo/promo link categories then consists of categories E, F, H, and L.

If a number (e.g., all) of the positions of the related social/geo/promo link promotional data set have been filled, the process 700 returns to step 702. Again, the process 700 determines whether there is at least one empty (e.g., unfilled) related social/geo/promo link promotional data set remaining (702). Consider the case, in the second example, where two related social/geo/promo link promotional data sets are requested. Because only the first related social/geo/promo link promotional data set has been filled, the process 700 repeats for the second requested social/geo/promo link promotional data set.

Before continuing to step 704, the process 700 adds a number (e.g., all) of the removed identified social/geo/promo link categories to the set of candidate social/geo/promo link categories (714). This step is not performed for the first social/geo/promo link promotional data set, because before the first social/geo/promo link position is filled in the first social/geo/promo link promotional data set, social/geo/promo link categories have not been removed from the set of candidate social/geo/promo link categories. For later social/geo/promo link promotional data sets, previously removed social/geo/promo link categories are added back to the set of candidate social/geo/promo link categories because, although these categories were too dissimilar to be included in the cluster for the first social/geo/promo link promotional data set, the social/geo/promo link categories for the other social/geo/promo link promotional data sets are chosen to be diverse relative to the social/geo/promo link categories selected for the first social/geo/promo link promotional data set.

Referring to the second example, the social/geo/promo link categories D, G, I, J, and K which were previously removed during the filling of the first social/geo/promo link promotional data set are added back to the set of candidate social/geo/promo link categories. That is, the set of candidate social/geo/promo link categories then includes categories E, F, H, and L (which had not been removed) and the added categories D, G, I, J, and K.

The process 700 repeats steps 704 through 714 until there are a predetermined number (e.g., zero) of remaining empty social/geo/promo link promotional data sets to be filled. If there are a predetermined number (e.g., zero) of empty social/geo/promo link promotional data sets remaining, the process 700 ends (716). The features described can be implemented in digital electronic circuitry, or in computer hardware, firmware, software, or in combinations of them. The features can be implemented in a computer program product tangibly embodied in an information carrier, e.g., in a machine-readable storage device or in a propagated signal, for execution by a programmable processor; and method steps can be performed by a programmable processor executing a program of instructions to perform functions of the described implementations by operating on input data and generating output.

The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language (e.g., Objective-C, Java), including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network. The relationship of client and server arises by virtue of computer programs running on the respective computers and having a client-server relationship to each other.

Online Gambling:

Unless specifically stated otherwise, as apparent from the following discussions, it is appreciated that throughout the specification discussions utilizing terms such as "processing", "computing", "calculating", "determining", or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

Furthermore, usage of the word "gaming", "gambling" or the like, refer to either land-based or online events, activities, games, sessions, rounds, hands, rolls and operations etc., including video games, Web games, casino games, card games, dice games, sporting events and/or any other gaming or gambling events. In addition, the word "bet", "bid" or the like, refer to any type of wagers, bets or gaming ventures that are placed on random events, whether of monetary or non-monetary value.

The platforms, processes and displays presented herein are not inherently related to any particular computer or other apparatus. Various general-purpose computing systems and networking equipment may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the present invention as described herein.

In the following detailed description, numerous specific details are set forth in order to provide a thorough understanding of the present invention. However, it will be understood by those skilled in the art that the present invention may be practiced without these specific details. In other instances, well-known methods, procedures and components have not been described in detail so as not to obscure the present invention.

The present invention provides a monetary or non-monetary online gaming platform, for enabling online games, gambling, events, activities and/or entertainment, that overcomes the limitations of existing land based and online gaming systems. The present invention provides a platform and method that may separate the actual event, produced by an event generator, and a Web server (i.e. transaction server), that may communicate with both a player and one or more event generators and may processes the event data such that a player may place bets on the outcome of one or more events produced by one or more event generators. This separation, together with the integration of additional server components, may enable a network-based game management center, (hereinafter referred to as a virtual House" or just "House" to monitor the results of events from a plurality of event generators in real time, and manage data streams from one or more event generators simultaneously, whether the events are land-based and/or network-based (virtual). One or more players, or groups of players, such as consumer groups, may monitor, analyze and play one or more events related to one or more Event generators.

According to at least one embodiment of the present invention, an event monitor such as a digital reader may be connected, associated with, and or otherwise collect data from one or more event generators and may digitize and/or transmit to the transaction server data indicative of events which may occur on the one or more event generators. According to further embodiment of the present invention, image and/or video information, digital or analog, may be collected from or near an event generator, and a pattern recognition unit may analyze the image and/or video information from one or more event generators such that the pattern recognition unit may produce a signal indicative of the events which may have occurred on the one or more event generators. Image and/or video information may be collected and transmitted via analog and/or digital communication channels. The image and/or video information may be collected by a video camera, web-cam, still digital camera, or any other suitable device or system known today or to be devised in the future.

According to some embodiments of the present invention, a person or persons may monitor a game event generator and may manually enter and/or transmit game event data to the transaction server. According to some embodiments, the image and/or video information collection device (e.g. video camera) may be controlled by a computer associate with the pattern recognition unit such that the device is positioned and focused onto those areas of the one or more event generators most relevant at a given moment. For example, during the time bets are places on a roulette table, the image/video collection device may be positioned so as to acquire clear images of the roulette table's bet placing area, and during the spin of the ball, the camera may be repositioned to get a clear view of the ball and the number where it lands.

There is provided, in accordance with at least one embodiment of the present invention, an application, system and method for automated conversion of image and/or video based gaming data, or data from a reader, digital or analog, into usable statistical data, thereby enabling one or more players to participate using both historic and real time gaming information from one or more games and/or event generators, whether the games are online or offline (e.g. land-based). According to further embodiments of the present invention, statistics may be compiled from game event-data collected, whether the data was collected manually through automated means such as a digital reader, video collection device, or the like.

As part of some further embodiments of the present invention, part or all of a specific players playing history may be recorded and statistics relating to the players gaming activities may be compiled and presented to the player on demand. A player may use these statistics in making future gaming decisions or developing a gaming/betting strategy.

There is also provided, in accordance with at least one embodiment of the present invention, a transaction server or system for players to place bets based on the outcomes of one or more specific games, whether the games are physical or virtual. These bets may be based on standard game results or on alternative elements or derivatives related to the game progress or results. For example, a player may bet on future spins of a roulette table, a set of future spins on a roulette table, or on one or more sets of wins on one or more sets of roulette tables, or any other combination of game events occurring on the same or independent game Event generators. It should be understood by one or ordinary skill in the art the present invention is not limited to roulette, but may apply to any games or game event generators, presently known or to be devised in the future, for example, but without limitation: a computer application simulating a slot machine, a real slot machine, a computer application simulating a chance-based game, a real chance-based game, a computer application simulating a blackjack game, a real blackjack game, a computer application simulating a baccarat game, and a real baccarat game.

According to some embodiments of the present invention, a player may instruct a virtual betting agent to monitor one or more event generators and upon one or a set of events taking places to place one or more bets associated with one or more game event generators, online casino, online sports betting, NBA, college basketball lines, football, soccer. According to further embodiments of the present invention, a player may place a bet on some combination of game events occurring on one or more game event generators, either over some period of time or over some number of games or game events.

According to some embodiments of the present invention, the transaction server may include a risk management unit which may stop or terminate the acceptance of bets from players on one or more game events associated with one or more event generators when it is determined that exposure to potential losses by the House exceeds some threshold value. Different risk management units may apply to different groups of player and different groups of event generators.

A monetary or non-monetary online gaming platform or system according to at least one embodiment of the present invention, for enabling online games, gambling, events, activities and/or entertainment. A Transaction server (TS) operationally connected to at least one database. The database may store player account data, game data for each gaming event (from all the Event generators, which are described below), player activity and history data, player participation data, player preferences data, House data, and any other data that is relevant for performing the operations of the platform. The TS is also operationally connected to at least one Event generator ("EG"), such as a land-based (physical) or online (virtual) video game, computer game, chess game, bingo game, roulette table, blackjack table, one-arm bandit machine or sporting game or any other game, entertainment event and/or gambling event that typically produces a random or indefinite result that may be bet or bid on. An EG may include a mechanism for maintaining, monitoring, implementing or otherwise generating events, as well as a mechanism for enabling transmission of event data relating to individual events (games/tables/machines etc.) to the TS. This data may be in the form of data signals that transmit game results, audio streams; images, video streams of actual event recordings, or any other data format that represents monitored events. The EG may include data reading and transmission tools, devices or systems to transmit event data. Such tools may include electronic or mechanical mechanisms to read analog and/or digital data generated by the EG, and transfer this data to the TS. Other examples of such a data reading devices may include optical readers, commonly known in the art, that are typically used in roulette tables, and or Video cameras. A video camera or any alternative reader may transmit data digitally either over a digital channel or over an I.P. network using digital packets.

The TS may be connected to an EG through a wireline and/or is wireless data network, such as the Internet, a company Intranet, and/or Extranet, using communications mediums including cable TV networks, satellite networks and cellular communication networks. Such network connectivity may enable interactive communications between players, the platform and the Event generator(s). According to an alternative embodiment of the present invention, the EG(s) may be geographically connected to the TS, such as in the case where the EG(s) are virtual (computerized) EG(s) connected to the TS. Players according to some embodiments of the present invention, may interact with the platform using any type of computing and/or communication device, including personal computers, PDAs, mobile telephones, interactive TV, wearable computers, notebook computers, etc.

Transaction server ("TS"), according to some embodiments of the present invention, may provide a platform and system that may separate an actual event, produced by an Event generator, and the server, that communicates and processes the event data (Transaction server). This separation, together with the integration of additional server components, enables the implementation of a virtual House that h monitor the results of events from a plurality of Event generators (in real time), and manage the data from one or more Event generators simultaneously, whether the events that have been generated are land-based and/or virtual. The House subsequently may enable one or more players, or one or more groups of players, such as consumer groups, to monitor, analyze and wager on one or more events produced by one or more EGs simultaneously, whether the events are land-based and/or virtual. The House furthermore may enable one or more players to monitor and interact with one or more external activities, events or gaming sessions (hereinafter referred to as "events"), and "play" these events with the House and/or one or more other players.

The above stated functions of the TS may be achieved by receiving event data from one or more EGs and directing the event data to the various components of the TS, to the database and to the players. Event data may be in the form of data signals representing event results of individual events, or actual recorded data streams, such as video streams, that capture the actual events. In this way players are able to monitor and interact with a plurality of external games or events simultaneously. Players, according to the present invention, may be operating any network enabled interactive computing or communications device. The present invention, furthermore, enables a plurality of players to play against the House, to play against each other, or to form teams whereby the teams may play against each other and/or against the House.

According to some embodiments of the present invention, one player or group of players may bear the financial risk for the bets of another player or group of players. In some games according to some embodiments of the present invention, where players compete against each other, for example poker, each player or team of players may bet against each other. In other games, a player or group of players may act as the House for another group of players, where the group representing the house may benefit from the losses of the second group and may be responsible for payment resulting from the wins of the second group.

The TS may further contain a Network Communication Module (NOM), with server functionality, for receiving and transmitting data between the TS and Event generators (EG), and between the TS and the players. The NCM may include a security layer for enabling (secure) communication of data to and from the TS. The security layer may incorporate relevant security hardware and/or software for protecting data against unauthorized access and keeping the network secure from intruders etc.

The TS may further contain a Game Management Unit (GMU) for managing various operations within the TS, and for enabling interaction between the TS and the EG(s), and between the TS and the players. The GMU may also provide a graphic user interface (GUI) that presents event data to the players and enables the players to monitor progress of relevant events, manage accounts, and give commands to the TS, such as bidding preferences and rules. According to a further embodiment of the present invention, the GUI may provide a split screen that divides the player's display device (which may include a PC monitor, interactive TV screen, cellular phone panel, PDA screen or any other display device) into several windows, each one displaying the progress, results and/or statistical data for at least one individual game. Such a GUI may thereby simultaneously provide viewing, analyzing, bidding and/or managing options to a player over a plurality of games or events.

In addition, the TS may include a Transactions and Finance Unit (TFU), for managing of players accounts as well as authentication and implementation of financing and payouts etc. for players. The TFU may be adapted to support any financial systems and payment methods, including online (Internet based) accounts, credit card accounts, token accounts, ATM accounts, e-bank accounts, or any other player accounts, whether "money" based or "non-money" based accounts. According to at least one embodiment of the present invention, the TFU may request initial deposits (of money or tokens etc.) in a account. The TFU may verify that the deposit satisfies House rules. Examples of such House rules relating to deposits include but are not limited to: minimum and maximum deposit amount, authentication of the depositor identity and eligibility, and any other deposit related rules and/or regulations determined by the House. Once this deposit has been made, the account may then be credited or debited in real time, according to the bids placed by players or payouts received by players. According to this embodiment, each bid or wager made may be verified by the TFU, which queries the player account before confirming a bid, to determine available resources to cover the cost of the bid.

According to a further embodiment of the present invention, the TS may be operationally connected to a player's financial institution, credit/debit card account, e-bank, credit-card processing center or any other financial transaction center. This embodiment may enable player participation with the platform, while the platform is indirectly connected to the player's account. In this way, the TFU may manage each players online account, including, but not limited to, the following functionalities: verifying player identity; authenticating financial ability of players; securing payments for bids; and implementing deposits of payouts etc.

According to an additional embodiment of the present invention, in the case where EG is equipped with multicasting software, the TS may enable a player to configure the platform to route video event data or other game data from: EG directly to at least one player. In this way, video data or alternative gaming data may be received and processed by one or more players, in addition to (but not necessarily by) the TS.

According to a further embodiment of the present invention, the TS may contain a Video Processing Module (VPM) that may enable processing of video data received from EG. This VPM may incorporate a video recognition module together with video data analysis software, thereby enabling the VPM to recognize, filter, format and/or analyze etc. raw video data streams from one or a plurality of EG(s), thereby converting such raw data into player-usable data. Any data recognition and conversion tool may be used for this purpose. An example of such a data recognition and formatting tool has been described in U.S. Pat. No. 6,339,773, which is incorporated by reference in its entirety. The '773 patent describes a tool for converting data from a received format into another chosen format, and subsequent transmitting or embedding the format. Where necessary, this tool also describes reformatting the data in its original format. Such video data from EG may alternatively be acquired directly from a security apparatus such as security video cameras that are located in close proximity to an individual event generator. An example of such video-based security apparatus is the NiceVision series of applications, from NICE Systems Ltd. (NICE Systems Ltd., 8 Hapnina Street, P.O Box 690, 43107 Ra'anana, ISRAEL.

According to a further embodiment of the present invention, the TS may contain an Audio Processing Module (APM) that enables processing of audio data received from EG. This APM may incorporate an audio recognition module together with audio data analysis software, thereby enabling the APM to recognize, filter, format and/or analyze etc. raw audio data streams from a plurality of EG(s), thereby converting such raw data into player-usable data. Any data recognition and conversion tool may be used for this purpose.

According to a further embodiment of the present invention, the TS may contain an Image Processing Module (IPM) that enables processing of image data received from EG. This IPM may incorporate an image recognition module together with audio data analysis software, thereby enabling the IPM to recognize, filter, format and/or analyze etc. raw image data streams from a plurality of EG(s), thereby converting such raw data into player-usable data. Any data recognition and conversion tool may be used for this purpose.

The Transaction server (TS) can act according to at least one additional embodiment of the present invention. The TS may contain a security layer for enabling secure communication of data to and from the TS.

According to an additional embodiment of the present invention, the TS may contain a Statistics and Data Mining Unit (SDMU), for processing event data from a plurality of EG(s) using statistical and data mining tools, such that raw or primary event data is converted to usable data for the players and the platform. There are many tools known in the art for undertaking statistical analysing and data mining on data. Such provision of gaming data may be provided to players on a continual and real-time basis. For example, the SDMU may convert data results from video footage of a roulette game to useful information represented by graphs, tables or summary figures that illustrate winning/losing history and trends etc. in any number of individual gaming or gaming sessions. Another example is the usage by SDMU of data mining tools to analyze gaming results from the "'x" number of recent games or rounds and recognize patterns which may be of use to players. Data recording and data mining applications are well known. Any data recording, data mining, statistical analysis methodology or systems known today or to be devised in the future are applicable to the present invention.

According to another embodiment of the present invention, the TS may contain a Virtual Betting Agent (VBA) for enabling personal configuration of gaming rules and conditions by players. The VBA may be configured, for example, to limit the bid amounts, determine maximum game times, exiting criteria, profit and loss limits and any individual conditions (e.g. in "a" event, do "b") etc. An example of a configuration of loss and profit limits is in the case where the player determines that his/her bids will be placed automatically, until such a time that a determined loss or profit limit has been reached, at which time the player's participation in a game may be automatically discontinued. Further examples of options enabled by the VBA include selecting future bets on games/events and/or derivatives of games/events. For example, a player may use statistics to determine that game has more chance of winning the next 5 rounds than game 2. Player may then place a bet on game 1, against game 2, in relation to the results of the 5 upcoming rounds. Another example is where player desires to bid for a derivative occurrence in game 3, such as on the probability that the next card is "white". In this way, players may configure rules for automatic betting based on actual game results or derivative information from game data, which is derived from analyzing game progress and/or results to develop new sets of events based on the probability of events happening. By enabling the above, the VBA may provide a stock-exchange type of environment of individual events or games, where players may bet on the probabilities of particular events occurring or future successes of individual events, such that each individual event has a kind of market capital that may be bet on.

According to a further embodiment of the present invention, the VBA may enable at least one player to play against at least one other player. This player-to-player option is particularly, but not only, relevant in the context of future bets, wherein players may bet against other players on the chances of selected events transpiring. The TS may monitor the requests and references of a plurality of players, and optionally the combination of two or more players in player groups, thereby providing player(s)-to-player(s) betting opportunities. As in the typical player-House interactions, according to the present invention, betting occurs, results of events are acquired, and payments are implemented by the TS according to the event results.

According to a further embodiment of the present invention, the TS may contain a Risk Management System (RMS), for enabling the House to manage event risks between various events and/or for the House operations as a whole. For example, the House may determine that any EG that has lost more rounds than it has won within any game routine must be discontinued, or that the entire house should cease activity if a certain amount of money has been lost in a determined period. The RMS may enable the House to see the total exposure or risk at any given moment, and to cease activities at any moment, to limit bets or to freeze payouts etc.

An example of steps performed according to at least one process of the present invention can include where user initially registers with the system, and subsequently utilizes the platform front-end (such as a House Website, as presented by the GMU) to select one or more EG(s) for monitoring. The registered player is typically required to log in to the platform, optionally by using a keyword, biometric data or any other necessary private code or key. The player may subsequently view the various available events and/or manage his/her portfolio of gaming events, adding or deleting events in which he or she is playing or monitoring. Once the player determines, for examples which games he or she would like to monitor or play, the relevant data is routed from the selected is EG(s) to the player computing device. This touting of event data is typically implemented by the GMU. The player subsequently receives event data, and optionally historical and statistical data, from selected Event generator(s). He/she then places bet(s) on a future event(s) or ongoing events produced by; either a single or multiple Event generator(s). These bets may be monetary and/or non-monetary: bets. Additionally or alternatively, the player may establish rules and/or conditions for automatic future bets, optionally using a Virtual Betting Agent (VBA), for enabling personal configuration of gaming rules and/or conditions by players. Betting conditions may include, for example, bid ceilings, payout ceilings loss limits, time limits, and particular event limits etc. Particular event limits may include, for example, a rule that in the case of "x" wins by the House, player game is immediately suspended. After bets have been placed, TS may authenticate the user and verify the user bid with the Transaction and, Finance Unit (TU). The bid amount may be extracted from the player's account or credit card etc., to confirm the bid placement.

In either of the above scenarios, the system subsequently tracks events on selected event generator(s) and compares generated (future) events produced by selected event generator(s) against bets placed, to derive bidding results and/or analyze Automatic Betting Requests (ABR). The latter process determines whether the ABR(s) have or have not been met, and thereby indicates whether the player's conditions for the placing of a bid have been met. In the case where the ABR have not been met, the system continues tracking events or games, until such a: time as the ABR are met. When the ABR has been met, the system informs the user, and returns to request confirmation of bid placement by the player. The above event tracking and comparing processes, in the cases where bets have been placed, provide the results for the event(s) that the players have bid on. In the case where the bet is lost, the game ends. In the case where the bet is won, the payout, which may be a monetary or non-monetary payout, is generated, and the payout or game prize, whether monetary or non-monetary, may be transferred from the House to the player account. The player account may be a "money" account or a "non-money" account, where bonuses coupons, incentives etc., may be deposited and/or withdrawn. According to a further embodiment of the present invention, a conversion may be implemented, in any of the above gaming scenarios, to convert non-monetary deposits into monetary deposits, or non-monetary accounts into monetary accounts, or vice Versa. The user may be authenticated before the payout is made (credited) to the user's account. In the case where the user is not authenticated, the user may need to reregister or otherwise prove his/her identity. Alternatively, the player may return directly to step and place one or more additional bets. The results of the event tracking and comparing processes are typically sent to the user, enabling the user to determine if he/she wishes to continue interacting with the particular event played, without having to start from step.

According to at least one embodiment of the present invention, a Risk Management System (RMS) may be provided to enable the House to determine risk limits. The RMS may monitor the results (which relate to the event results) or any other steps in at least one gaming process, from one or more EG(s), to determine whether the House determined risk ceiling has been met for the House in general, or for one or more EG(s). In the case where a determined risk limit has been met, TS may act to discontinue one or more activities, such as player bids or payouts, and/or the general functioning of the House, in accordance with the predetermined rules. In the case where a determined risk limit has not been met, the gaming process may be continued. The RMS may monitor the House risk at any time, during all or any processes. Such an example is but one alternative of where the RMS may implement monitoring.

According to at least one embodiment of the present invention, the receiving of event data and (optionally) historical and statistical data from selected Event generator(s) may be enabled by the Statistics and Data Mining Unit (SDMU). The SDMU may enable processing of event data from a plurality of EG(s) using statistical and data mining tools, such that raw or primary gaming data may be converted to usable data for both the players and the platform.

According to at least one embodiment of the present invention, the establishment of rules and/or conditions for automatic future bets may be implemented using a Virtual Betting Agent (VBA). The VBA may enable personal configuration of gaming rules and/or conditions by players.

According to a further embodiment of the present invention, a method is provided for enabling a land-based House to provide event betting to remote players. According to at least one version of this embodiment, the land-based House may convert at least one existing event or game into an EG. The land-based House may also provide a TS. The EG may subsequently transfers event results to the TS, using a network, whereby the events may be processed and transferred to one or more remote players. The remote players may subsequently interact with the existing events, by monitoring events, analyzing event statistics, and placing bets and/or setting betting conditions and rules using a GUI provided by the TS.

According to a further embodiment of the present invention, a method is provided for enabling a non-monetary gaming platform, wherein the step is ignored. In this case, once the user has placed a bid, the system may automatically track the selected events, without requiring financial verification.

According to a further embodiment of the present invention, a method is provided for enabling the data and/or results of at least one event generator to be at least partially owned, possessed or otherwise purchased by at least one user, whether the user is an individual, group, partnership, company, incorporation or any other entity, and whether the user is participating in the events or not participating in the events. This embodiment thereby enables users to have interests or rights in the data and/or results of at least one Event generator.

A number of implementations have been described. Nevertheless, it will be understood that various modifications may be made. For example, elements of one or more implementations may be combined, deleted, modified, or supplemented to form further implementations. As yet another example, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

Potential Aspects or Elements of the Claimed Invention that can be Optionally Excluded or Negatively Claimed.

The present invention can also in particular claimed embodiments exclude or negatively claim one or more aspect of the following list, e.g., to more particularly recite or exclude embodiments or elements that might occur in cited or other published art. Accordingly, the present invention can optionally exclude, not include, or not provide, one of more, or any combination of, promotion, online coupons, mobile services, assortment of entertainment and entertainment shopping, online casino, online sports betting, NBA, college basketball lines, football, soccer, penny auctions or online auctions, advertisements and affiliate advertising or services for such items as e-commerce, media and entertainment, sports, personal & financial network, real estate, educational services, ancillary services, advertisements, service providers, social networking, social networking communities, social networking activities, social plugins, ad links, promotions, social applications, entertainment shopping, penny auctions or online auctions, advertisements and affiliate advertising or services, social networking, social networking communities, messaging, online communications, user profiles, viewing public & private user profiles, online dating, gaming, and/retail stores, virtual communities and virtual goods and information about microloans or microcredit, humanitarian aid and support other worldly causes through charitable donations or sustainable gifts, e.g., but not limited to, various types of real estate (e.g. vacant land, residential, commercial, recreational, retail, shopping malls, hotels, motels, golf courses, resorts, marinas, industrial, vacation, time shares, condominiums, multifamily, and other types of real estate etc.), travel & hospitality services, educational services, ancillary services, (e.g. brokers, agents, relocation services, internet marketing, concierge, transportation, entertainment, lenders, appraisers, education, developers, contractors, inspectors, home improvements/ remodeling, basement designs, landscaping, home warranties, insurance, indoor & outdoor furniture, fixtures, windows, siding, roofing, heating/cooling, solar, plumbing, electrical, mechanical, and additional services etc.) and providing other services such as loans and quotes, auto loans, mortgages, banking services, family fun, sports and sporting events interests, restaurants, events, consumer packaged goods, groceries, apparel, beverages, books & magazines, foods, health care, household, office, personal care, pet care, photography, autos, business, classic car parts, restoration and maintenance services, collectibles & art, custom car parts, restoration and maintenance services, deals & gifts education, electronics, fashion, financial, healthcare, home, outdoor & décor, travel & hospitality services, insurance, online services, other legal, marketing, medical facilities, medical insurance, medical retailers, motors, pets, physicians, dentists, other practitioners, public services, psychics, mediums & spiritual advisors, travel & hospitality, real estate, ancillary services, sports, travel, tourism, wedding, parties & media and entertainment, online dating, and the like. The present invention can also exclude one or more of the following: (1) finding social awareness of companies found in patent searches; (2) showing entities such as companies on maps; (3) finding local travel & hospitality, real estate, educational services & ancillary service providers and other types of service providers on map searches; (4) ranking entities found using geospatial mapping; (5) representing objects (e.g., brand or logo or product) of entities on a geospatial map; (6) providing local comparative shopping information to members on a website; and/or (7) modeling user views to include objects (brand, logo, or product) of entities in local environment.

Although various embodiments of this invention have been described above with a certain degree of particularity, and/or with reference to one and/or more individual embodiments, those skilled in the art could make numerous alterations to the disclosed embodiments without departing from the spirit and/or scope of this invention. And while the subject matter has been described in language specific to structural features and/or methodological arts, it is to be understood that the subject matter defined in the appended claims is not necessarily limited to the specific features and/or acts descried above. Rather, the specific features and acts described above are disclosed as example forms of implementing the claimed subject matter. It is intended that all matter contained in the above description and/or shown in the accompanying drawings shall be interpreted as illustrative only and not limiting. Changes in detail and/or structure can be made without departing from the basic elements of the invention as defined in the following claims.

The invention can further include a system for providing sports and sporting events related social networking interactions using Internet and mobile devices that provide end user customized interactive displays of three dimensional (3D) geospatial maps comprising end user customized ad links, promotions relating to Sports related products, goods, gambling, or services, and related company and local information for selected worldwide locations, the system comprising:
  (a) a system component for collecting and analyzing initial end users data via a processor on a computer system to provide initial end users data sets, the initial end users data sets comprising (1) initial end users' (A) online activity, (B) geo-target location based technologies including GPS and GIS and multiple points of interest, (C) receiving current location of user's electronic or mobile device and multiple points of interest, (D) online communications, (E) group chat, (F) circle of friends, (G) hangouts, (H) games, (I) sports and sporting events interests, (J) social networking, (K) search inquiries, (L) videos or photos, (M) instant messenger, (N) social networking activities, (O) end user profiles, (P) viewing and interactions with online ad links, promotions, (Q) purchasing, (R) purchasing behavior, (S) generating user behavior data, (T) preferences and (U) buying patterns; the initial end user data sets further comprising initial end users related (2) consumer profiles, (3) trends, (4) cloud-type configuration sharing and handling large amounts of user data across multiple enterprises and (5) target markets;
  (b) a system component for generating, via a processor on a computer system, first promotional data sets from the initial end user data sets, the first promotional data sets comprising first sets of customized ad links, promotions for each of (i) the initial end users, (ii) additional end users, and (iii) target end user groups, the first sets of customized ad links, promotions relating to (1) Products, (2) Goods, (3) Services, (4) company and local information for selected worldwide locations, (5) integrated social networking and (6) associated 3D geospatial mapping coordinates; and
  (c) a system component for generating, via a processor on a computer system or mobile device, second promotional data sets from the first promotional data sets to provide 3D geospatial map interactive displays comprising the first sets of customized ad links, promotions relating to (1) Products, (2) Goods, (3) Services, (4) company and local information for selected worldwide locations, (5) integrated social networking and (6) associated 3D geospatial mapping coordinates; and
  (d) a system component for selecting and integrating, into the 3D geospatial map interactive displays comprising the first sets of customized ad links, promotions, a first social/geo/promo link category for a first position of a social/geo/promo link promotional data set; and identifying one or more second social/geo/promo link categories using one or more correlation criteria, at least one second social/geo/promo link category having one or more correlation criteria associated with the first social/geo/promo link category.

The invention can further include a computer-readable medium having instructions stored thereon, which, when executed by a processor, causes the processor to perform operations comprising:
  (a) for a set of candidate social/geo/promo link categories and at least one social/geo/promo link promotional data set associated with a web page; comprising
    (i) selecting a first social/geo/promo link category for a first position of the social/geo/promo link promotional data set, the first social/geo/promo link category being in the set of candidate social/geo/promo link categories; and
  (b) for at least one empty position in the social/geo/promo link promotional data set:
    (i) identifying social/geo/promo link categories having a correlation measure that is greater than a correlation threshold, the identified social/geo/promo link categories being in the set of candidate social/geo/promo link categories, at least one social/geo/promo link category in the set of candidate social/geo/promo link categories having one or more correlation measures associated with a most recently selected social/geo/promo link category;
    (ii) removing the identified social/geo/promo link categories from the set of candidate social/geo/promo link categories before selecting a next social/geo/promo link category for a next empty position of the social/geo/promo link promotional data set;
    (iii) adding at least one removed identified social/geo/promo link category to the set of candidate social/geo/promo link categories before selecting a first social/geo/promo link category for a first position of a next social/geo/promo link promotional data set; and
    (iii) selecting a next social/geo/promo link category for a next empty position of the social/geo/promo link promotional data set, the next social/geo/promo link category being in the set of candidate social/geo/promo link categories EXAMPLES: EXEMPLARY IMPLEMENTATION OF NON-LIMITING EMBODIMENTS OF THE PRESENT INVENTION The following example is shown by way of example and is not intended to limit the scope of the present invention in any way.

Example 1: Social Earth, Inc.: Description of Present Invention Example

The present invention in a non-limiting embodiment called SOCIAL EARTH™ provides, in one aspect, for an infrastructure and global platform that provides users and members and businesses of all types with access to broad markets for the delivery of Social Earth ad links, promotions, online coupons, mobile services, Sports related Products, Goods, Gambling, and/or Services or services from merchants and sellers from around the world to its highly-engaged Social Shoppers via its unique live view of the planet. The site includes links to places and events, data on the landscape, interactive 360 panoramas, fly-through shopping tours with stunning 3D imagery and videos, advertising on the landscape, advanced search for private and public information, social networking integration, self-posting for uploading user generated content, custom tools, apps, widgets and other embodiments. SOCIAL EARTH™ will include Social Earth Mobile allowing Social Shoppers to receive Social Earth Mobile Coupons for Sports related Products, Goods, Gambling, and/or Services or services based upon their precise location. Mobile apps for smart phones (Android and tablets, iPhone, iPod Touch and iPad) are provided that will allow Social Shoppers to receive Social Earth Mobile products, services, or retail based upon their precise location or other criteria, such as shopping or interest preferences. With Social Earth Mobile, Social Shoppers can explore the same 3D imagery and terrain as the desktop version. Fly to your current location or just about anywhere in the world with the touch of a button. Pan, zoom, and tilt your view as you travel around the globe. Search for cities, places and businesses around the world. View layers of geographic information and more. The invention provides opportunities to reach people at the point of shopping—a benefit both to shoppers and merchants. What do you get when you combine a global marketplace with buyers and sellers and ad links, promotions, online coupons, Sports related Products, Goods, Gambling, and/or Services or services from merchants and sellers from around the world, including without limitation, for such items as products, services, e-commerce, media and entertainment, sports, personal & financial network, real estate, educational services, ancillary services, advertisements, service providers, social networking, online dating, gaming, retail stores, virtual communities and virtual goods and information about microloans or microcredit, humanitarian aid and support other worldly causes through charitable donations or sustainable gifts, the social media revolution and the power of geomapping technology? You get a cutting-edge online experience that blends the best of online shopping and social networking and takes it to a stratospheric new height called SOCIAL EARTH™.

Unlike any other shopping site, when Social Earth site subscribers called Social Shoppers (OR SE SHOPPERS), visit the Social Earth website, e.g., at www.socialearth.co, they are invited to travel virtually around the globe in search of ad links, promotions, online coupons, mobile services, Sports related Products, Goods, Gambling, and/or Services or services from merchants and sellers from around the world. This one-of-a-kind website aggregates ad links, promotions, online coupons, mobile services, Sports related Products, Goods, Gambling, and/or Services or services from merchants and sellers from around the world (collectively referred to as "Social Earth Shopping") and showcases them in their actual, physical location on the websites through GPS technology and unique Live View of Earth. As Social Shoppers shop the world for coupons, Sports related Products, Goods, Gambling, and/or Services, they can view Social Earth Shopping from major brands for ad links, promotions, online coupons, mobile services Sports related Products, Goods, Gambling, and/or Services or services from merchants and sellers from around the world for such items as: Sports related Products, Goods, Gambling, and/or Services, service providers, media and entertainment, sports, personal & financial network, travel & hospitality services, real estate, educational services, ancillary services, advertisements, service providers, social networking, online dating, gaming, retail stores, virtual communities and virtual goods and information about microloans or microcredit, humanitarian aid and support other worldly causes through charitable donations or sustainable gifts, e.g., but not limited to, online auctions, various types of real estate (e.g. vacant land, residential, commercial, recreational, retail, shopping malls, hotels, motels, golf courses, resorts, marinas, industrial, vacation, time shares, condominiums, multifamily, and other types of real estate etc.), educational services, ancillary services, loans and quotes, auto loans, mortgages, banking services, and/or any other product or service, e.g., but not limited to, family fun, sports, restaurants, events and hundreds of top consumer packaged goods brands for groceries, apparel, beverages, books & magazines, foods, health care, household, office, personal care, pet care, photography and other embodiments.

Social Shoppers will find great ad links, promotions, online coupons, mobile services, Sports related Products, Goods, Gambling, and/or Services, entertainment shopping, penny auctions, or online auctions, advertisements and affiliate advertising or services from merchants and sellers from the leading travel & hospitality industry, restaurants, toy and entertainment companies and top retailers around the world. Social Shoppers can select a target location in the U.S., e.g., but not limited to, Atlanta, Austin, Dallas, Denver, San Diego, San Francisco or in other cities around the world. Social Shoppers can find product or services deals in London or they can tour the planet at will, jumping from Hong Kong to Amsterdam to Buenos Aires to check out the bargains. Because the Earth view comes live from satellite and webcam images, shoppers can zoom in for a closer look or zoom out to gain perspective on the location.

SOCIAL EARTH™ will offer advertising opportunities for service providers, business centers, affiliates and business owners e.g. for business services, healthcare services, specialty financial services, consumer products, specialty retail and media and entertainment, lenders, mortgage companies, auto finance companies and other business owners' who want to reach millions of users and members online on Social Earth. Advertisements will appear at the top of consumers' property and service provider search results ahead of other properties meeting their search criteria. Realtors, mortgage lending, auto finance, financial services, healthcare, travel & hospitality services, cars, insurance, online education, government services, media and entertainment and sports industry, travel industry, top internet advertisers, social brands and thousands of service providers, business owners and affiliates will have the ability to purchase advertising space, which will appear at the top of consumers' property and service provider search results ahead of other properties meeting their search criteria. Consumers can learn about neighborhoods, property values, schools, shopping centers, and cost of living features and join with thousands of service providers and business owners from around the world. Our goal is to help consumers conveniently connect with thousands of service providers and business owners to find what they're looking for in our Social Earth Personal Network.

SOCIAL EARTH™ will also provide links and free real estate information and mortgage quotes from national lenders and mortgage companies for the purchase of a new home, refinance, consolidating debt, auto loans, insurance quotes or home equity loans. The SOCIAL EARTH™ database will include links to millions of residential listings, commercial properties and thousands of service providers and business owners. Millions of users and members will search online and align with thousands of service providers and business owners in search of everything from "A" to "Z" whether its buying a home or a new or used car, finding an apartment or a medical professional or healthcare provider, booking travel, weather updates, breaking news, reading about your favorite celebrity or entertainer or sports' team, SOCIAL EARTH™ has it all.

The Company's website will populate the virtual landscape with various types of real estate (e.g. vacant land, residential, commercial, recreational, retail, shopping malls, hotels, motels, golf courses, resorts, marinas, industrial, vacation, time shares, condominiums, multifamily, and other types of real estate, etc.), travel & hospitality services, educational services, ancillary services (e.g. brokers, agents, relocation services, internet marketing, concierge, transportation, hospitality, lenders, appraisers, education, developers, contractors, inspectors, home improvements/remodeling, basement designs, landscaping, home warranties, insurance, indoor & outdoor furniture, fixtures, windows, siding, roofing, heating/cooling, solar, plumbing, electrical, mechanical, and additional etc.), advertisements from service providers and various links from the desired search request. Consumers can zoom in and out of the Social Earth Personal Network, click on advertisements and links and see the exact location of a business, retailer, restaurant or shopping mall on the landscape. Advertisements will appear at the top of the consumers' property and service provider search results. Home buyers and renters can learn about neighborhoods, property values, apartments, schools, shopping centers, cost of living and connect with thousands of real estate professionals, educational services, ancillary services and other service providers and business owners from around the world. The SOCIAL EARTH™ Personal Network will allow consumers too easily and conveniently search for all of their personal and financial services from the comfort of their home. The future of searching for all of your personal and financial needs via the Internet is here with the development of a SOCIAL EARTH™ Personal Network.

SOCIAL EARTH™ displays, organizes and delivers information across many social layers and social media sites featuring top-notch content, stunning satellite imagery, aerial photography and graphic animated color overlays on top of Google Earth™. SOCIAL EARTH™ delivers a delightful mash-up of content, Social Earth Shopping and live social networking feeds from, e.g., Twitter™. Social Earth™ utilizes the top social networking platforms such as Facebook™ and Twitter™ to allow Social Shoppers to share the latest product or services deals with their friends. Unlike Groupon™, Livingsocial™ or Google Offers™, SOCIAL EARTH™ aggregates Social Earth Shopping on its site. Social Shoppers are encouraged to share these product or services deals with their friends in Facebook™ and Twitter™. The global sharing capabilities are built into SOCIAL EARTH™ technology using sophisticated technology integrating geospatial mapping, layering location-relevant data, and GPS technologies.

Social Shoppers are able to find great products or services in their local areas or just about anywhere else in the world with the click of a mouse or input on their mobile device. Capitalizing on the popularity of social networking giants such as Facebook™ and Twitter™ with more than 750 million users worldwide, SOCIAL EARTH™ creates an online community that taps into the power of social networking by integrating live social feeds from these social networking giants directly into its website. By creating a highly engaged social networking community, Social Earth creates "stickiness," keeping the Social Shoppers on the site for long periods of time, as well as bringing them back again and again. In other words, SOCIAL EARTH™ provides long-time customer loyalty, not just a one-off deal.

Social Earth™ also provides microloans or microcredit and donates a portion of each "Social Earth online coupon, mobile services, Products, Goods or Services" that are sold on Social Earth will be allocated to microloans or microcredit, humanitarian aid or other worldly cause or sustainable gift to help those in need. The community aspect of SOCIAL EARTH™ is the driver behind building awareness of the website and its featured ad links, promotions, online coupons, mobile services, Sports related Products, Goods, Gambling, and/or Services or services from merchants and sellers from around the world. Existing and potential customers provide advertising by spreading the word to their friends about the great product or services deals they have found on a shopping site such as SOCIAL EARTH™. Add to that the power of collective buying and its easy to see how the SOCIAL EARTH™ community can leverage group size in exchange for larger discounts. Social Earth delivers ad links, promotions, online coupons, mobile services, Sports related Products, Goods, Gambling, and/or Services or services from merchants and sellers from around the world to its Social Shoppers via its unique live view of the Earth that includes links to places and events, data on the landscape, interactive 360 panoramas, fly-through shopping tours with stunning 3D imagery. The use of geospatial mapping for associating information to specific places can included, but it not limited to, one or more of: Live links to places and events; Data on the landscape; Zoom to birds-eye and human scale views; 3D custom audio/visual content; Interactive 360 panoramas; Fly-through tours with content, narration, music; Stunning imagery and videos; 3D buildings and landscaping e-commerce and mobile banking tools and hooks; Advertising on the landscape; Advanced search for private and public information; Social networking integration; Self-posting for uploading user generated content; Custom tools, apps and widgets; and the like. SOCIAL EARTH™ Mobile sends mobile coupons to Social Shoppers based upon their precise location. This provides opportunities to reach people at the point of shopping—a benefit both to shoppers and merchants.

Social Layers. Social Shoppers virtually travel around the globe in search of shopping products or services, as well as bargains. Social Earths technology will drive content, ad links, promotions, online coupons, mobile services, Sports related Products, Goods, Gambling, and/or Services or services from merchants and sellers from around the world into a "virtual Earth" based upon their precise location and GPS technology. Social Shoppers will be able to view Social Earth™ Shopping from around the world by geo-target location, their hometown or another city around the world and virtually travel there. This one-of-a-kind website aggregates Social Earth™ Shopping from around the world and showcase them in their actual, physical location on the virtual Earth. Because the virtual Earth is "interactive," one can zoom in for a more detailed view or zoom out to gain perspective on where they are in the world. Social Earth™ Shopping can last for days, weeks or even months. What makes Social Earths website different from other group buying websites is that Social Earth's™ website allows Social Shoppers to search for ad links, promotions, online coupons, mobile services, Sports related Products, Goods, Gambling, and/or Services, entertainment shopping, penny auctions or online auctions, as well as advertisements and affiliate advertising or services from merchants and sellers from around the world on a virtual Earth. Users will be able to customize their buying preferences, engage in social networking, social networking communities, social networking activities and support worthwhile causes. Social Earth's™ website allows Social Shoppers to select from a menu of coupons based upon their preferences, which is integrated into the virtual Earth along with other layer location-relevant data as Social Shoppers shop online and interact with their friends on Facebook™ and Twitter™. Advertisers and merchants will send coupons to Social Shoppers based on geo-target location.

Social Earth™ develops layer applications, which are known as "social layers." These social layers allow Social Shoppers to customize their personal experience on SOCIAL EARTH™ as they search for Social Earth™ Shopping in their local area or just about anywhere else in the world based upon their interests or travels take them. Social Shoppers select from a menu of "Purchase" coupon categories such as. (Arts & Entertainment, Travel, Giving Back, Eat & Drink, Deal of the Day) and "Free" coupon categories such as: (Health & Beauty, Sports, Shopping, Groceries). Social Shoppers may be able to search for other products and services such as: Autos, Business, Classic Car Parts, Restoration and Maintenance Services, Collectibles & Art, Custom Car Parts, Restoration and Maintenance Services, Deals & Gifts, Education, Electronics, Fashion, Financial, Healthcare, Home, Outdoor & Décor, Travel & Hospitality Services, Insurance, Online Services, Other Legal, Marketing, Medical Facilities, Medical Insurance, Medical Retailers, Motors, Pets Physicians, Dentists, Other Practitioners, Public Services, Psychics, Intuitives, Metaphysical, Mediums & Spiritual Advisors, Real Estate, Educational Services, Ancillary Services, Sports, Tourism, Wedding, Parties & Entertainment, Online Dating and Free Coupons). Social Earth™ drives traffic to its website by targeting Social Earth Shopping from around the world, based upon a user's and members preference, which are displayed on a unique Live View of planet Earth. Once a Social Shopper selects one or more coupon categories, entertainment shopping, penny auctions or online auctions, advertisements and affiliate advertising or services from merchants and sellers from around the world will populate the virtual Earth. Social Shoppers are able to double click on Social Earth Shopping and fly directly to its location on Earth. Social Shoppers can also click on one of the featured cities and take a tour of London, San Francisco or Denver and zoom down to street level to take a closer look. Social Shoppers enjoy the experience of virtually traveling around the world, zooming in and out to street level in search for great product or services deals and sharing the latest product, goods or services, penny auction or online auction with their friends.

In connection with a one-of-a-kind geospatial website aggregates Social Earth™ Shopping from around the world and showcases them in their actual, physical location on the websites unique live view of Earth. As Social Shoppers shop the world for bargains, they can view Social Earth Shopping from major brands for family fun, sports, restaurants, events and hundreds of top consumer packaged goods brands for groceries, apparel, beverages, books & magazines, foods, health care, household, office, personal care, pet care, photography and other embodiments. Social Shoppers can find great products, goods or services deals from the leading travel & hospitality industry, restaurants, toy and entertainment companies and top retailers around the world. Social Shoppers can use "a mobile device payment method and system for effectuating an online payment through a computer or mobile device equipped carrier or a mobile device equipped bank using a mobile users and members device in connection with e-commerce and mobile banking transactions on the host geospatial website or mobile device (e.g., mobile telephone, PDA, laptop computer, etc.); wherein users and members create and maintain a rich-media application via a geospatial mapping platform via the Internet comprising: mobile banking and electronic payments.

The delivery system for a host geospatial website (accessible via a mobile device or computer) will provide for a multidimensional representation of information and scalable version of web content for the delivery of Social Earth™ Shopping from around the world on a three dimensional geospatial platform using geospatial mapping technology. A host geospatial website will include realistic virtual landscape using satellite and aerial photography that will include many content layers of web based information, e-commerce and mobile banking links, social networking and virtual advertisements for a richer user experience. A host geospatial website shall store images, web-based content, social data, social plugins, social applications, penny auctions or online auctions, advertisements and share live social feeds from social networking giants such as Facebook™ and Twitter™ and other communications in real-time. Connecting Social Earth Shopping from around the world with users and members known as "Social Shoppers" in real-time on a geographical area across multiple social layers that are displayed as graphic animated color overlays on a three dimensional geospatial platform using geospatial mapping technology. More specifically, it relates to a method for users and members known as "Social Shoppers" to effectuate banking and electronic payments; accessing a user account, engaging in mobile social activities and viewing available options via a three dimensional geospatial mapping platform using geospatial mapping technology."

Giving Back: Social Shoppers will be able to help those who have been impacted by a natural disaster, live in impoverished conditions or are less fortunate in the world. Social Shoppers are able to purchase coupons from merchants who support humanitarian causes in developing countries and charities in their communities and local and global causes around our planet and relief efforts for natural and manmade disasters including devastating earthquakes and tsunamis. For example, fly to Japan and view a video on the Japan relief effort. By tapping into the power of social networking and bringing together a collective consciousness with millions of Social Shoppers, Social Earth raises awareness for global issues and millions of dollars for microloans or microcredit, humanitarian aid and support other worldly causes and saving our planet from ecological harm.

Example 2: Further Description of Social Earth Example

Business Description:

What do you get when you combine the daily deal phenomenon, the social media revolution and the power of geospatial technology? You get a cutting-edge online experience that blends the best of social networking with daily deals, e-commerce, sports, education and other services taking it to a stratospheric new height called "Social Earth" that also gives back to our planet. The demo website for Social Earth is located at www.socialearth.co. You will need to install the Google Earth plug-in, which has been downloaded more than one billion times since October 2011, to navigate around Social Earth.

Unlike any other shopping site, Social Earth will use geospatial technology allowing its members to virtually travel around the globe in search of their friends, the best bargains, daily deals and other Sports related Products, Goods, Gambling, and/or Services in their exact physical location on the planet. Users will be able to select their favorite cities and virtually travel there in an instant. Social Shoppers will be amazed at the stunning satellite imagery as they virtually travel around the selected city or fly to another location in an instant. Use the "Fly Anywhere on Earth" tool and type in a physical address or search for a famous landmark such as the "Eiffel Tower" in Paris, France, the "Statue of Liberty" in New York or the "Taj Mahal" in India. Use the Google Navigation Tool to zoom down to street level to take a closer look of the high-resolution satellite imagery of the Earth's surface.

This one-of-a-kind social networking website that will be built as a layer on top of Google Earth™ using GIS and geospatial technologies to connect merchants from around the world with their customers at the exact point of shopping. Social Shoppers will be able to select a desired location on the planet and zoom in and out of the local landscape. Social Shoppers will be able to view some of the best shopping in their local area or cosmopolitan cities around the world such as London, New York and Paris. Because the Earth view comes live from satellite and webcam images, Social Shoppers will be able to virtually travel around gaining a perspective on their precise location. Social Earth will feature stunning satellite imagery, aerial photography and graphic animated color overlays on top of Google Earth™ giving Social Shoppers a wonderful perspective of our planet. 1 This global shopping site is going to bring users exactly to the point of shopping in an instant.

As Social Shoppers search the globe for great bargains, they will be able to shop online for family fun, merchandise, restaurants, sporting events and hundreds of top consumer packaged goods from major brands. Users will choose from a variety of coupon options such as: (Arts & Entertainment, Travel, Giving Back, Eat& Drink, Deal of the Day). As Social Shoppers make their selections, coupons will populate the targeted city based upon their preferences. For example, if a user is interested in finding the latest travel deals around the globe, they will click on Travel and coupons for airlines, hotel, rental cars or cruises will populate the globe. Select Eat &Drink to find great deals at a nearby restaurant, bar & club, organic foods, etc.

For the savvy Social Shopper, Social Earth will offer free coupon options for: (Health & Beauty, Sports, Shopping& Groceries). Select Health& Beauty to find discounts on bath & body, fitness, weight loss and salons & spas. Select Sports to find great bargains on golf, exercise equipment, indoor & outdoor activities and more. The Company also plans on offering online auctions and penny auctions where users can find great Sports related Products, Goods, Gambling, and/or Services for up to ninety percent (90%) off the retail price.

Users will also be able to connect online just like in the real world, interact with their circle of friends, play games, search for a school or university, popular restaurant, museum, sporting event or art gallery on a fun interactive social networking platform. The Company believes that geospatial technology is the wave of the future with tremendous capacity for growth. As emerging geospatial technologies continue to expand over the Internet, the Company sees a tremendous opportunity to capture a share of the market by being one of the first social networking sites to use geospatial technology in conjunction with social media, online shopping, sports, education, telecommunications and more.

Social Networking Community

Users will be able to connect online just like in the real world. As Social Shoppers search the globe for great bargains, they will be able to interact with their friends in our social networking community, view "live social feeds" from Facebook™ and Twitter™ and "talk live" on Skype™ sharing the latest deals with their friends. Users will also be able to play games, follow their favorite sports team, search for a great restaurant, a museum, art gallery or other Sports related Products, Goods, Gambling, and/or Services, upload videos & photos, send instant messages and video chat with their circles of friends.

The Company plans on capitalizing on the popularity of social networking giants Facebook™ and Twitter™, with a combined 900 million users worldwide, by integrating "live social" feeds into its website. The Company plans on developing an application that can be downloaded by users in these popular social networks. On average people on Facebook™ install applications more than 20 million times per day. More than 350 million active users currently use Facebook™ through their mobile devices.

As more and more people sign up for Social Earth around the world, a highly engaged social networking community will create "stickiness" that will keep users coming back to the site for again and again. The social networking community aspect of Social Earth will be the driver behind connecting users with their circle of friends and spreading the word about the latest bargains, hippest restaurant, sharing photos, sending instant messages and video chat. Add to that the power of collective buying and it's easy to see how the social networking community will be able to leverage group size in exchange for larger discounts. The Company plans on giving users the option to select different foreign languages to attract users from outside the US and around the world.

Giving Back

Social Earth will give back to our planet and help children, families and others in need from around the world by donating a portion of each sale to humanitarian aid, charitable donations and sustainable gifts. Social Earth plans on giving back to our planet by supporting organizations that promote reducing ecological impact and saving our planet from grave ecological harm. Social Shoppers will also be able to support causes by contributing through the Social Earth Shopping Cart.

Products & Services Description

The Company plans on delivering a global interface with a unique online shopping experience with social networking and multitude of products and service in their local area or just about any place around the world as users virtually tour around our planet. They will be able to: Use Social Earth after installing a Google Earth™ plug-in. This one-of-a-kind social networking website that will use GIS and geospatial technology to reach people at the point of shopping displaying the exact location of daily deals, coupons, products & services in their actual, physical location on the planet. Users will be able to connect online just like in the real world and interact with their circle of friends. Use the "Fly Anywhere on Earth" tool by typing in a physical address or famous landmark. Use the Google Navigation Tool to zoom down to street level to take a closer look. Search for a school or university, popular restaurant, Movie Theater, museum, hotel, fitness center, address, landmark or thousands of other Sports related Products, Goods, Gambling, and/or Services using GPS technologies. Virtual scavenger hunt looking for everything interesting, unusual or unexplained. Upload videos & photos, send instant messages, play games and video chat with their circle of friends. Participate in online auctions and penny auctions. Follow your favorite sports team, view stadiums, scores, teams and players from major sporting events as they occur around the globe. View links to places and events, data on the landscape, interactive 360 panoramas, fly-through shopping tours with stunning 3D imagery and videos. Search for the latest bargains via a mobile phone to reach people at the point of shopping. Zoom into birds-eye view and navigate around stunning 3D satellite images. Watch videos and news via RSS links. Have a unique interactive online 3D shopping experience. Learn how Social Earth gives back to our planet and helping children, families and those in need through humanitarian aid, charitable donations or sustainable gifts. As our social networking community grows around the world, the Company will be able to develop additional revenue verticals such as online dating, online retail stores and more!

Advantages

Social Earth plans to offer a unique online shopping experience to users and provide a multitude of advantages over other daily deal sites by: Social Earth will connect users online just like in the real world. Social Earth will allow users a one stop shopping experience where they can find great bargains, chat with their circle of friends interact, search, play games, participate in virtual scavenger hunt, follow their favorite sport, upload videos & photos, send messages and more. Social Earth will be an exceptional educational tool. Unlike other daily deal sites, Social Earth daily deals won't last just one day. Social Earth will reach mobile customers at the point of sale via GPS technology. Social Earth will combine the power of a social networking community with a collective bargaining coupon site, the fastest growing business model on the Web. Social networking integration will create "stickiness" and bring Social Shoppers back to the site again and again. Social Earth will give back with every purchase.

Further non limiting examples of how the delivery system and software of the invention is interactive with the social shopper based upon the social shopper's preference, location, GPS, buying patterns, likes & dislikes, user profile, online communications, social networking, social networking communities, social networking activities, messaging, online communications, viewing public & private user profiles, advertising, bidding, bidding behavior, bidding results, purchasing, behavior, buying pattern and other criteria allowing the social behavior software to search for and filter and display related ad links, promotions, online coupons, mobile services, Sports related Products, Goods, Gambling, and/or Services, assortment of entertainment and entertainment shopping, online casino, online sports betting, NBA and college basketball lines, football, soccer, boxing, fighting, penny auctions or online auctions, or advertisements and affiliate advertising or services from merchants and sellers on the 3D landscape. So when a social shopper searches for ad links, promotions, online coupons, mobile services, Sports related Products, Goods, Gambling, and/or Services or services on Social Earth, the social behavior software will keep track of online activity, location, online communications, search inquiries, social networking, social networking communities, social networking activities, messaging, viewing public & private profiles, advertising, bidding, bidding behavior, bidding results, social plugins, ad links, promotions, social applications, purchasing, behavior, buying patterns and other criteria and search for, filter and display related ad links, promotions, online coupons, mobile services, Sports related Products, Goods, Gambling, and/or Services or services from merchants and sellers on the 3D landscape based upon the desired location, GPS technology, behavior tracking, which can even predict future demand.

Each user's will have a unique experience on Social Earth based upon their online activity, location, online communications, search inquiries, social networking, social networking communities, social networking activities, messaging, viewing public & private user profiles, advertising, bidding, bidding behavior, bidding results, social plugins, ad links, promotions, social applications, buying preference, location and other criteria. So if someone is searching for a particular promotion, online coupon, mobile service, Product, Good or Service, entertainment shopping, penny auction or online auctions, advertisement and affiliate advertising or service on Social Earth, the social behavior software will track their online activity, location, online communications, search inquiries, social networking, social networking communities, social networking activities, messaging, viewing public & private user profiles, advertising, bidding, bidding, bidding behavior, bidding results, social plugins, ad links, promotions, social applications, purchasing, behavior, buying patterns and other criteria and filter and display related ad links, promotions, online coupons, mobile services, Sports related Products, Goods, Gambling, and/or Services or services from merchants and sellers on the 3D landscape based upon the desired location, GPS technology, behavior tracking, which can even predict future buying demand.

For example, if someone is searching for a sporting event or other type of entertainment on Social Earth and the social shopper previously purchased a coupon for a pizza, the social behavior software will locate nearby pizza restaurants, sporting events, sports venues, sports bars, hotels, and other points of interest etc. based upon the online activity, location, online communications, search inquiries, social networking, social networking communities, social networking activities, messaging, viewing public & private user profiles, advertising, bidding, bidding behavior, bidding results, social plugins, ad links, promotions, social applications, purchasing, behavior, buying patterns and other criteria and filter and display related coupons, products, goods, services, advertisements and service providers on the 3D landscape based upon the desired location, GPS technology, behavior tracking, which can even predict future shopping.

If someone is searching for a new or used car, motorcycle, recreational, RV or other type of motorized vehicle or transportation on Social Earth, the software will search for related services based upon GPS such as i.e. dealerships, manufacturers, insurance, tires, oil change, car wash, air conditioning, gas stations, etc. based upon the online activity, location, online communications, search inquiries, social networking, social networking communities, social networking activities, messaging, viewing public & private user profiles, advertising, bidding, bidding behavior, bidding results, social plugins, ad links, promotions, social applications, purchasing, behavior, buying patterns and other criteria and filter and display related ad links, promotions, online coupons, mobile services, Sports related Products, Goods, Gambling, and/or Services, entertainment shopping, penny auctions, or online auctions, advertisements and affiliate advertising or services from merchants and sellers on the 3D landscape based upon the desired location, GPS technology, behavior social software tracking, which can even predict future shopping.

If the social shopper has previously purchased a coupon for pet food, the social behavior software will keep track of online activity, location, online communications, search inquiries, social networking, social networking communities, social networking activities, messaging, viewing public & private user profiles, advertising, bidding, bidding behavior, bidding results, social plugins, ad links, promotions social applications, purchasing, behavior, buying patterns and other criteria and filter and display related ad links, promotions, online coupons, mobile services, Sports related Products, Goods, Gambling, and/or Services, entertainment shopping, penny auctions or online auction, advertisements and affiliate advertising or services, pet stores, veterinarians, grooming services, advertisements and other related pet services on the 3D landscape based upon the desired location, GPS technology, behavior tracking, which can even predict future shopping demand.

If someone is searching for a home, condo, apartment or other type of real estate on Social Earth, the social behavior software will track online activity, location, online communications, search inquiries, social networking, social networking communities, social networking activities, messaging, viewing public & private user profiles, advertising, bidding, bidding behavior, bidding results, social plugins, ad links, promotions, social applications, bidding, bidding behavior, bidding results, purchasing, behavior, buying patterns and other criteria and filter and display related ad links, promotions online coupons, mobile services Products, goods, gambling, or services, from i.e. brokers, agents, relocation services, lenders, moving and storage, furniture, lawn care or gardening, grocery stores, schools, doctors & physicians, parks, cleaning services, etc. on the 3D landscape, based upon the desired location, GPS technology, behavior tracking, which can even predict future buying demand.

If someone is searching for a school, college, university or other type of educational services on Social Earth, the social behavior software will track online activity, location, online communications, search inquiries, social networking, social networking communities social networking activities, messaging, viewing public & private user profiles, advertising, bidding, bidding behavior, bidding results, social plugins, ad links, promotions, social applications, purchasing, behavior, buying patterns and other criteria and filter and display related ad links, promotions, online coupons, mobile services, Products, goods, gambling, or services, for such items as i.e. online classes, student loans, financial aid, colleges, universities, private and public schools, tutoring, test preparation, etc. on the 3D landscape based upon the desired location, GPS technology, behavior tracking, which can even predict future buying demand.

If someone is searching for a particular travel destination on Social Earth, the social behavior software will track online activity, location, online communications, search inquiries, social networking, social networking communities, social networking activities, messaging, viewing public & private user profiles, advertising, bidding, bidding behavior, bidding results, social plugins, ad links, promotions, social applications, purchasing, behavior, buying patterns and other criteria and filter and display related ad links, promotions, online coupons, mobile services, Products, goods, gambling, or services, from merchants and sellers for such items as i.e. travel deals, airfare or ground transportation options, restaurants, sport venues, entertainment, airports, car rentals, limos, dry cleaners and other services, etc. on the 3D landscape based upon the desired location, GPS technology, behavior tracking, which can even predict future buying demand.

If someone is searching for an environmental-friendly or green product on Social Earth, the social behavior software will track online activity, location, online communications, search inquiries, social networking, social networking communications, social networking activities, messaging, viewing public & private user profiles, advertising, bidding, bidding behavior, bidding results, social plugins, ad links, promotions, social applications, purchasing, behavior, buying patterns and other criteria and filter and display related ad links, promotions, online coupons, mobile services, Sports related Products, Goods, Gambling, and/or Services for such as items as i.e. eco-friendly home, office and business products that reduce the carbon footprint, made from recycled materials and do little harm to the environment, etc. on the 3D landscape based upon the desired location, GPS technology, behavior tracking, which can search criteria, social shopper's buying preferences, buying patterns, likes and dislikes, online communications, transaction history, etc. and even predict future buying demand.

If someone is searching for a flight comparison on Social Earth by clicking on one of the travel links i.e. Expedia, Travelocity, Orbitz, Cheap Flights, Kayak, etc., the social behavior software will track online activity, location, online communications, search inquiries, social networking, social networking communities, social networking activities, messaging, viewing public & private user profiles, advertising, bidding, bidding behavior, bidding results, social plugins, social ad links, promotions, applications, purchasing, behavior and buying patterns and other criteria and filter and display related ad links, promotions, online coupons, mobile services, Products, goods, gambling, or services, for such services as fights, hotels, car rentals, restaurants, food & drink, entertainment and other related services on the 3D landscape based upon the desired location, GPS technology, behavior tracking, which can even predict future buying demand.

If someone is searching for a penny auction or online auction on Social Earth, the social behavior software will track online activity, location, online communications, search inquiries, social networking, social networking communities, social networking activities, messaging, viewing public & private user profiles, advertising, bidding, bidding behavior, bidding results, social plugins, ad links, promotions, social applications, purchasing, behavior and buying patterns and other criteria and filter and display related ad links, promotions, online coupons, mobile services, Products, goods, gambling, or services, on the 3D landscape based upon the desired location, GPS technology, behavior tracking, which can even predict future buying demand.

If someone is searching for a sporting event, sports memorabilia or other merchandise or advertisement on Social Earth, the social behavior software will track online activity, location, online communications, search inquiries, social networking, social networking communities, social networking activities, messaging, viewing public & private user profiles, advertising, bidding, bidding behavior, bidding results, social plugins, ad links, promotions, social applications, purchasing, behavior and buying patterns and other criteria and filter and display related ad links, promotions, online coupons, mobile services, Products, goods, gambling, or services, on the 3D landscape based upon the desired location, GPS technology, behavior tracking, which can even predict future buying demand.

Advantages: Social Earth™ plans to offer a unique online shopping experience to users and provide a multitude of advantages over other daily deal sites by connecting users online just like in the real world. Social Earth will allow users a one stop shopping experience where they can find great bargains, chat with their circle of friends interact, search, play games, upload photos, send messages all without ever leaving Social Earth. Unlike other daily deal sites, Social Earth™ deals won't last just one day. Social Earth is going to reach customers at the point of sale via GPS technology. Social Earth is going to combine the power of a social networking community with a collective bargaining coupon site, the fastest growing business model on the Web. Social networking integration will create "stickiness" and bring Social Shoppers back to the site again and again. Social Earth™ is going to give back with each purchase.

What is claimed is:

1. A method for providing sports and sporting events related social networking interactions using Internet and mobile devices that provide end user customized interactive website displays of three dimensional (3D) geospatial maps comprising end user customized ad links and promotions for sports or sporting events related products, goods, gambling, or services, and sports related company and local information for selected worldwide locations, said method comprising:

(a) electronically providing an integrated social networking and 2D and 3D geospatial mapping interactive website that provides geospatial mapping interactive displays interactive with social networking, where the geospatial interactive displays provide a multi-dimensional and scalable geospatial mapping functional tool, and where the social networking provides interactive emailing, instant messaging, texting, online auctions, social networking communities, online communications, user profiles, social plugins, social applications, entertainment shopping, bidding, advertisements, promotions, online coupons, mobile services, products, goods and services;

(b) collecting and analyzing initial end users data sets via a processor on a computer system or mobile device to generate initial end users data sets, said initial end users data sets comprising (1) initial end users' (A) online activity, (B) geo-target location based technologies including GPS and GIS and multiple points of interest, (C) receiving current location of user's electronic or mobile device and multiple points of interest, (D) online communications, (E) group chat, (F) circle of friends, (G) hangouts, (H) games, (I) sports and sporting events interests, (J) players and player profiles, (K) social networking, (L) search inquiries, (M) videos or photos, (N) instant messenger, (O) social networking activities, (P) end user profiles, (Q) viewing and interactions with online ad links, promotions, (R) purchasing, (S) purchasing behavior, (T) generating user behavior data, (U) preferences and (V) buying patterns; said initial end user data sets further comprising initial end users related (2) consumer profiles, (3) trends, (4) cloud-type configuration sharing and handling amounts of user data across multiple enterprises and (5) target markets;

(c) generating, via a processor on a computer system or mobile device, first promotional data sets from said initial end user data sets, said first promotional data sets comprising first sets of customized ad links, promotions for each of (i) said initial end users, (ii) additional end users, and (iii) target end user groups, said first sets of customized ad links, promotions including (1) products, (2) goods, (3) services, (4) company and local information for selected worldwide locations, (5) integrated social networking and (6) 3D geospatial mapping coordinates; and (d) generating, via a processor on a computer system or mobile device, second promotional data sets from said first promotional data sets to provide 3D geospatial map interactive displays comprising said first sets of customized ad links, promotions for (1) Products, (2) Goods, (3) Services, (4) company and local information for selected worldwide locations, (5) integrated social networking and (6) 3D geospatial mapping coordinates;

(e) selecting and integrating, into said 3D geospatial map interactive displays comprising said first sets of customized ad links, promotions, a first social/geo/promo link category for a first position of a social/geo/promo link promotional data set; and identifying one or more second social/geo/promo link categories using one or more network interaction correlation values of the at least one second social/geo/promo link category having one or more degree of correlation values of the first social/geo/promo link category; and (f) selecting data for a third social/geo/promo link category for a second position of the social/geo/promo link promotional data set, where the third social/geo/promo link category is different from the one or more identified second social/geo/promo link categories;

wherein the social/geo/promo link promotional data set is displayed on a visual display of a web page customized to the user; and the social/geo/promo link categories are ordered by relevance to the displayed web page; and wherein the step of identifying one or more second social/geo/promo link categories using one or more network interaction correlation values further comprises: identifying one or more social/geo/promo link categories having a network interaction correlation value that is less than a network interaction correlation value threshold.

2. A method according to claim 1, wherein a sport or sporting event is selected from men's or women's amateur, high school, college, university, recreation, professional, local, city, county, state, region, Provence, country, union, league, associated, or group of countries, continental, hemisphere, related sport or sporting event.

3. A method according to claim 1, wherein said sport or sporting event is selected from NFL, NCAAF, NCAAB, NBA, NASCAR, Horse racing, Golf, MLB, NHL, Indy Car, Cricket, Soccer, Football, Basketball, college basketball, Tennis, Motor racing, hockey, boxing, and fighting.

4. A method according to claim 1, wherein said sport or sporting event is selected from
(a) soccer selected from World Cup, a FIFA event, Premier League, AFC, CAF, CONCACAF, CONMEBOL, OFC, UEFA, Olympics, NCAA;
(b) Cricket selected from ICC World Cup, World Twenty, Olympics, college, NCAA;

(c) Tennis selected from Wimbledon, Australian Open, French Open, Shanghai Open, US Open, Indian Wells, ATA, WTA, Davis Cup, Hopman Cup, Federation Cup, Olympics;

(d) hockey selected from NHL, WHA, IIHF, junior hockey league, adult sport leagues, Olympics;

(e) Volleyball selected from college, professional, beach volleyball, Olympics, NCAA;

(f) Horse Racing from The Kentucky Derby, The Preakness, The Belmont Stakes, Gulfstream Park Handicap, Santa Ana Handicap, Breeder's Cup;

(g) Polo from The Queen's Cup, Polo in the Park, Princes of Wales Cup, Veuve Clicquot Gold Cup, Mercedes-Benz Polo Challenge, Cartier International Polo, the Warwickshire Cup;

(h) Auto Racing from dirt track, electric drag racing, karting, open wheel racing, rally racing, road rallying, sports car racing, stock car racing, formula-one racing, Indy car racing;

(i) Summer Olympics, Winter Olympics, Paralympics, Youth Olympics, Special Olympics, Commonwealth Games;

(j) Golf selected from PGA, Masters, PGA Championship, U.S. Open, The Open Championship, college, men's, women's, NCAA, USGA, Golf Canada, International Golf Network, World Golf Federation, GCSAA, National Golf Federation, IGF, World Senior Golf Federation, Ryder Cup, Olympics;

(k) American Football selected from college, professional, high school, NFL, AFC, WFL, IFAF, CFL, UFL, IFL, APFL, Arena Football League, Professional Indoor Football League, Ultimate Indoor Football League, Empire Football League, Mid Continental Football League, Empire Football League, Mid Continental Football League, New England Football League, North American Football League, Alberta Football League, Maritime Football League, Northeastern Football Alliance, Rocky Mountain Football League, Central Football League, Southern States Football League, Minor League Football Association, Oklahoma Metro Football League, Florida Football Alliance, Big Northeast Football Federation, Gridiron Developmental Football League, Five Star Football League, Regional American Football League, Stars Football League, Texas Six man Football League, Canadian Junior Football League, National Collegiate Athletic Association, Collegiate Sprint Football League, National Junior College Athletic Association, National Association of Intercollegiate Athletics, National Capital Amateur Football Association, Canadian Interuniversity Sport, Quebec Junior Football League, Canadian Colleges Athletic Association, ONEFA Organizacion Nacional Estudiantil de Fútbol Americano, Collegiate; Women's leagues: Independent Women's Football League, Lingerie Football League, Women's Football Alliance, Women's Spring Football League, Super Bowl;

(l) Basketball selected from men's, women's, college, NCAA, professional, NBA, men's, women's, college, professional, ABA, BAA, CBA, NCAA, D-League, NBL, USBL, WNBA, Dream Team, Olympics, WBC, TOA;

(m) Baseball selected from MLB, AL, NL, Japan's Central League and Pacific League; Cuba's West League and East League; Caribbean Series; Latin American winter leagues: the Dominican Winter League, Mexican Pacific League, Puerto Rican Professional Baseball League, and Venezuelan Professional Baseball League, South Korea, Taiwan, and China professional leagues; European professional leagues, Dutch league, Italian league, Australia, Olympic Games, European Baseball Confederation, Baseball World Cup, Olympic baseball tournament, International Baseball Federation (IBAF), Women's baseball amateur basis, Women's Baseball World Cup, World Baseball Classic, Baseball World Series;

(n) Table Tennis selected from college, professional, ABA, BAA, CBA, NCAA, men's, women's, D-League, NBL, USBL, WNBA, Dream Team, Olympics, WBC, TOA, Olympic Games, World Championships, World Table Tennis Championships, Top International Table Tennis Tournaments, World Cup, World Clubs Championships, ITTF Pro Tour Events, ITTF Pro Tour Grand Finals, African Championships, Asian Championships, European Championships, Latin American Championships, North American Championships, Oceania Championships, Pan-American Games, Commonwealth Games, Mediterranean Games, Arab Championship;

(o) Boxing from title fights, promotion fights, professional, amateur, Olympics;

(p) Fighting from TFC, UFC, MMA;

(q) Wrestling from WWE, TNA, CMLL, OVW, APW, UPW, CWF, HWA, AWF, WOW, ECWA, JCW, WCWO, WWA, Olympics;

(r) Cycling from International Cycling Union Pro Tour, Five Continent Circuit Championship (America, Africa, Asia, Europe, Oceania), World Championships, National Cycling Championships, Giro d' Italia, Tour de France, Vuelta a Espana, Olympics;

(s) Alternative sports selected from Racing, Backpacking, Water and Snow Skiing, Bicycling, Big Wave Surfing, Bodyboarding, Riding, Canoeing, Diving, Hiking, Motor Sports, Kayaking, Scuba Diving, Running, Motocross, Hang Gliding, Walking, Horseback Riding, Climbing, Ice and Roller Skating, Jet Skiing, Stilts, Kite flying, Kneeboarding, Motorcycling, Motor racing, Mountain Biking, Sailing, Scootering, Skate Boarding, Snow Shoeing, Snowboarding, cross country skiing, fishing, Trekking, Wakeboarding, Rafting, Windsurfing, Badminton, Chess, Olympics;

(t) Adventure sports selected from Adventure Racing, Airsoft, Backpacking, Ballooning, Barefoot Skiing, Base Jumping, Bicycling, Big Wave Surfing, Bike Trials, BMX, BMX Dirt, BMX Freestyle, BMX Street, BMX Vert, Bodyboarding, Bossaball, Bouldering, Buildering, Bull Riding, Bungee Jumping, Extreme Canoeing, Canopying, Cave Diving, Caving, Spelunking, Cliff Jumping, Dog Sledding, Extreme Biking, Extreme Hiking, Extreme Ironing, Extreme Motor Sports, Extreme Sea Kayaking, Extreme Skiing, Flowboarding, Four Wheel Driving, Free Diving, Free Running, Freeboarding, Freestyle Motocross, Gliding, Hang Gliding, Heli Skiing, Hill Walking, Horseback Riding, Hot Air Ballooning, Ice Climbing, Indoor Rock Climbing, Inline Skating, Jet Skiing, Jumping Stilts, Kite Landboarding, Kite boarding, Kite surfing, Kite wing, Kneeboarding, Le Parkour, Luge, Motocross, Motorsports, Motorcycling, Drag racing, Freestyle Motocross, Mountain Biking, Mountain Biking Free ride, Mountain Biking North Shore, Mountain Biking Slope style, Mountain Boarding, Mountain Climbing, Mountaineering, Paintball, Parachuting, Paragliding, Para motoring, Parasailing, Parkour, Pole Climbing, Poweriser, Jumping Stilts, Rafting, Rappelling, Abseiling, Rock Climbing, Roller Derby, Roller Skating, Russian Climbing, Extreme Rugby, Sailing, Sand Kiting, Sand boarding, Scootering, Scuba Diving, Shark Diving, Skate Boarding, Ski Joring, Ski Jumping, Skiboarding, Extreme Skiing, Skiboarding, Sky Flying, Skydiving, Skysurfing, Slack lining, Slam ball, Snake boarding, Snorkeling, Snow Kiting, Snow Shoeing, Snowboarding, Snow cross, Snowmobiling, Snow skating, Soaring, Spearfishing, Speed Climbing, Speed Skiing, Street Climbing, Street Luging, Stunt Pogo, Super cross, Swimming, Surfing, Tree Climbing, Trekking, Trials Biking, Tricking, Unicycling, Urban Kayaking, Wakeboarding, Water Skiing, White Water Rafting, Whitewater Canoeing, Whitewater Kayaking, Whitewater Rafting, Wind sports, Windsurfing, Wingsuit Flying, Winter Swimming, and Zorbing.

5. The method of claim 1, wherein the at least one second social/geo/promo link category has a composite network interaction correlation value selected from a maximum, a minimum, or a combination of separate network interaction correlation values for two or more of the at least one second social/geo/promo link category.

6. The method of claim 5, wherein identifying one or more social/geo/promo link categories having a network interaction correlation value that is less than a correlation threshold further comprises: identifying one or more social/geo/promo link categories having a composite network interaction correlation value that is less than a network interaction correlation value threshold.

7. The method of claim 1, wherein said computer system or mobile device is provided by a mobile device operator using a mobile device communication standard.

8. The method of claim 1, wherein said product or service includes data generating a visual display of celebrity or entertainment news.

* * * * *